US007552094B2

(12) United States Patent
Park et al.

(10) Patent No.: US 7,552,094 B2
(45) Date of Patent: Jun. 23, 2009

(54) OPTICAL PAYMENT TRANSCEIVER AND SYSTEM USING THE SAME

(75) Inventors: Kyung Yang Park, Seoul (KR); Chul Ki Kim, Songnam (KR); Que Min Hwang, Seoul (KR); Bong Sung Jung, Seoul (KR); Kwang Hyun Sung, Seoul (KR); Do Ha Kim, Seoul (KR); Hoon Joon Jung, Gunpo (KR); Bog Heui Kang, Dobong-gu (KR); Eun Sang Cho, Jongro-gu (KR); Won Dong Kim, Seoul (KR); Dae Yeon Kim, Seoul (KR); Kwang Su Chang, Seoul (KR); Hee Gu Woo, Seoul (KR)

(73) Assignee: Harexinfotech, Inc., Seoul (KR)

( * ) Notice: Subject to any disclaimer, the term of this patent is extended or adjusted under 35 U.S.C. 154(b) by 633 days.

(21) Appl. No.: 10/148,326

(22) PCT Filed: Mar. 16, 2001

(86) PCT No.: PCT/KR01/00428

§ 371 (c)(1),
(2), (4) Date: May 29, 2002

(87) PCT Pub. No.: WO01/69346

PCT Pub. Date: Sep. 20, 2001

(65) Prior Publication Data

US 2002/0194137 A1 Dec. 19, 2002

(30) Foreign Application Priority Data

| Mar. 16, 2000 | (KR) | ................................ 2000-13426 |
| May 18, 2000 | (KR) | ................................ 2000-26621 |
| Jun. 9, 2000 | (KR) | ............................ 2000-16328 U |
| Jun. 9, 2000 | (KR) | ................................ 2000-31567 |
| Jun. 13, 2000 | (KR) | ................................ 2000-32454 |
| Jun. 13, 2000 | (KR) | ................................ 2000-32455 |
| Jun. 16, 2000 | (KR) | ................................ 2000-33198 |
| Jul. 28, 2000 | (KR) | ............................ 2000-21614 U |
| Dec. 6, 2000 | (KR) | ................................ 2000-73716 |
| Dec. 6, 2000 | (KR) | ................................ 2000-73717 |
| Dec. 6, 2000 | (KR) | ................................ 2000-73718 |
| Dec. 6, 2000 | (KR) | ................................ 2000-73719 |
| Jan. 11, 2001 | (KR) | ................................ 2001-1540 |

(51) Int. Cl.
*G06Q 20/00* (2006.01)
*G06Q 30/00* (2006.01)

(52) U.S. Cl. ............................. 705/65; 705/39; 705/66; 705/14; 705/26; 705/27

(58) Field of Classification Search .................. 705/14, 705/69, 39, 66; 713/201; 710/1; 455/414
See application file for complete search history.

(56) References Cited

U.S. PATENT DOCUMENTS 5,446,783 A * 8/1995 May ............................ 455/557

(Continued)

*Primary Examiner*—Evens J. Augustin
(74) *Attorney, Agent, or Firm*—F. Chau & Associates, LLC

(57) ABSTRACT

An optical payment transceiver and an optical settlement system using the same uses a personal portable terminal incorporated with an optical transceiver as a card substitute payment unit for settlement. Here, card information is incorporated in a personal portable terminal incorporated with an optical transceiver such as a portable phone or a PDA and the optical transceiver is connected to a card inquiry machine to thereby optically transmit and receive card information. The card inquiry machine recognizes the received card information in the same manner as that of the card reader reading a magnetic card, and transmits the card information to a VAN company server or a card company server, to then request for an approval and settle transactions. The present invention is applied to most fields where financial transactions are performed as in a general commerce, a toll gate fee or tunnel passage fee collection system, a subway or bus fare levying system, a gas station, a department store, a drive-thru ordering system, a vending machine, and a fee payment system of kiosks. Also, the present invention can be applied to an entrance/exit security system requiring personal identification. Thus, the present invention can use a portable terminal as a payment unit without carrying a cash or cards, to thereby provide an effect of performing a safer and more reliable credit transaction.

13 Claims, 104 Drawing Sheets

U.S. PATENT DOCUMENTS

| | | | | |
|---|---|---|---|---|
| 5,465,038 A * | 11/1995 | Register | | 710/1 |
| 5,590,038 A * | 12/1996 | Pitroda | | 705/41 |
| 5,708,840 A * | 1/1998 | Kikinis et al. | | 708/105 |
| 5,884,271 A * | 3/1999 | Pitroda | | 705/1 |
| 5,887,266 A * | 3/1999 | Heinonen et al. | | 455/558 |
| 5,903,830 A * | 5/1999 | Joao et al. | | 455/406 |
| 6,250,557 B1 * | 6/2001 | Forslund et al. | | 235/492 |
| 6,305,603 B1 * | 10/2001 | Grunbok et al. | | 235/379 |
| 6,367,010 B1 * | 4/2002 | Venkatram et al. | | 713/171 |
| 6,418,326 B1 * | 7/2002 | Heinonen et al. | | 455/558 |
| 6,507,727 B1 * | 1/2003 | Henrick | | 455/3.06 |
| 6,535,726 B1 * | 3/2003 | Johnson | | 455/406 |
| 6,584,309 B1 * | 6/2003 | Whigham | | 455/414.1 |
| 6,587,835 B1 * | 7/2003 | Treyz et al. | | 705/14 |
| 6,589,290 B1 * | 7/2003 | Maxwell et al. | | 715/224 |
| 6,636,833 B1 * | 10/2003 | Flitcroft et al. | | 705/1 |
| 6,825,751 B1 * | 11/2004 | Kita et al. | | 340/5.61 |
| 6,859,650 B1 * | 2/2005 | Ritter | | 455/406 |
| 6,885,877 B1 * | 4/2005 | Ozaki et al. | | 455/556.1 |
| 6,892,307 B1 * | 5/2005 | Wood et al. | | 713/201 |
| 2001/0034720 A1 * | 10/2001 | Armes | | 705/65 |
| 2001/0037254 A1 * | 11/2001 | Glikman | | 705/26 |
| 2001/0051922 A1 | 12/2001 | Waller et al. | | |
| 2003/0075610 A1 | 4/2003 | Ong | | |
| 2003/0181201 A1 * | 9/2003 | Bomze et al. | | 455/414.3 |

* cited by examiner

FIG. 38

| PRODUCT NAME | QUANTITY | AMOUNT |
|---|---|---|
| LOBSTER BUGGER | 10 | 20000 |
| BEEF BUGGER | 2 | 5000 |
| TOTAL SUM | | |

VENDOR CONTROLLER CONNECTOR

OPTICAL PAYMENT TRANSCEIVER AND SYSTEM USING THE SAME

TECHNICAL FIELD

The present invention relates to an optical payment transceiver and an optical settlement system using the same, and more particularly, to a system for settling an expense of various transactions through a portable terminal in which payment information is contained in the portable terminal to which an optical payment transceiver is attached.

BACKGROUND ART

Recently, cards convenient to use and handy to carry are widely being used compared with cash. The cards are classified into a credit card, a cash card, a direct payment card, an advance payment card, a traffic card and so on according to a settlement method. For example, cards are frequently used to settle accounts for purchase of products in general shops or department stores. Also, cards are used to pay for filling gas in gas stations or having food in restaurants. Recently, cards are being used for traffic fare in taxis, subways or buses. In addition, cards are being used for electronic commerce transactions or automatic transfer machines (ATMs)/CDs. As such, card affiliated stores continue to increase and card settlement items become diverse. However, cards are not still sufficiently applied to toll gates, tunnel passage, vending machines, and self-service kiosks.

FIG. 1 illustrates a general credit card settlement system, which shows the case of paying for an article purchased in a shop.

In FIG. 1, a purchaser gives his or her own credit card 11 to a seller. The credit card 11 is a magnetic card in which an inherent number and a user name are engraved. The seller inserts the credit card into a magnetic card reader in a credit card inquiry machine 12, so that credit card information is recognized via the magnetic card reader. Then, the credit card inquiry machine 12 transmits the recognized credit card information to a VAN (Value-Added Network) company server 13, to thereby send an approval request. The credit card inquiry machine 12 and the VAN company server 13 are connected through a dedicated line. The VAN company server 13 applies for an approval to a corresponding card company server 14 according to the received approval request. The card company server 14 having received the approval application from the VAN company server 13 confirms whether the corresponding credit card is black-listed, how is the credit standing of the credit card holder, how is the credit limit of the credit card, and so on, and then transmits an approval result to the VAN company server 13. The VAN company server 13 having received the approval result from the card company server 14 notifies the approval result to the credit card inquiry machine 12 in the store having received the initial approval application. The seller in the store confirms the approval result and then notifies the purchaser of the confirmed approval result. In the case that the credit card proves normal according to the approval result, the seller gives the purchaser a sales check and then receives a signature from the purchaser. Accordingly, a settlement of payment using such a credit card is completed.

FIG. 2 illustrates a credit card settlement system in a general electronic commerce, which includes a cyber shopping mall system 23 providing products or services, and a customer terminal 22 which accesses the shopping mall system 23 via the Internet in order to purchase articles or services. The credit card settlement system also includes a payment gateway company server 24, and a VAN company server 25 and a card company server 26, which are involved in payment for products such as the articles or services.

In FIG. 2, a customer accesses the cyber shopping mall system 23 with a computer, that is, the Internet-accessible terminal 22, in order to perform a shopping. If the customer finds out an article desired to be purchased, he or she transmits a purchase intention to the shopping mall system 23. The customer inputs information of the possessed credit card 21, that is, the customer name, the card number, the secret number, the valid date, etc., on a screen provided by the shopping mall system 23. The shopping mall system 23 transmits the card information provided by the customer to the payment gateway company server 24. The payment gateway company server 24 requests for an approval for the transmitted card information to the card company server 26 or the VAN company server 25, and then confirms an approval result, and transmits the approval result to the shopping mall system 23 where transactions took place. If the shopping mall system 23 is notified that a normal settlement processing has been made from the payment gateway company server 24, the article purchased by the corresponding customer is delivered to the customer to complete the transaction.

Meanwhile, an electronic money is used as a new payment means in addition to cashes or cards. The electronic money may be classified into a network-type electronic money, an IC card-type electronic money and a petty sum electronic money using a phone number. The network-type electronic money adopts a method of storing a substantial monetary value in a particular database on a network and transmits a requested value at a needed time on an on-line, which cannot be used on an off-line. The IC card-type electronic money is represented by a Mondex card as an example. The petty sum electronic money using a phone number adopts a method of inputting a phone number such as a portable phone number instead of payment information such as credit card information when goods or services are purchased on the Internet after registration with respect to corresponding electronic money dealing stores, to thereby allow a phone number inputter to purchase his or her desired goods or services, and charging the amount summed in a following month bill for phone charges to him or her.

DISCLOSURE OF THE INVENTION

By the way, the above-described credit card holder should always possess it in order to pay for charges. If the credit card is lost, it may be unduly used. Also, personal credit information of a credit card holder can be unduly exposed through use of the credit card. Also, in the case that a credit card is handed over to a seller for inquiry of the credit card, the credit card may be easily illegally copied. For this reason, a dispute between a card holder and a card company is frequently raised. However, all responsibilities are taken to a card holder.

Also, in the case that a credit card is a magnetic card, such a credit card can be easily read-out by an unauthorized person and damaged by a careless use and treatment. Also, since a valid data of use is determined, a new credit card should be re-issued for even a member having a normal credit standing every three or five years, and delivered again. Accordingly, a business cost increases. Also, a card is usually kept in custody in a wallet. Thus, in the case that a card is lost, it is difficult to recognize that the card has been lost until it is time when the card is used again or it is found that the wallet has been lost. Thus, an illegal use may be aggravated due to a theft or loss. In addition, since an existing magnetic card can contain only a small amount of information, it cannot be applied to a variety of application fields. Further, since card issuance responsibilities of each card such as entrance cards, security cards, service cards and so on are diverse, persons who wish to receive diverse services provided from the various card issuing authorities should possess a plurality of cards.

Meanwhile, since the number of possessed cards increases and use of cards is frequently made, loss or theft of cards frequently occurs, which increases a burden to suspend dealings on a credit card. Also, if a card holder is registered as a poor credit standing due to a unpaid card dealing amount, it is necessary to suspend such a card dealing. For suspending such a card dealing, a card company server keeps black list (B/L) information with respect to poor credit standing cards and checks whether a card dealing should be suspended if a card dealing approval request is received from a card dealing store. Otherwise, a card reader installed in a bus or subway entrance gate downloads B/L information by wire from a card company server, and compares input card information with the stored B/L information during using of cards in a bus or subway, to thereby check whether such a card is black-listed.

However, the above card dealing suspension methods have the difficulty that a massive amount of information should be stored in each card company server or card reader, which causes an operation of systems difficult. Further, as an amount of information to be processed increases, it becomes longer to check a B/L card and thus a reaction time of the card company server or card reader becomes later, which may cause complaint or dissatisfaction due to inferior services.

To solve the above problems, it is an object of the present invention to provide a card issuance system for enabling a card applicant to use a portable device as a substituted card, in which card information is input into the portable device such as a wireless communications terminal including a cellular phone, a PCS, a portable mobile phone, a PDA, an IMT-2000 device and so on, instead of a magnetic card.

It is another object of the present invention to provide a new settlement system for optically transmitting and receiving card information for paying for an expense and settling the expense payment.

It is still another object of the present invention to provide a settlement system in which an optical transmitter containing card information is rent and all purchased amount bills can be settled.

It is yet another object of the present invention to provide a card information reception combining apparatus for use in a credit card inquiry machine, which receives optically transmitted card information to thereby perform a successful transaction, in which an existing credit card inquiry machine is used as it is without purchasing a credit card inquiry machine attached with an optical receiver receiving optically transmitted card information.

It is a still yet another object of the present invention to provide an authentication system enhancing a reliability with respect to user authentication in the above settlement system.

It is a further object of the present invention to provide a portable device which has a larger information storage capability to thereby provide a variety of services which are not limited in payment of banking or financing transactions.

It is a still further object of the present invention to provide a portable device including information on various cards thereby enhancing user conveniences in which a user possesses a single portable device instead of a plurality of cards.

It is a yet further object of the present invention to provide an optical payment transceiver which is manufactured easily to hand, contains payment information, and transmits the stored payment information by infra-red communications upon manipulation of user buttons, to thereby settle the payment securely.

BRIEF DESCRIPTION OF THE DRAWINGS

The above objects and other advantages of the present invention will become more apparent by describing the preferred embodiments thereof in more detail with reference to the accompanying drawings in which:

FIG. 38 shows a display state with respect to an order details display board in the FIG. 36 system;

BEST MODE FOR CARRYING OUT THE INVENTION

Figure 1:
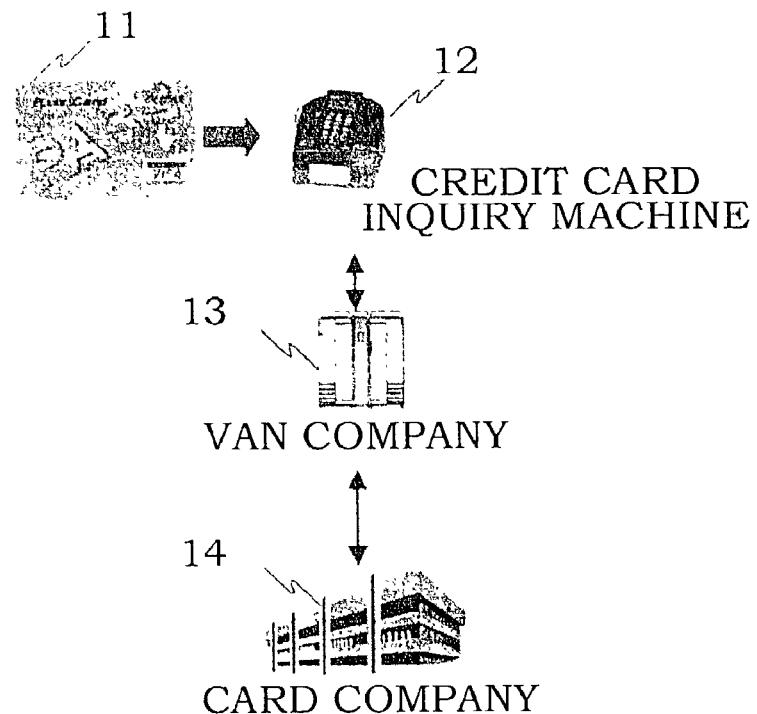
FIG. 1 illustrates a general credit card settlement system.
Figure 2:
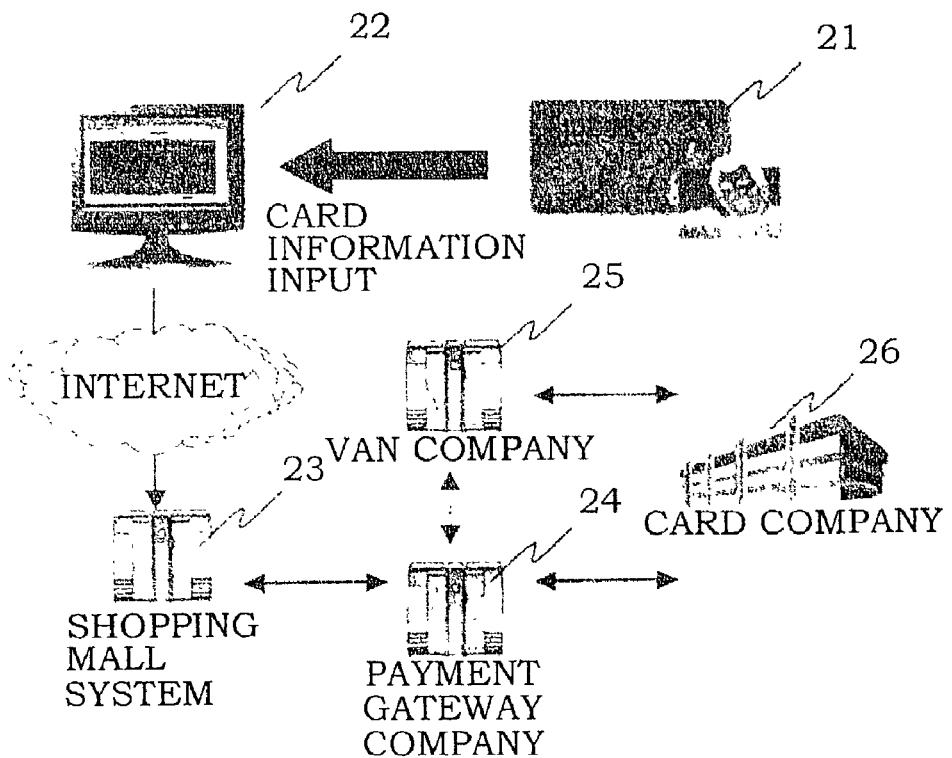
FIG. 2 illustrates a credit card settlement system in a general electronic commerce.

To accomplish the above object of the present invention, there is provided a card issuance method comprising the steps of: (a) receiving a card issuance application; (b) examining an issuance qualification with respect to the received card issuance application; (c) encrypting card information if the issuance qualification is met; (d) transferring the encrypted card information to an applicant designating portable terminal so as to be stored therein; and (e) if the encrypted card information has been completely stored, check a normal operation state and approve the card information stored portable terminal to be used as a substitute card.

To accomplish the above object of the present invention, there is also provided a card issuance system comprising: a card company server receiving a card issuance application, examining an issuance qualification encrypting card information if the issuance qualification is met, and encrypting the card information and transferring the encrypted card information to an applicant designating portable terminal; and said portable terminal receiving and storing the transmitted card information, and displaying the received card information on a screen in order to inform the card issuance applicant that the card issuance has been made.

To accomplish the above object of the present invention, there is also provided an optical payment transmitter for use in an optical transceiver apparatus for payment of expenses, the optical payment transmitter comprising: a memory storing user card information therein; an optical transceiver for optically transmitting and receiving card information; a button for commanding an optical payment operation; a controller for optically transmitting card information according to user button manipulation so that a settlement is completed; and a display displaying an optical payment operation state, in which the optical payment transmitter is fabricated as a compact portable device.

To accomplish the above object of the present invention, there is also provided an optical payment receiver for use in a credit card inquiry machine for receiving card information transmitted from a portable terminal and performing a settlement operation, the optical payment receiver comprising: an optical reception unit for receiving the card information as an optical signal and performing a settlement according to the received card information.

To accomplish the above object of the present invention, there is also provided an optical payment system for paying for fees using an optical signal, the optical payment system comprising: a mobile optical relayer for receiving a card information contained optical signal from a user terminal, temporarily storing corresponding card information, and outputting the stored card information one time; and an optical relay base device for receiving the card information from the mobile optical relayer and transmitting the received card information to a credit card inquiry machine.

To accomplish the above object of the present invention, there is also provided an optical settlement system for use in a commerce system, the optical settlement system comprising: an optical payment transmitter for optically transmitting card information; an optical payment receiver for optically receiving the transmitted card information; a credit card inquiry machine for transferring the received card information and requesting a transaction approval; and a settlement authority server for notifying an approval result with respect to the received approval request to the credit card inquiry machine.

Preferred embodiments of the present invention will be described in detail with reference to the accompanying drawings.

Figure 3:
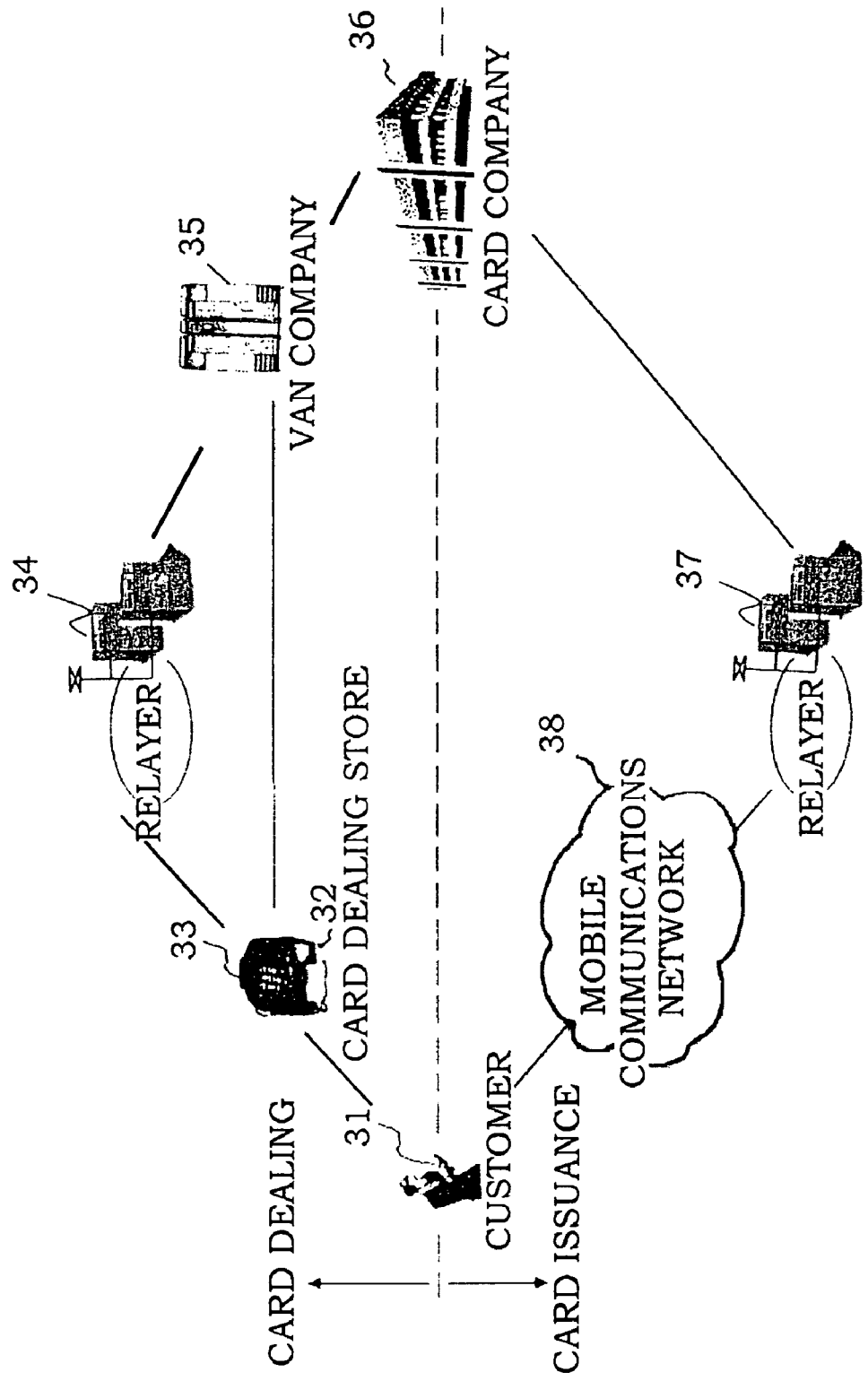
FIG. 3 schematically illustrates an optical settlement system according to the present invention.

FIG. 3 schematically illustrates an optical payment settlement system according to the present invention, which includes a card issuance system and a card dealing settlement system. The card issuance system issues a card according to a method of inputting credit card information to a portable terminal of a card applicant by a data optical transmission and reception method in which an optical transceiver is attached in a card issuance terminal of a card company, a method of inputting card information in a battery pack of a portable terminal, or a method of downloading card information into a portable terminal by wire or wireless network. The card issuance system includes a card issuance applicant 31, a card company 36 issuing the card, and a relayer 37 for transferring the issued card information to a portable terminal possessed by the applicant 31 using the above-described methods. Of course, the card company 36 can directly perform the role of the relayer 37. Between the relayer 37 and the applicant 31 is connected a communications network 38 of a mobile communications company to which the portable terminal has been subscribed, in order to transmit the card information to the portable terminal possessed by the applicant 31 by a radio frequency (RF) transmission and reception method. Between the card company 36 and the relayer 37 is connected a phone network (X.25). The settlement system includes the portable terminal 31 for optically transmitting and receiving the issued credit standing information, a credit inquiry terminal 33 attached in a card dealing store, for receiving a transmitted customer credit information signal using an attached optical receiver 32, and a settlement authority 36 such as a card company for performing credit transaction confirmation and transaction approval. The settlement authority 36 is a bank or card company. A transaction approval request is made via a VAN company 35. The relayer 34 is selectively connected between the credit inquiry terminal 33 of the card dealing subscriber and the VAN company 35.

First, a card issuance system which issues payment information such as a credit card, a payment card, an electronic money, a merchandise coupon and so on, which is contained in a personal portable information device such as a portable phone or a PDA, will be described below.

Figure 4:
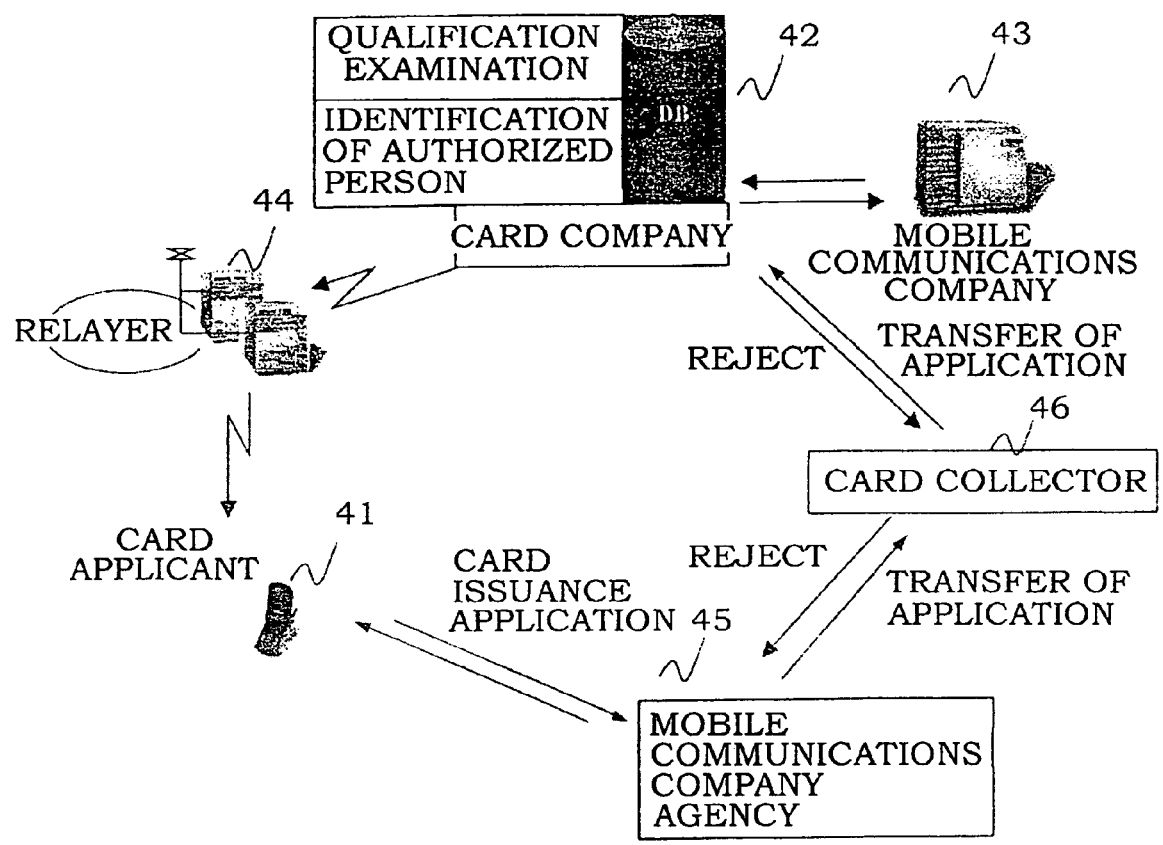
FIG. 4 illustrates a card issuance system according to an embodiment of the present invention.
Figure 5:
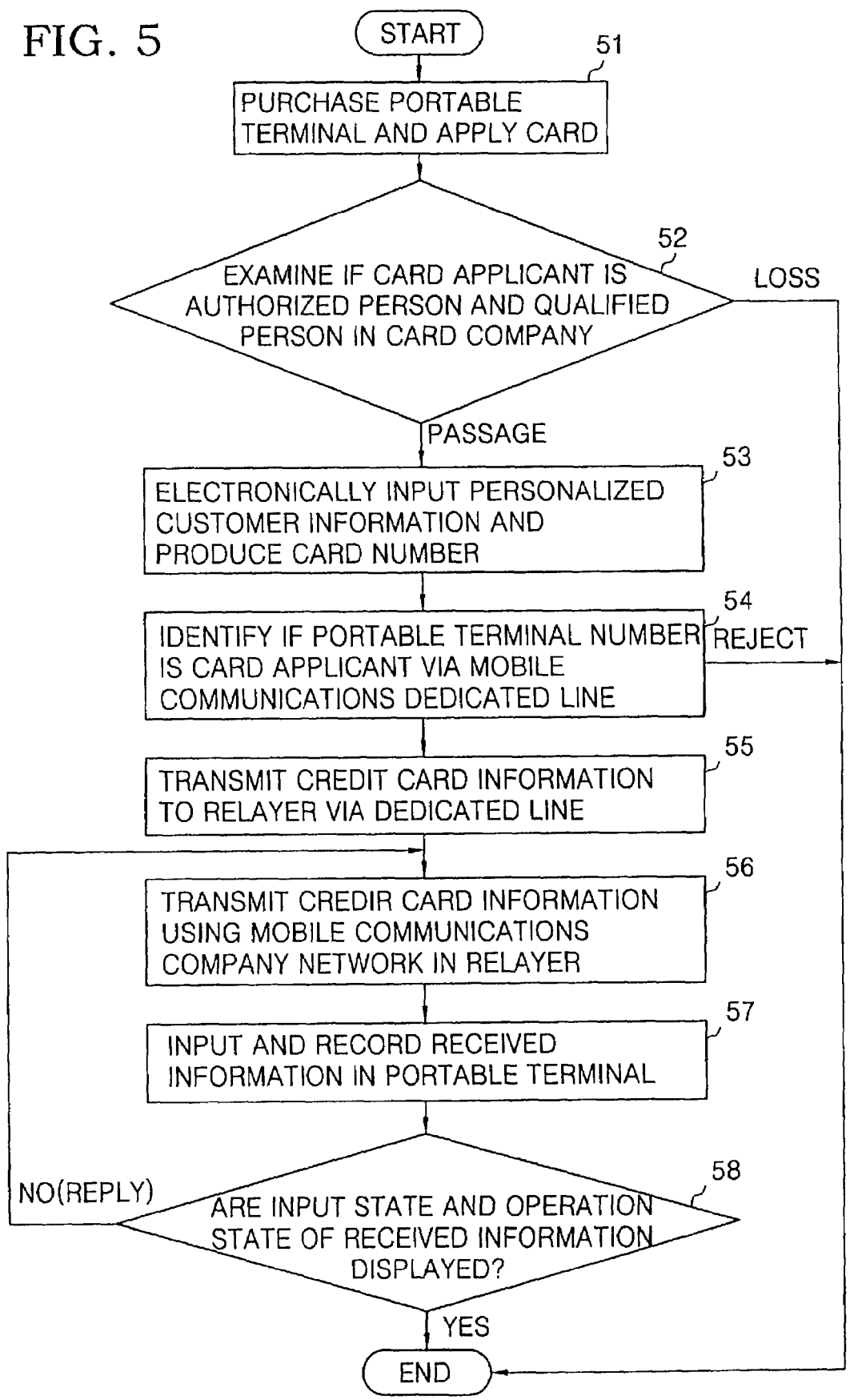
FIG. 5 is a flowchart view for explaining a card issuance operation of the FIG. 4 system.

FIG. 4 illustrates a card issuance system according to an embodiment of the present invention. The system shown in FIG. 4 includes a card applicant 41, and a card company 42 for performing qualification examination and identification of an authorized person, to thereby issue a card. A relayer 44 transmits the information of the issued card to the card applicant's designating portable terminal via a mobile communications network. Also, the FIG. 4 system includes a mobile communications company 43 which authenticates that the card issuance applicant 41 is same as the portable terminal possessor, and a mobile communications agency 45 which sells portable terminals and recommends subscription of the portable terminals. An operation of the card issuance of the FIG. 4 system having the above structure will be described in detail with reference to FIG. 5.

The card applicant 41 purchases a portable terminal such as a portable phone and a PDA which can be used as an optical payment unit, in the mobile communications company agency 45 (step 51). The cars used in the present embodiment is a mobile communications terminal having a portable phone or a PDA form incorporated with an optical transceiver which can transmit and receive card information. The mobile communications company agency 45 transmits the received card issuance application to the card company 42 via a card recruiter 46. The card company 42 ascertains whether the card applicant is the same person as that which is filled in the card issuance application and examines a card issuance qualification (step 52). In the case that the card issuance application proved to be submitted by a person who lost a card issuance qualification in the result of examination of step 52, the card issuance application is returned to the card recruiter 46 or the card applicant 41 or card issuance is rejected. In the case that the card issuance application has been passed through the card issuance examination, a person in charge enters the card applicant information filled in the card issuance application in a server in the card company 42, to then let the server to produce a card number by a card number generation program (step 53). The card company 42 requests a computer server in the mobile communications company 43 to ascertain whether a portable terminal in which the residence number and card information of the card issuance applicant are stored is possessed by the card applicant via a dedicated line which has been already installed according to the contract (step 54). If the residence numbers do not match between the possessor of the portable terminal and the card applicant in the result of ascertainment of step 54, the card issuance application is returned. If it is ascertained that the portable terminal is possessed by the card applicant 41, the server in the card company 42 encrypts the credit card information including the generated card number and transmits the encrypted credit card information to the relayer 44 via the dedicated line together with the portable terminal number (step 55). The relayer 44 receives the encrypted card information together with the portable terminal number. The relayer 44 calls the portable terminal having the same number as the received portable terminal number via the mobile communications network and transmits the credit card information at the connected state where the relayer 44 is connected to the portable terminal (step 56). The portable terminal stores the received credit card information in a memory region which is not accessible by a user, and displays a message for user confirmation on a screen (step 57). On the portable terminal screen, is displayed a message "Dear Mr. Kim, congratulate on your card subscription. Your credit limit is one million U.S. dollars." Thus, the user can ascertain his or her own name and credit limit and so on, and check whether or not error information has been input (step 58). Upon confirmation, the portable terminal returns to step 56 so that the relayer 44 can re-transmit the card information in order to perform the operations of steps 56-58 again, if the received information has not been normally input.

Here, the above card issuance system is called a push system. According to the push system, a portable terminal designated at the time when a card issuance application has been submitted is called if a card applicant is a person who meets a card issuance qualification condition and stores card information transmitted from a card company therein, and then notifies the card applicant that a card has been issued, irrespective of connection of the card applicant to the card company. However, a card can be also issued at the state where a user gains access to the relayer 44 via the Internet. Briefly, the relayer 44 transmits the card issuance notification to the portable terminal via a mobile communications network at the state where the card information is received from the card company 42. A customer who confirms the card issuance notification via the portable terminal manipulates the keypad on the portable terminal to gain access to the relayer 44 and wireless internet. The relayer 44 transmits a message for requesting a personal identification data to a customer in a wireless internet connection state. The customer who receives the message for requesting the personal identification data manipulates the keypad on the portable terminal and transmits the personal identification data to the relayer 44. The relayer 44 which receives the personal identification data judges whether or not the customer to be in connection is an authorized person. If the customer is an authorized person, the relayer 44 transmits the credit card information to the portable terminal. The portable terminal stores the received credit card information in a memory incorporated therein, displays a message "normally received" on a screen, and ends its operations, to enable a user to confirm the normal input. Meanwhile, if the customer is not an authorized person, the relayer 44 make the portable terminal display a message "You are not an authorized person, and card information can not be issued." on a screen, and end its operations. Like this, in the case of the card issuance via the Internet, card issuance is not notified to the card applicant after issuance of the card but card reception intention is asked and then a card is issued to the card applicant only in the case that the card applicant acknowledges the card reception.

Besides, a detachable IC card using methods such as subscriber identity module (SIM), universal subscriber identity module (USIM) and user identity module (UIM) is mounted on the portable terminal, to be used for downloading and storing the card information.

In addition, a card applicant can visit a card company and directly input card information into a portable terminal. This is called a keypad system. A card issuance system using the keypad system is shown in FIG. 6.

Figure 6:
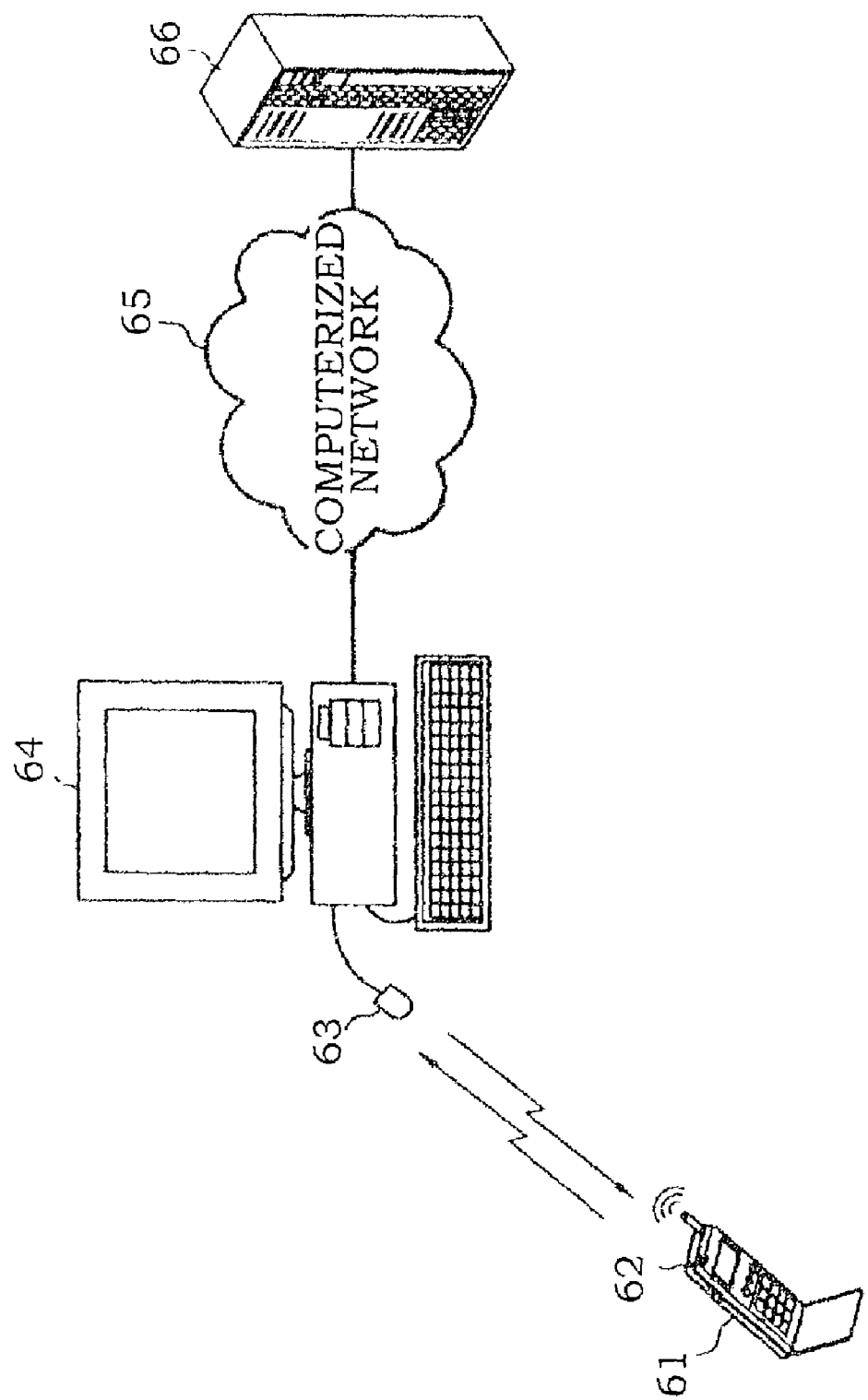
FIG. 6 illustrates a card issuance system according to, another embodiment of the present invention.
Figure 7:
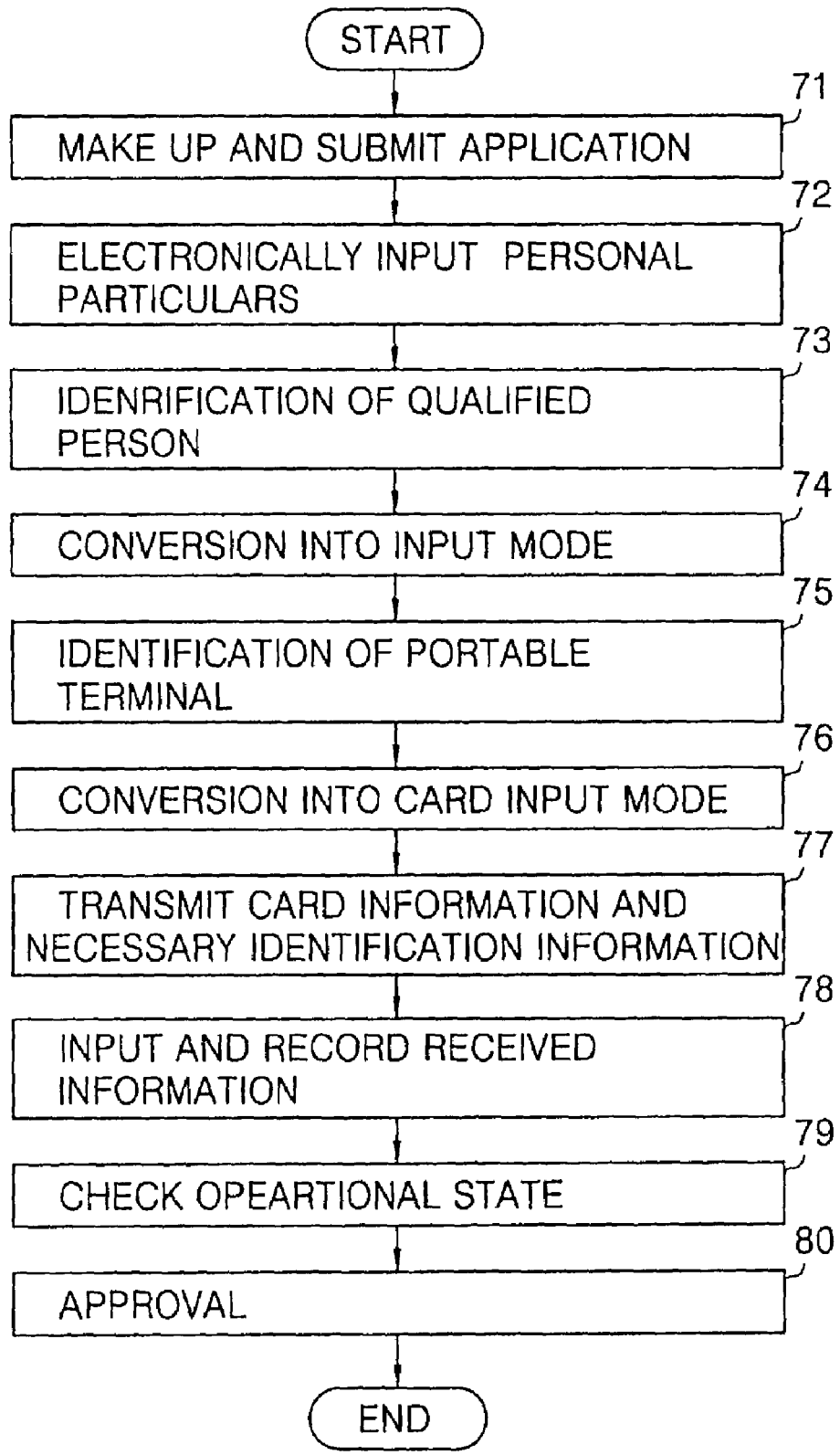
FIG. 7 is a flowchart view for explaining a card issuance operation of the FIG. 6 system.

FIG. 6 illustrates a card issuance system according to another embodiment of the present invention. The system shown in FIG. 6 includes a portable terminal 61 in which an optical transceiver 62 is attached, which receives issued card information and functions as an optical payment unit. A card issuance terminal 64 in which an optical transceiver 63 is attached, inputs the issued card information into the portable terminal 61 possessed by a card applicant. The portable terminal 61 is connected to the card issuance terminal 64 via wire or wirelessly. The FIG. 6 system includes a computer network 65 and a main computer 66 of a card-issuance-related banking authority. An operation of the card issuance of the FIG. 6 system having the above configuration will be described in more detail with reference to FIG. 7.

A card applicant pays a visit to a card issuance company, holding his or her own portable terminal in person, and fills in a card issuance application and submits the same to the company (step 71). A card issuing person inputs contents filled in the submitted application in a computer via the card issuance terminal 64 (step 72). The contents stored in the computer is transmitted to the main computer via the computer network 65. Also, the card issuing person identifies whether the card applicant is the same person as one whose information has been filled in the card issuance application, through an identification card such as a residence card, a passport, and a driving license (step 73). After identification, the card issuing person converts the card issuance terminal 64 into an input mode (step 74), and then ascertains whether the number of the portable terminal 61 being an input object is identifies with that of the submitted portable terminal (step 75). In this case, the portable terminal is identified by asking or calling a mobile communications company if the number of the portable terminal 61 is identifies with that of the submitted portable terminal. Then, the submitted portable terminal 61 is converted into a card input mode (step 76). If the card issuance terminal 64 and the portable terminal 61 have been converted into the input mode, respectively through steps 74 and 76, the optical transceiver 62 attached to the portable terminal 61 and the optical transceiver 63 attached to the card issuance terminal 64 are positioned to face each other so that the one can optically transmit and receive card information to and from the other. Of course, the card issuance terminal 64 and the portable terminal 61 can be directly connected by cable, to thereby transmit and received card information. The card issuing person presses predetermined input buttons on a keyboard of the card issuance terminal 64 to thereby transmit personal card information, a name, and other information required by a banking authority (step 77). Here, the transmitted information is input to the main computer 66 through the computer network 65 as well as the portable terminal 61 and then recorded therein. The portable terminal 61 receives the information transmitted from the optical transceiver 63 of the card issuance terminal 64 via the optical transceiver 62 and records the received information therein (step 78). When the card information has been completely input, the optical transceiver 62 is positioned to face the optical transceiver 63 at a normal operational state confirmation mode of the card issuance terminal 64, and then the predetermined buttons are pressed to ascertain an operational state (step 79). If it is confirmed that there is no abnormality, the personal card information entry is finally approved (step 80).

Other than the optical transmission and reception, the portable terminal can be connected to the card issuance terminal by cable via an external communications port provided in the portable terminal, so that card information can be stored in the portable terminal. A variety of information can be stored in the portable terminal by means of the previously described optical payment device other than the card information. That is, existing ticket- or coupon-fashioned premium information and respective service card information is stored and then transmitted via an optical transceiver.

Figure 8:
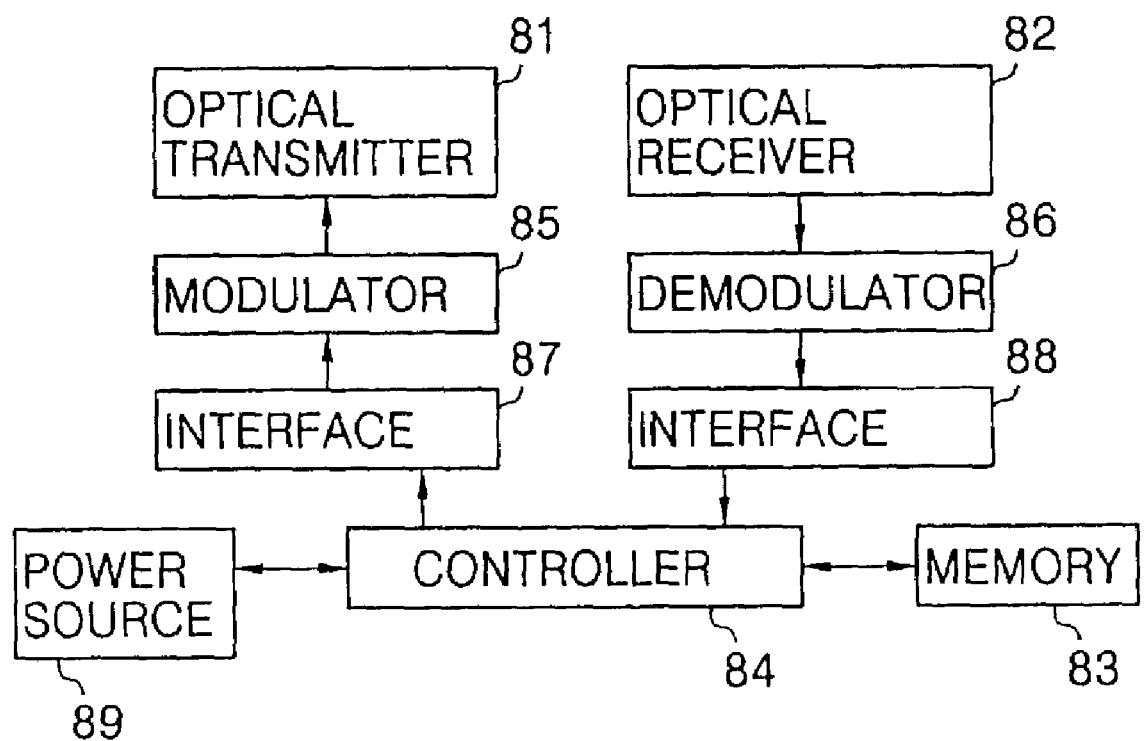
FIG. 8 is a block diagram showing an optical payment unit according to the present invention.

FIG. 8 is a block diagram showing an optical payment unit according to the present invention. The FIG. 8 optical payment unit includes an optical transmitter 81 for converting an electrical signal into an optical signal, an optical receiver 82 for converting an optical signal into an electrical signal and a memory 83 storing various information including input card information. A controller 84 stores the input information and controls respective elements so that the stored information can be used as payment information. The optical transmitter 81 is connected to a modulator 85 for modulating a signal to be transmitted and the optical receiver 82 is connected to a demodulator 86 for demodulating a received signal. Interfacers 87 and 88 perform an interfacing operation between the modulator 85 and the controller 84, and between the demodulator 86 and the controller 84, respectively.

The optical payment unit according to the present invention is not limited to a portable terminal being a mobile communications terminal in which an optical transceiver is attached, and is applied to a key-chain, a watch, an electronic notebook, a PDA, and so on, which enables fabrication of a variety of mobile units (MUs) which can be selectively used according to users' needs.

Figure 9:
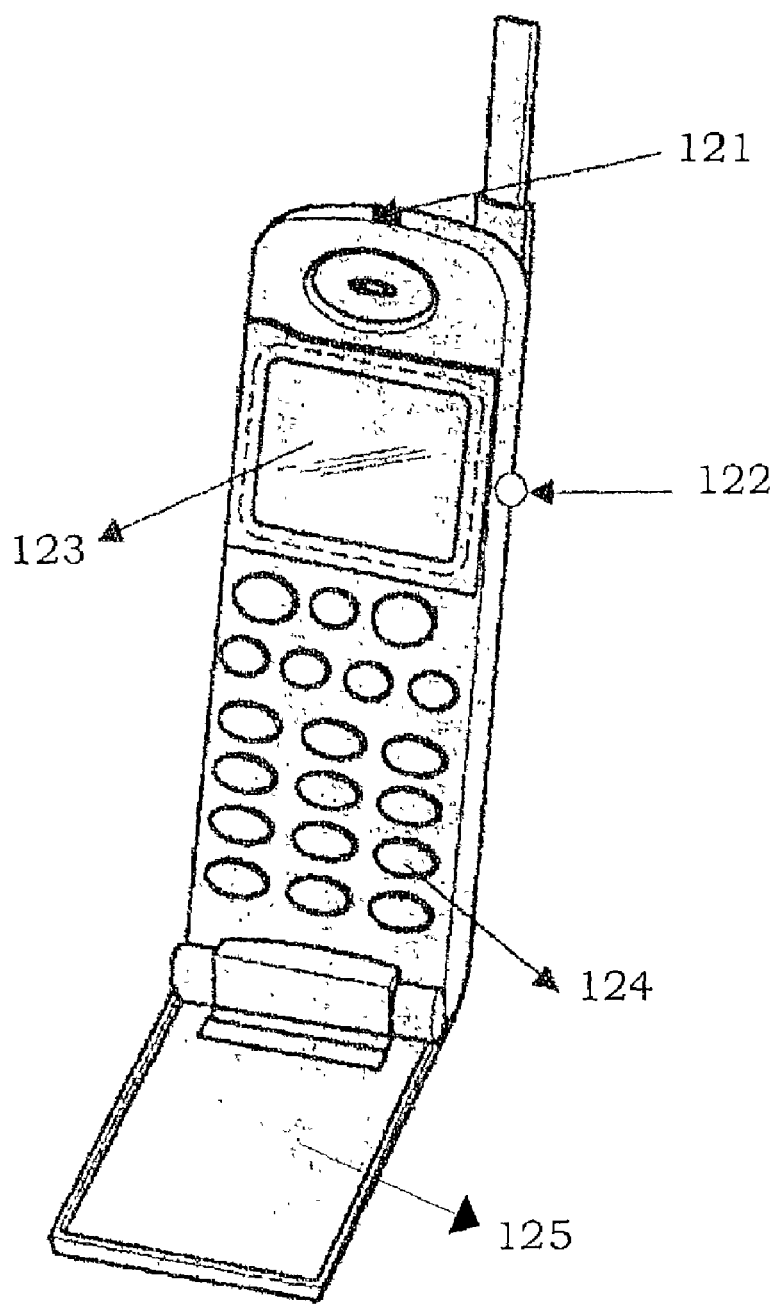
FIG. 9 shows an external appearance of an optical payment unit fabricated in a portable phone shape.

FIG. 9 shows an external appearance of an optical payment unit fabricated in a portable phone shape. An optical transceiver 121 for optically transmitting and receiving card information is attached to the portable phone shown in FIG. 9. Also, buttons for commanding optical transmission operations of the card information are provided on a keypad 124 additionally. Of course, existing keys on the keypad can be used. A button 122 for commanding an optical transmission operation of a traffic card function is provided in a proper position of the portable phone, in the case of a portable phone shaped optical payment unit. An optical payment operation is displayed on a liquid crystal display (LCD) 123. Also, a signature tag 125 for showing a card membership signature is attached to a proper position at which the portion is not easily worn during use of the portable phone, which can satisfy a signature confirmation request as in the case of using a magnetic card.

Figure 10A:
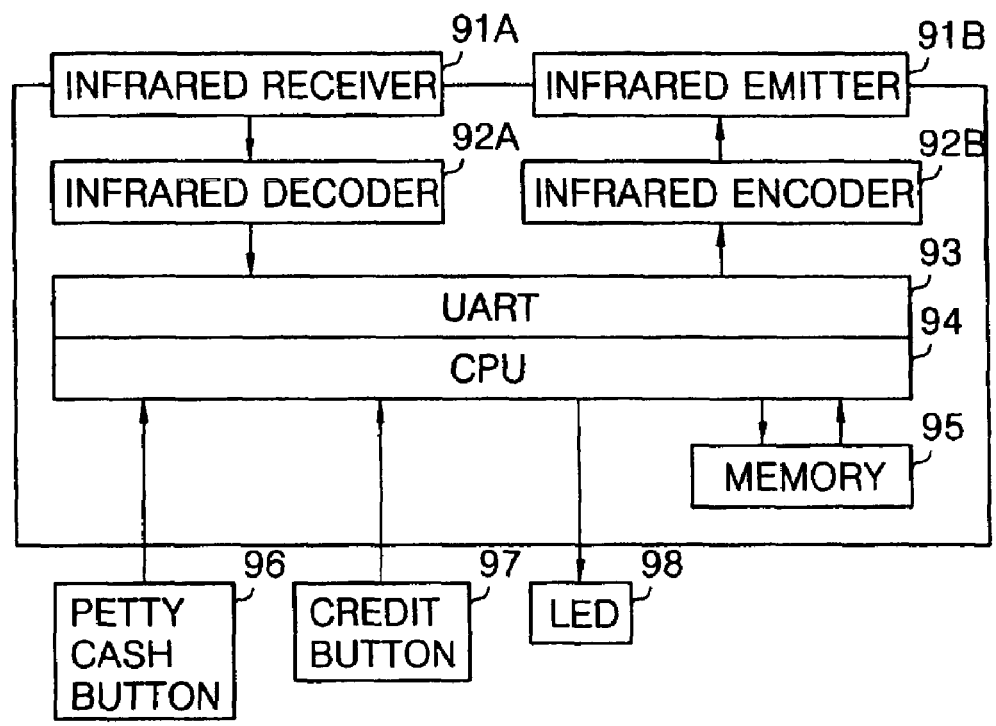
FIG. 10A is a block diagram showing an optical payment unit fabricated in a key chain shape.
Figure 10B:
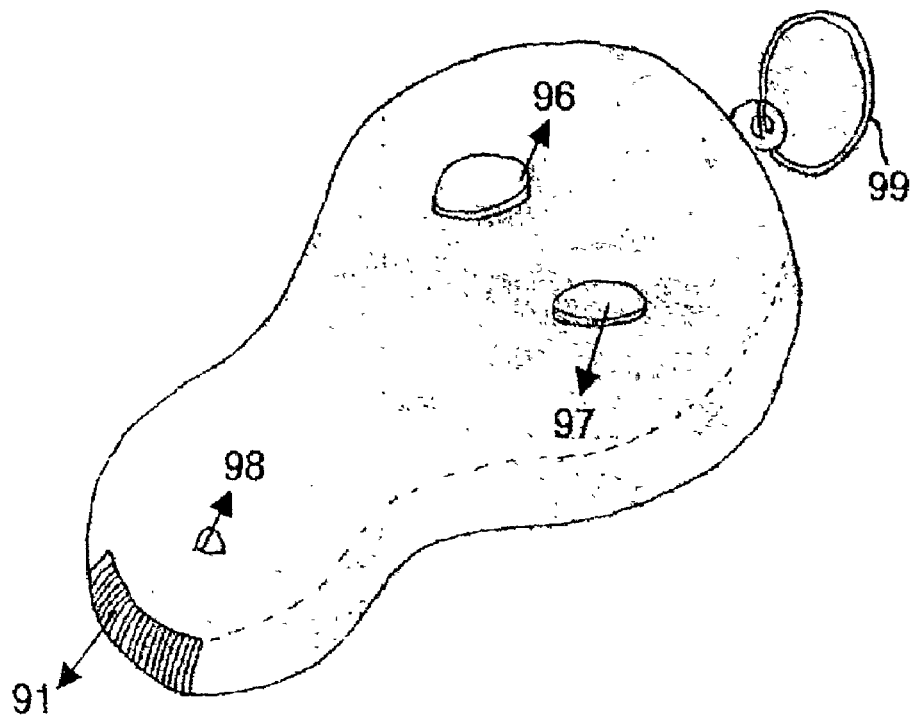
FIG. 10B shows an external appearance of the FIG. 10A optical payment unit fabricated in a key chain shape.

FIG. 10A is a block diagram showing an optical payment unit fabricated in a key chain shape, and FIG. 10B shows an external appearance of the FIG. 10A optical payment unit fabricated in a key chain shape. The key chain internal configuration shown in FIG. 10A includes an infrared receiver 91A for receiving credit card information of an infrared signal and converting the infrared signal into an electrical signal and an infrared decoder 92A for altering the converted electrical signal into a UART standard signal. A UART portion 93 transforms a UART standard serial electrical signal into an 8-bit parallel signal. Also, the key chain shaped optical payment unit includes a memory 95 storing the received credit card information, a petty money button 96 and a credit button 97 both for commanding an optical transmission payment operation. A display 98 is formed of light emitting diodes (LEDs) and displays an operational state. Meanwhile, the key chain optical payment unit includes a CPU 94 for transferring credit information of infrared signals according to a user's button manipulation and performing a control operation to be settled, an infrared encoder 92B for altering a UART standard electrical signal into an infrared standard signal, and an infrared light emitting portion 91B for converting and transmitting an electrical signal into an infrared signal. The key chain shaped optical payment unit 90 having the above configuration is fabricated into a compact key ring to be conveniently hand-held as shown in FIG. 10B. Here, a ring 99 is provided to be conveniently combined with other keys.

When a user presses the petty cash button 96 for credit dealing or the credit button 97 for petty money dealing, the CPU 94 receiving button inputs reads credit card information from the memory 95 in which payment information is stored. The UART portion 93 converts the credit card information read via the CPU 94 into a serial patterned UART standard signal and transmits the converted result to the infrared encoder 92B. The infrared encoder 92B converts the UART standard serial signal into the infrared standard signal, and transmits the converted result via the infrared light emitting portion 91B. The infrared credit card information is transmitted to a credit card inquiry terminal, that is a base unit (BU) in which an optical transceiver is attached, so as to be settled. Usually, if credit information is normally received, the base unit responds to the received credit information in an infrared signal. The infrared signal is received in the infrared receiver 91A of the optical payment unit 90 and converted into an electrical signal. The infrared decoder 92A changes the converted electrical signal to the UART standard signal. The UART portion 93 converts the UART standard signal into the 8-bit unit parallel signal and transmits the converted result to the CPU 94. The CPU 94 performs a communications operation according to a protocol determined by an internal program and controls the display 98 to display the communications success or failure thereon.

Here, additional buttons for performing credit dealing and petty money dealing are provided, so that a respectively different operation is performed during a petty money dealing and a large sum dealing. First, in the case of a petty settlement such as a traffic fare, a secret input is not needed. Thus, a simple settlement can be performed with only one touch of the petty money button 96. However, in the case of a large sum settlement, a settlement is usually performed by confirmation of a secret number. Thus, in the case that the credit button 97 is pressed, a credit card inquiry machine (not shown) at a reception end requests a secret number, and then a user inputs a secret number using a keypad at the reception end in which a personal identification number (PIN) input keypad is provided, to thereby perform a business transaction.

In the case that a secret number input means such as a keypad is installed for a large sum settlement which requires a secret number input, a production cost increases and a volume of the device is enlarged. Thus, the present invention incorporates a tone recognition module of a portable phone keypad in the above-described optical payment unit, so that a secret number can be input using the portable phone keypad. That is, in the case of a large sum settlement, the tone recognition module is positioned to be close to the speaker of the portable phone. In this state, a secret number is pressed using the portable phone keypad. Then, the portable phone speaker outputs a dial tone signal corresponding to the corresponding number of the pressed buttons. Then, the tone recognition module receives a tone signal corresponding to the corresponding secret number and recognizes the secret number from the received tone signal. If the large sum settlement button is pressed in this state, the CPU 94 transmits the secret number recognized in the tone recognition module externally. Here, since the transmitted secret number is not stored in the optical payment unit but output externally, there is no concern about an exposure of the secret number even in the case of loss or theft of the optical payment unit.

Portable phones possessed by most people can be used as the above-described optical payment unit. In this case, it is preferable that an optical transmission circuit is integrated and incorporated into a portable phone circuit. However, it takes much time and requires much cost to design and fabricate a new portable phone incorporated with the optical transmission circuit. Thus, an optical transmitter is incorporated into a battery of the portable terminal such as the portable phone, so that a currently available portable terminal is used as it is while performing the function of an optical payment settlement system.

Figure 11:
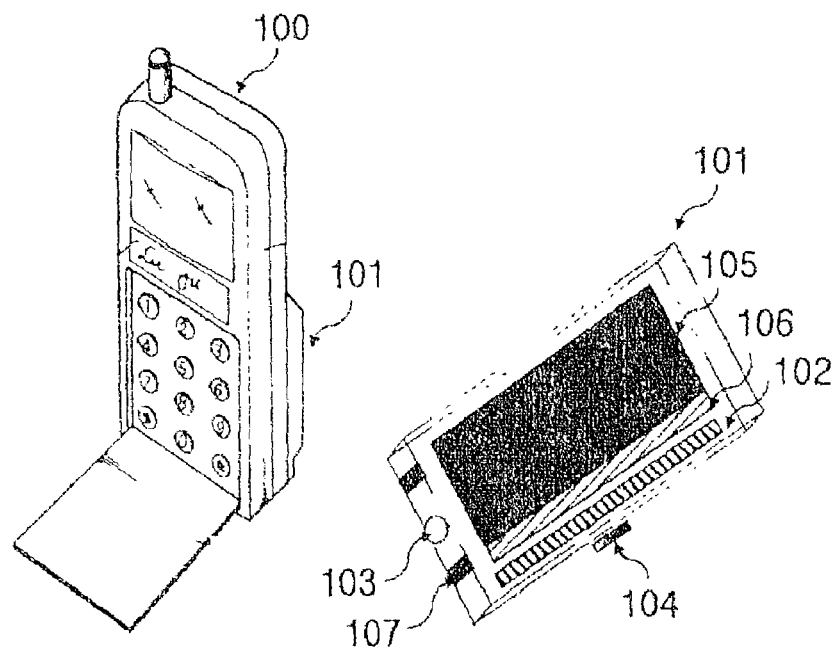
FIG. 11 illustrates an embodiment of a portable terminal battery pack including an optical transceiver according to the present invention.

FIG. 11 illustrates an external appearance of a portable terminal battery pack including an optical transceiver according to the present invention.

A portable terminal 100 is a terminal which is carried and movable by a user, including a portable phone, a wireless Internet communications terminal and a PDA. A pack-type battery 101 includes a rechargeable battery 105 for supplying power to the portable terminal 100, a charging circuit and charging taps 107. Also, the battery 101 includes an optical transmitter for enabling an optical payment credit dealing as in a credit card. The optical transmitter is incorporated into the battery 101, which includes the optical transmission circuit 102 for generating an optical signal, a light emitting element 103 for emitting an optical signal from the optical transmission circuit 102 externally, and a settlement switch 104 for approving a settlement of the optical payment according to the emitted optical signal.

The optical transmission circuit 102 is incorporated using an internal clearance space in the battery pack 101. The light emitting element 103 is attached near the charging taps 107. Of course, the light emitting element 103 can be attached in a proper place of the battery pack 101 so as to perform an optical transmission easily. In the case that the light emitting element 103 is attached in the periphery of the charging taps 107 as in this embodiment, the light emitting element 103 should be attached so that it is not protruded from an external surface of the battery pack 101. Also, the settlement switch 104 is attached unprotrudingly on the rear surface of the battery pack 101 in order to prevent an unwanted settlement optical signal from be emitted due to an external contact.

Figure 12:
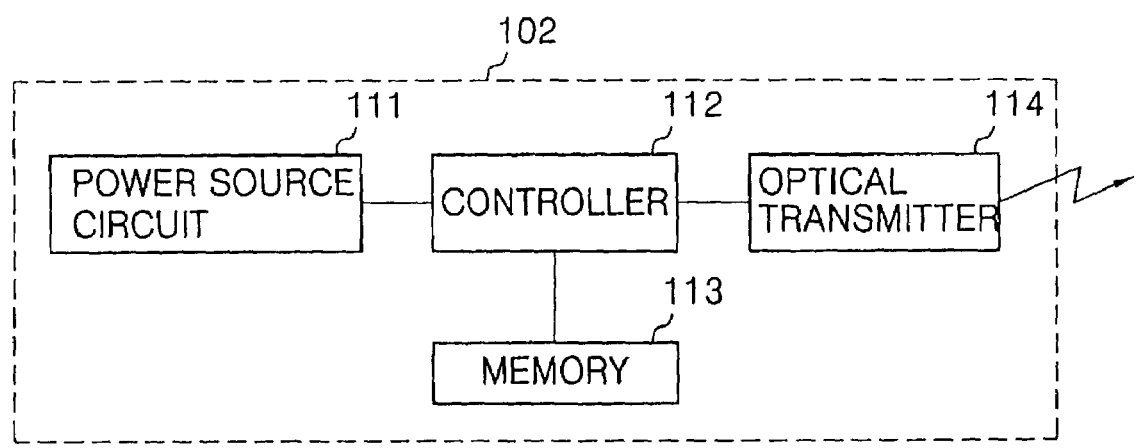
FIG. 12 is a block diagram showing an optical transmission circuit included in a battery pack.

FIG. 12 is a block diagram showing an optical transmission circuit included in a battery pack 101.

A power circuit 111 is a circuit for supplying power to an optical transmission unit, in which power is obtained from a rechargeable battery in the battery pack. The memory 113 stores user credit dealing information and an optical transmitter 114 converts credit dealing information into an optical signal so as to be externally emitted. A controller 112 transmits information from the memory 113 to the optical transmitter 114, and controls the operation of a circuit 112.

If a user presses a settlement switch 104 attached in the battery pack 101, the power circuit 111 supplies power to the whole parts of the optical transmission circuit 102. Then, the controller 112 reads information from the memory 113 and transmits the read information to the optical transmitter 114. The optical transmitter 114 converts the received information into an optical signal such as an infrared signal. That is, received digital information is converted into an optical signal using a light intensity. In the case that a longer transmission distance is needed, a communications distance can be increased using an additional modulation/demodulation unit. The converted optical signal is emitted via the light emitting element 103 externally. Here, an IC chip such as an IC card can be used as the memory 113. The IC chip has a single unique recognition number, to thereby prevent personal information from being leaked due to an illegal reproduction of the IC chip.

As another embodiment, the optical transmission circuit 102 can be incorporated in the portable terminal 100 not in the battery pack 101. In this case, a connection means is needed for connecting the optical transmission circuit 102 incorporated in the portable terminal 100 to the light emitting element 103 and the settlement switch both of which are attached in the battery pack 101. Such a connection means is formed by using a power supply terminal for supplying power to the portable terminal 100 or an additional terminal.

Figure 13A:
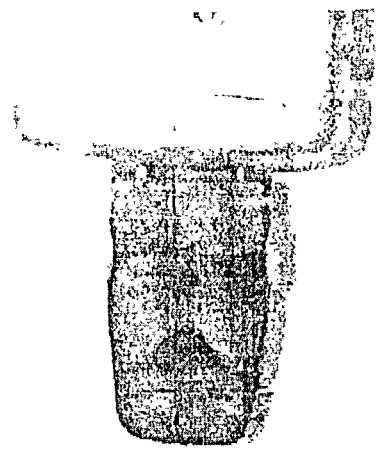
FIG. 13A is a front-end bottom view showing a connection state between an optical transceiver plug device and a portable phone device.
Figure 13B:
FIG. 13B is a rear view showing a connection state between an optical transceiver plug device and a portable phone device.
Figure 14:
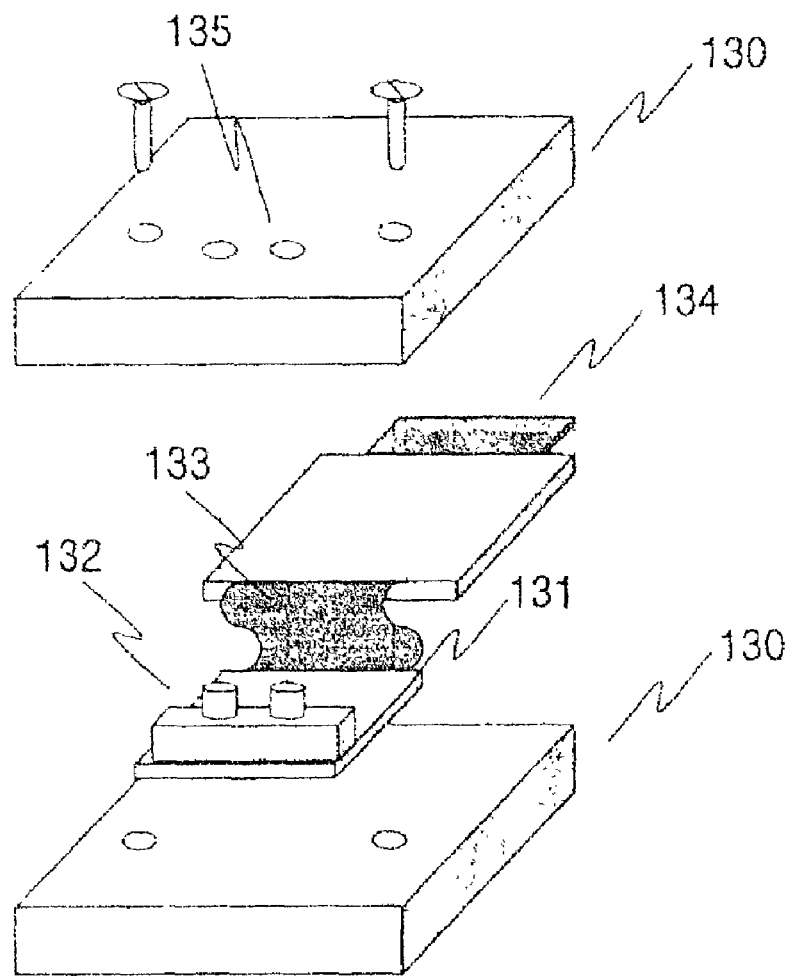
FIG. 14 is a detailed configuration view showing an optical transceiver plug device.

FIG. 13A is a front-end bottom view showing a connection state between an optical transceiver plug device and a portable phone device, and FIG. 13B is a rear view showing a connection state between an optical transceiver plug device and a portable phone device. FIG. 14 is a detailed configuration view showing an optical transceiver plug device.

As shown in FIG. 14, the optical transceiver plug device includes a circuit 131 provided in a case 130 and an optical transceiver 132 for optically transmitting and receiving data. A connection cable 133 is formed on one side of the circuit 131 to connect with a plug 134. The plug 134 is connected to an external communications port provided on the bottom of the portable phone as shown in FIGS. 13A and 13B. Also, the optical transceiver plug device includes optical transmission and reception windows 135 formed on one surface of the case 130, to thereby form an entrance and exit portion of an optical signal transmitted to and received from the optical transceiver 132. As shown in FIG. 13B, the optical transceiver plug device is connected so that the optical transmission and reception windows 135 face the rear surface of the portable phone. Thus, the user connects the plug device with the portable phone without changing a basic design and structure of the portable phone, and then performs an optical transmission and reception function conveniently at the state where the user opposes the portable phone.

A conventional credit card inquiry machine adopts a method of receiving credit information via a magnetic card or a contact-type IC card and processing the same. For this reason, the conventional credit card inquiry machine cannot receive an infrared credit information transmitted from the optical payment unit according to the present invention. Thus, an optical receiver is incorporated in the credit card inquiry machine so that the infrared credit information can be directly received in the credit card inquiry machine. The optical receiver will be described with reference to FIGS. 15A and 15B.

Figure 15A:
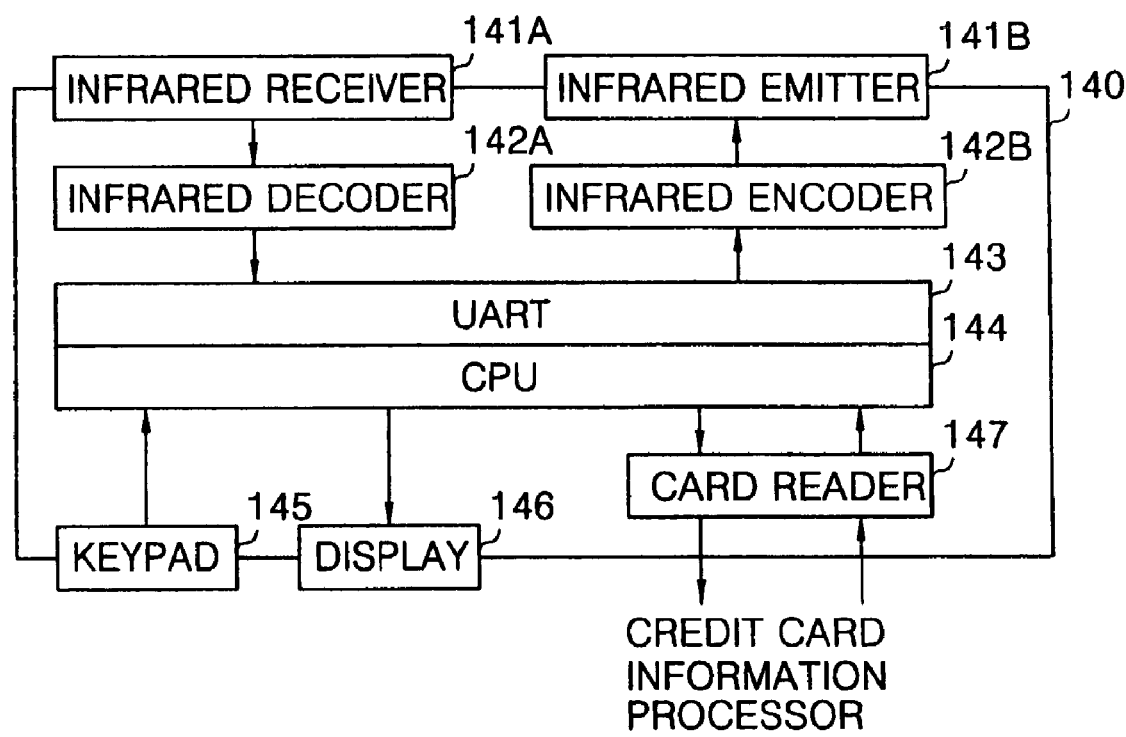
FIG. 15A is a block diagram showing an optical receiver incorporated credit card inquiry machine according to an embodiment of the present invention.
Figure 15B:
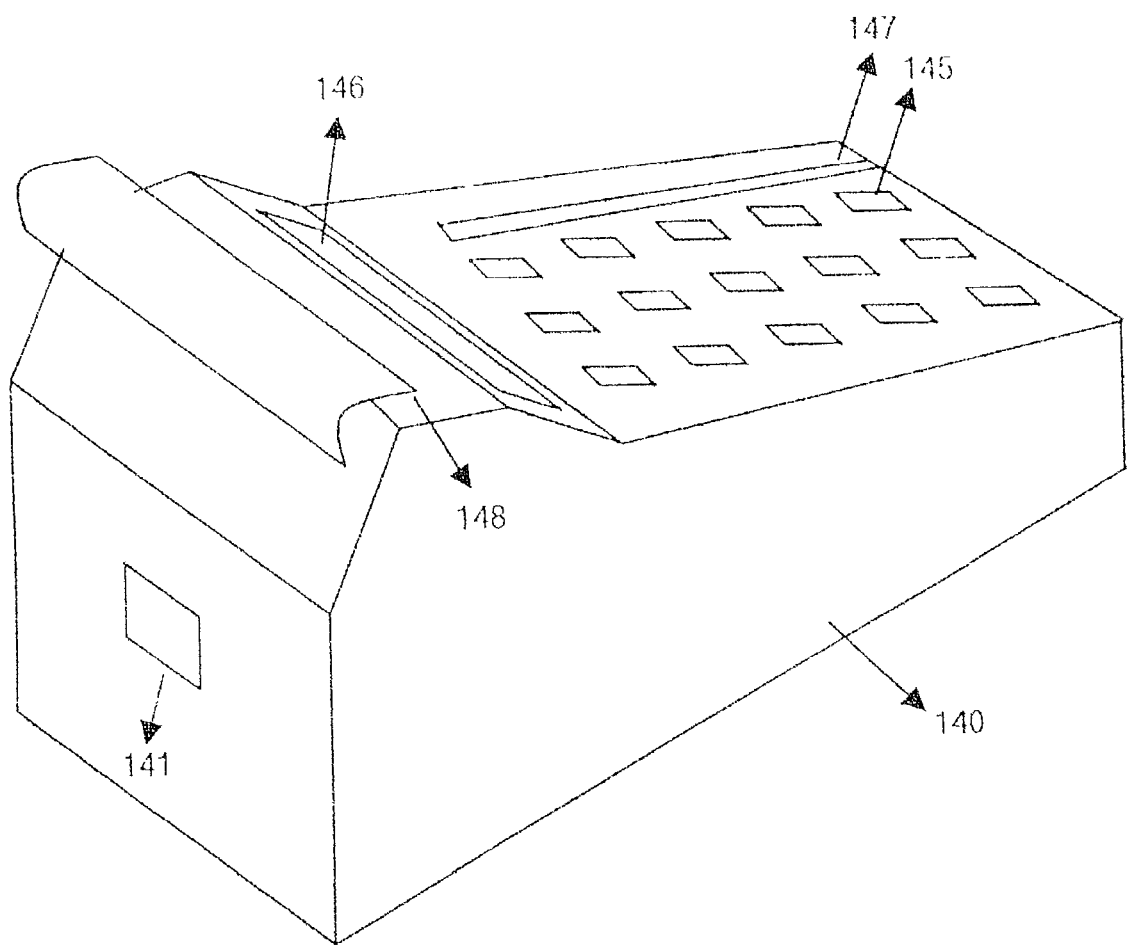
FIG. 15B shows an external appearance of the FIG. 15A optical receiver incorporated credit card inquiry machine.

FIG. 15A is a block diagram showing an optical receiver incorporated credit card inquiry machine according to an embodiment of the present invention, and FIG. 15B shows an external appearance of the FIG. 15A optical receiver incorporated credit card inquiry machine.

The credit card inquiry machine 140 shown in FIG. 15A includes an infrared receiver 141A for converting an infrared signal into an electrical signal and a decoder 142A for converting the electrical signal into a UART standard signal according to a conversion of the infrared signal. A UART portion 143 transforms an input serial electrical signal into an 8-bit parallel signal, to then transfer the resultant signal to a CPU 144. The CPU 144 controls the entire operation. Also, the credit card inquiry machine 140 includes an encoder 142B for altering a UART standard electrical signal into an infrared signal, and an infrared light emitting portion 141B for transmitting the infrared signal. A keypad 145 receives a user key input and then transmits the same to the CPU 144. A display 146 is formed of light emitting diodes (LEDs) or a liquid crystal display (LCD) and displays an operational state. Meanwhile, the optical receiver incorporated credit card inquiry machine 140 has an external appearance as shown in FIG. 15B.

The optical receiver incorporated credit card inquiry 140 performs the same operation as a settlement procedure using a magnetic card even in the case of the optical payment settlement. First, if a customer expresses a credit dealing intention using an optical payment unit (not shown), a credit dealing mode is input using a predetermined function key on a keypad 145. A CPU 144 having received key inputs requests a card input via a display 146. Usually, a card inserted according to the card input request is read by a card reader 147, so that card information stored in the magnetic portion of the card is input. Here, in the case that a customer indicates a credit dealing intention using the optical payment unit, a credit dealing button (FIG. 10A) in the optical payment unit is pressed so that card information is transmitted in the form of an infrared ray. The infrared receiver 141 incorporated in the credit card inquiry machine 140 detects the infrared card information and converts the detected result into an electrical signal to be transmitted to an infrared decoder 142A. The infrared decoder 142A decodes the card information into a UART standard signal to be transmitted to a UART portion 143. The UART portion 143 converts the received UART standard card information signal into an 8-bit parallel signal to be transmitted to the CPU 144. Accordingly, the CPU 144 receives the card information and let a settlement to be completed. Several services which had been impossible in the past can be possible. That is, existing available service purposed coupon can be transmitted to an optical payment unit in an electronic pattern, to thereby provide a new service.

The above-described optical receiver incorporation type requires that additional space and an interface unit in the credit card inquiry machine be provided. Thus, such an optical receiver incorporation type is not easy to be applied to credit card inquiry machines which have been fabricated or available on market. An optical receiver externally installed credit card inquiry machine is shown in FIG. 16A, in which an optical receiver is connected to an external communications port in a credit card inquiry machine so as to receive credit information which is transmitted in the form of an optical signal.

Figure 16A:
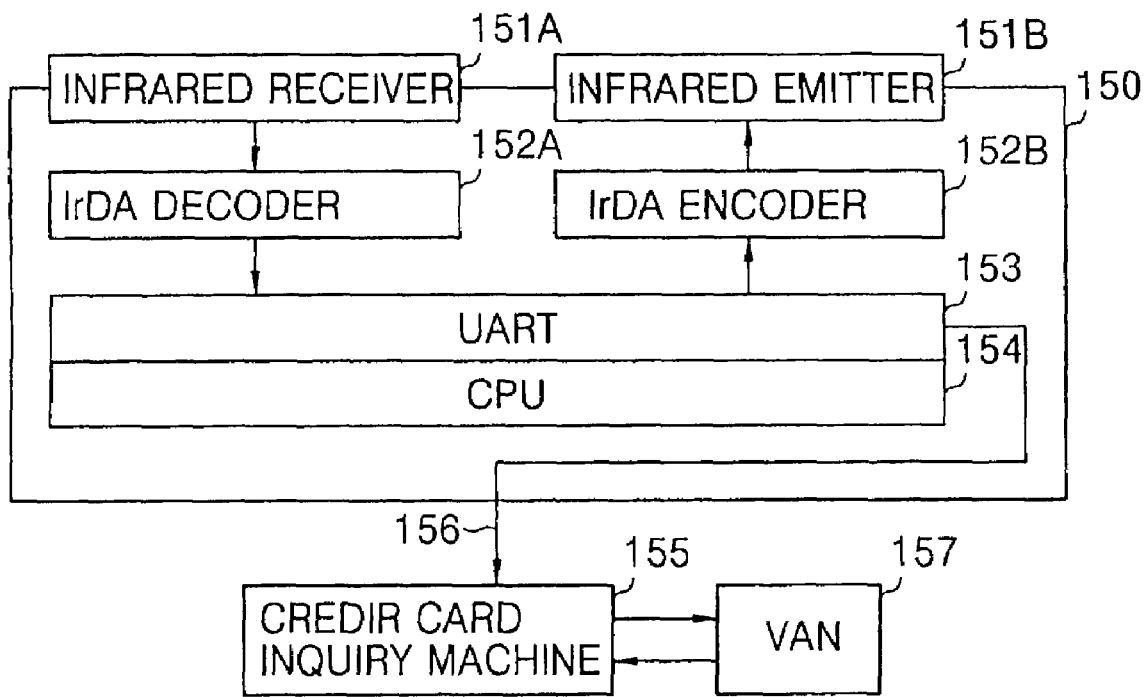
FIG. 16A is a block diagram showing an optical receiver externally installed credit card inquiry machine according to another embodiment of the present invention, in which the optical receiver is connected to the credit card inquiry machine by cable.

FIG. 16A is a block diagram showing an optical receiver externally installed credit card inquiry machine according to another embodiment of the present invention, in which the optical receiver is connected to the credit card inquiry machine by cable. An externally installed optical receiver 150 shown in FIG. 16A receives optically transmitted credit information, converts the received credit information into a signal of the form which can be recognized in a credit card inquiry machine 155, and transmits the converted result to the credit card inquiry machine 155. Here, the externally installed optical receiver 150 is connected to the credit card inquiry machine 155 by cable. The operation for an optical payment settlement in FIG. 16A is same as that of the optical receiver incorporated credit card inquiry 140 shown in FIGS. 15A and 15B.

However, even in the case of the externally installed optical receiver, a program stored in the credit card inquiry machine should be modified. Thus, considering that respective existing credit card inquiry machines are provided with a card reader slot having an identical magnitude, an adapter which can be fitted into the slot is fabricated, which is shown in FIGS. 17A, 17B and 17C.

Figure 17A:
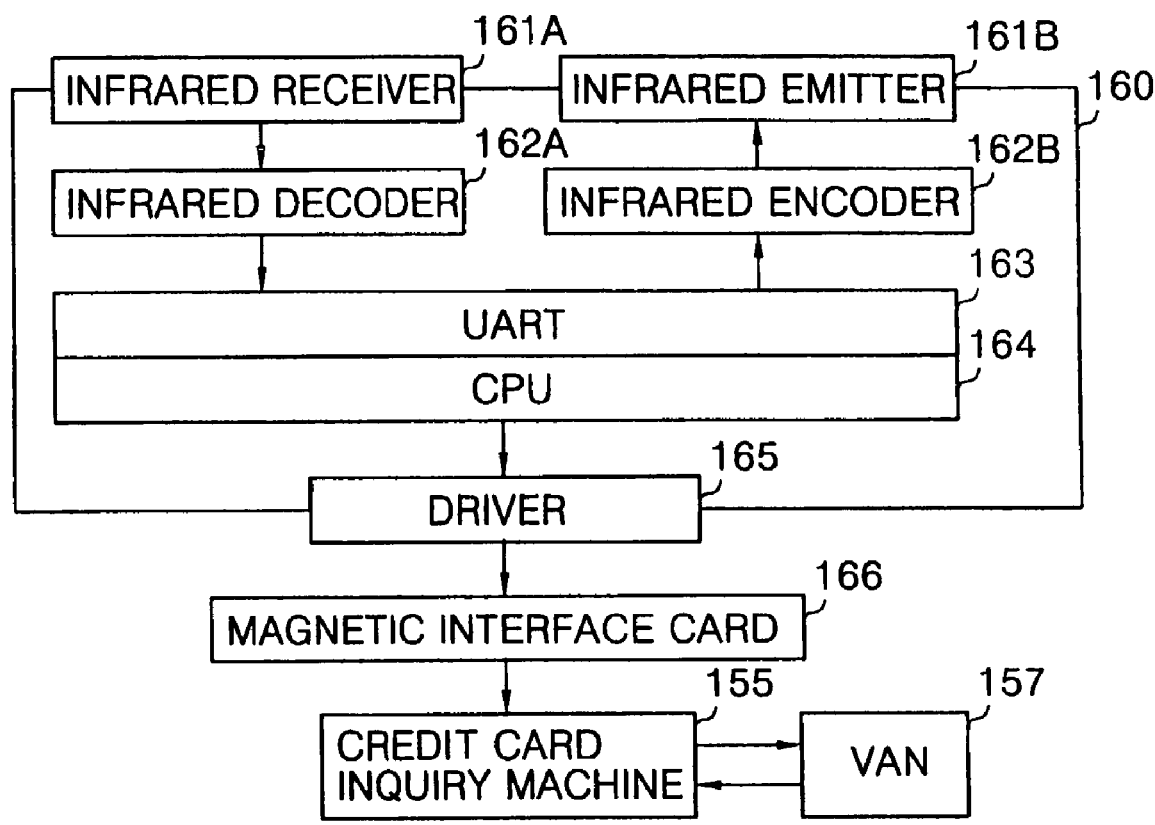
FIG. 17A is a block diagram showing an adapter in a credit card inquiry machine according to still another embodiment of the present invention.
Figure 17B:
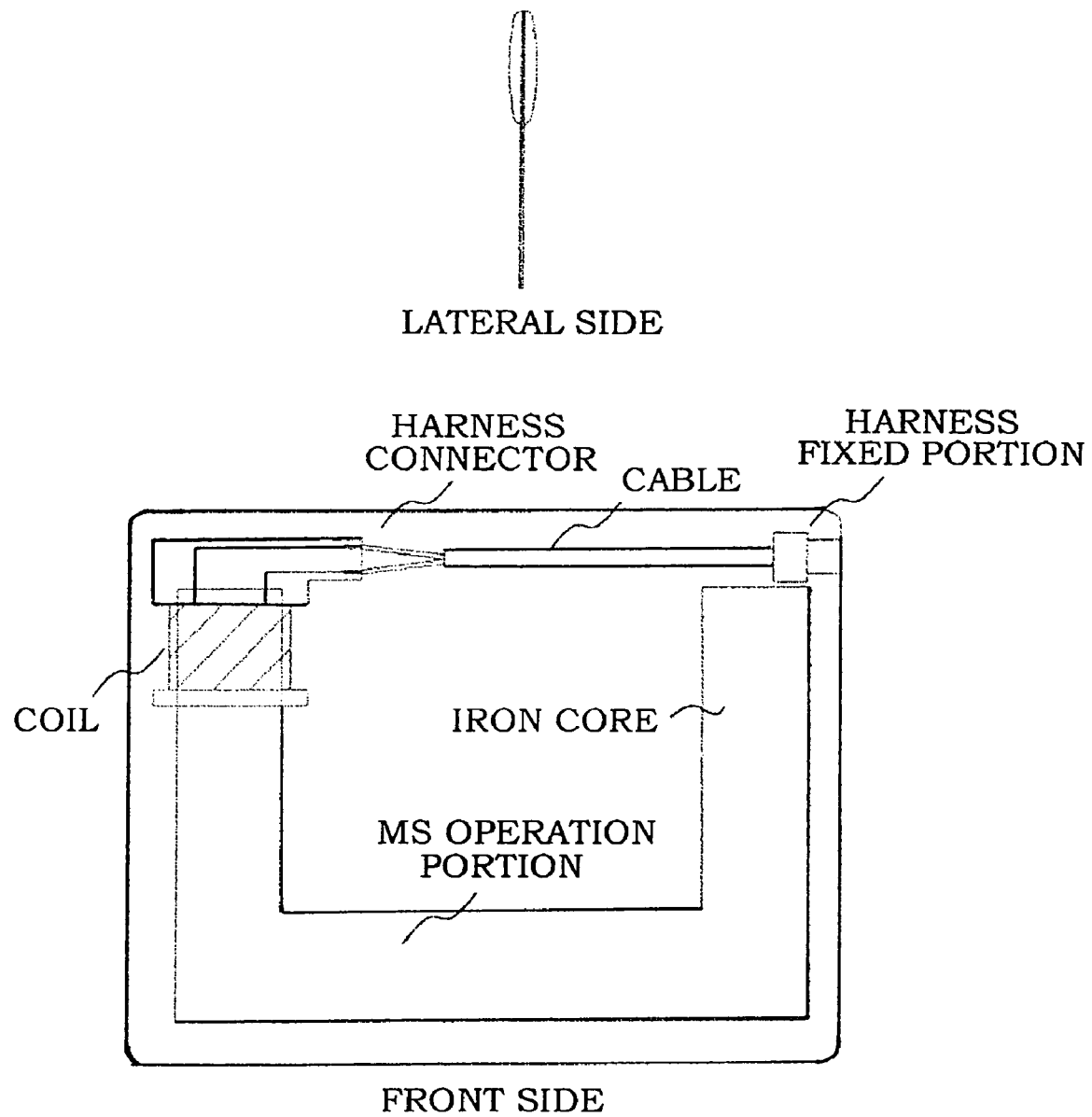
FIG. 17B is a block diagram showing a magnetic interface card of FIG. 17A.
Figure 17C:
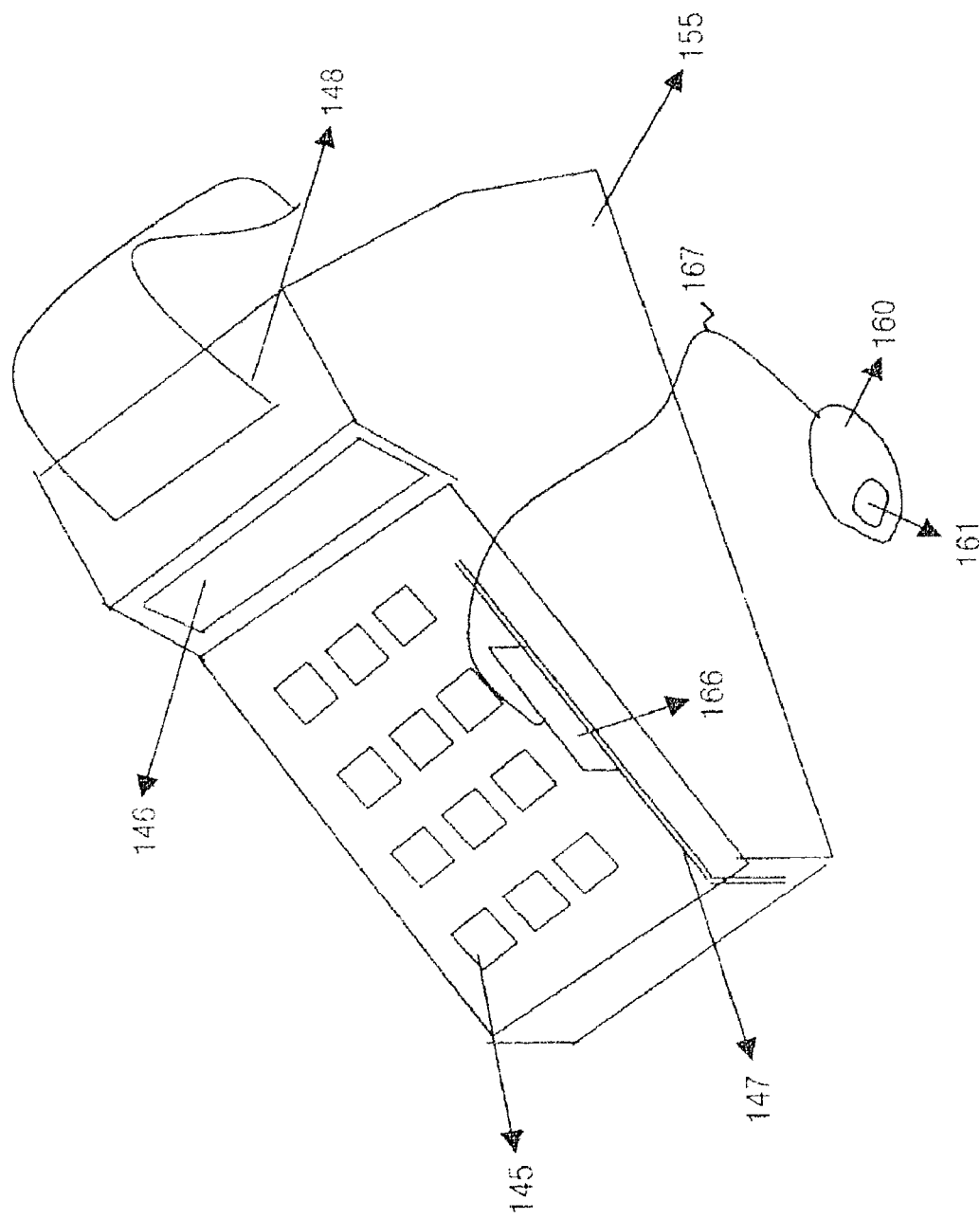
FIG. 17C is a connection state between the adapter of FIG. 17A and the credit card inquiry machine.

FIG. 17A is a block diagram showing an adapter in a credit card inquiry machine according to still another embodiment of the present invention, FIG. 17B is a block diagram showing a magnetic interface card of FIG. 17A, and FIG. 17C is a connection state between the adapter of FIG. 17A and the credit card inquiry machine.

An adapter 160 shown in FIG. 17A includes an infrared receiver 161A and an infrared emitter 161B for receiving and transmitting an infrared signal, respectively. An infrared decoder 162A connected to the infrared receiver 161A decodes the received card information into a UART standard signal. An infrared encoder 162B connected to the infrared emitter 161B encodes a UART standard signal into an infrared signal. The adapter 160 of FIG. 17A also includes a UART portion 163 for converting a decoded UART standard signal into an 8-bit parallel signal or converting a parallel signal transmitted from a controller 164 into a serial patterned signal, and the controller 164 for applying a pulse signal in order to alter an electrical signal concerning card information into an electromagnetic signal of an ISO-7811 type by a transform algorithm prepared in a transfer mode. A driver 165 connected to the controller 164 adjusts an impedance voltage according to a pulse signal applied from the controller 164. The impedance voltage controlled alternating current signal is applied to a coil incorporated in a magnetic interface card 166, to thereby generate change of a magnetic flux. The magnetic interface card 166 is formed so that coil is wound at a predetermined position of an iron core as shown in FIG. 17B. The generated magnetic flux change brings out a swapping effect as if a magnetic card is swapped in a card reader 147. Accordingly, the card reader 147 in the credit card inquiry machine 155 acquires credit information by a credit card reading procedure and then transmits the read credit information via a VAN network 157. The adapter having the above configuration is used as shown in FIG. 17C, in which the magnetic interface card 166 and the adapter 160 are connected each other by cable 167, at the state where the magnetic interface card 166 is inserted into the card reader 147 of the credit card inquiry machine 155.

However, in the case of the above-described adapter, a magnetic interface card should be inserted and taken out every time when a settlement is made by an optical payment unit and a magnetic card. Thus, an adapter which can be settled by a magnetic card without taking out a magnetic interface card is shown in FIGS. 18A and 18B.

Figure 18A:
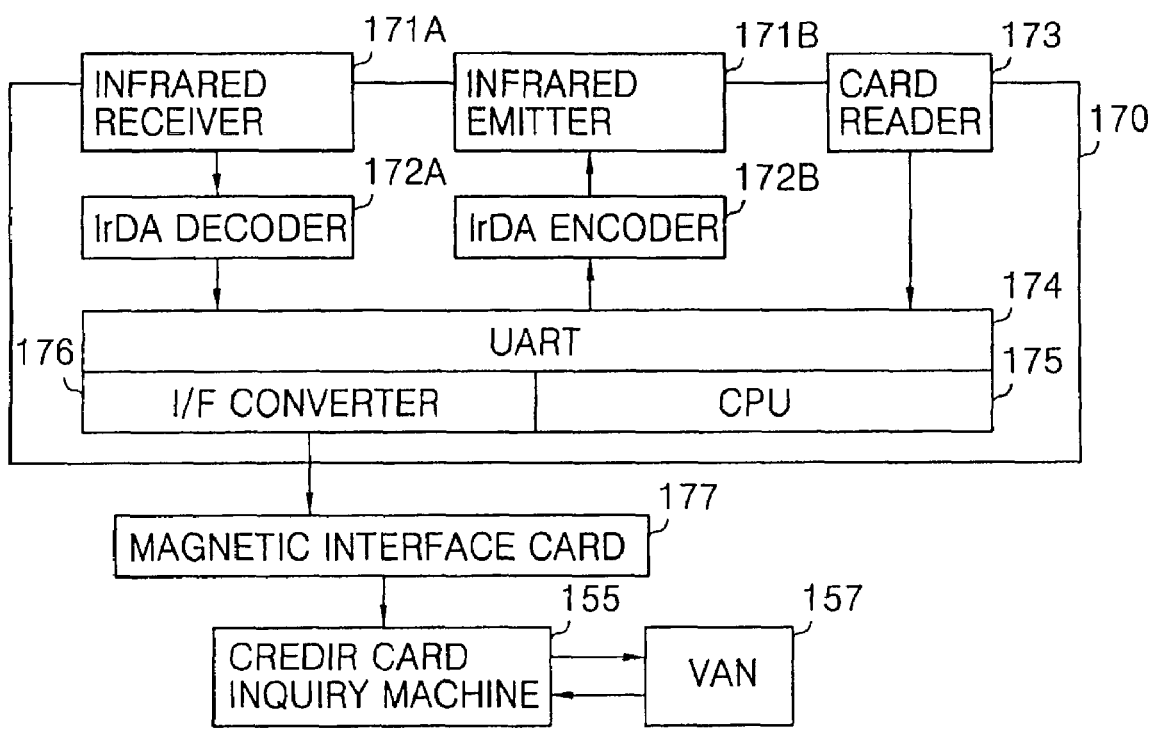
FIG. 18A is a block diagram showing an adapter having a card reader in a credit card inquiry machine according to yet another embodiment of the present invention.
Figure 18B:
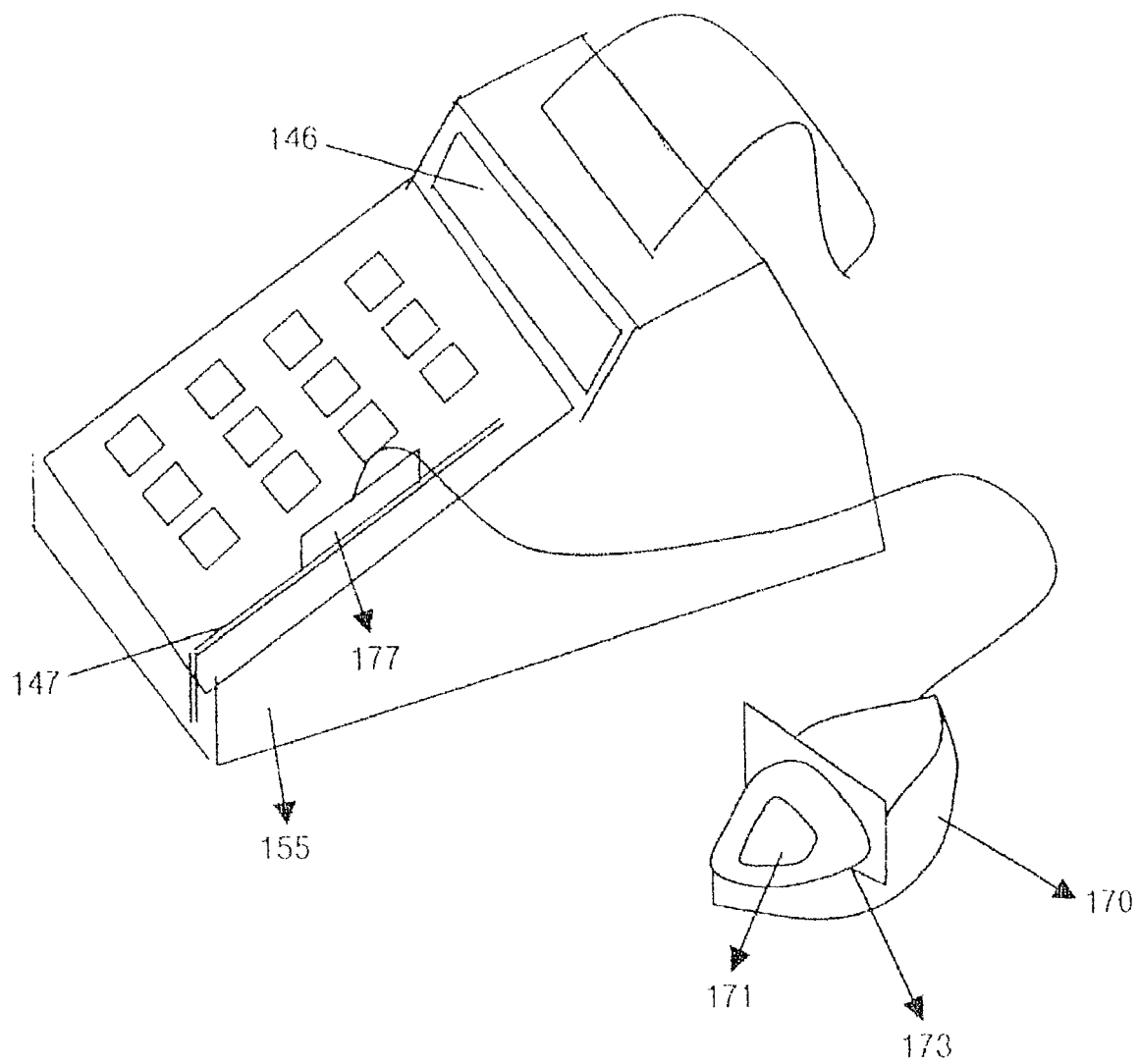
FIG. 18B is a connection state between the adapter of FIG. 18A and the credit card inquiry machine.

FIG. 18A is a block diagram showing an adapter having a card reader in a credit card inquiry machine according to yet another embodiment of the present invention, and FIG. 18B is a connection state between the adapter of FIG. 18A and the credit card inquiry machine. The configuration of an adapter 170 shown in FIG. 18A is same as that of the adapter 160 shown in FIG. 17A. The adapter 170 of FIG. 18A further includes a card reader 173 for reading a magnetic card which is connected to a UART portion 174. In the case of using the adapter 170 having the above configuration, two kinds of settlement using an optical payment unit or a magnetic card can be processed at the state where a magnetic interface card 177 has been inserted into the card reader 147.

First, if a customer expresses a credit dealing intention using an optical payment unit, a credit dealing mode is input using a predetermined function key on a credit card inquiry machine 155. The credit card inquiry machine 155 requests a card input via a display 146. The customer presses a predetermined credit dealing button in a portable terminal such as a portable phone or PDA possessed as the optical payment unit so that credit information is transmitted in the form of an infrared ray. The adapter 170 connected to the magnetic interface card 177 inserted into the card reader 147 of the credit card inquiry machine 155 by cable receives credit information via the infrared receiver 171A.

Meanwhile, if a customer expresses a credit dealing intention using a magnetic card, a credit dealing mode is input using a predetermined function key on a credit card inquiry machine 155. The credit card inquiry machine 155 requests a card input via a display 146. The customer inputs card information stored in a magnetic portion of the card via the card reader 173 attached to the adapter 170. The card information input via the card reader 173 is converted into an 8-bit parallel signal via the UART portion 174 and transmitted to the CPU 175. The CPU 175 applies an alternating current signal to an I/F converter 176 in order to alter the card information transmitted from the UART portion 174 into an electromagnetic change of the ISO-7811 type. The I/F converter 176 converts the applied alternating current signal into an impedance voltage appropriate for the magnetic interface card 177 inserted into the slot of the credit card inquiry machine 155 and transmits the altered impedance voltage. The magnetic interface card 177 generates a flux change in an iron core when the alternating current signal transmitted via the I/F converter 176 has been applied to the coil. The generated flux change brings out an effect like a swapping effect of a magnetic card. Of course, the card information read through the card reader 173 attached to the adapter 170 can be transmitted to the credit card inquiry machine 155 directly.

Meanwhile, the above-described optical payment unit can settle using an infrared communication only in the case that a card inquiry machine is positioned close to a customer. That is, the current infrared communication distance is limited to one meter or so. This makes settlement using the optical payment unit inconvenient at gas stations, department stores where card inquiry machines are installed in several limited places, and restaurants having several compartments. Thus, a mobile relayer is shown in FIGS. 19A through 19D, in which user credit information is received at a current position of a user, the credit information is temporarily stored and then the stored credit information is used only one-time for a settlement.

Figure 19A:
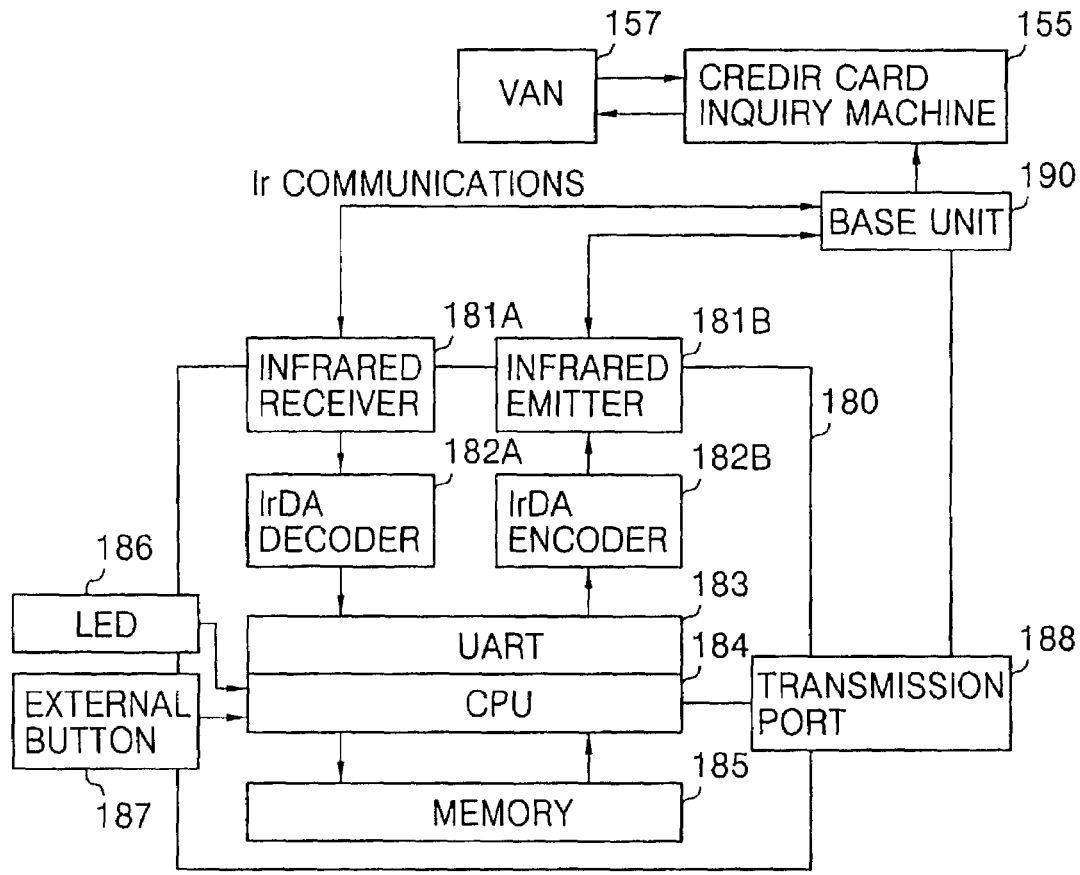
FIG. 19A is a block diagram showing a mobile optical relayer according to the present invention.
Figure 19B:
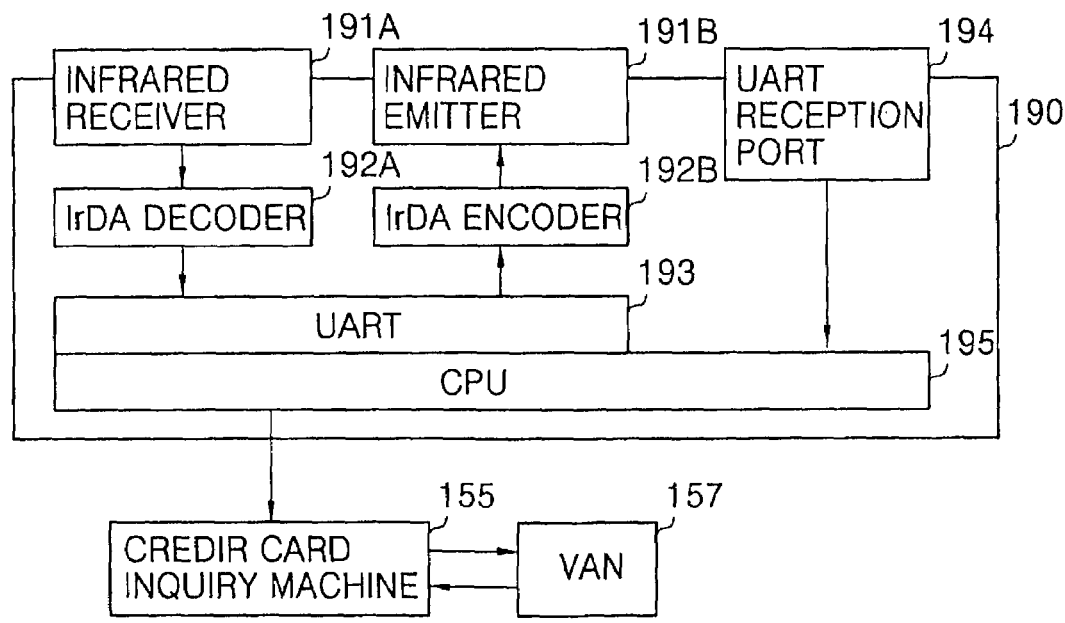
FIG. 19B is a block diagram showing a mobile optical relayer base device according to the present invention.
Figure 19C:
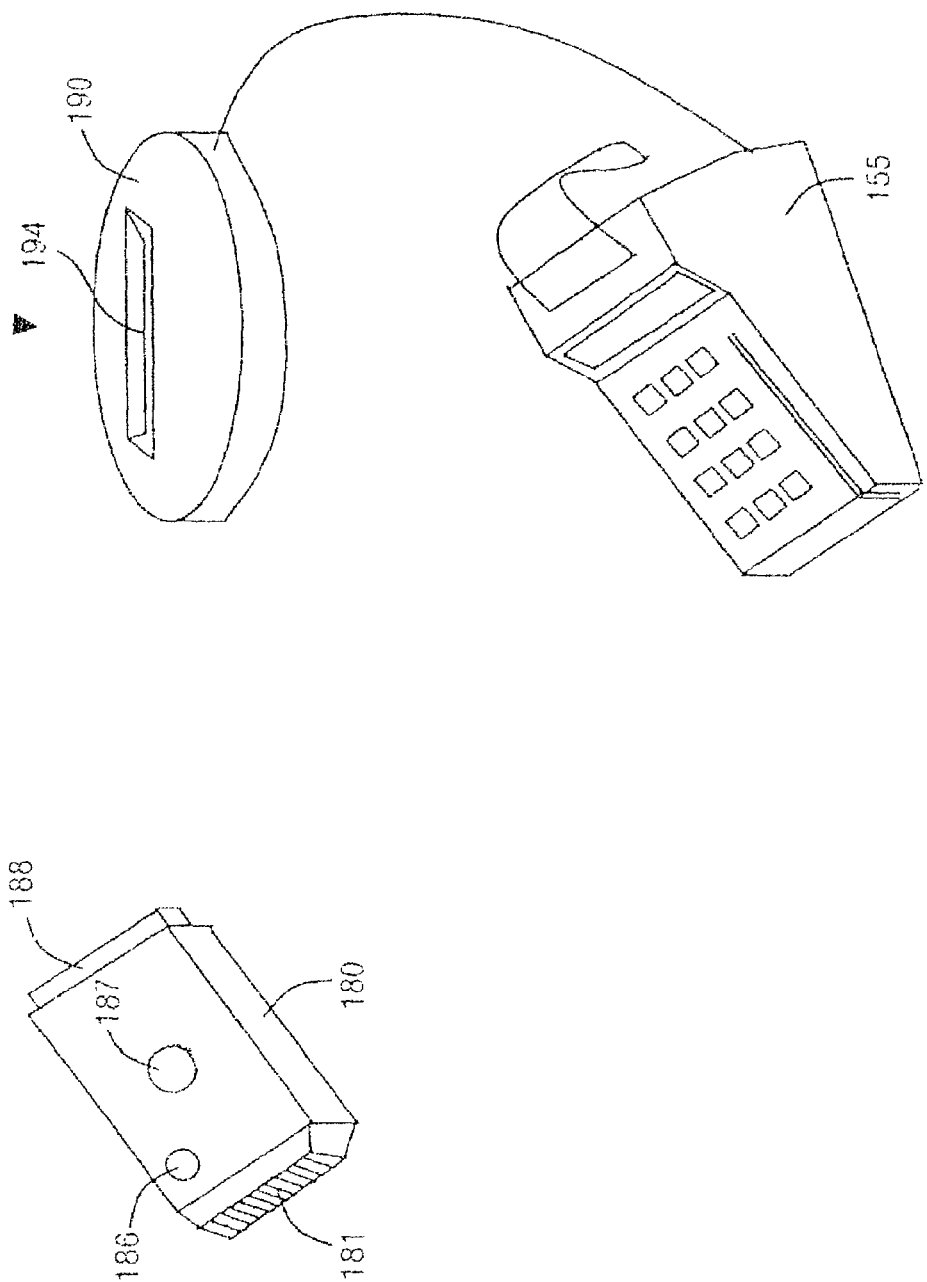
FIG. 19C is a connection state of the mobile optical relayer of FIG. 19A.
Figure 19D:
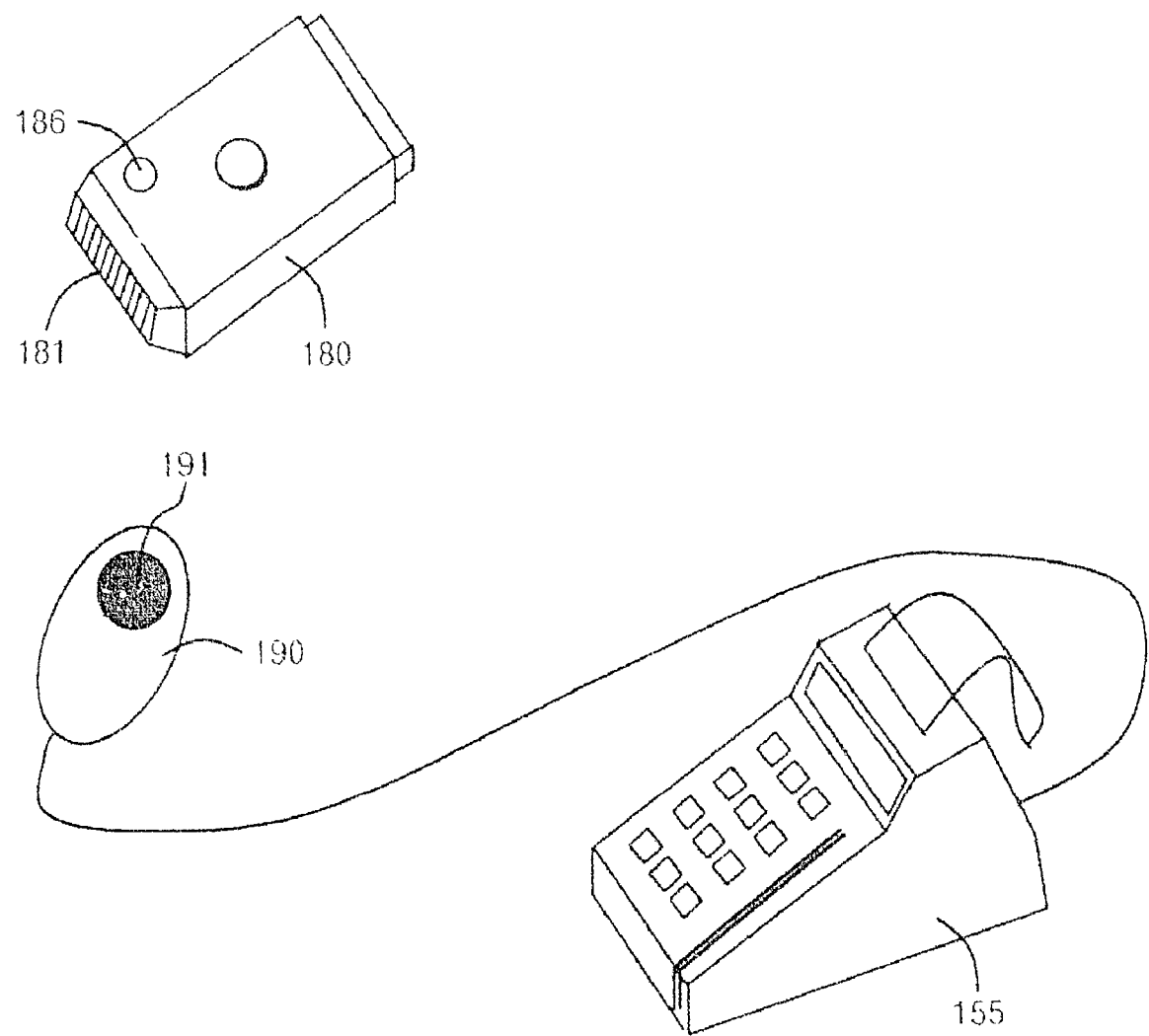
FIG. 19D is a connection state of the mobile optical relayer base device of FIG. 19B.

FIG. 19A is a block diagram showing a mobile optical relayer according to the present invention. FIG. 19B is a block diagram showing a mobile optical relayer base device according to the present invention. FIG. 19C is a connection state of the mobile optical relayer of FIG. 19A. FIG. 19D is a connection state of the mobile optical relayer base device of FIG. 19B. A mobile optical relayer 180 is movable, which receives user credit information in an optical signal from a user terminal, stores the same temporarily, and transmits the stored credit information to an optical relayer base unit 190 or an optical receiver attached credit card inquiry machine only one time.

The optical relayer base unit 190 is connected to a credit card inquiry machine by cable or through an adapter, which receives credit information the mobile optical relayer 180 and transmits the received credit information to the card inquiry machine 155 in order to inquire the creditability of the user. Here, the optical relayer base unit 190 user (customer) credit information via an optical signal transmitted from the mobile optical relayer 180, or receives user credit information from the mobile optical relayer 180 at the state where the optically relayer base unit 190 is connected to the mobile optical relayer 180 via a connector.

In the mobile optical relayer 180, an infrared receiver 181A receives credit information in the form of an infrared signal from a portable terminal and converts the same into an electrical signal. A CPU 184 temporarily stores the received credit information in a memory 185, and controls a LED 186 to operate and indicate that the credit information has been normally received. After recognizing the display of the LED 186, the optical relayer 180 is positioned on the optical relayer base unit 190 connected to the credit card inquiry machine 155 and then a data transfer button 187 is pressed. Here, the optical relayer 180 is connected to the optical relayer base unit 190 as shown in FIG. 19C, or connected thereto in the form of an infrared signal as shown in FIG. 19D. In the case of the connector connection of FIG. 19C, the CPU 184 in the optical relayer 180 transmits the credit information stored in the memory 185 to the optical relayer base unit 190 via a transfer port 188. In the case of the infrared signal connection as shown in FIG. 19D, the CPU 184 in the optical relayer 180 converts the credit information stored in the memory 185 into an infrared signal via the infrared emitter 181B, and transmits the converted result to the optical relayer base unit 190. The CPU 184 receives credit information and then deletes corresponding credit information from the memory 185.

In the optical relayer base unit 190, a reception port 194 is connected to the transfer port 188 of the optical relayer 180, receives credit information transmitted in the form of a UART standard signal and outputs the received credit information to a CPU 195. An infrared receiver 191A receives credit information in the form of an infrared signal transmitted from the infrared emitter 181B of the optical relayer 180 and converts the received credit information into an electrical signal. The CPU 195 transmits the credit information received via the reception port 194 or the infrared receiver 191A to the credit card inquiry machine 155 connected by cable.

Figure 20A:
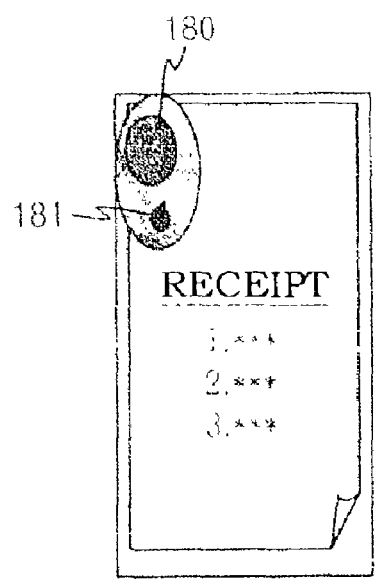
FIGS. 20A through 20D show a clip-type optical relayer, respectively.
Figure 20B:
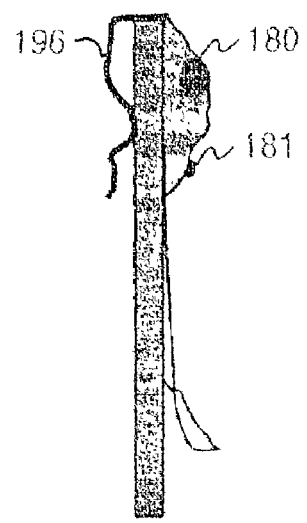
Figure 20C:
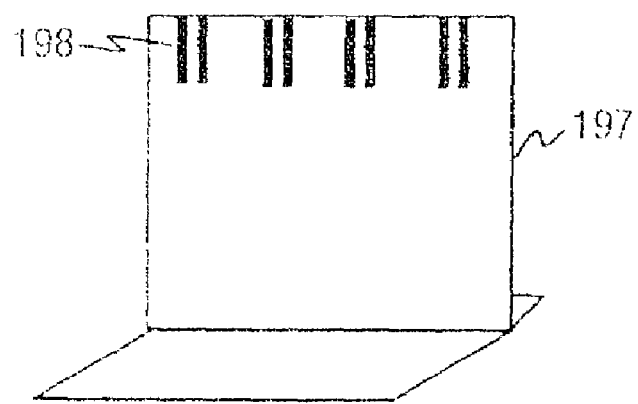
Figure 20D:
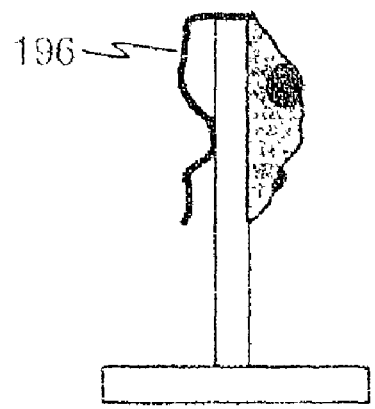

Also, the above-described optical relayer 180 can be fabricated so as to be easily used at a circumstance where a clip is attached to the optical relayer, so that a slip is presented in a distance from a counter as in a restaurant, in order to make a settlement, as shown in FIGS. 20A through 20D. Referring to FIG. 20A, a slip fitted on a settlement binder using a clip 196 of the optical relayer 180 is presented to a customer. Accordingly, the customer can check a calculated amount at a sitting table and optically pay for the expenses. FIG. 20B shows a lateral shape of a clip-type optical relayer. The clip-type optical relayer is attached to a charging unit at ordinary times and prepared on a counter. As shown in FIG. 20C, the charging unit 197 is fabricated in the form that a clip-type optical relayer is easily mounted, and a battery accommodated in the optical relayer 180 is charged via charging connection portions 198, which can be always used. FIG. 20D shows a lateral shape of a clip-type optical relayer which is mounted in a charging unit.

Figure 21:
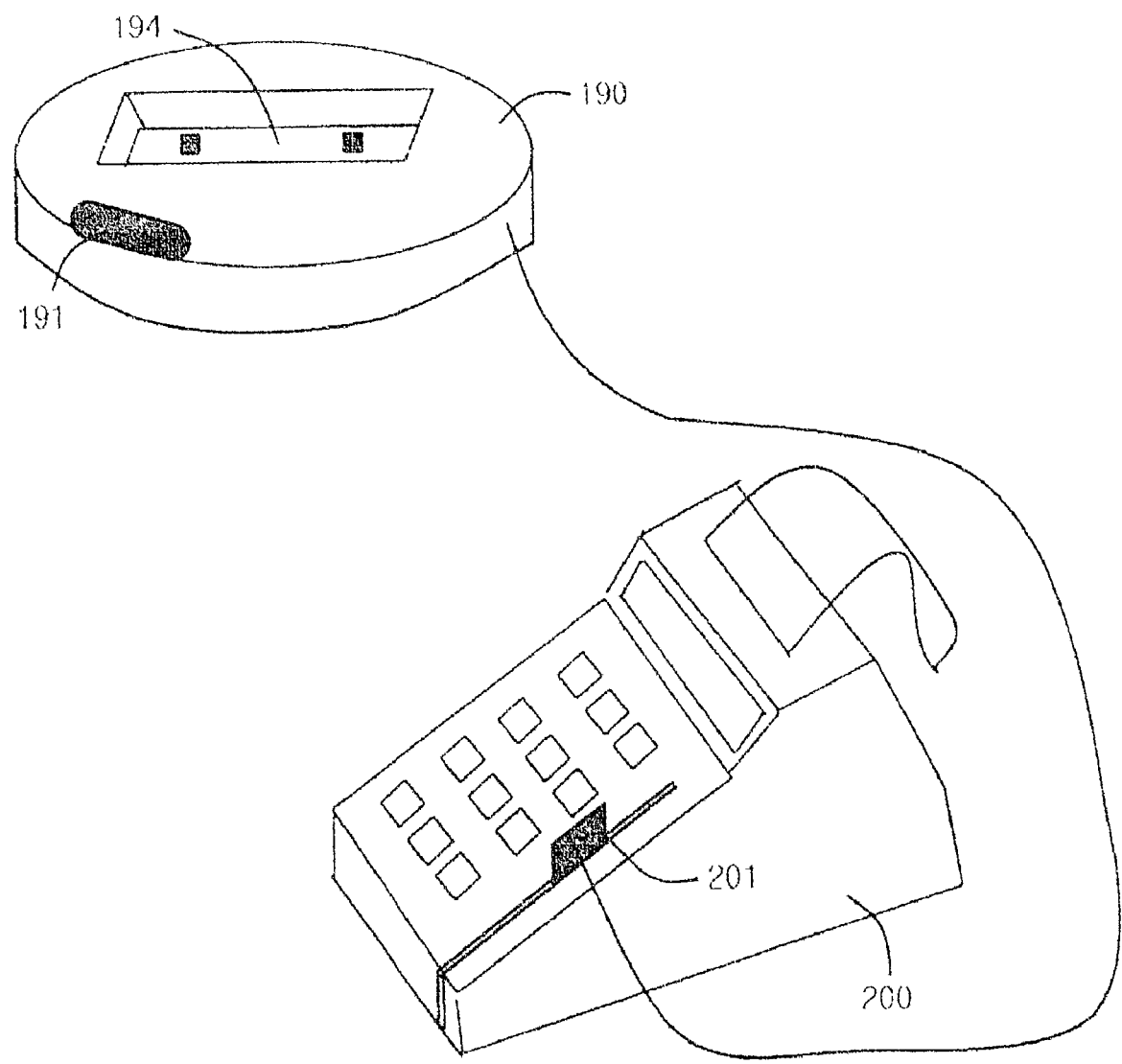
FIG. 21 illustrates an adapter-type optical relay base device.

The optical relayer base unit 190 can be fabricated in an adapter form so as to be connected to an existing credit card inquiry machine without any change of functions and external appearance thereof like an adapter-type credit card inquiry machine as shown in FIGS. 17A and 17B. This adapter-type optical relay base device is shown in FIG. 21. Referring to FIG. 21, an I/F card 201 is inserted into a slot of a credit card inquiry machine 200. An optical payment unit according to the present invention transmits card information in an infrared signal, in which the card information needs to be encrypted for card security.

Figure 22:
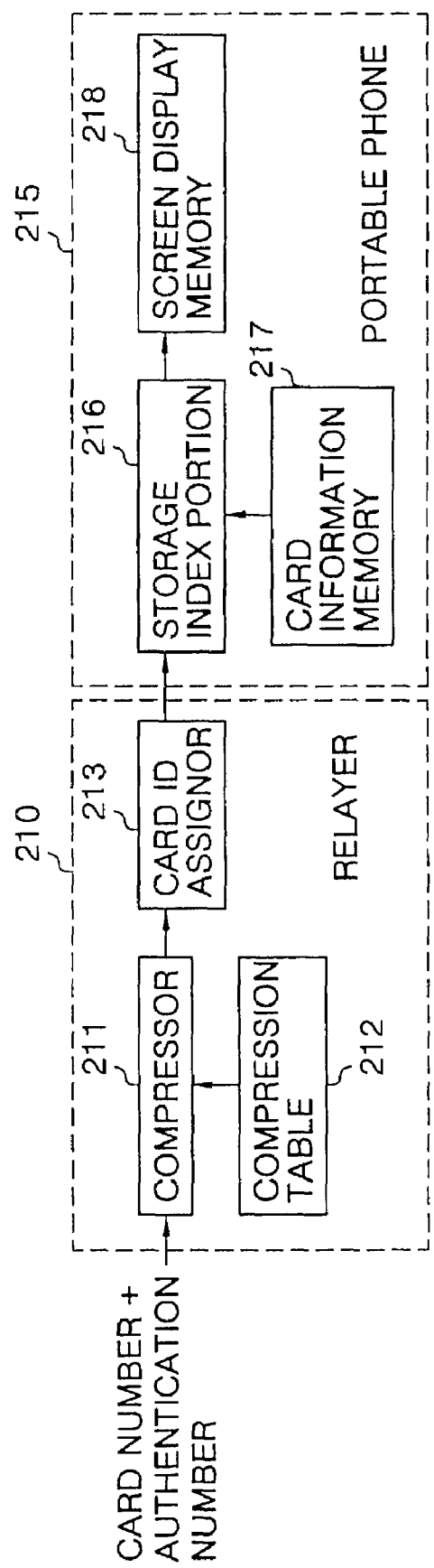
FIG. 22 is a block diagram for explaining a card information encryption method according to the present invention.

FIG. 22 is a block diagram for explaining a card information encryption method according to the present invention.

Referring to FIG. 22, a card number is formed of a set of an actual card number and an authentication number assigned by a card company. The thus-formed card number has 40 bytes approximately. A relayer 210 receives the card number and executes a compression algorithm set in a compressor 211 to compress the card number information. Here, the compressor 211 uses a compression table 212 and converts the received card information into card information which can be stored in a portable terminal 215. The compressed card information is about 20 bytes. The thus-converted card information makes a pair together with a card ID assigned from a card ID assignor 213, so as to be transmitted to the portable terminal 215. Here, the card ID is information for discriminating the kind of a card with the corresponding card information.

Figure 23A:
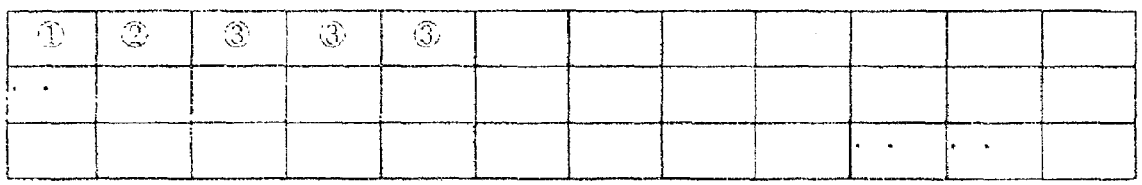
FIGS. 23A through 23C show a structure of storing a plurality of kinds of payment information, respectively.
Figure 23B:
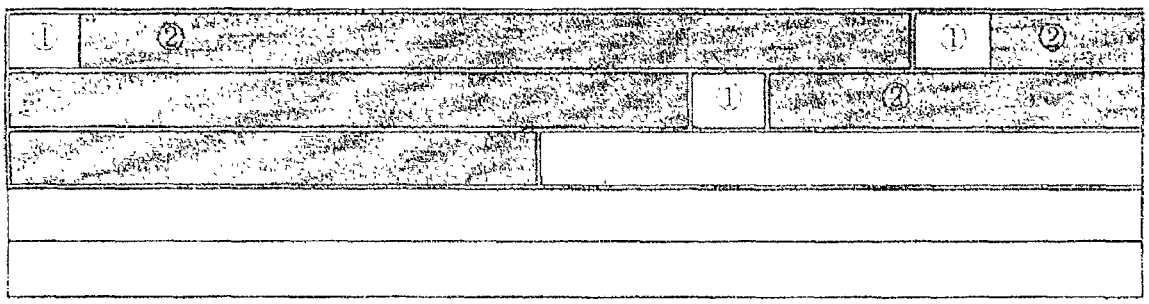
Figure 23C:
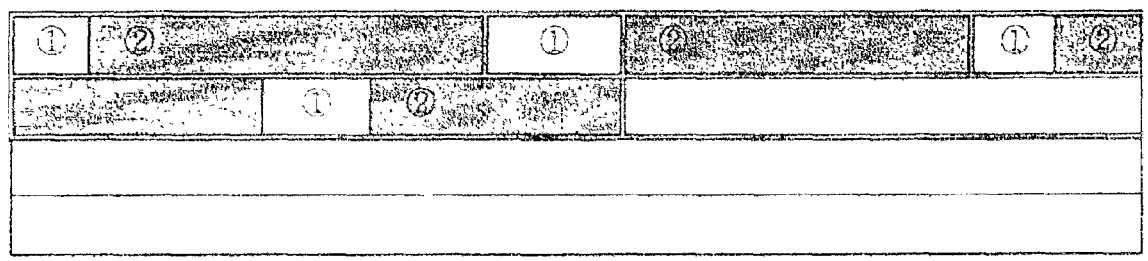

The portable terminal 215 receives card information including a card ID from the relayer 210. A storage index portion 216 in the portable terminal 215 registers the card ID included in the transmitted card information as an index and stores the card information in a memory 217. The storage index portion 216 also stores a card name corresponding to the card information stored in the memory 217 in a screen display memory 218, in order to make a user confirm the kind of the card selected by him or her. Thus, when a user selects a card, the corresponding card name stored in the screen display memory 218 is displayed on a screen so that the user can ascertain the selected card. Here, the storage index portion 216 has an index memory as shown in FIG. 23A. The index memory comprises a total length ① of stored indexes, IDs ② of the card information selected by a user among various kinds of card information, and index information ③ representing positions where the card information is actually stored. As shown in FIG. 23b, a card ID ① for identifying a kind of the payment information is paired with actual card information ② corresponding to the card ID and a plurality of the pair are stored in the card information in a memory 217. As shown in FIG. 23c, a card ID ① for identifying the payment information and a letter or a logo data ② for displaying an actual kind of the card are stored in the screen display memory 218. The screen logo may be a logo of a card company or its partner. A card ID which is stored in the memory 217 and the screen display memory 218, respectively, has a same value.

The process for transmitting and receiving the card information, in a state that the card information is encoded and stored in the portable terminal 215 as above, is described.

Figure 24:
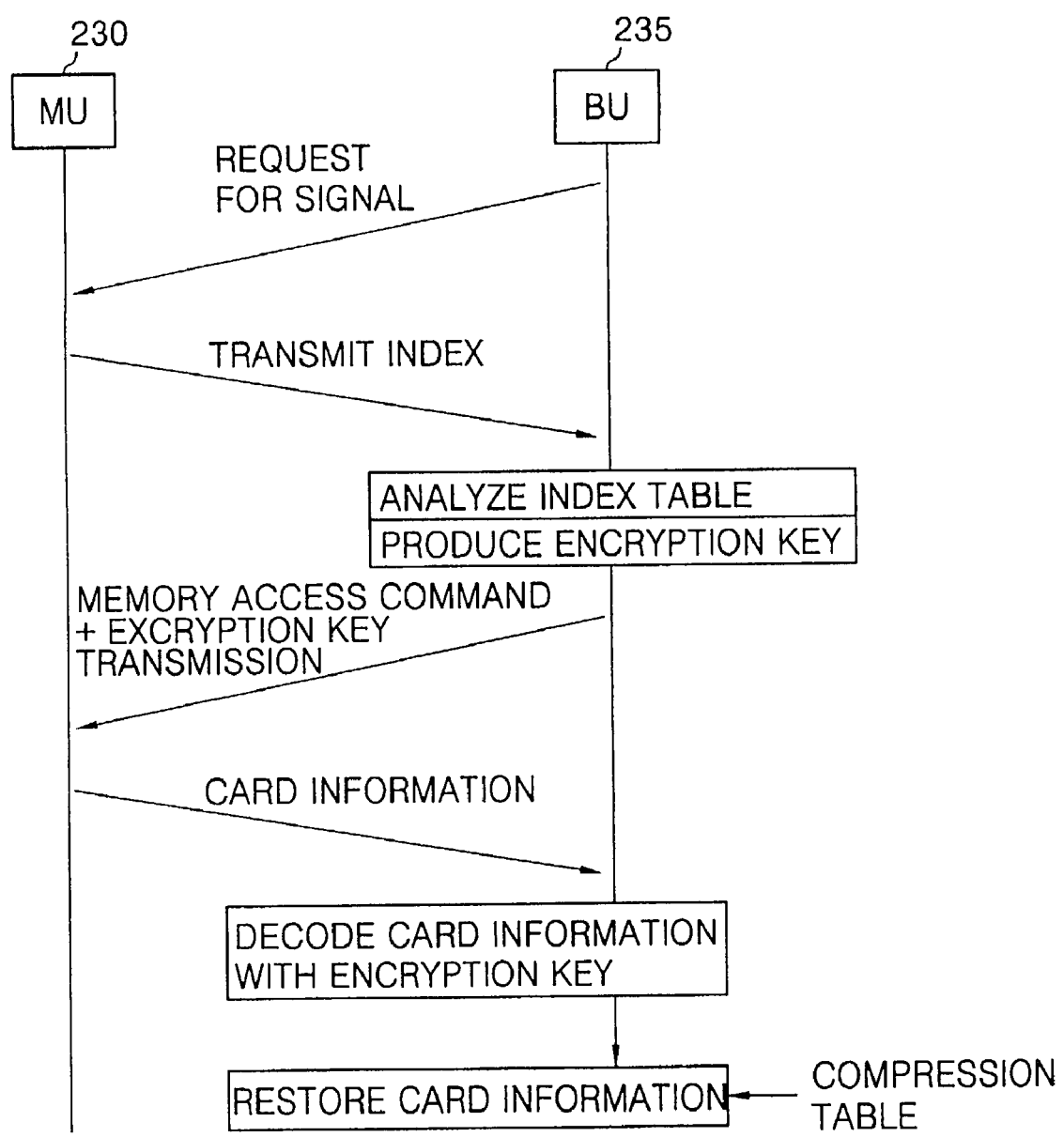
FIG. 24 illustrates a communications procedure between the optical payment transceivers.

FIG. 24 illustrates a communications procedure between the optical payment transceivers.

In FIG. 24, if an optical payment settlement is selected by a user, an optical payment receiver illustrated as a base unit (BA) 235 requests a corresponding optical payment transmitter illustrated as a mobile unit (MU) 230 to send a signal. The MU 230 transmits index data stored in an index memory in response to a signal request from the BU 235. Here, the index data is an address for pointing a storage location of the card information stored in the card information memory 217. The BU 235 receives the index data, compares the received index data with a prestored index analysis table, and creates an encryption key in the received index data proved a significant index. The BU 235 sends the created encryption key to the MU 230 together with a memory access command. The MU 230 extracts an encryption key from the encryption key signal, reads the card information stored in the card information memory 217, and encrypts the read card information with the extracted encryption key again. The thus-encrypted card information is transmitted to the BU 235. The BU 235 decodes the received card information with a possessed encryption key, and then restores the decoded card information into card information according to a predetermined compression table.

An infrared data transmission method is a protocol for a one-to-N transmission, in which a recognition protocol is complicated between communicating stations and thus it takes 2-3 seconds only in the case that a mutual recognition is performed between the communicating stations only with a basic protocol link hierarchy, which causes a time delay. The one-to-N transmission protocol cannot be applied to a fee payment field where an information transfer time is of importance because of the above time delay. Thus, a new communications protocol is presented for a one-to-one communication.

Figure 25:
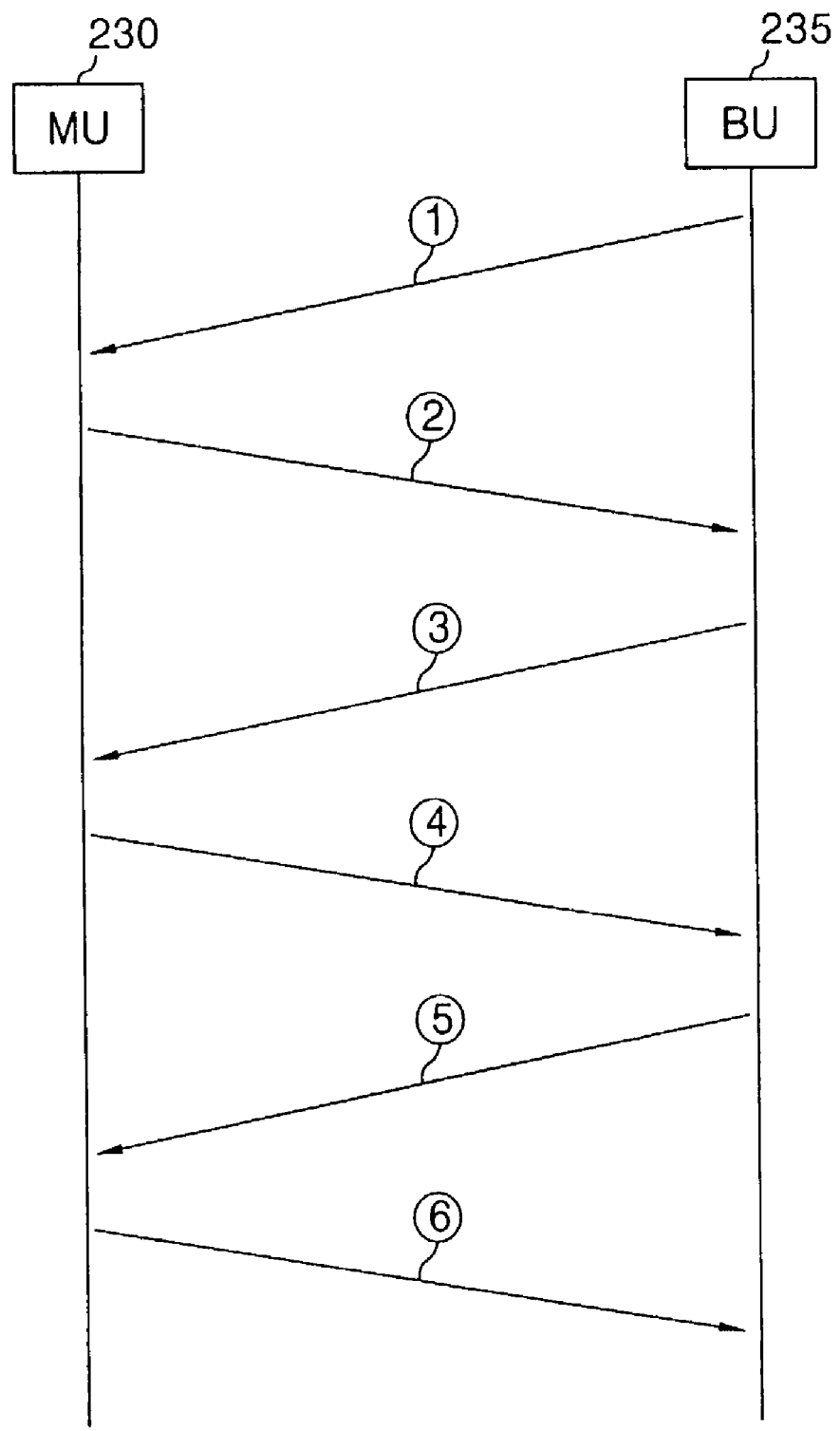
FIGS. 25 and 26 illustrate a communications protocol applied to a settlement method using an optical payment according to the present invention, respectively.
Figure 26A:
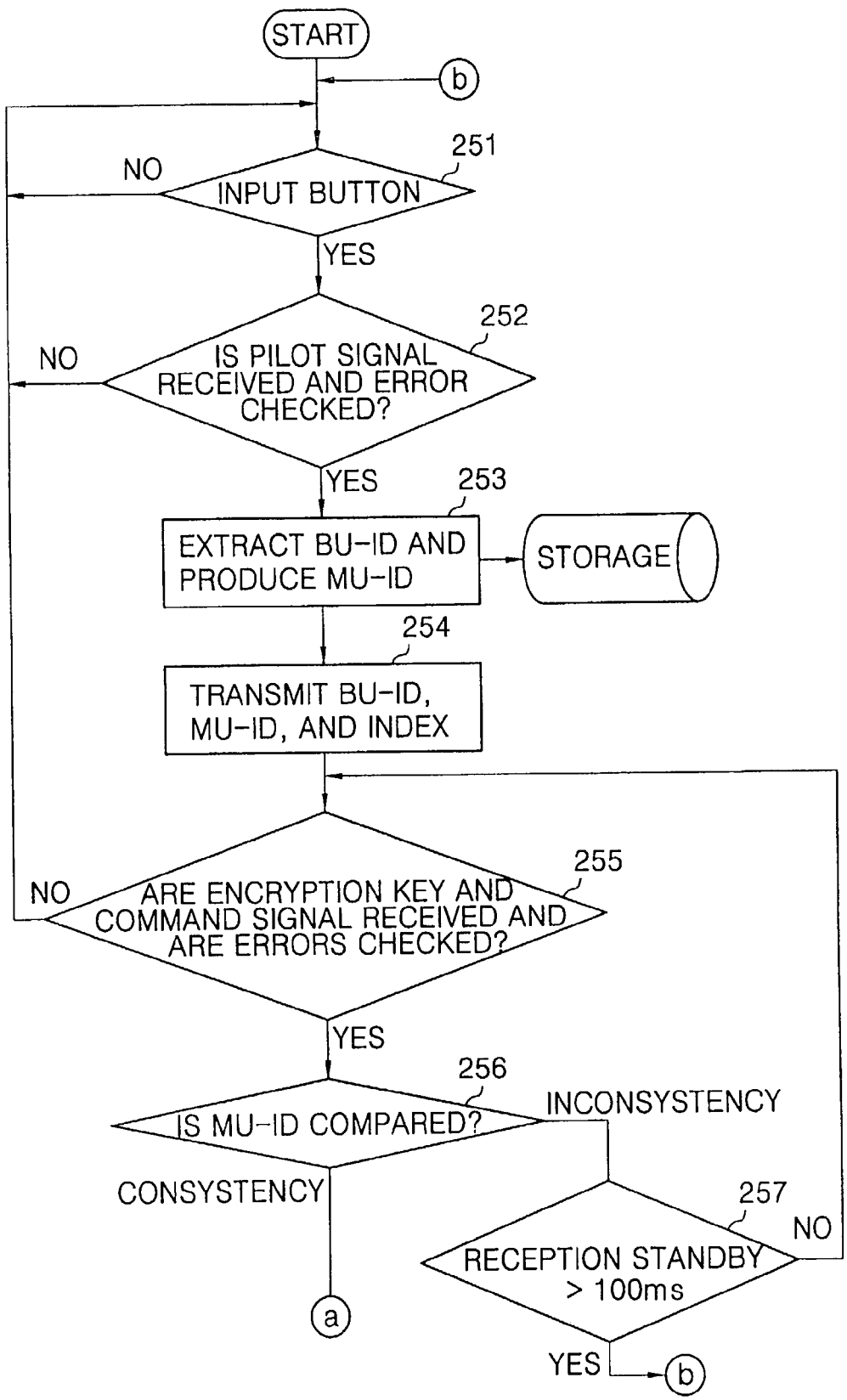
Figure 26B:
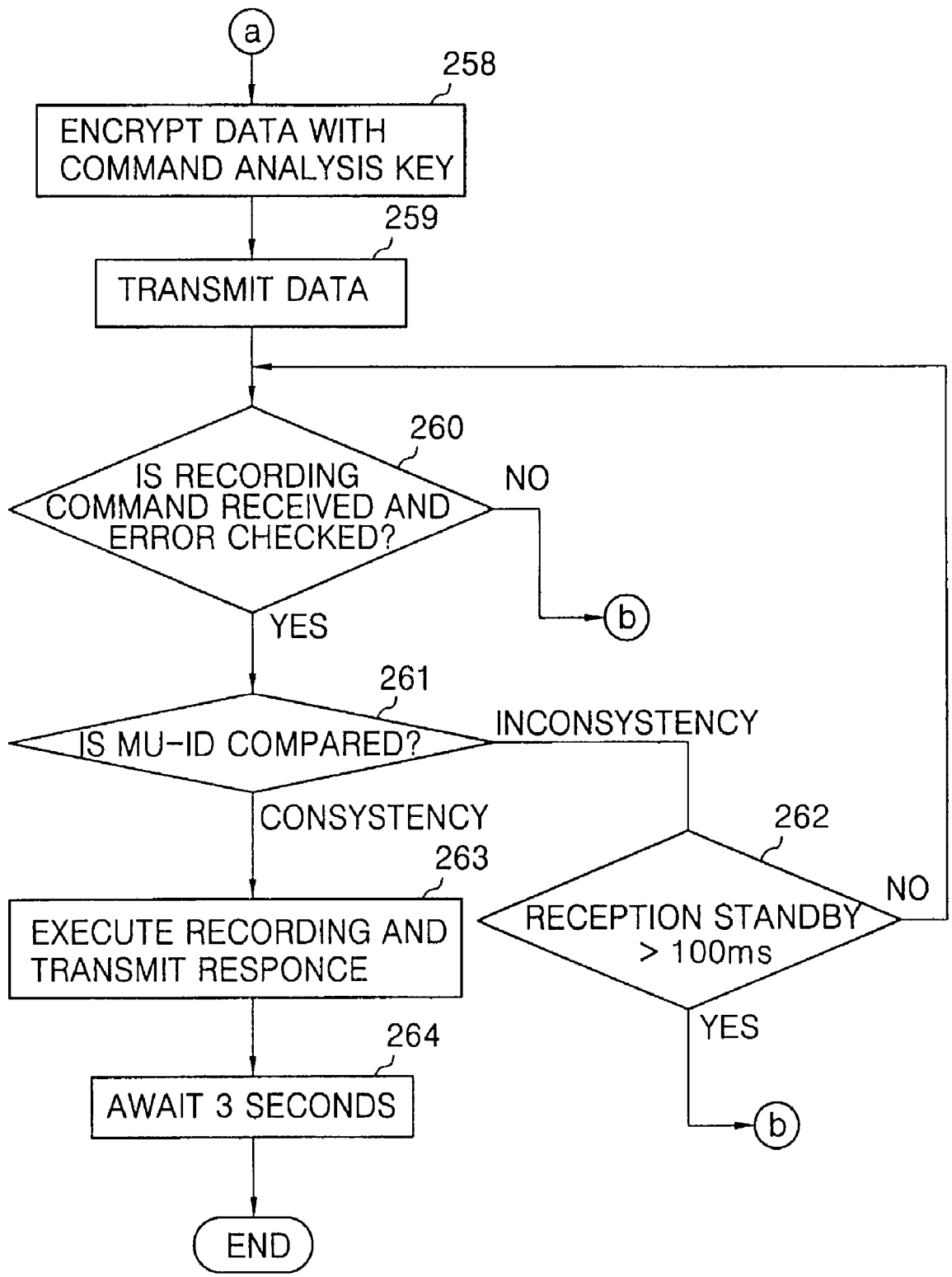

FIGS. 25 and 26 illustrate a communications protocol applied to a settlement method using an optical payment according to the present invention, respectively. The BU 235 emits a pilot signal for finding whether there is any counterpart station which is in a communicating state within a communications distance (①). The pilot signal includes an ECC (Error Correcting Code) (for example, a BCC (Block Check Character)) value for guaranteeing a faultlessness of communicating data, and its own ID (BU-ID) value for guaranteeing a one-to-one communication. Meanwhile, the BU 235 checks if there is a button input (step 251). If there is a button input, the MU 230 ascertains whether a pilot signal is received from the BU235 and an error is generated (step 252). The MU 230 having received the pilot signal ascertains whether a pilot signal is received within a predetermined reception standby time after having received a button input and the received pilot signal is transmitted without having any deformation, from the ECC value included in the received data. If is ascertained that the pilot signal has been received within a predetermined time without having any error, the ID value (BU-ID) of the BU 235 included in the received data is extracted in order to guarantee the faultlessness of the whole forthcoming communications, and its own ID value (MU-ID) is created and stored (step 253). The MU 230 calculates an index value for pointing a value indicating its own communication-ready state and a stored card information value, an ID value (MU-ID) indicating its own body, an ID value (BU-ID) of the BU 235 having sent a communications request, and the ECC value for guaranteeing a faultlessness of the whole data to be transmitted (②) (step 254). The BU 235 having received the ECC value ascertains whether the received communication standby signal indicated as the number ② has been transmitted without any deformation, from the received ECC value included in the received data. The BU 235 ascertains whether there is a response with respect to his or her request communications with its own ID value (BU-ID) included in the received data. If all match, the BU 235 keeps in custody the ID value (MU-ID) of the MU 230 included in the communication standby signal in order to guarantee the faultlessness of the whole communications. The BU 235 decrypts the index value for pointing a credit information value included in the received communications standby signal shown in ② of FIG. 25, by using a predetermined index table and then extracts a value for pointing necessary credit information. The BU 235 creates an encryption key to be used during communications and transmits it together with the ID value (MU-ID) of the MU 230 (③). The MU 230 having received the encryption key ascertains whether the received encryption key and command signal has been transmitted without any deformation, from the received ECC value included in the received data (step 255). If ascertained, the MU 230 ascertains whether there is a response with respect to his or her request communications with the MU-ID value included in the received data (step 256). If the MU-ID value is not equal to the ID of the MU 230, the MU 230 stands by a reception for a predetermined tome (step 257). If a matching MU-ID value is not received even though a reception standby time elapses for a predetermined time, the MU 230 returns to step 251 to perform the steps 251-257 again. If all match, the BU 235 keeps in custody the ID value (MU-ID) of the MU 230 included in the communication standby signal in order to guarantee the faultlessness of the whole communications. The BU 235 decrypts the index value for pointing a credit information value included in the received communications standby signal shown in ② of FIG. 25, by using a predetermined index table and then extracts a value for pointing necessary credit information. If the received MU-ID value is equal to the ID of the MU 230, the MU 230 reads data from a storage device according to the re-transmitted command, and then encrypts the read data with an encryption key (step 258). The encrypted data is transmitted to the BU 235 (④) (step 259). The BU 235 having received the encrypted data ascertains whether the received encrypted data has been transmitted without any deformation, from the ECC value included in the received data. The BU 235 ascertains whether there is a response with respect to his or her request communications with its own ID value (BU-ID) included in the received data. If all match, the BU 235 transmits corresponding data to a post-end processor and completes communications. If data to be updated exists, the BU 235 sends the updating data signal to the MU 230 together with a storage command (⑤). Here, the updating data corresponds to departure information of a fee payment system for a subway or a toll gate. The MU 230 ascertains whether the received updating data and command signal has been transmitted without any deformation, from the received ECC value included in the data (step 260). The MU 230 ascertains whether there is a response with respect to his or her request communications with its own ID value included in the received data (step 261). If it ascertained that his or her own ID value does not exist in the received data, the MU 230 stands by a reception for a predetermined time (step 262). If a matching MU-ID value is not received even though a predetermined time elapses, the MU 230 returns to step 251, to perform steps 251-262. If it is ascertained that his or her own ID value exists in the received data, the MU 230 stores the corresponding updating data and transmits an acknowledge signal (ACK) with respect to the corresponding updating data (⑥) (step 263). Then, the MU 230 awaits about three seconds (step 264) and completes the program. Through these procedures, the communications complete.

As described above, card information is stored in a portable terminal in place of a magnetic-type card such as a credit card, a prepaid card, and a banking card. In this case, if card information is stored in a portable terminal without any modification, there may be a concern about an illegal reproduction of the card. In particular, in the case that card information is directly input in a memory of a portable terminal, a person who developed a portable terminal may illegally reproduce a portable terminal memory using specific equipment. Thus, card issuing authorities such as card companies or banks wish to avoid that card information is stored in a portable terminal in the same form as that stored in a magnetic card. However, an encryption system using a personal asymmetric key requires long calculation time in banking transactions performed by a plurality of unspecific people, which makes customers more inconvenienced compared to a current system. Also, since symmetric keys input in a number of POS terminals are same in the case that a symmetric key is used, key protection may be so much difficult.

Considering the above, a new IC card system has been developed, which is not however widely spread due to an infrastructure setup cost. Thus, the present invention uses a current system as it is and uses a user designating secret number as an encryption algorithm key in order to increase a security, which will be described in detail with reference to FIG. 27.

Figure 27:
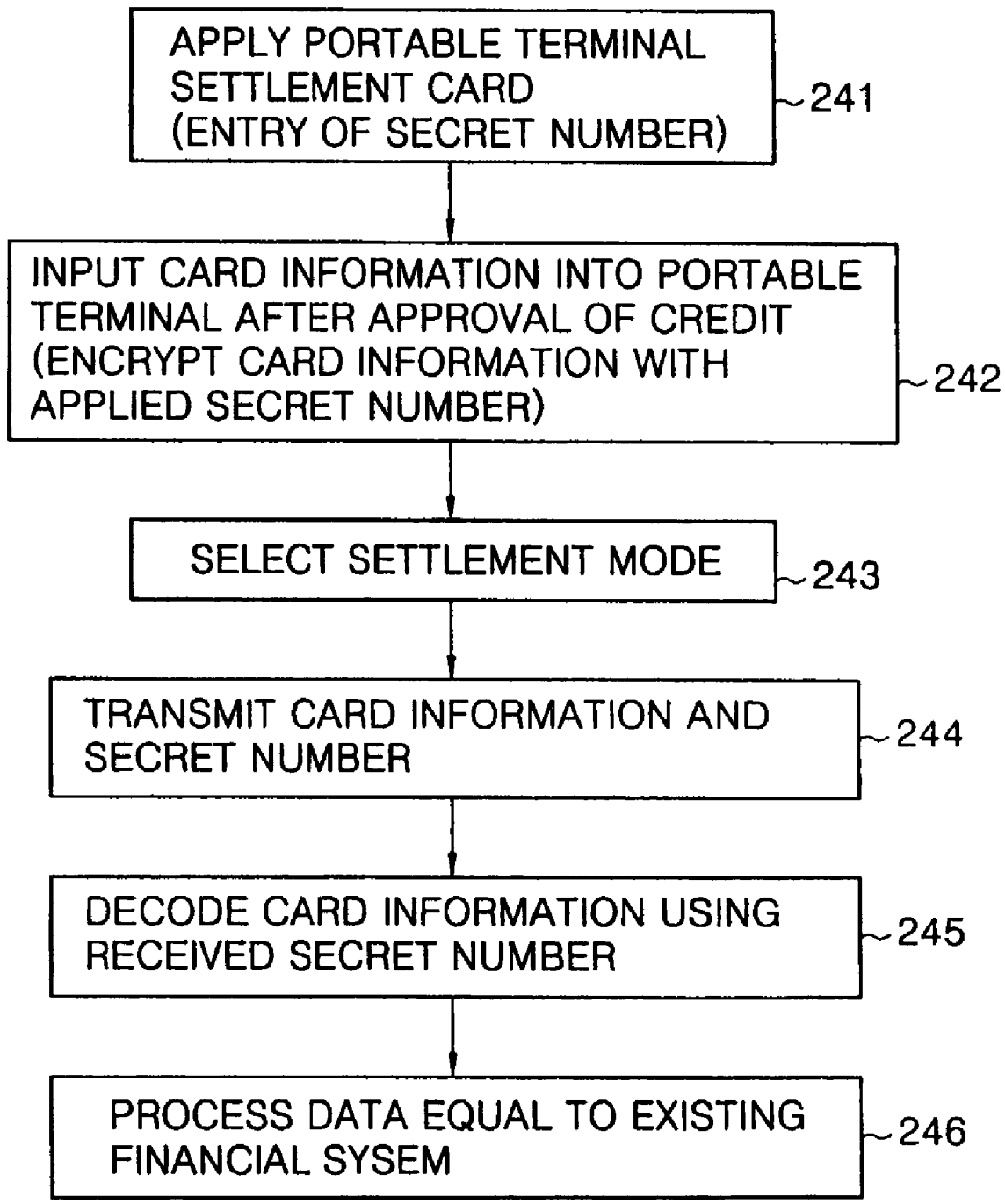
FIG. 27 is a flowchart view for explaining a security enhancement method in a settlement system using a card information contained portable terminal according to the present invention.

FIG. 27 is a flowchart view for explaining a security enhancement method in a settlement system using a card information contained portable terminal according to the present invention.

A customer fills in an application in order to use his or her own portable terminal as a card, and applies it to a corresponding banking authority. In this case, a secret number of the card is additionally filled in the application (step 241). The banking authority examines the application and then after the application has been accepted, card information such as a card number and a valid period is encrypted using a secret number requested by the customer as an encryption key (step 242). An encryption method uses an algorithm of a symmetric key pattern which cannot be solved without knowing a card possessor's secret number. Accordingly, although internal card information is read from a portable terminal, the read card information cannot be used illegally. Here, only part of card information can be encrypted. The encrypted card information is input in a portable terminal. For security, a customer who visits a corresponding banking authority inputs information via an interfacer located in the lower end of the portable terminal. According to selection of a user, information can be input in a portable terminal by using a wireless network. Here, in the case that the secret number is encrypted in the form of an irreversible function, a security can further heightened. When a card substitute portable terminal issued through the above process is used, a customer manipulates a keypad in the portable terminal to input a settlement secret number and selects a settlement mode (step 243). At a settlement mode, a customer selects the kind of a card to be used and presses a transmission button. As a result, the card information and secret number stored in the portable terminal are transmitted in the form of an infrared signal (step 244). An optical receiver connected to a POS terminal in a contract shop receives the card information and secret number from the customer's portable terminal and transmits the received result to the contract shop POS terminal. Here, a distance between the portable terminal and the optical receiver is a short distance within about one meter. Since a linearity is obtained by using light, it is not possible to illegally record the information. The POS terminal operates a decoding algorithm without keeping a separate encryption key in custody, and decodes the card information by using the received secret number (step 245). Thereafter, like the existing banking transaction systems, an approval of the credit dealing is determined in a card company computer via a VAN company (step 246). If the received secret number is incorrect, the card information which is received and decoded is also incorrect. Thus, an approval of the credit dealing is not made. In the case that a customer wishes to know his or her own card information at a portable terminal settlement mode, he or she selects a card information ascertainment menu. Then, a decoding program operates in the portable terminal to thereby display information such as a card information and valid period on a screen.

The optical payment settlement system can be applied to various fields. For example, the optical payment system can be used in most of fields where a fee information. The FIG. 28 system includes a credit card inquiry machine 30 or 31 for transferring the received credit card information and requesting an approval of a dealing, and a VAN company server 40 for applying an approval according to the received approval request and notifying an approval or a disapproval to the credit card inquiry machine 30 or 31. Here, the optical payment receiver 20 or 21 is connected to the credit card inquiry machine 30 by cable (see FIGS. 15A and 15B), is fabricated in the form of an adapter in which a card reader is installed and connected to the credit card inquiry machine 30 (see FIGS. 17A, 17B and 17C), or can be incorporated in the credit card inquiry machine 31 (see FIG. 14). The operation with respect to an optical settlement in a general commerce system of FIG. 28 having the above-described configuration will be described in detail with reference to FIG. 29.

Figure 28:
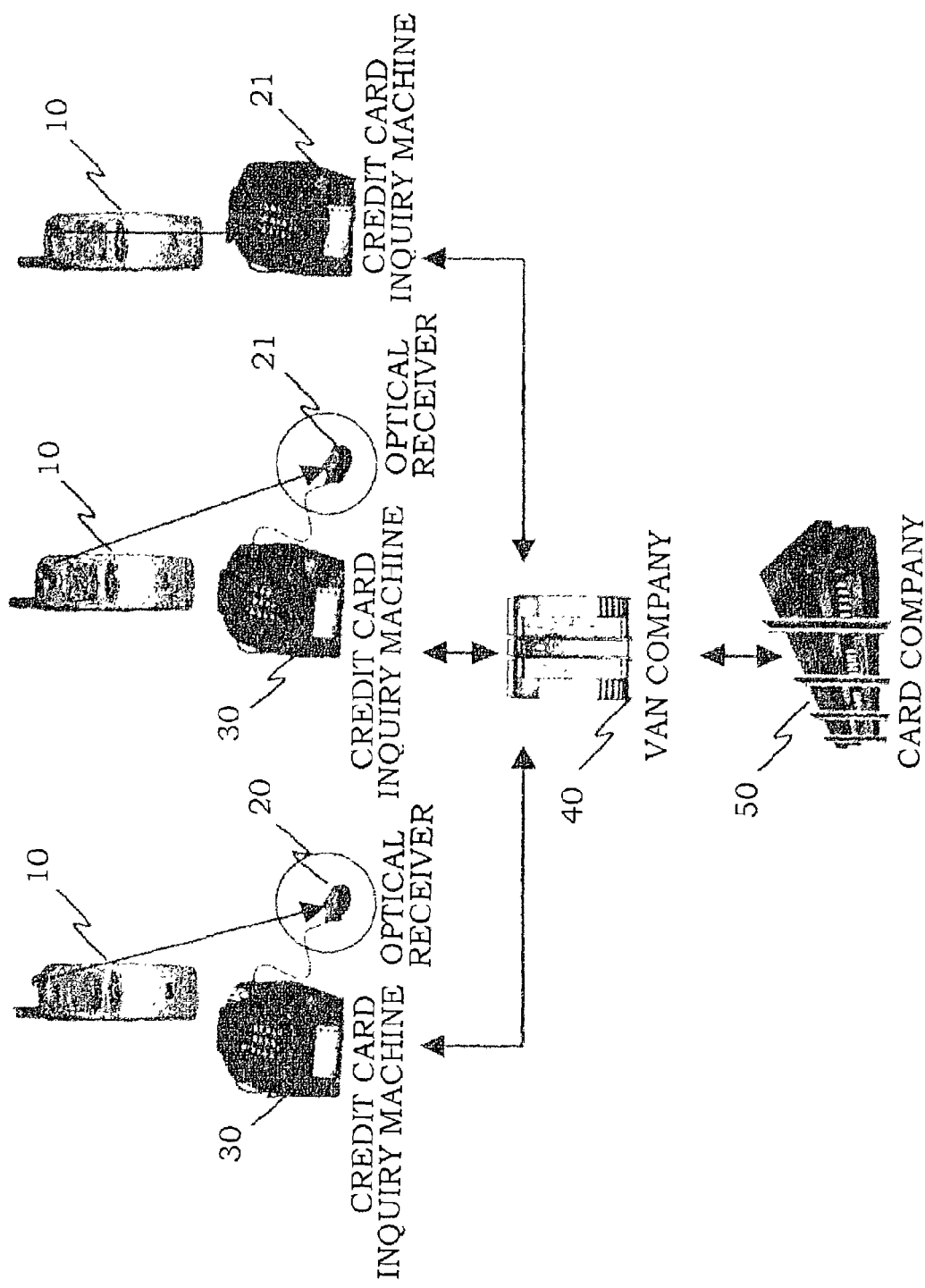
FIG. 28 is a configuration diagram showing a commerce system using an optical payment transceiver according to the present invention.
Figure 29:
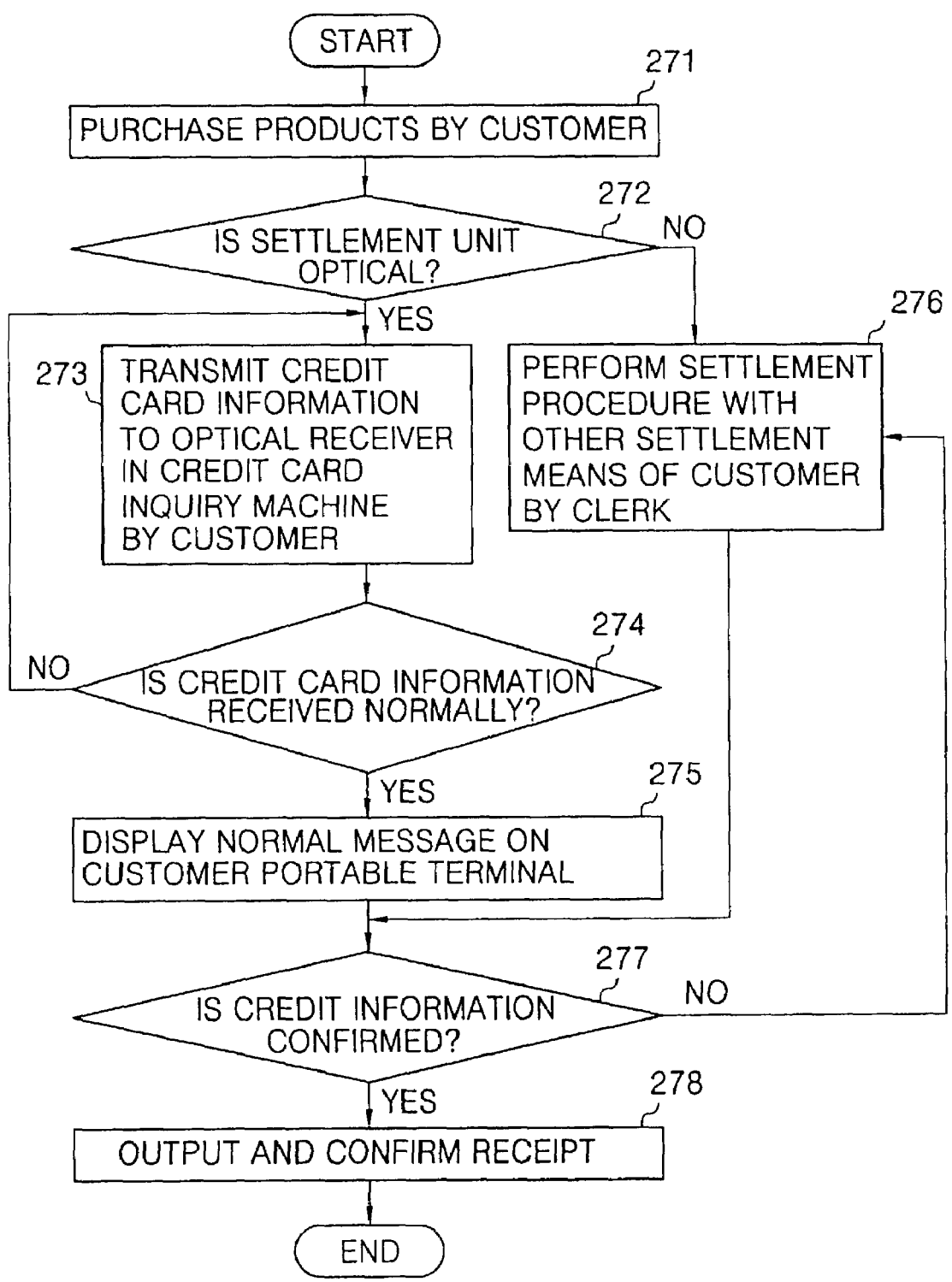
FIG. 29 is a flowchart view for explaining an operation with respect to an optical settlement in a general commerce system of FIG. 28.

FIG. 29 is a flowchart view for explaining an operation with respect to an optical settlement in a general commerce system of FIG. 28. A customer purchases an article (step 271). In the case that the customer pays for the article, a settlement method is selected (step 272). If the settlement is optically performed, the customer transmits credit card information to an optical receiver incorporated in or connected to a credit card inquiry machine 30 or 31 (step 273). That is, the customer makes a portable terminal to be used as an optical payment unit 10 face an optical payment receiver 20 or 21, and then presses a predetermined button to transmit an optical signal indicating a dealing start. Here, the optical signal indicating the dealing start is transmitted together with credit information including a name of a customer and a credit card number. The optical payment receiver 20 or 21 receives an optical signal containing credit information and the received optical signal to the credit card inquiry machine 30 or 31. The customer ascertains whether the credit information has been normally received (step 274). If not, the customer transmits the credit information again (step 273). If the credit information has been normally received, a normal message is displayed on a screen of the portable terminal (step 275). Meanwhile, in the case that other settlement unit is used other than light, an employee performs a settlement procedure with other settlement unit of the customer (step 276). The credit card inquiry machine 30 or 31 checks the input credit information (step 277). That is, the credit card inquiry machine 30 or 31 transmits the input credit information to the VAN company server 40 to request an approval of a dealing. The VAN company server 40 applies an approval to the corresponding card company 50 according to the received approval request. The card company having received the approval application checks credit status and transmits an approval result to the credit card inquiry machine 30 or 31. In the case that the approval application is rejected the credit card inquiry machine 30 or 31 performs the following steps including step 276 again, so that the dealing can be settled using other settlement unit. In the case that the approval application is accepted, the credit card inquiry machine 30 or 31 prints a sales slip and receives a settlement signature from the customer, to then deliver a customer's purchased article (step 278).

Figure 30:
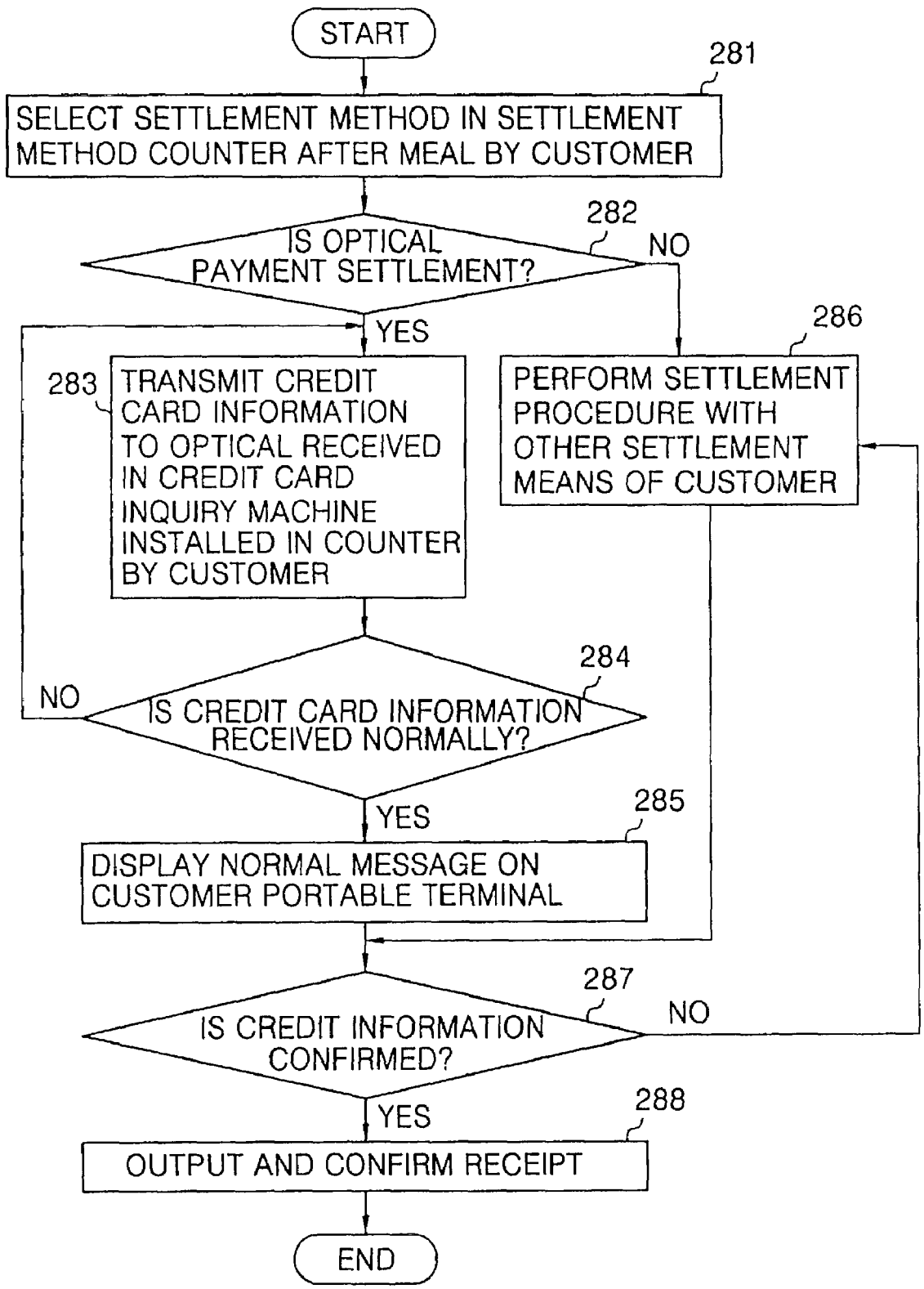
FIG. 30 is a flowchart view for explaining an operation in the case that the settlement system of FIG. 28 is applied to a counter calculation-type restaurant.

FIG. 30 is a flowchart view for explaining an operation in the case that the settlement system of FIG. 28 is applied to a counter calculation-type restaurant.

A customer having had food at a restaurant selects a settlement method at a counter at the time of payment for the food price (step 281). Here, the customer determines whether an optical payment settlement will be performed (step 282). In the case of an optical payment settlement, the customer makes an optical receiver attached in a portable terminal 10 being an optical payment unit face the optical receiver 20 or 21 and transmits card information stored in the portable terminal 10 in the form of an optical signal to perform the settlement (step 283). The optical receiver 20 or 21 is connected to a credit card inquiry machine 30 installed on a counter by cable or an adapter, or incorporated in a credit card inquiry machine 31. The optical receiver 20 or 21 receives the card information transmitted in the form of an optical signal from the optical transmitter in the portable terminal 10 being an optical payment transmitter, and sends a response signal with respect to the received card information. The portable terminal 10 being an optical payment transmitter receives the response signal sent from the optical payment receiver 20 or 21 at the end of the credit card inquiry machine 30 or 31 and judges whether the transmitted card information has been normally received (step 284). If the card information has not been normally received, a message indicating an abnormal reception is displayed on a display of the portable terminal 10, and repeatedly performs the following steps including step 283 in order to re-transmit the card information. If the card information has been normally received, a message indicating a normal reception is displayed on the display of the portable terminal 10 (step 285). The optical payment receiver 20 or 21 converts the received optical signal card information into the form which can be recognized in the credit card inquiry machine 30 or 31 and transmits the converted result. If the customer's settlement method is not an optical payment settlement in step 282, the settlement process is performed with other settlement unit (step 286). For example, if a settlement method is method of using a magnetic credit card, the card reader of the credit card inquiry machine 30 or 31 or the card reader mounted on the optical receiver adapter 21 reads a magnetic portion on the card to receive card information. The credit card inquiry machine 30 or 31 ascertains credit information with respect to the card information transmitted from the optical payment receiver 20 or 21 or input via the card reader (step 287). That is, The credit card inquiry machine 30 or 31 requests for an approval to the card company via the VAN company server 40. The card company server 50 transmits a dealing approval or disapproval to the credit card inquiry machine 30 or 31 via the VAN company server 40 with respect to the requested card information. In the result of credit information ascertainment, if an approval of dealing is not accepted, the following steps including step 286 are repeatedly performed. If an approval is accepted, an employee prints out a sales slip from the credit card inquiry machine 30 or 31 and receives a customer's signature thereon, a settlement is completely finished (step 288).

If only credit information is transmitted using a portable phone in the above-described settlement system, only a signature of a purchaser performed on a sales slip becomes a subject identification unit of the dealing action, according to a general practice in a present credit dealing. In particular, if a user should sign on a receipt every time when a dealing action is done in a credit settlement for traffic fare related dealing action or a comparatively petty cash, the whole execution time of the dealing action is delayed. Thus, a commerce participant can be identified using a portable phone number.

Figure 31:
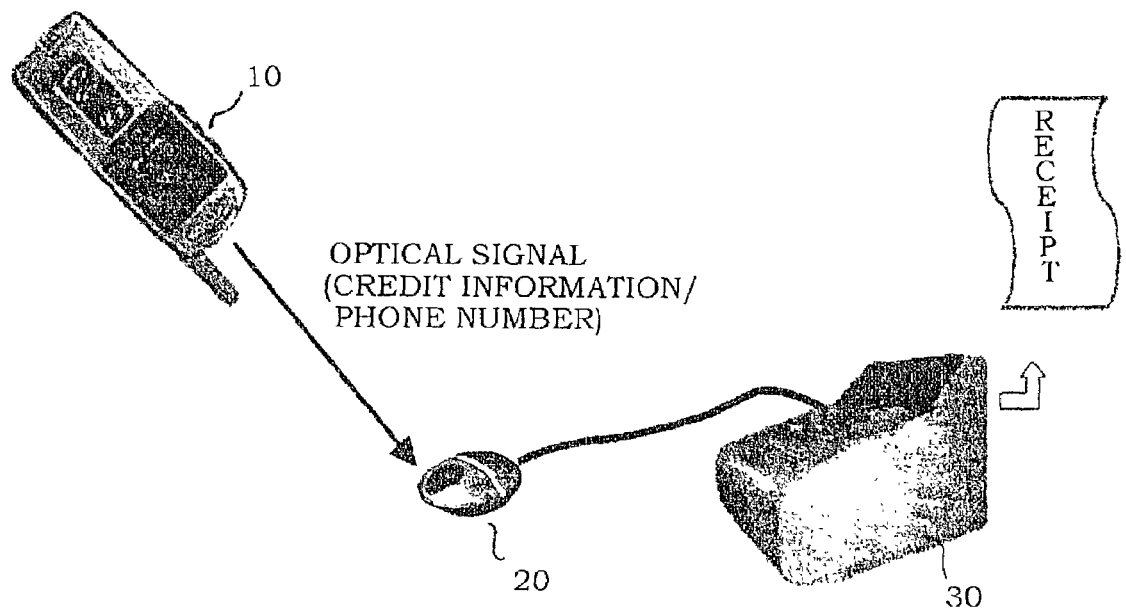
FIG. 31 is a conceptual view of a settlement system adopting an optical payment using a phone number as an ID (IDentification)
Figure 32:
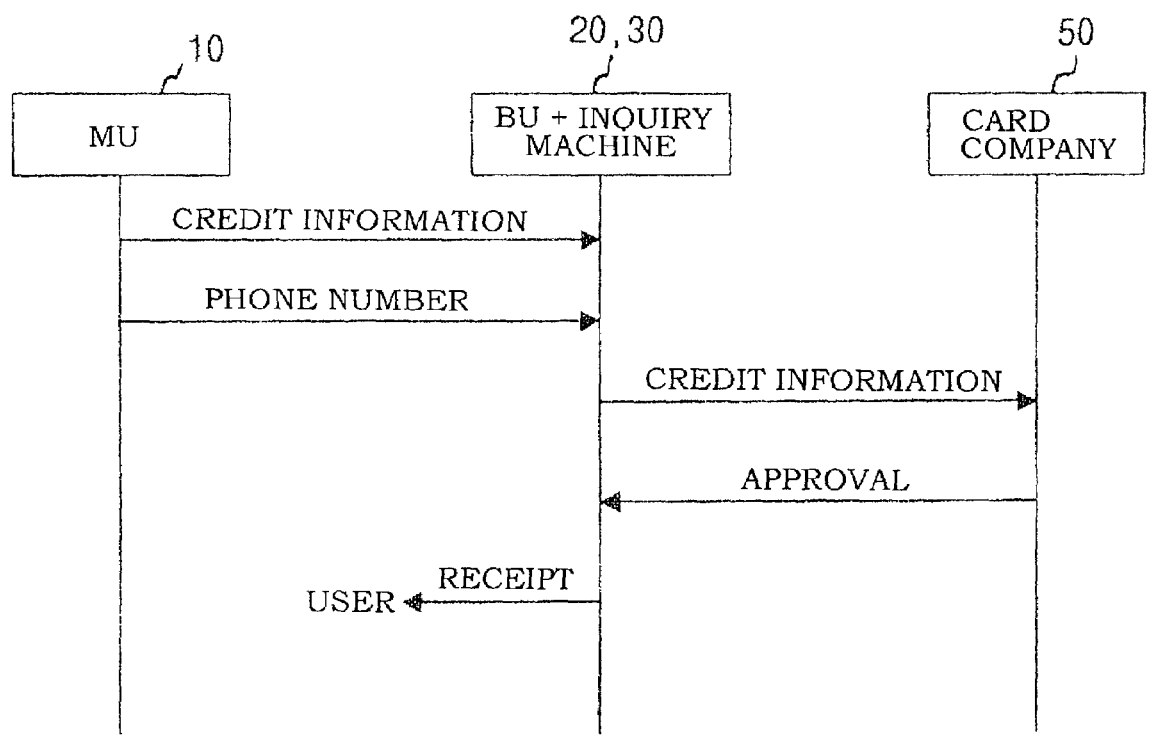
FIG. 32 is a view showing a data flow of a settlement system adopting an optical payment using a phone number as an ID (IDentification)

FIG. 31 is a conceptual view of a settlement system adopting an optical payment using a phone number as an ID (IDentification), and FIG. 32 is a view showing a data flow of a settlement system adopting an optical payment using a phone number as an ID (IDentification).

When credit information is stored in a portable terminal such as a portable phone or a PDA, the credit information corresponds to the phone number assigned to the terminal on a one-to-one basis and stored in the terminal. If a button input is done by the user for optical payment settlement, the portable terminal (MU) 10 transmits the phone number together with the stored credit information in the form of an infrared signal. The optical receiver (BU) 20 receiving the phone number extracts the credit information and the phone number from the received optical signal. The optical receiver (BU) 20 transmits the extracted credit information and phone number to the credit card inquiry machine 30. The credit card inquiry machine 30 transmits the received credit information for authentication externally and keeps the phone number in custody. The card company 50 receives the credit information and approves dealt particulars. If the dealt particulars have been approved, the credit card inquiry machine 30 prints out purchased particulars together with the kept phone number on a receipt. Accordingly, a transaction subject is indicated as a phone number on the receipt.

In the optical payment settlement system using a phone number as an ID, a person concerned which performs dealings using a portable terminal selects a mobile communications company of his or her own subscribed terminal not a card company as a dealing authority, in order to perform a dealings action, in the case of a vendor machine or a traffic fare related dealing action, which is a batch processing settlement system without passing through an existing on-line approval system, to thereby diversify selection of a credit dealing authority.

A phone number which can be used as an ID has been already stored in a portable terminal and the phone number is used on a one-to-one relationship basis with respect to the portable terminal. If a user selects a mobile communications company as a credit dealing authority in the case of a vendor machine or a traffic fare related dealing action, which is a batch processing settlement system, and performs a button manipulation for optical payment settlement, the portable terminal transmits the contained phone number together with an authentication key in an infrared form. The optical receiver receiving the phone number together with the authentication key identifies the authentication key using a decoding key and approves dealing particulars and keeps it in custody, if it is identified that the transmitted phone number is a specific number input when the user subscribed in the communications network, using the identified authentication key.

Figure 33:
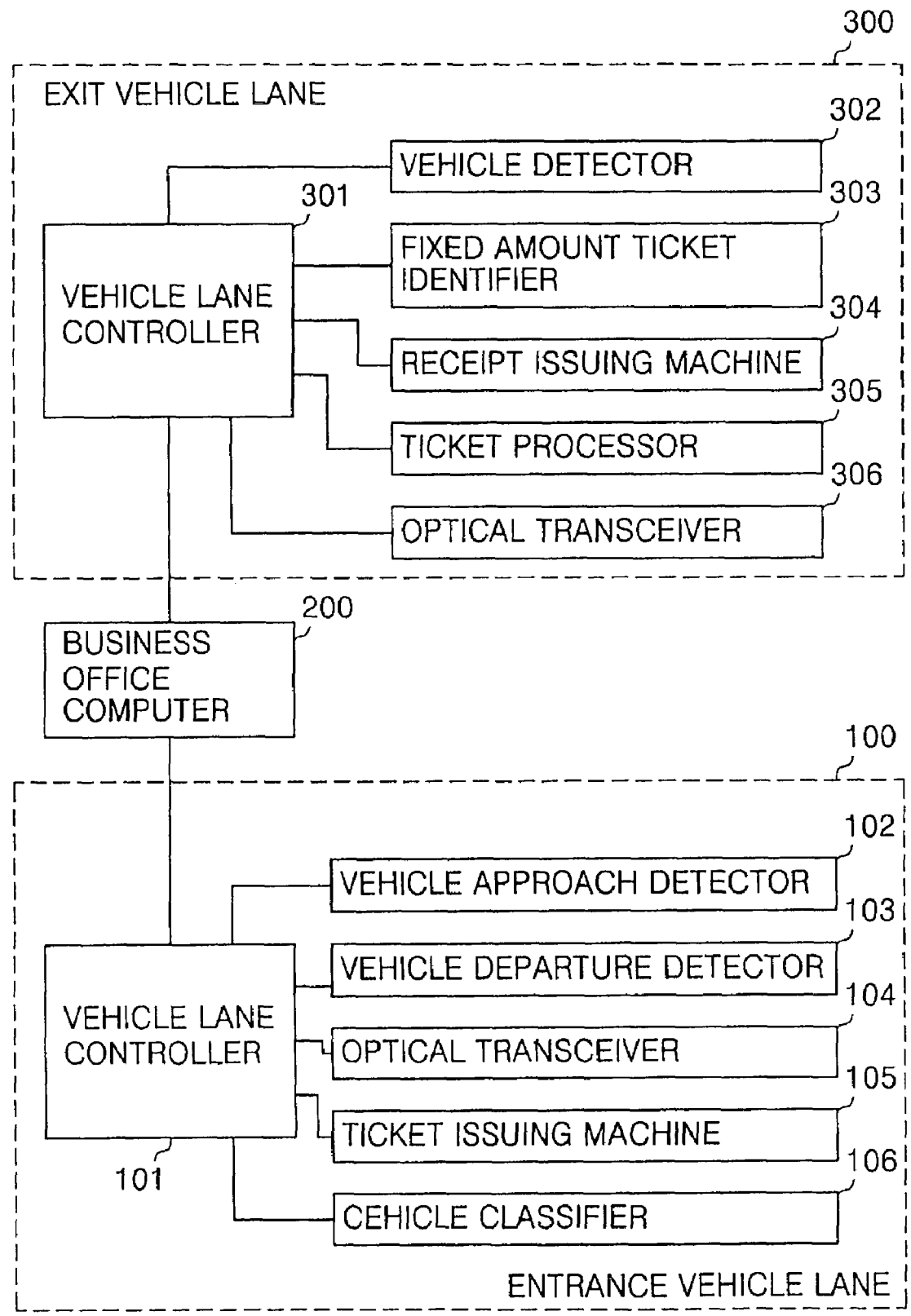
FIG. 33 is a configuration view showing a toll gate fee settlement system adopting an optical payment settlement system according to the present invention.
Figure 34:
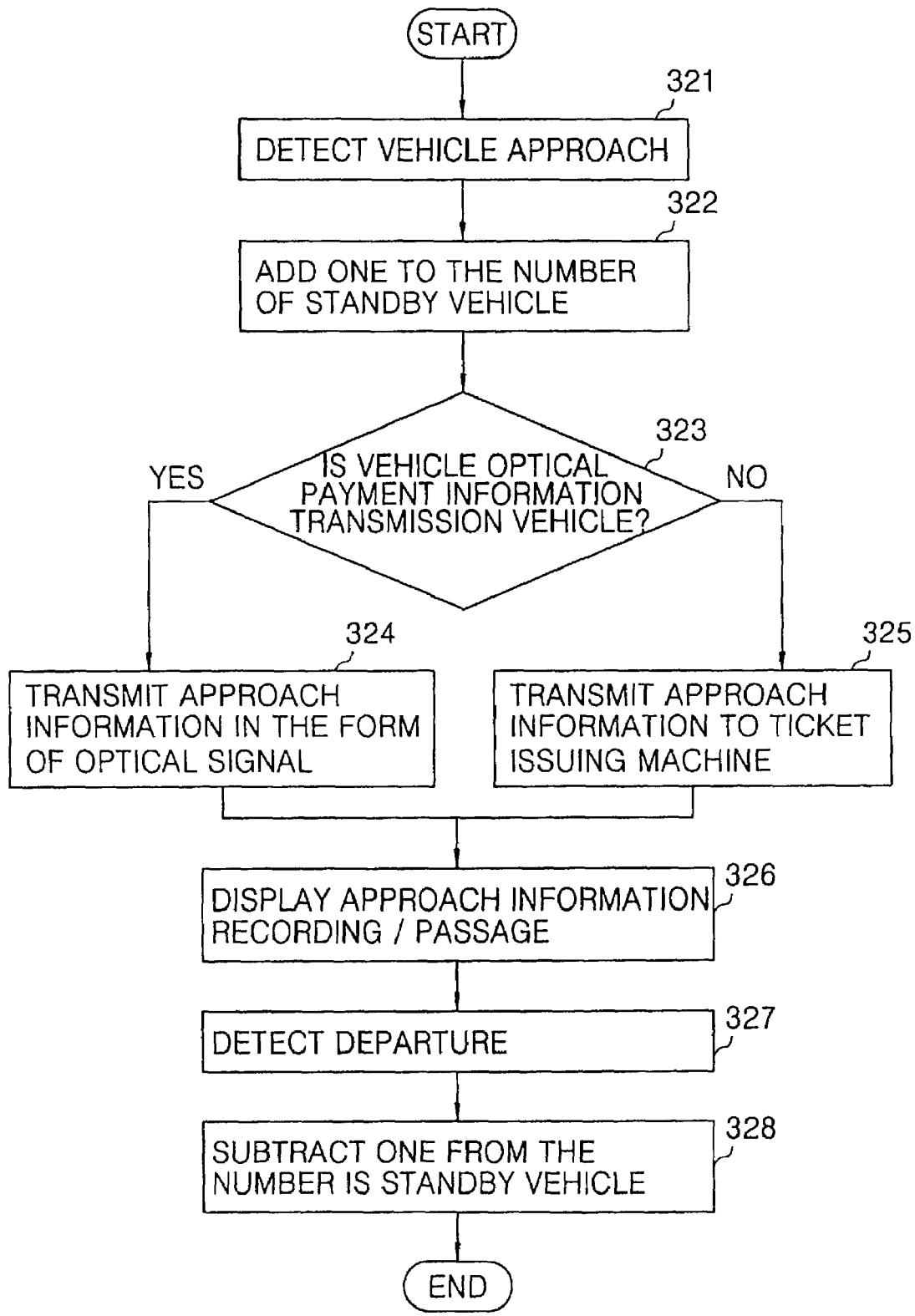
FIG. 34 is a flowchart view for explaining an operation with respect to settlement of a toll gate fee of a vehicle which passes an entrance gate in a toll gate.
Figure 35:
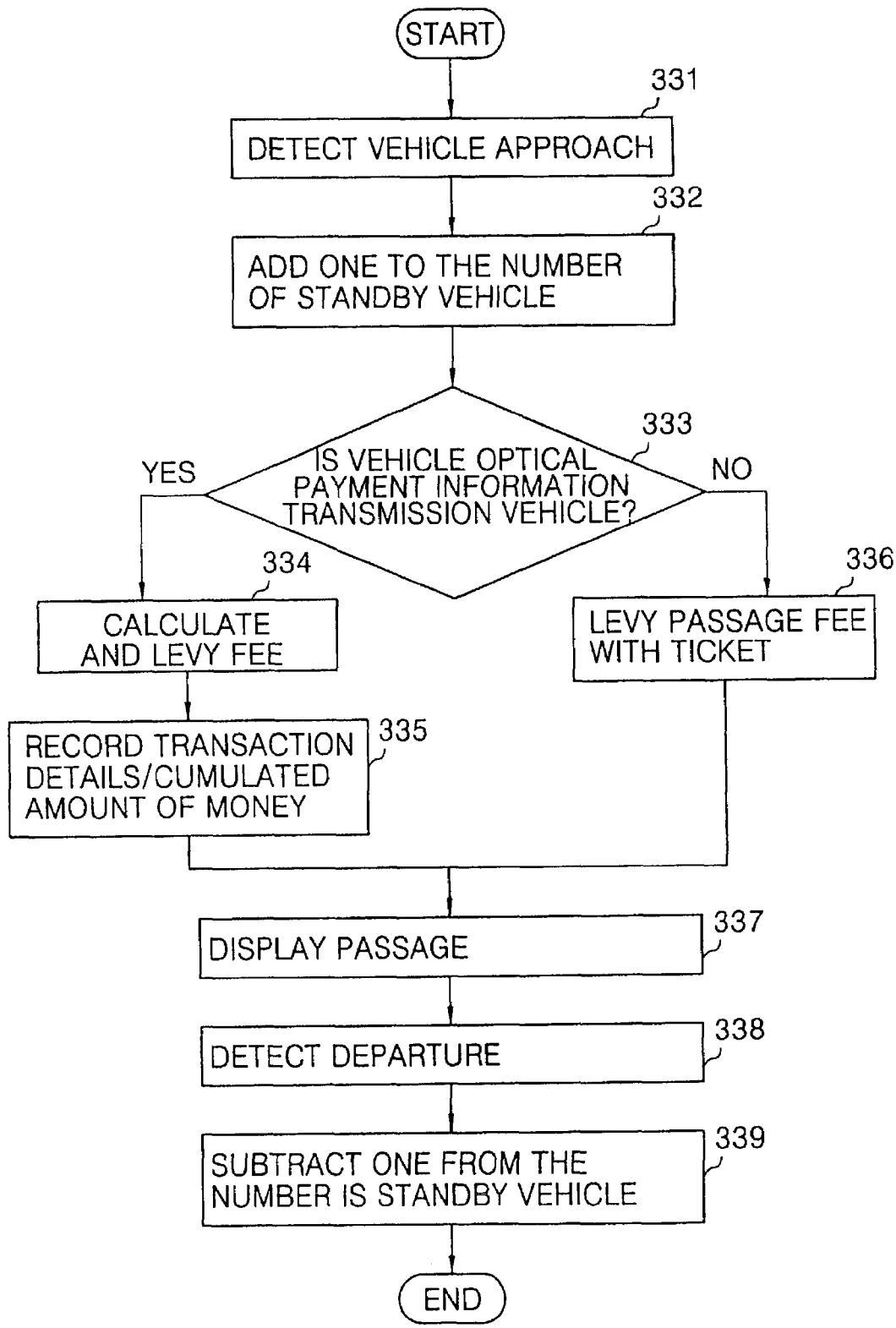
FIG. 35 is a flowchart view for explaining an operation with respect to settlement of a toll gate fee of a vehicle which passes an exit gate in a toll gate.

FIG. 33 is a configuration view showing a toll gate fee settlement system adopting an optical payment settlement system according to the present invention. The system shown in FIG. 33 includes controllers 100 and 300 which are installed at a toll gate entrance side and a toll gate exit side, respectively and a business office computer 200. The entrance controller 100 includes a vehicle approach detector 102, a vehicle departure detector 103, a vehicle classifier 106, a ticket issuing machine 105, a vehicle lane controller 101. The entrance controller 100 also includes a bidirectional optical transceiver 104 which can perform both transmission and reception operations. The exit controller 300 includes a vehicle lane controller 301, a vehicle detector 302, a fixed amount ticket identifier 303, a receipt issuing machine 304, and a ticket processor 305. The exit controller 300 also includes a bidirectional optical transceiver 306 which can perform transmission and reception operations. The operation of the toll gate fee settlement in the toll gate system having the above configuration will be described in detail with respect to FIGS. 34 and 35.

If a vehicle arrives at an access road of a departure toll gate, a driver or a passenger makes a portable optical payment transmitter face the optical transceiver 104 which is located at the side of the access road, and then presses a transmission button. The card information stored in the optical payment transmitter is transmitted in the form of an optical signal. The optical transceiver 104 receives the card information transmitted from the optical payment transmitter. The optical transceiver 104 checks a signal format of the received card information. In the case that the signal format is normal which meets a predetermined protocol, the card information is transmitted to the vehicle lane controller 101. The vehicle lane controller 101 adds one to the number of standby vehicles (step 322), if a vehicle approach is detected in the vehicle approach detector 102 (step 321). Then, the vehicle lane controller 101 ascertains whether the approaching vehicle is an optical payment information transmission vehicle (step 323). If the approaching vehicle is an optical payment information transmission vehicle, the vehicle lane controller 101 sends entrance related approach information in the form of an optical signal via the optical transceiver 104 (step 324). The portable terminal being the optical payment transmitter records the entrance approach information transmitted from the optical transceiver 104 in a memory. The entrance approach information includes a current toll gate information, time information and vehicle type information. The vehicle type is classified via the vehicle classifier 106. If the approaching vehicle is not an optical payment information transmission vehicle, the vehicle lane controller 101 sends entrance approach information to the ticket issuing machine 105 to make the ticket issuing machine issue a ticket containing entrance approach information (step 325). If the above procedure is completed, the vehicle lane controller 101 displays a signal approving passage of the vehicle and informs the passenger of a passage approval (step 326). The vehicle lane controller 101 subtracts one from the number of standby vehicles (step 328) if a vehicle departure is detected in the vehicle departure detector 103 (step 327). The vehicle lane controller 101 transmits each vehicle entrance approach information to a corresponding business office computer 200.

If a vehicle having passed through a departure toll gate arrives at an arrival toll gate, a driver or a passenger makes the portable optical payment transmitter face the optical transceiver 306 which is located at the toll gate access road, and then presses a transmission button. The card information stored in the optical payment transmitter is transmitted in the form of an optical signal, and the entrance approach information stored in the memory is transmitted in the form of an optical signal. The optical transceiver 306 receives the card information and the entrance approach information transmitted from the optical payment transmitter. The optical transceiver 306 checks a signal format of the information transmitted from the optical payment transmitter. In the case that the signal format is normal, the optical transceiver 306 transmits the received information to the vehicle lane controller 301. The vehicle lane controller 301 adds one to the number of standby vehicles (step 332), if a vehicle approach is detected in the vehicle approach detector 302 (step 331). Then, the vehicle lane controller 301 ascertains whether the approaching vehicle is an optical payment information transmission vehicle (step 333). If the approaching vehicle is an optical payment information transmission vehicle, the vehicle lane controller 301 calculates a passage fee as much as a corresponding passage interval based on the transmitted information, and levies a passage fee in linkage with the card information (step 334). The vehicle lane controller 301 records the transaction particulars in a memory of the optical transceiver 306 and simultaneously transmits the transaction particulars to the optical payment-transmitter so that a cumulative settlement amount is stored (step 335). The transaction particulars is transmitted to the business office computer 200 and then be recorded therein. Meanwhile, if the approaching vehicle is not an optical payment information transmission vehicle, the ticket processor 305 receives from the driver the ticket issued at a departure toll gate and levies a toll gate passage fee in cash or a fixed amount ticket (step 336). In the case that the toll gate passage fee is paid in the fixed amount ticket, a corresponding fee is settled via the fixed amount ticket identifier 303 and then the difference is recorded and displayed thereon and returned. After a fee is levied through the above procedure, a receipt is issued via the receipt issuance machine 304. If a passage fee is settled, the vehicle lane controller 301 displays a passage approval (step 337). The vehicle lane controller 301 subtracts one from the number of the standby vehicles (step 339), if a vehicle approach is detected in the vehicle detector 302 (step 338).

The business office computer 200 checks whether the transaction particulars recorded with respect to the approaching and departing vehicles are congruous with the transaction particulars recorded in the optical transceivers 104 and 306 attached to the toll gates by every point of time. If two recorded transaction particulars are congruous with each other, the business office computer 200 clears the records of the optical transceivers 104 and 306, and transmits the transaction particulars to a collection server (not shown). Here, the collection server is a central server for centrally controlling respective business office computers connected to each other. The collection server checks if the transaction particulars recorded in the business office computer 200 are congruous with the collected data and transmits the collected data in a bundle to a card company server only when the former is congruous with the latter. Then, the recorded data in the business office computer 200 is cleared.

Figure 36:
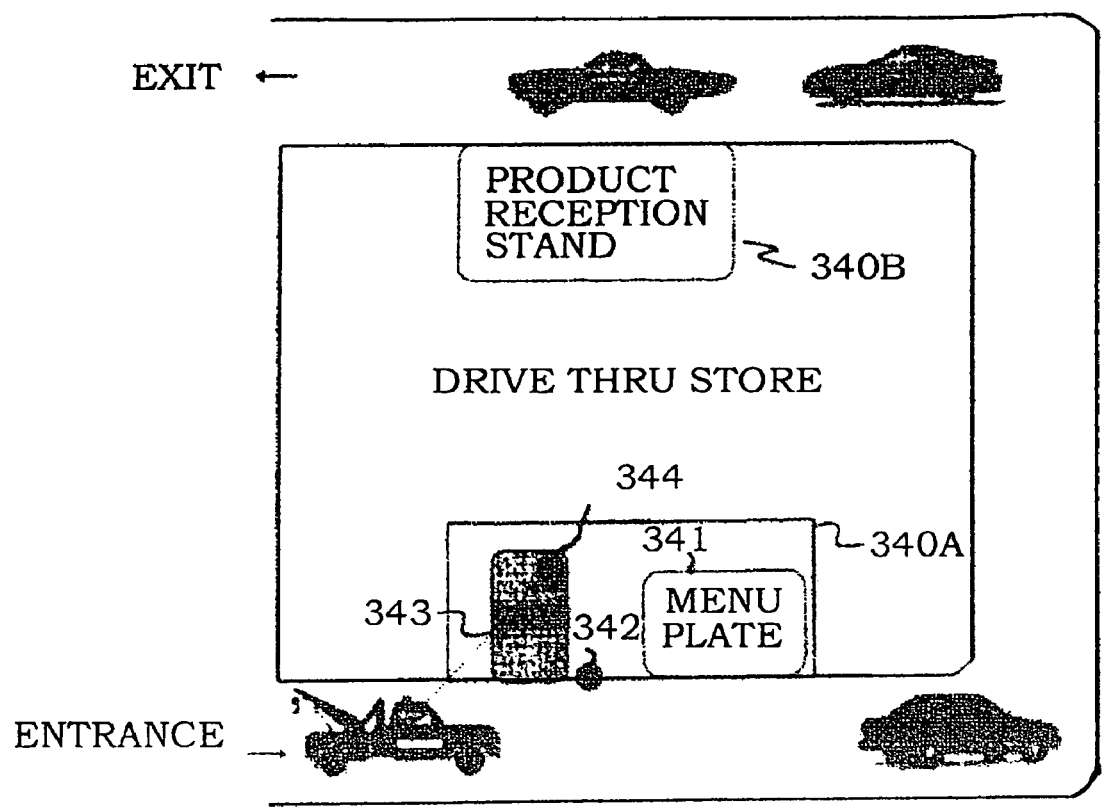
FIG. 36 is a configuration view showing a drive-thru order system adopting an optical payment settlement system according to the present invention.

FIG. 36 is a configuration view showing a drive-thru order system adopting an optical payment settlement system according to the present invention. The system shown in FIG. 36 further includes an optical receiver 344 which is attached at a proper position on an order items display board 343 of an existing system, for receiving card information in the form of an optical signal. Here, customers riding in a vehicle use an optical payment unit such as a portable phone containing a credit card in which an optical transmitter transmitting the card information in the form of an optical signal is attached.

Figure 37:
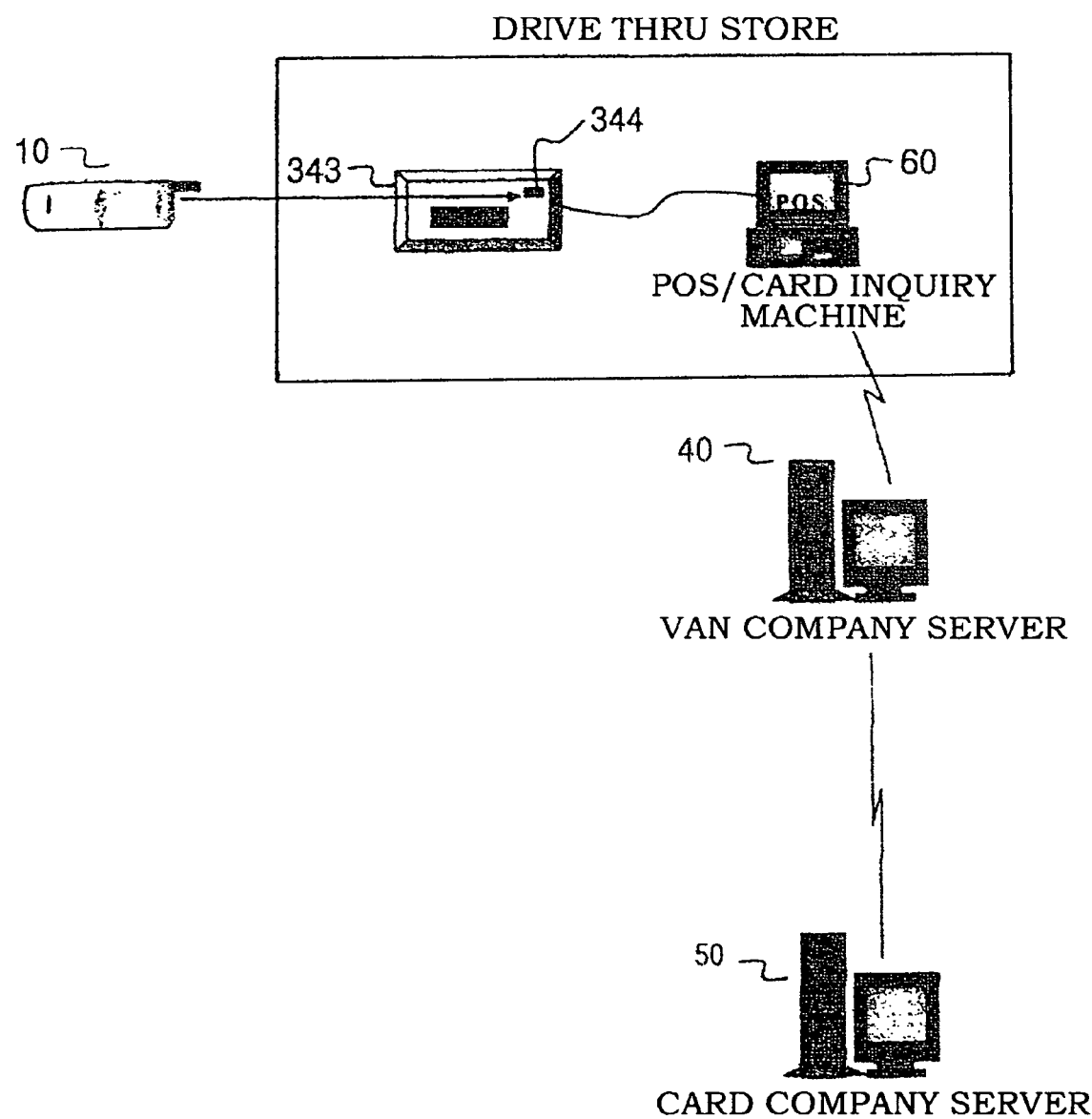
FIG. 37 is a configuration view showing an optical payment settlement system in the FIG. 36 system.

FIG. 37 is a configuration view showing an optical payment settlement system in the FIG. 36 system. The system shown in FIG. 37 includes a portable phone 10 containing card information and transmitting the card information in the form of an optical signal as an optical payment unit, an optical receiver 344 attached to the order items display board 343, for receiving the card information in the form of an optical signal, and a card inquiry machine or POS (point of sales) terminal 60 connected to the optical receiver 344, for receiving the transmitted card information and ascertaining a transaction approval. It is possible to use any portable article in addition to the portable phone 10, as an optical payment unit. Here, the order items display board 343 and the optical receiver 344 attached card inquiry machine or POS terminal 60 are installed in a store. The optical receiver 344 and the card inquiry machine 60 are connected each other by cable or with an adapter. The FIG. 37 system includes a VAN company server 40 which transmits the transaction approval requested card information to the card company server 50 being a settlement authority and transmits the approval or disapproval result to the card inquiry machine or POS terminal 60.

Figure 39:
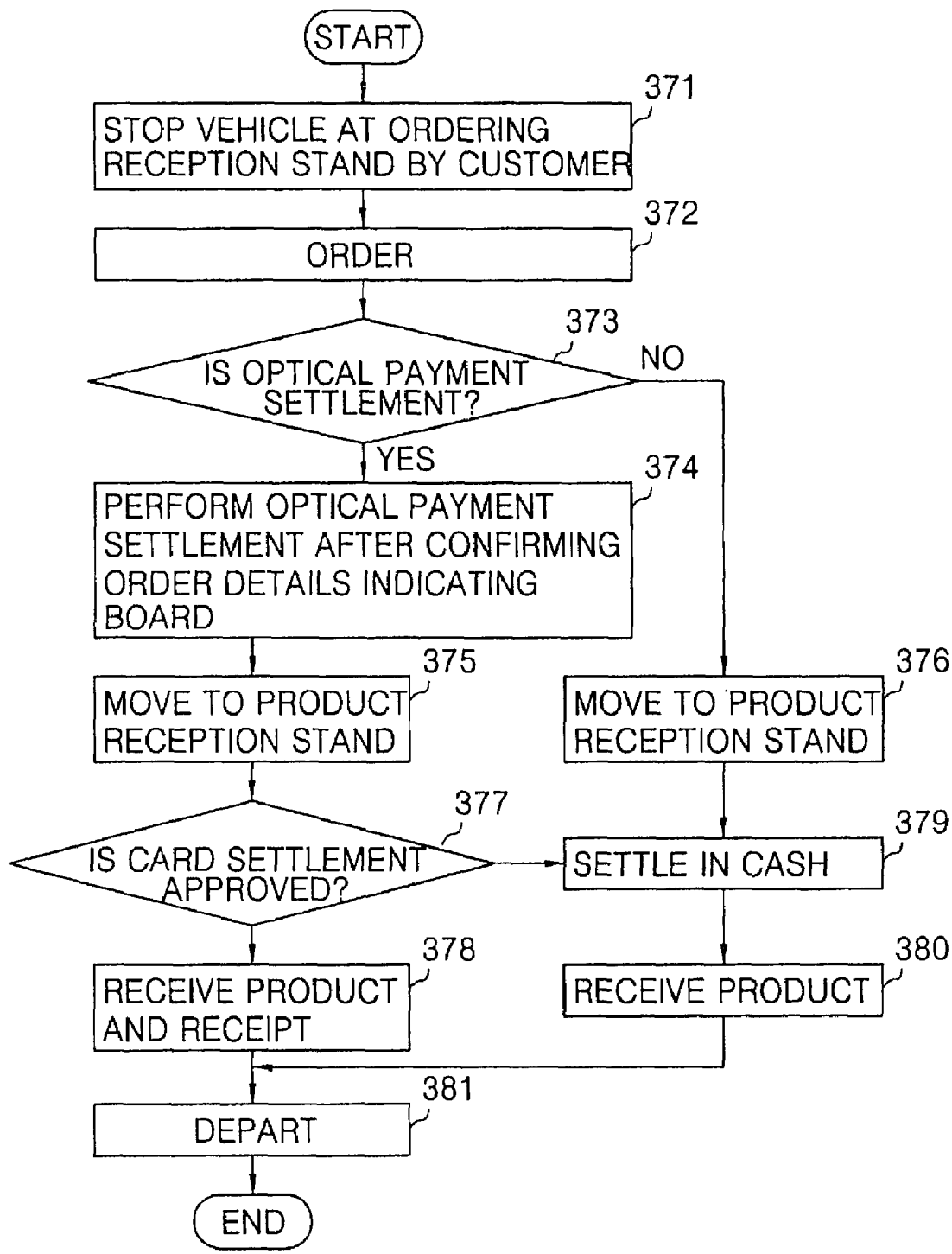
FIG. 39 is a flowchart view for explaining an order/settlement operation in the FIG. 36 system.

The operation of the optical payment settlement system in the drive-thru ordering system having the above configuration will be described in detail with reference to FIGS. 38 and 39, as well as FIG. 36.

A customer stops a vehicle at an order reception stand 340A (step 371). Then, the customer sees a menu plate 341 installed at the order reception stand 340A and orders a commodity to be purchased at the state where the customer gets in the vehicle (step 372). A clerk receiving orders inputs order data in the POS 60. The input data is output on a screen which can be seen by a clerk who selects the commodity so that the clerk takes out ad pays the customer's ordered commodity. If an order is completed, the customer determines whether or not the commodity payment is done by an optical payment settlement (step 373). In the case that an optical payment settlement is done, the customer identifies the item-by-item order particulars with the payment settlement amount, which are displayed on the order items display board 343 installed at the order reception stand 340A (step 374), to thereby perform an optical payment settlement. Here, the customer can settle the payment without opening a window of the vehicle. As shown in FIG. 38, the order items display board 343 indicates a commodity name, a quantity, an amount and a sum total. Also, the optical receiver 344 is attached on an appropriate place of the order items display board 343, for example, on the upper-right side thereof. Thus, the customer identifies the order particulars with the payment settlement amount, which are displayed on the order items display board 343 and then makes the optical transmitter attached on the portable phone 10 being an optical payment unit face the optical receiver 344, to thereby transmit the card information contained in the portable phone 10 in the form of an optical signal and perform an optical payment settlement. The optical receiver 344 attached on the order items display board 343 is optically receives the optical signal card information transmitted from the portable phone 10 which is the customer optical payment unit. The optical receiver 344 converts the received optical signal card information into the form which can be recognized at the card inquiry machine or POS terminal 60 and transmits the converted result. The card inquiry machine or POS terminal 60 requests for approval to the card company via the VAN company server 40 with respect to the card information transmitted from the optical receiver 344. The card company server 50 transmits a transaction approval or disapproval result with respect to the requested card information to the card inquiry machine or POS terminal 60 which has requested a transaction approval via the VAN company server 40. During awaiting an approval, the customer drives the vehicle and moves a commodity withdrawal stand 340B (step 375). At step 373, if a customer settlement method is not an optical payment settlement, the customer drives the vehicle and moves to the commodity withdrawal stand 340B immediately after a commodity is ordered (step 376). It is checked whether a credit card settlement is approved in the case of an optical payment settlement at the state where the vehicle stops at the commodity withdrawal stand 340B (step 377). After the card settlement has been approved in the result of checking in step 377, the customer receives the ordered commodity and a card receipt from the clerk (step 378) and then departs (step 381). If the card settlement is not approved or a settlement method is not an optical payment settlement, the settlement is done in cash as in the conventional case (step 379). After the settlement is done in cash, the customer receives an ordered commodity from the clerk (step 380) and then departs (step 381).

As described above, in the case that the drive-thru ordering system adopts an optical payment settlement system, payment information is transmitted at the same time when an order is sent, and thus all the settlements for payment of the commodity are completed, thereby sharply increasing a sales amount per time.

Figure 40:
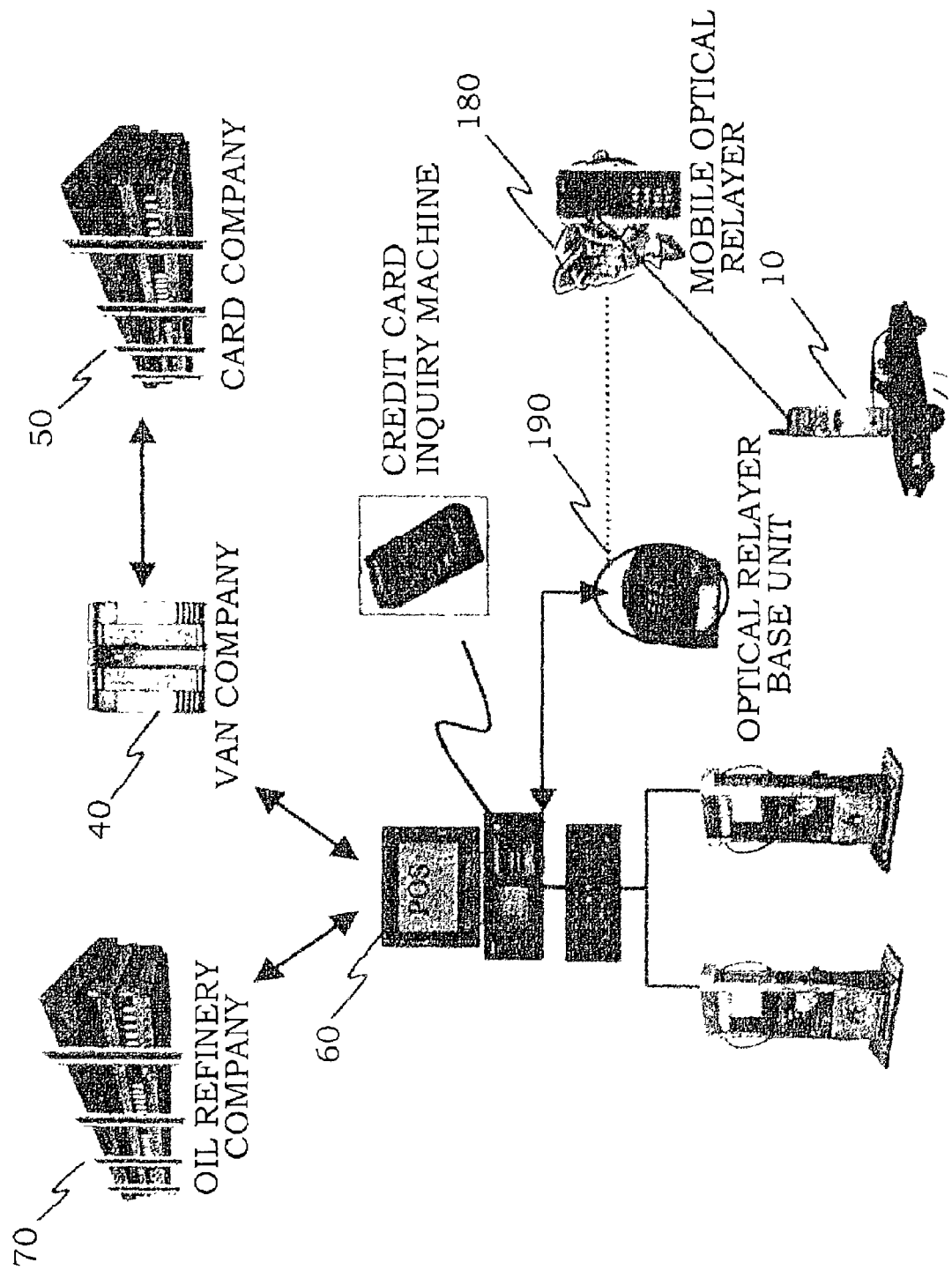
FIG. 40 is a configuration view showing a gas station fee collection system adopting an optical payment settlement system according to the present invention.
Figure 41:
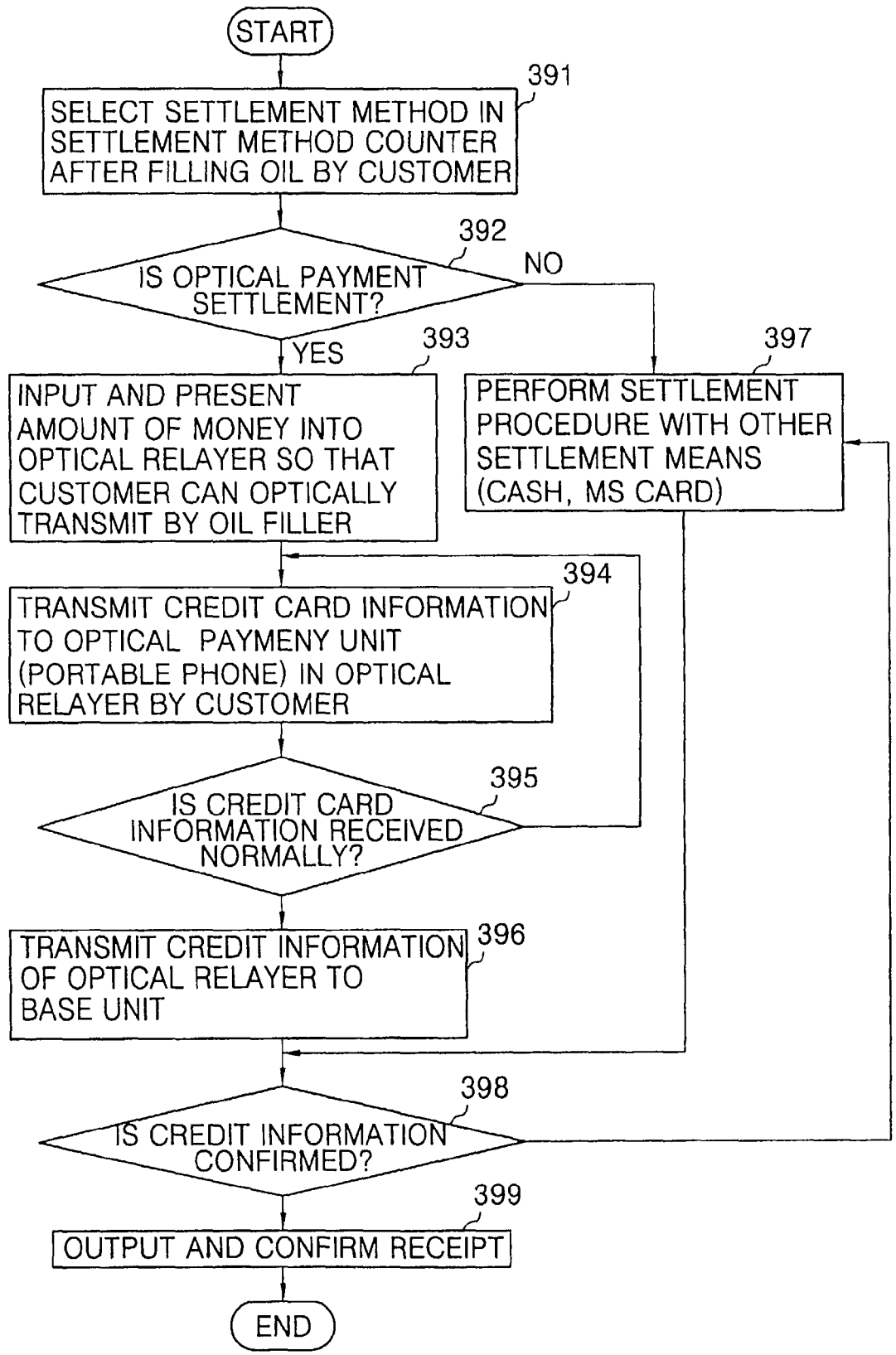
FIG. 41 is a flowchart view for explaining a settlement operation in the FIG. 40 gas station fee collection system.

FIG. 40 is a configuration view showing a gas station fee collection system adopting an optical payment settlement system according to the present invention. The system shown in FIG. 40 includes a mobile optical relayer 180 and an optical relayer base unit 190, in which the portable mobile optical relayer 180 held by a gas filler operator receives payment information, and the gas filler operator makes the optical relayer 180 connected to the optical relayer base unit 190 in order to input payment information into a card inquiry machine or POS terminal 60 and make a transaction approval and settlement accomplished. The operation of the optical payment settlement system in the gas station fee collection system having the above configuration will be described below with reference to FIG. 41.

At a gas station, an operator informs a customer that a fuel is completely filled and asks a settlement method of him or her. Then, the customer selects a settlement method after filing (step 391). The operator ascertains whether the customer's desired settlement method is an optical payment settlement method (step 392). In the case that the customer desires an optical payment, the operator inputs a settlement amount into a mobile optical relayer 180 and presents the settlement amount entered mobile optical relayer 180 to the customer (step 393). The customer ascertains the settlement amount displayed on the mobile optical relayer 180 presented by the operator at the state where the customer gets in the car, and transmits credit information to the mobile optical relayer 180, by means of a portable phone 10 which is his or her own optical payment unit (step 394). The mobile optical relayer 180 ascertains whether an optical signal has successfully arrived from the portable phone (step 395). If the optical signal arrives at the mobile optical relayer normally, the credit information included in the optical signal is temporarily stored in the mobile optical relayer 180. In the case that an optical signal does not reach normally or the reached optical signal is abnormal so as not to read credit information normally, the operator requests that credit information should be re-transmitted to the mobile optical relayer. Here, it is natural that an optical receiver be attached in a portable phone 10 which is an optical payment unit so that the mobile optical relayer 180 requests that credit information be retransmitted to the portable phone 10 automatically, through automatic optical communications between the portable phone 10 and the mobile optical relayer 180. After receiving the credit information, the operator takes the mobile optical relayer 180 to an optical relayer base unit 190 in order to transmit the credit information to the optical relayer base unit 190 (step 396). This method can be largely embodied into two. First, the mobile optical relayer 180 is so mounted that the connector of the mobile optical relayer 180 contacts the connector of the optical relayer base unit 190. Second, the mobile optical relayer 180 transmits an optical signal including credit information to the optical receiver in the optical relayer base unit 190. Here, the mobile optical relayer 180 transmits corresponding credit information to the optical relayer base unit 190 only one time. In the case that a customer desires to pay for in cash or other settlement methods other than an optical payment at step 392, a settlement procedure proceeds depending upon the customer's desired settlement method (step 397). That is, a customer hands over his or her own magnetic card to an operator, and then the operator processes a settlement using a card reader in a credit card inquiry machine or POS terminal 60 installed in a settlement place. In the case that a magnetic interface card is attached to the mobile optical relayer 180 held by the operator, the magnetic credit card is read using the magnetic interface card without using a card reader in the credit card inquiry machine or POS terminal 60 and then the read card information is temporarily stored to then be the optical relayer base unit 190. The optical relayer base unit 190 having received the credit information from the mobile optical relayer 180 transmits the corresponding credit information to the credit card inquiry machine or POS terminal 60. The credit card inquiry machine or POS terminal 60 the credit information to the VAN or card company 40 or 50 to ascertain whether the transaction is approved (step 398). If the transaction is approved from the VAN or card company 40 or 50, the optical relayer base unit 190 prints transaction particulars with a printer and outputs the printed result, and the operator hands over the printed receipt to the corresponding customer to make him or her check the transaction particulars (step 399). If the transaction is not approved from the VAN or card company due to a poor credit or an excess limit, the optical relayer base unit 190 outputs an error signal and makes another settlement unit perform a settlement as in step 397.

Here, in the case that an optical receiver is mounted in the credit card inquiry machine or POS terminal 60, the mobile optical relayer 180 directly transmits customer's credit information to the credit card inquiry machine or POS terminal 60 which is not the optical relayer base unit 190, in the form of an optical signal to thereby perform an optical payment.

Also, in the case of a bonus card issued in order to assign a bonus point depending upon an amount of fuel filled and pay for a commodity according to a cumulated points, a card number is contained in a portable phone, so as to be transmitted in the form of an optical signal. The POS terminal 60 transmits points depending upon the input bonus card number and the amount of fuel filled to a corresponding oil refinery company 70. The oil refinery company 70 cumulates a newly generated point to the points cumulated in the corresponding card number and transmits the cumulated points to the POS terminal 60 again, to thereby make the customer identify how many total points are his or her own bonus points.

In the case that an optical payment settlement method is used in the above-described gas station fee levying system, the customer can settle the cost incurred instantly without moving to the credit card inquiry machine or POS terminal 60 and needing to hand over a credit card to an operator.

Figure 42:
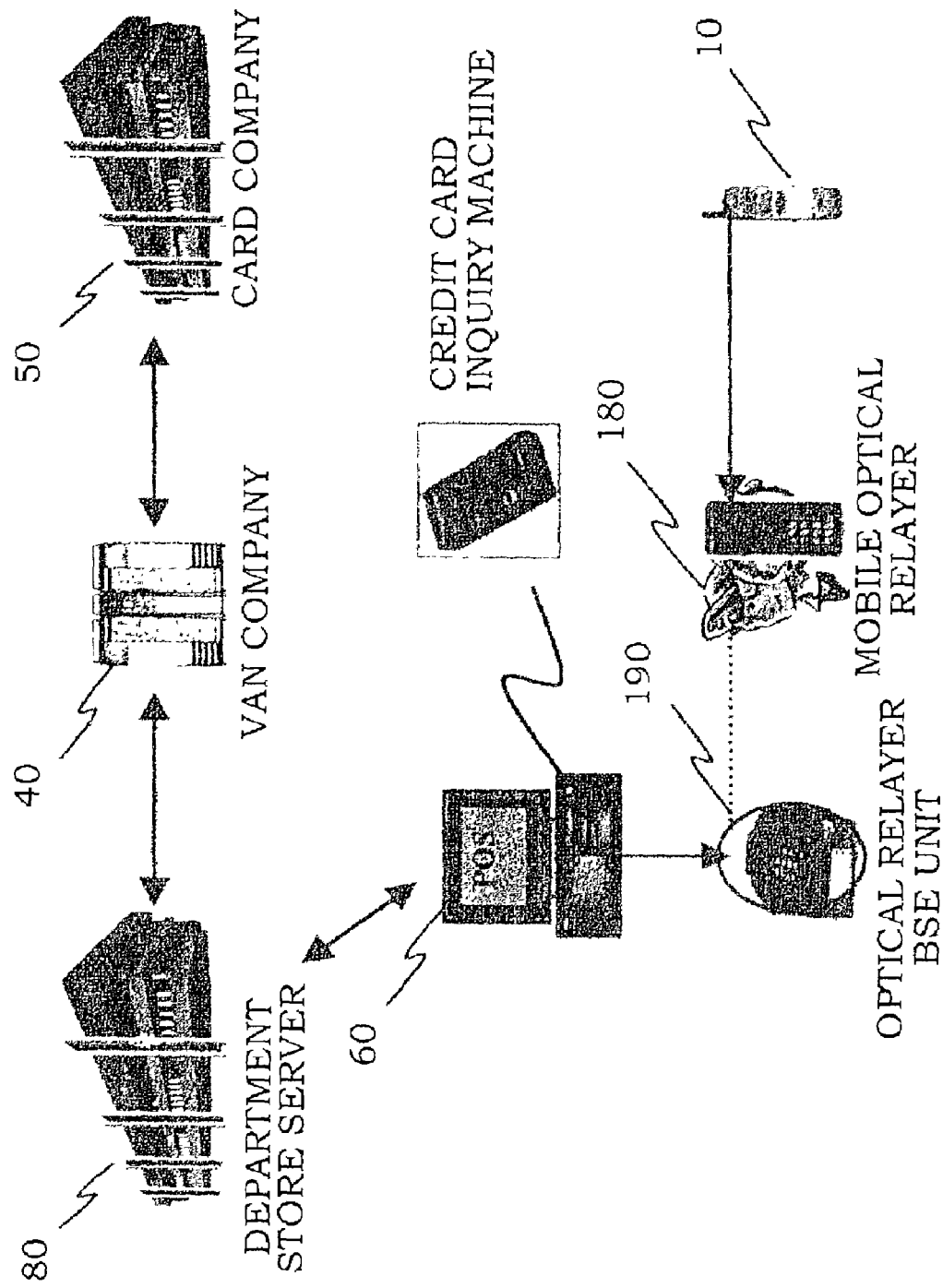
FIG. 42 is a configuration view showing a department store settlement system adopting an optical payment settlement system according to the-present invention.

FIG. 42 is a configuration view showing a department store settlement system adopting an optical payment settlement system according to the present invention. The department store settlement system shown in FIG. 42 is configured to have the substantially same configuration as that of the gas station fee levying system shown in FIG. 40. However, a POS terminal 60 is not directly connected to a VAN company 40 but is connected to the VAN company 40 via a department store server 80.

A customer transmits payment information in the form of an optical signal to a mobile optical relayer 180 held by a department store clerk during purchasing an article and performs a settlement of the cost incurred. The department store clerk transmits the payment information received in the optical relayer 180 to the credit card inquiry machine or POS terminal 60 via the optical receiver incorporated in or externally mounted on the credit card inquiry machine or POS terminal 60, or the credit card inquiry machine or POS terminal 60 via the optical relayer base unit 190. The credit card inquiry machine or POS terminal 60 sends the transmitted credit information to the VAN or card company 40 or 50 via the department store server 80, to thereby identify a transaction approval or disapproval. If the transaction is approved from the VAN or card company 40 or 50, the optical relayer base unit 190 prints transaction particulars with a printer and outputs the printed result, and the department store clerk hands over the printed receipt to the corresponding customer to make him or her check the transaction particulars. Here, in the case that payment information is card information of a card issued from a department store, a department store server 80 itself determines a transaction approval or disapproval in consideration of personal credit information, an installment approval or disapproval, and a settlement amount.

As described above, the optical settlement system including the mobile optical relayer and the optical relayer base unit can be applied to a customer table calculation restaurant. In this case, a clerk uses a clip-type mobile optical relayer as shown in FIG. 20.

Also, the present invention can be applied to an unmanned vending machine installed in a building or on the street, to thereby make a user use the vending machine although he or she does not have a coin or small petty cash.

Figure 43:
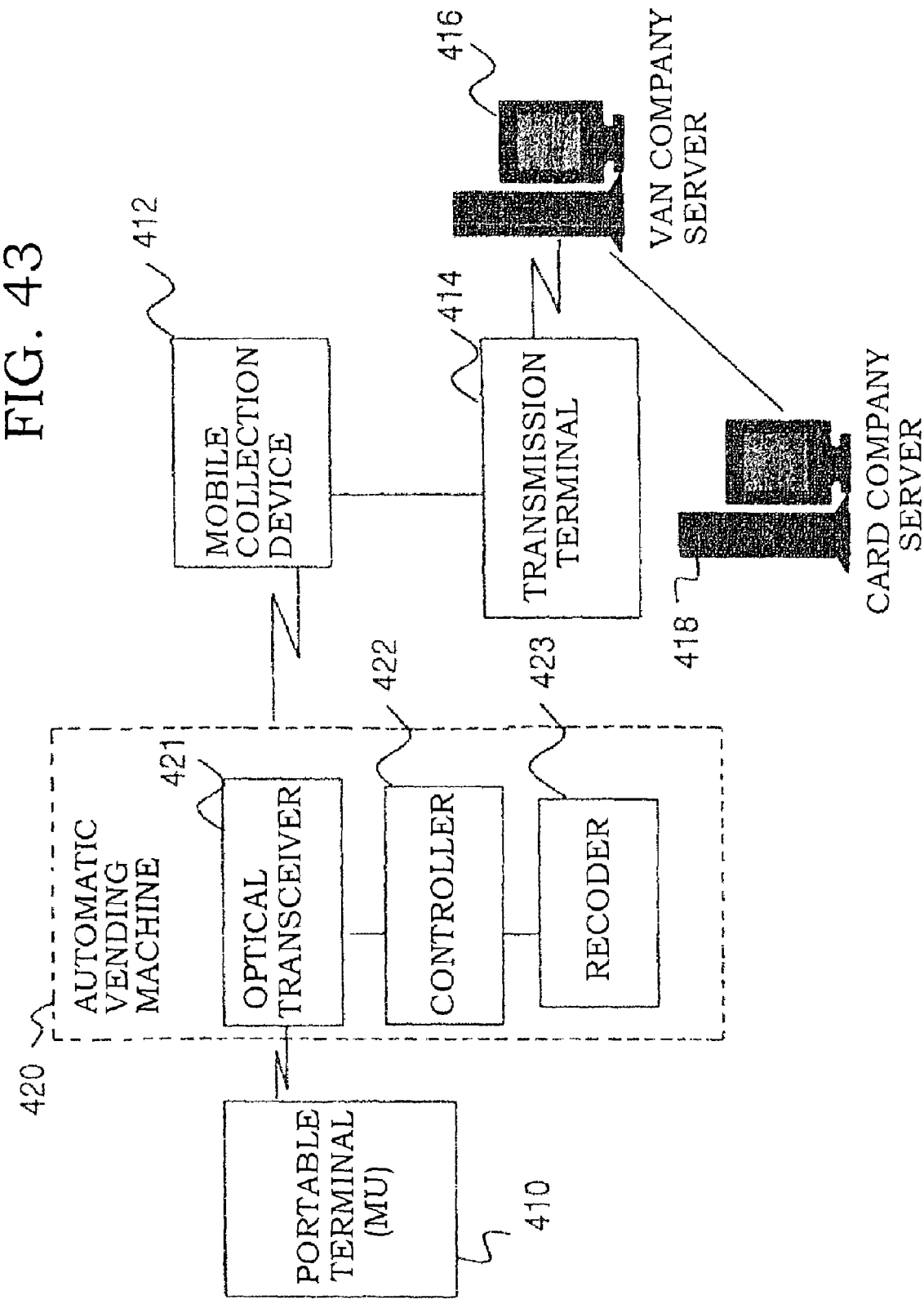
FIG. 43 is a configuration view showing an unmanned automatic vending system adopting an optical payment settlement system according to the present invention.
Figure 44:
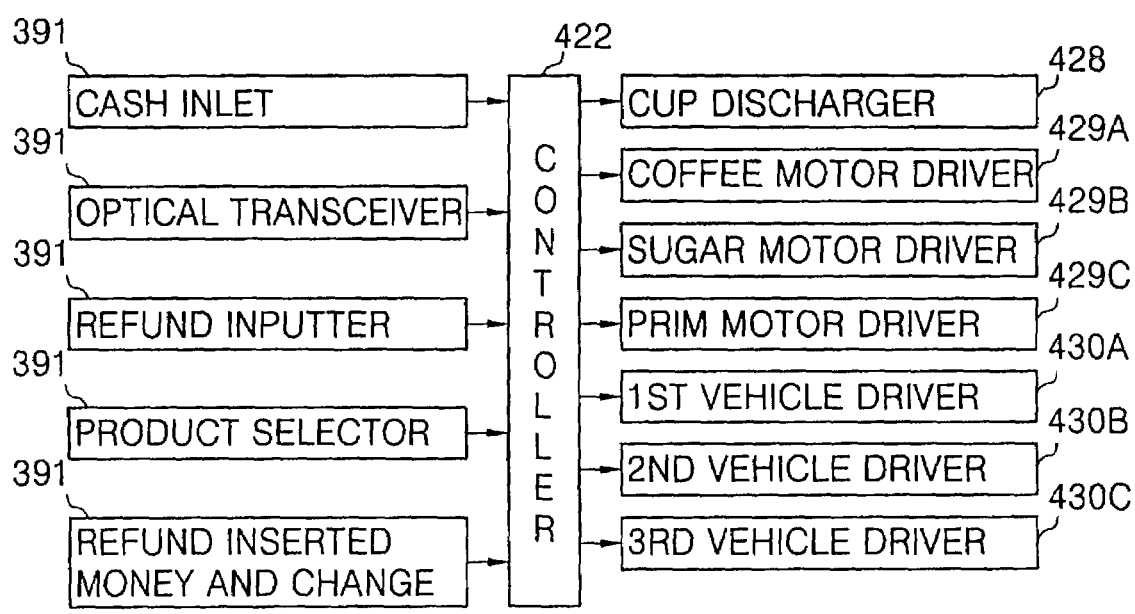
FIG. 44 is a detailed block diagram showing the automatic vending system of FIG. 43.
Figure 45:
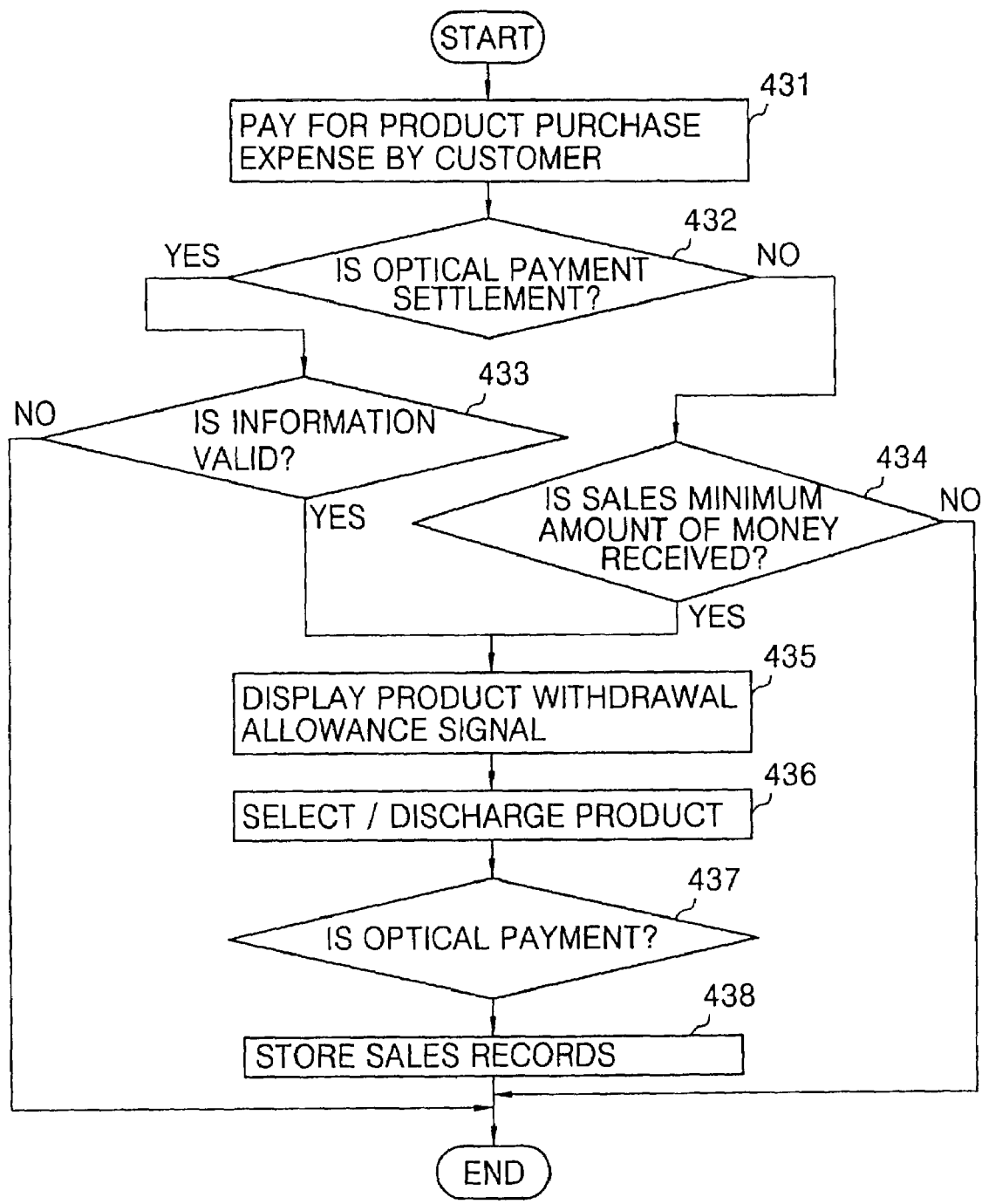
FIG. 45 is a flowchart view for explaining an operation of settlement of payment in the FIG. 43 unmanned automatic vending system.

FIG. 43 is a configuration view showing an unmanned automatic vending system adopting an optical payment settlement system according to the present invention. The system shown in FIG. 43 includes a portable terminal (MU) 410, and an automatic vending machine 420 including an optical transceiver 421 in order to receive optical payment information of the portable terminal 410. The automatic vending machine 420 also includes a controller 422 for controlling the operation of product sales and a recorder 423 for recording particulars of sales. The detailed configuration of the automatic vending machine 420 is shown in FIG. 44. The FIG. 43 system includes a totalization device 412 for totalling sale particulars recorded in the recorder 423 in automatic vending machines 420 which are discretely disposed in mutually different places, and a transmission terminal 414 for transmitting the totalized sales particulars to the VAN company 416 or card company 418 to be processed for approval in bulk. The operation of settlement of the expenses in the unmanned automatic vending system having the above configuration will be described below with reference to FIG. 45.

A customer pays for products purchased (step 431). In the case of a coffee automatic vending machine, a customer pays for drinks of the kind to be desired. In the case of a cash payment, the customer inputs a corresponding amount of cash into a cash inlet 424 in the automatic vending machine 420. In the case of an optical payment, card information is optically transmitted via the portable terminal 40. The optical transceiver 421 in the automatic vending machine 420 receives an optical signal including the card information, and transmits the received optical signal to a controller 422. The controller 422 checks if a payment is an optical payment settlement (step 432). In the case of the optical payment settlement, it is checked if the received corresponding card information is significant information (step 433). It is ascertained of its own power without passing through a card company 418 whether the card information is significant. That is, the controller 422 stores for registration poor transaction card information, named as card information corresponding to a blacklist and simply ascertains whether the received card information is included in the previously registered poor transaction card information, to thereby identify a validity of the card. Through such a simple identification, each automatic vending machine does not need to install a particular dedicated line to perform a credit card information inquiry and a transaction approval by the card company 418 or the VAN company 416, to thereby make an installation cost low. Also, the poor trade or blacklist is periodically updated to thereby secure safety of transactions. Of course, a blacklist is registered in the corresponding portable terminal 410 so that payment information need not be transmitted optically in the portable terminal 410, in which case it need not be identified whether card information is valid. The registration of the poor traders will be described later. If a payment is not an optical payment settlement in step 432, it is judged whether an amount of money more than a corresponding price of the purchased product is input into the cash inlet 424 (step 434). If the corresponding card information is valid information in step 433 or the input money is more than the corresponding product price in step 434, the controller 422 displays a product withdrawal approval signal on a product selector 426 (step 435). The customer selects a desired product which is displayed for approval of withdrawal on the product selector 426. The controller 422 discharges the selected product (step 436). For example, in the case that a customer selects a cup of "milk coffee," the controller 422 controls a coffee motor driver 429A, a sugar motor driver 429B and a milk motor driver 429C to be driven, and discharge a cup of milk coffee mixed with coffee, sugar and milk through a cup outlet 428. In the case of a cash payment, the controller 422 calculates change and discharges a corresponding amount of money via a money refunder 427. If a customer cancels a purchase of product via a refund requester 427, the controller 422 refunds the input money via the refunder 427. If the customer receives the discharged product, the controller 422 checks again if a payment is an optical payment settlement (step 437). In the case of an optical payment, the sales particulars are recorded in the recorder 423 (step 438).

Meanwhile, an operator of the automatic vending machine 420 goes to the places where the automatic vending machines 420 are installed with the totalization device 412 every interval of period, to collect particulars of sales in sum. That is, the sale particulars recorded in the recorder 423 are downloaded into the totalization device 412 via the optical transceiver 421 in the automatic vending machine 420. The operator collects all the sales particulars with respect to the automatic vending machines which are distributively located in various places, and then makes the totalization device 412 connected with a transfer terminal 414 to then be transmitted to the server of the VAN company 416 for approval in bulk. The server of the VAN company 416 transmits the bulk-approval-requested sales particulars to the server of the corresponding card company 418. Here, the totalization device 412 and the transfer terminal 414 will be described below.

Figure 46:
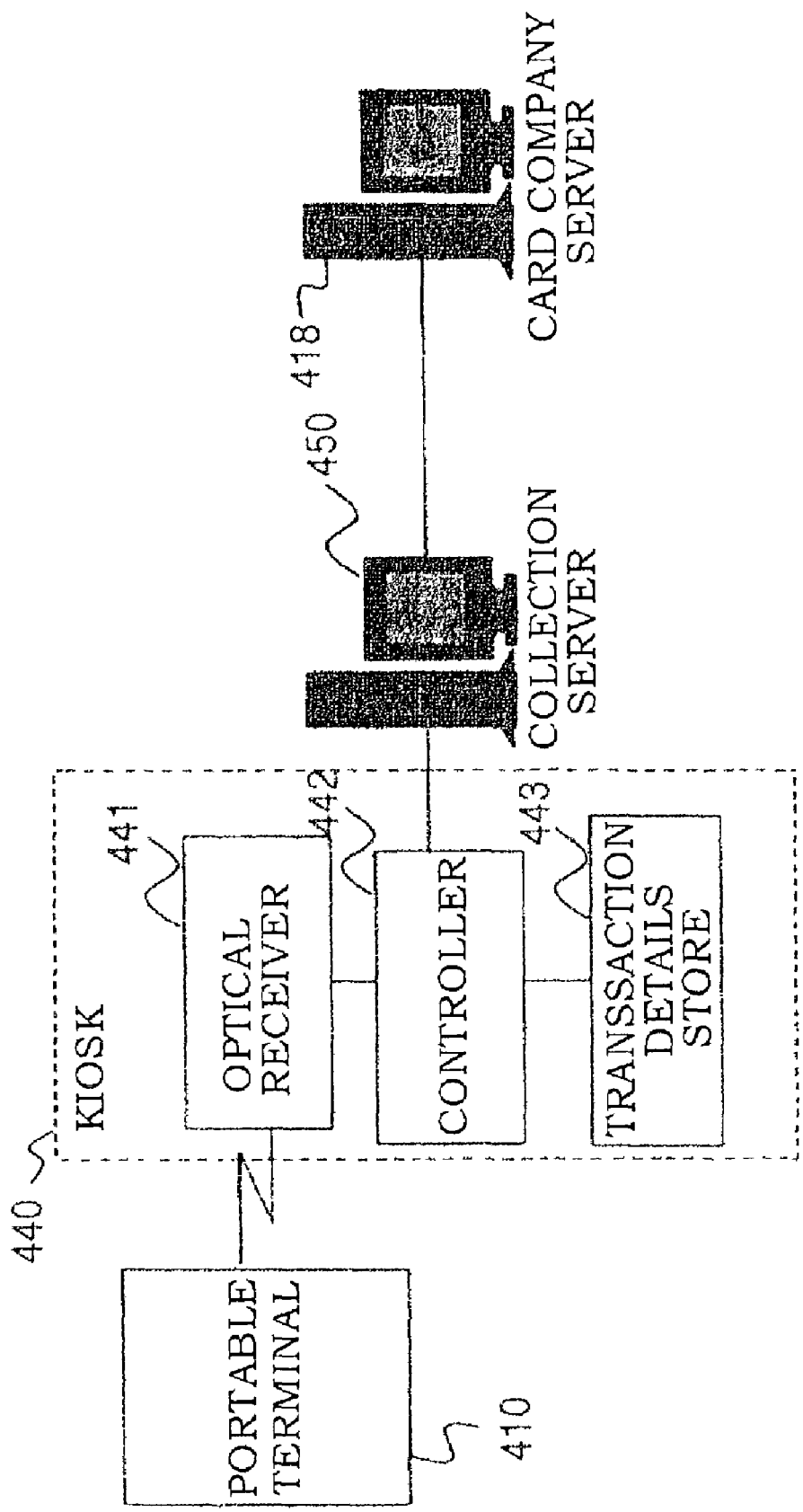
FIG. 46 is a configuration view showing a kiosk fee payment system adopting an optical payment settlement system according to the present invention.

FIG. 46 is a configuration view showing a kiosk fee payment system adopting an optical payment settlement system according to the present invention.

A portable terminal 410 is a portable phone or portable personal device containing card information such as a credit card, an advance payment card and a direct payment card, which can transmit user's card information in the form of an optical signal.

A kiosk 440 receives an optical signal from the portable terminal 410, extracts card information from the received optical signal and issues a user's desired document. The kiosk 440 stores transaction details and then transmits the stored transaction details to a totalization server 450 through a phone call connection in accordance with an operator's manipulation. The totalization server 450 transmits the totalized transaction details to a card company 418 in a package.

The server 418 of the card company 418 remits a corresponding dealing amount into an operator's account of a designated kiosk if a dealing details of a kiosk is received, and charges for a dealing amount to a card user.

Figure 47:
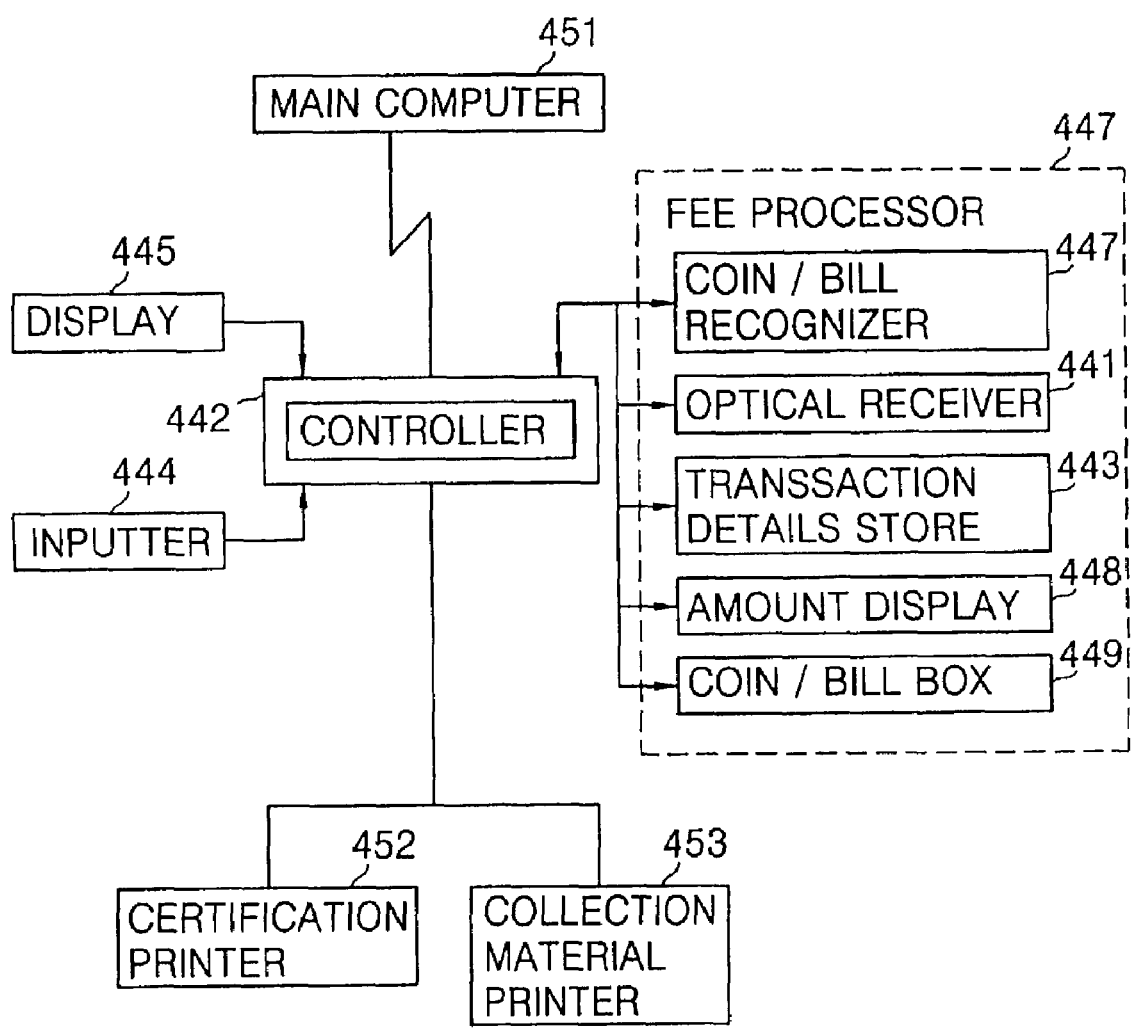
FIG. 47 is a detailed block diagram showing the kiosk fee payment system of FIG. 46.
Figure 48:
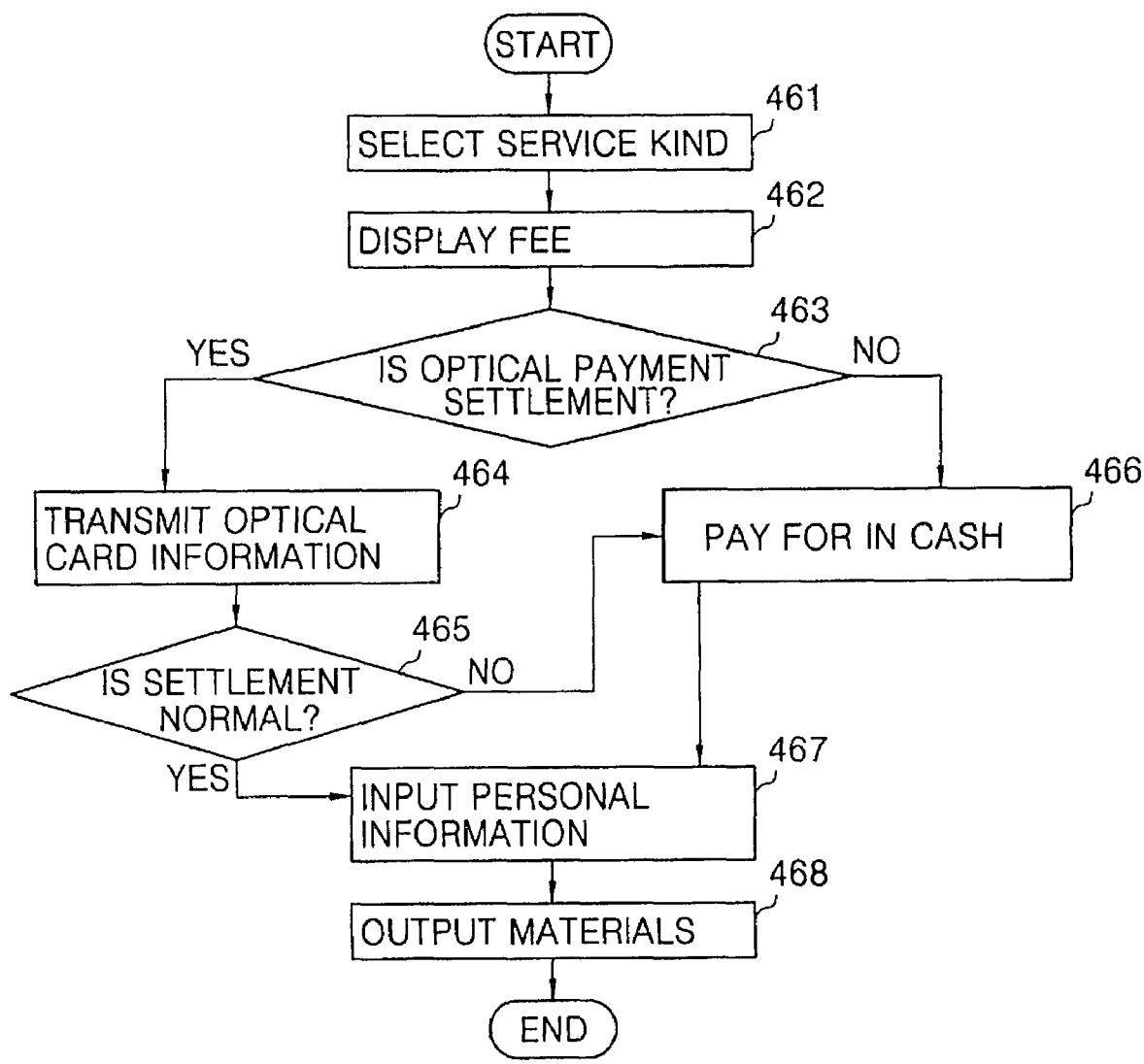
FIG. 48 is a flowchart view for explaining a fee payment operation in the FIG. 46 fee payment system.

FIG. 47 is a detailed block diagram showing the kiosk 440 of FIG. 46, which shows an example of issuance of a certificate. A certificate issuance system shown in FIG. 47 includes an input portion 444 for inputting personal information necessary for issuance of certificates, a display 445 for displaying screen information thereon, thereby enabling a user to conform his or her desired information, and a fee processor 446 for processing a fee with respect to the issued certificate. The fee processor 446 includes a coin/bill recognizer 447 for recognizing an amount of input coins or bills, a sum display 448 for displaying the recognized amount, and a coin/bill collecting box 449 for collecting the input coins or bills. The fee processor 446 also includes an optical receiver 441 for receiving an optical signal including card information from the portable terminal 410 being an optical payment unit, and a transaction details storage device 443 for storing transaction details. The certificate issuance system of FIG. 47 also includes a main computer 451 having the contents which are contained in an issuable certificate, and a controller 442 for controlling the whole operation of each element, and a certificate printer 452 for printing a user's desired certificate and issuing the same under the control of the controller 442. A collective material printer 453 prints transaction details and issues the same to a user as a receipt. The operation of a fee payment in a self-service automatic certificate issuance system having the above-described configuration will be described in detail, with reference to FIG. 48.

The controller 442 displays a menu including possible services which can be provided on the display 445, to thereby let a customer to select his or her desired service (step 461). The customer sees the contents of the menu displayed on the display 445 and selects his or her desired service. If a service is selected via the input portion 444, the controller 442 displays a fee on the display 445 so that a customer to pay for a corresponding fee (step 462). Here, the controller 442 confirms whether an optical payment settlement is displayed on the display 445 (step 463). The customer confirms an amount displayed on the display 445 and then pays for the amount of fees in his or her desired settlement method. In the case of an optical payment settlement, the customer makes the portable terminal 410 used as an optical payment unit face the optical receiver 441 in the fee processor 446, and then transmits card information in the form of an optical signal (step 464). The optical receiver 441 in the fee processor 446 extracts card information from the received optical signal and transmits the extracted result to the controller 442. The controller 442 confirms whether the received corresponding card information is significant information (step 465). If the card information is not significant information, the controller 442 notifies the customer that the card information is not significant information and lets the customer to pay for it in cash (step 466). If the card information is significant, the controller 442 displays normal indication on the display 445 and receives necessary personal information such as an identification via the input portion 444 (step 467). The controller 442 stores the transaction details in the transaction details storage unit 443 (step 468). Here, the transaction details includes service items, fees, issuance dates, and so on. If the payment is not an optical payment settlement in step 463, the customer pays for the fee in cash (step 466). In the case that the fee has been paid for in an optical payment or cash, the controller 442 loads necessary information from the main computer 441 based on the input information, prints a certificate via the certificate printer 452 and issues the printed certificate to the customer (step 469).

As described above, the transaction details collected in the transaction details storage unit 443 are transmitted to a totalization server 450 at a certain point in time. That is, the stored transaction details are transmitted by manipulation of an operator of the kiosk 440. The totalization server 450 compares the transmitted transaction details with those stored in the transaction details storage unit 443, and transmits the transaction details to the card company 418 in package only if both the transaction details equal each other, to then clear all the transaction details of the transaction details storage unit 443. Here, the kiosks are distributively disposed in various places and connected via a computer network. Thus, the main computer 451 managing the kiosks in entirety plays a role of the totalization server 450. The card company having received the transaction details remits an amount of money based on the corresponding transaction details to a bank account of the operator of the predetermined kiosk 440 and sends a debit note to the customer.

In the case that a settlement on credit cannot be performed on a real-time basis as in an automatic vending machine or kiosk, a mobile collection device is needed, in which the collected credit information is totally calculated, to thereby enable the customer to move to a place which can settle the payment on credit. The present invention provides a mobile collection device using a PDA or memory pack.

Figure 49A:
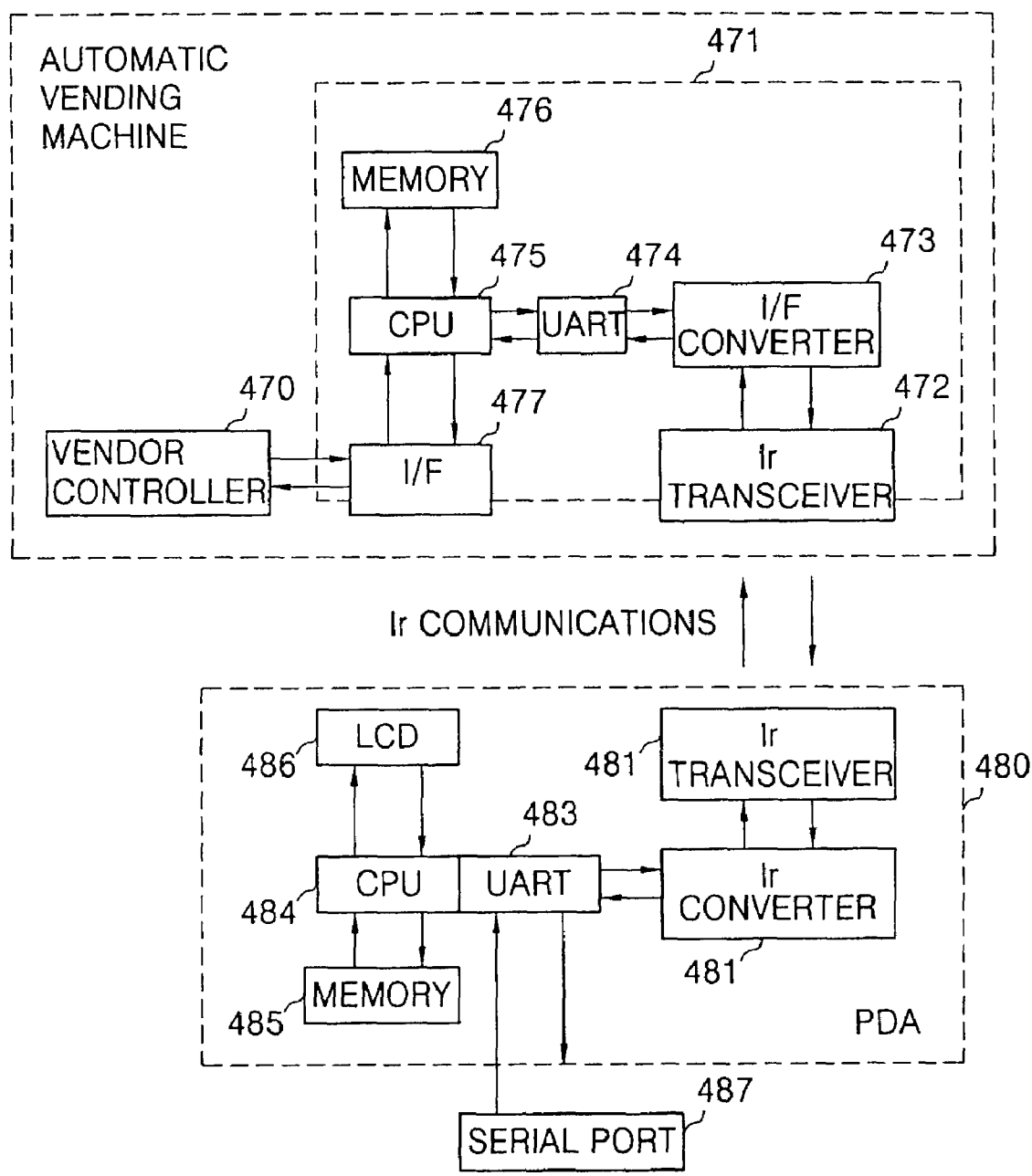
FIG. 49A is a block diagram showing an automatic vending system adopting a mobile collection device using a PDA.
Figure 49B:
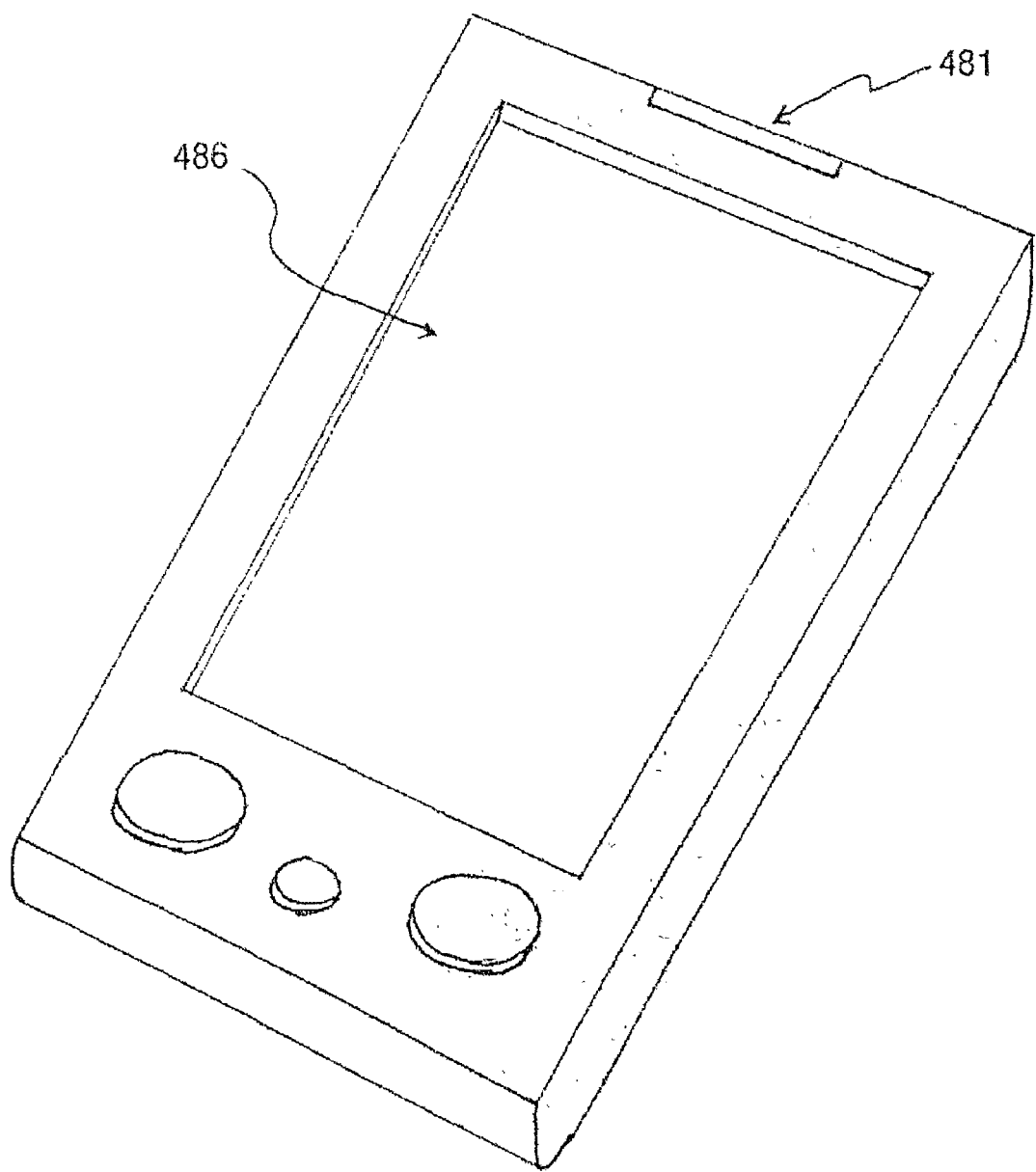
FIG. 49B shows an example of the PDA applied in the FIG. 49A system.

FIG. 49A is a block diagram showing an automatic vending system adopting a mobile collection device using a PDA. FIG. 49B shows an example of the PDA applied in the FIG. 49A system.

An optical payment receiver 471 installed in an automatic vending system monitors a vending machine controller 470 via an intermediate frequency (I/F) portion 477. Whenever a transaction item occurs in the result of monitoring, a CPU 475 detects the transaction item and records the same in an internal memory 476. Meanwhile, a PDA illustrated in FIG. 49B includes an attached infrared (Ir) transceiver 481 and communicates with an optical payment receiver 471 in the automatic vending system using an infrared ray. An operator of the automatic vending system manipulates a menu key on the PDA 480 to activate a transaction details collection program, and then directs the Ir transceiver 481 to a collection object machine to then transmit a collection command in the form of an infrared ray. The received collection command is converted into a signal which can be recognized by the CPU 475 via an Ir converter 473 and a UART 474, to thereby control a CPU 475. The CPU 475 reads transaction details data recorded in the internal memory 476 according to the collection command and outputs the read result to the Ir transceiver 472 via the UART 474 and the Ir converter 473. The Ir transceiver 472 transmits the input transaction details data in the form of an infrared ray. The Ir transceiver 481 of the PDA 480 receives the infrared signal of the transaction details transmitted from the optical payment receiver 471 in the automatic vending system. The received transaction details arrive at the CPU 484 via the Ir converter 482 and the UART 483, and recorded in the internal memory 485. The CPU 485 checks whether or not data is successfully received and displays the checked result on a LCD 486, to thereby let the operator monitor the collection status. If transaction details are totalized in the PDA 480, the transaction details, the totalized transaction details are transmitted to a PC via an Ir port or a serial port 487, to a central collection center using transmission sale management software, or a central collection device using a separate communications unit such as a portable phone, a base unit, etc.

Figure 50A:
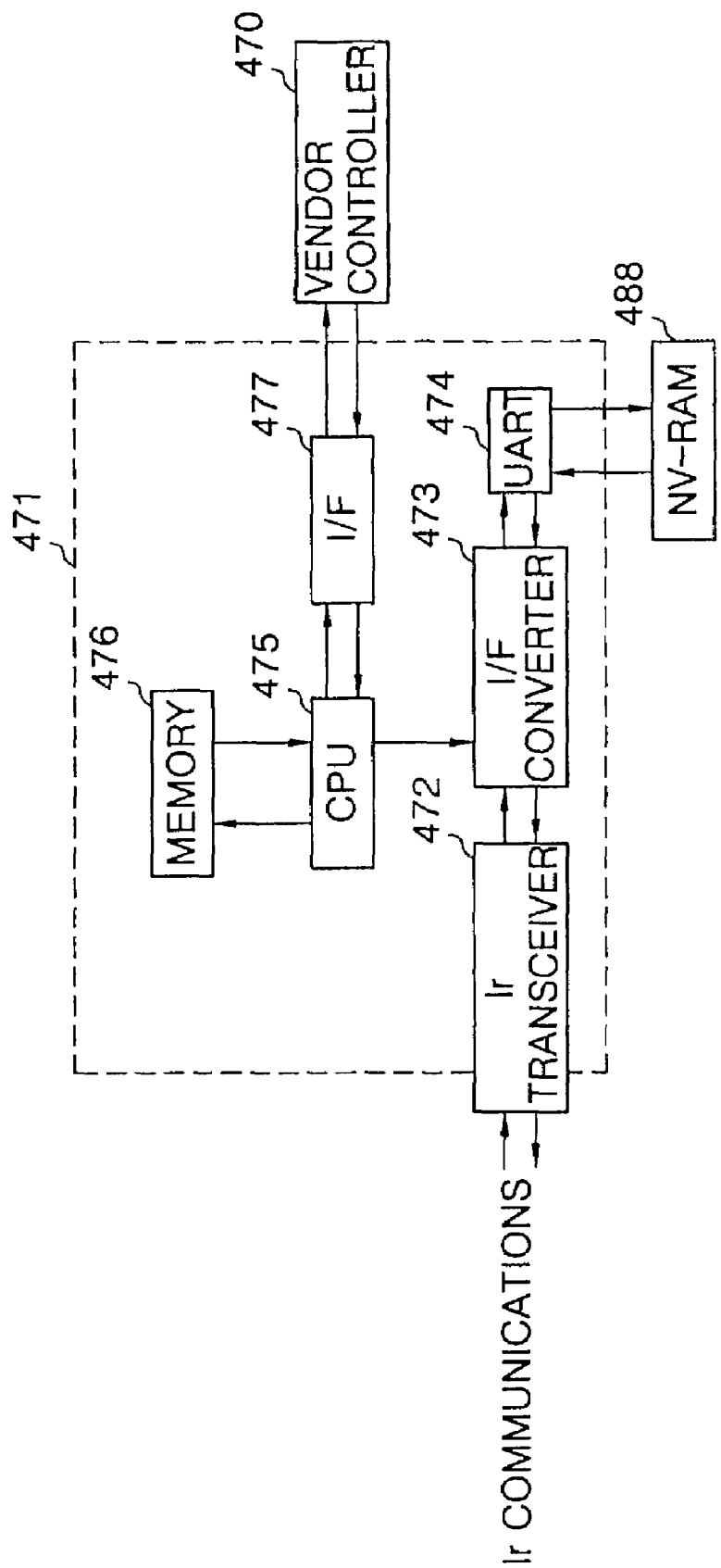
FIG. 50A is a block diagram showing a mobile collection device using a memory pack.
Figure 50B:
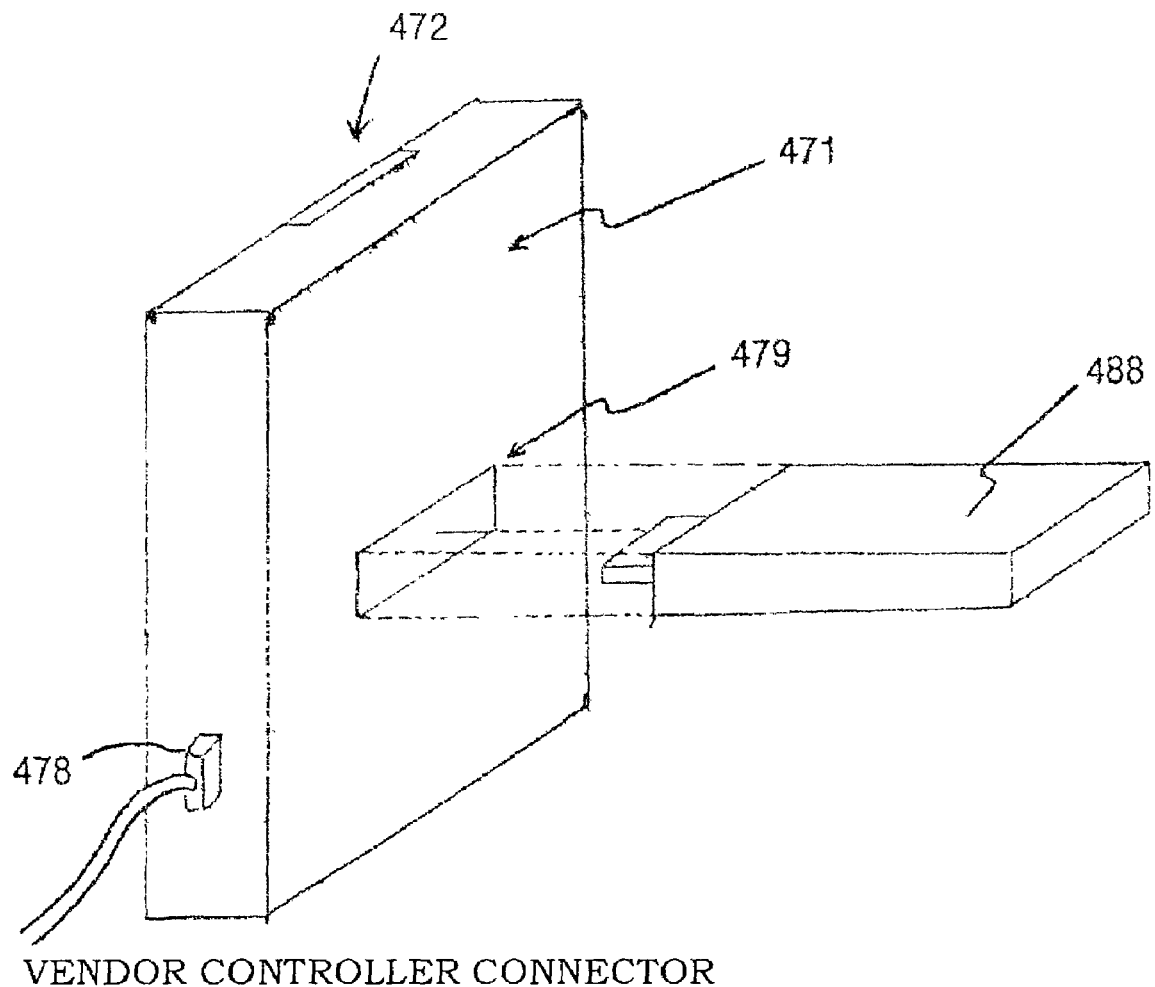
FIG. 50B shows a connection state of the memory pack of FIG. 50A.

FIG. 50A is a block diagram showing a mobile collection device using a memory pack. FIG. 50B shows a connection state of the memory pack of FIG. 50A.

An optical payment receiver 471 installed in an automatic vending system monitors a vending machine controller 470 via an intermediate frequency (I/F) portion 477. Whenever a transaction item occurs in the result of monitoring, a CPU 475 detects the transaction item and records the same in an internal memory 476. A memory pack 488 for collecting transaction details is a non-volatile memory NVRAM, and is connected to a UART 474 in the optical payment receiver 471 via a memory connector 479 as shown in FIG. 50B. In order to totalize the transaction details, an operator of the automatic vending system inserts the memory pack 488 into the memory connector 479. The UART 474 having detected a connection state of the memory pack 488 notifies the CPU 475 of the memory pack connection state. The CPU 475 reads the transaction details recorded in a memory 476 according to the notification of the UART 474 and records the read result in the memory pack 488 connected via the UART 474. If the transaction details are totalized in the memory pack 488, the operator detaches the memory pack 488 from the optical payment receiver 471 and transmits the memory pack 488 to a corresponding settlement authority (a card company or bank).

In the case of the above mobile collection device, an administrator disposed in a system installation place totalizes transaction details and collects the totalized PDA or memory pack, to then be directly carried to a settlement authority. Thus, the present invention provides a transfer terminal which can transfer transaction details data collected via a modem.

Figure 51A:
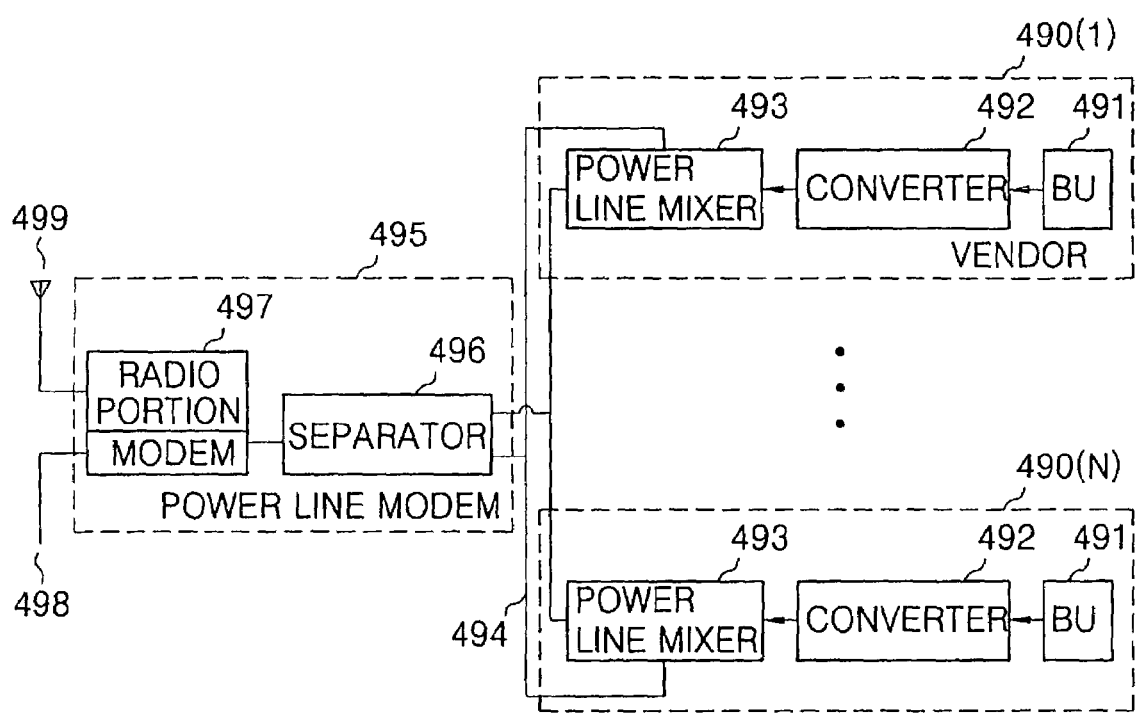
FIG. 51A is a block diagram showing an automatic vending system adopting a power line modem connection device.
Figure 51B:
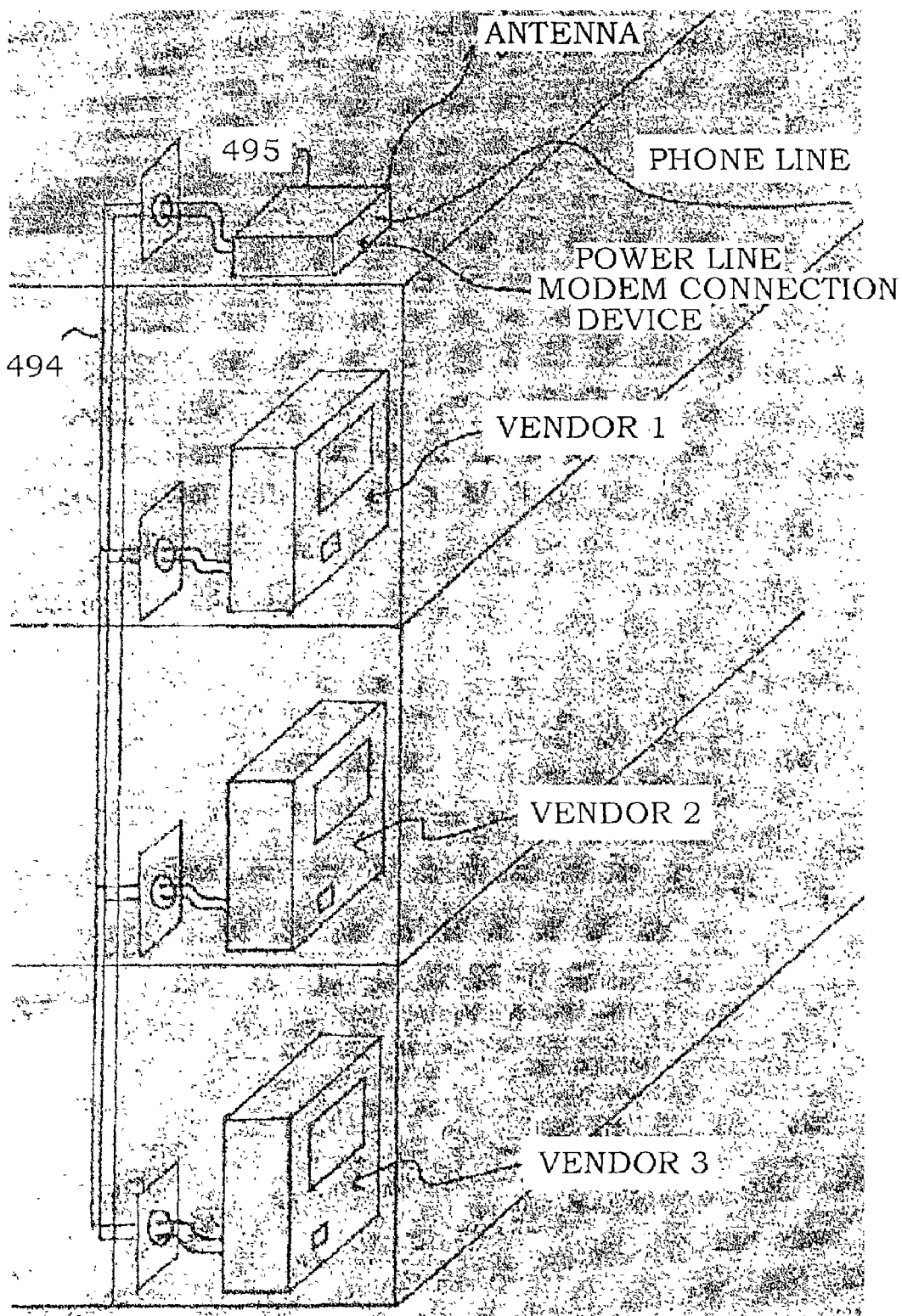
FIG. 51B shows connection states of the automatic vendors applied in the FIG. 51A system in a building.

FIG. 51A is a block diagram showing an automatic vending system adopting a power line modem connection device. FIG. 51B shows connection states of the automatic vendors applied in the FIG. 51A system in a building.

When each of devices included in an automatic vending system is installed in each floor in a building having a plurality of floors, a power line in the building provides a closed circuit. That is, as shown in FIG. SIB, a power line modem 495 is connected to a power source to be connected to a power line of each vending machine 490(1), . . . , 490(N) installed in each floor. Thus, sales information generated in the vending machine 490(1), . . . , 490(N) installed in each floor is temporarily stored in an internal memory of an optical payment receiver (BU) 491 installed in the corresponding vending machine 490(1), . . . , 490(N). The stored sales information is modulated in a converter 492 in order to be transmitted via the power line and loaded into the power line 494 while passing through a power line mixer 493. Here, the power line mixer 493 ascertains whether a transmission exists via other power line mixers. When there is no transmission, a power line is used. Accordingly, there is no mixture or collision during transmission. Also, the vending machines 490(1), . . . , 490(N) installed in other floors load sales information into a power line via the same procedure as the above. A power line modem 495 connected to a separate power source ordinarily monitors whether information is loaded in a power line. When information is recognized in the result of monitoring, a separator 496 in the power line modem 495 starts to operate and transmits sales information to a central server via a phone line 498 or an antenna 499 through a modem 497. Thus, the sales information of the vending machines 490(1), ..., 490(N) is transmitted to the central server in real-time or in a package processing method.

Figure 52A:
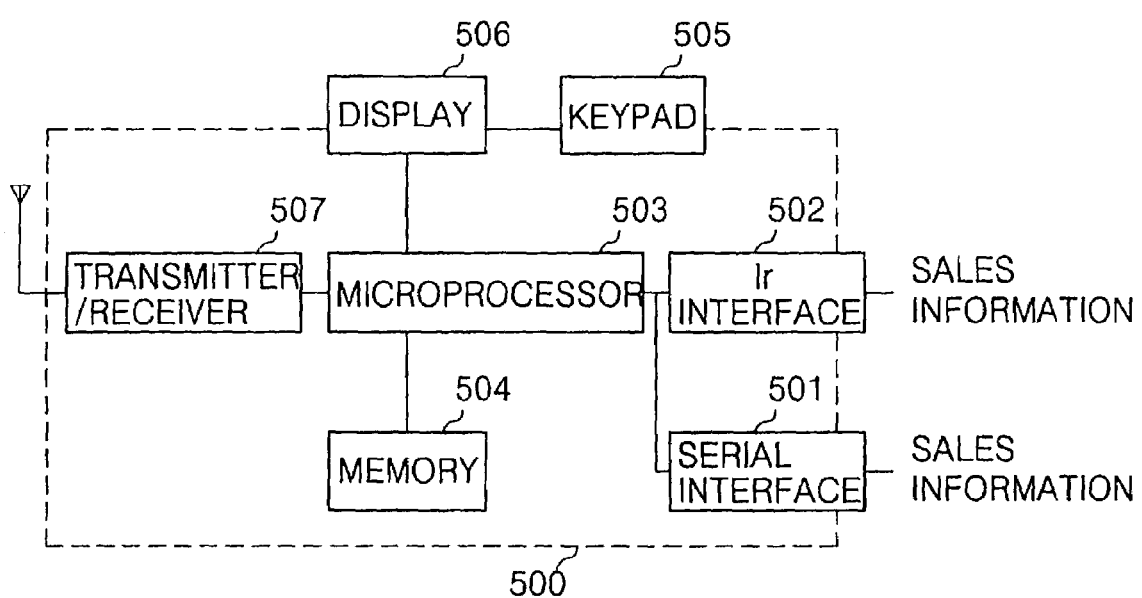
FIG. 52A is a block diagram showing a mobile communications modem incorporated transmission terminal.
Figure 52B:
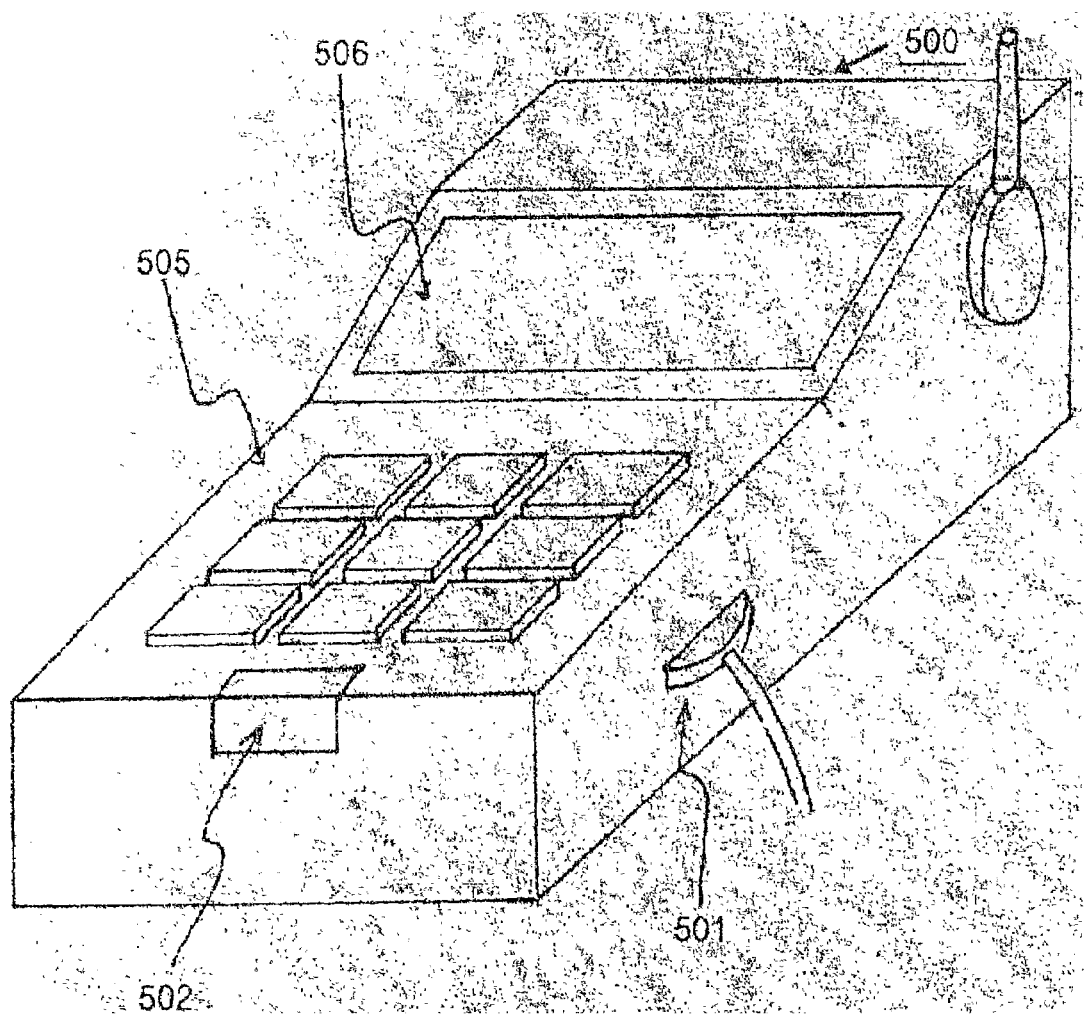
FIG. 52B shows an external appearance of the FIG. 52A mobile communications modem incorporated transmission terminal.

FIG. 52A is a block diagram showing a mobile communications modem incorporated transmission terminal. FIG. 52B shows an external appearance of the FIG. 52A mobile communications modem incorporated transmission terminal. The terminal is configured to wirelessly transmit transaction details data collected through the connection to a collection device shown in FIGS. 49A, 49B, 50A and 50B.

An administrator who processes transaction details in a package manipulates a keypad 505 of a transmission terminal 500 shown in FIG. 52B and sets the transmission terminal into an account mode. The administrator makes the transmission terminal 500 set as the account mode positioned in the proximity of a collector which is an account object, and communications are performed between the transmission terminal and the collector. The administrator can connect the collector by port with the transmission terminal 500 via a serial interface unit 501. The transmission terminal 500 receives the collected transaction details from the collector (not shown) which is an account object in the form of an infrared signal in a package via an infrared interface unit 502. In the case of a connection by port, the transmission terminal 500 receives transaction details data via the serial interface unit 501. A microprocessor 503 temporarily stores transaction details data input via the infrared interface unit 502 or the serial interface unit 501 in an internal memory 504. Then, the microprocessor 503 transmits the stored transaction details data to a central server (not shown) via a transceiver 507 wirelessly. The microprocessor 503 displays the transmission result on a display 506 to thereby allow the administrator to recognize the communications service state.

In the case of the above-described power line modem connection device or mobile communications modem incorporated terminal, a system should be newly constructed. Thus, a portable phone connection device is provided so that transaction details data can be transmitted via a portable phone which is mostly and widely possessed by people.

Figure 53A:
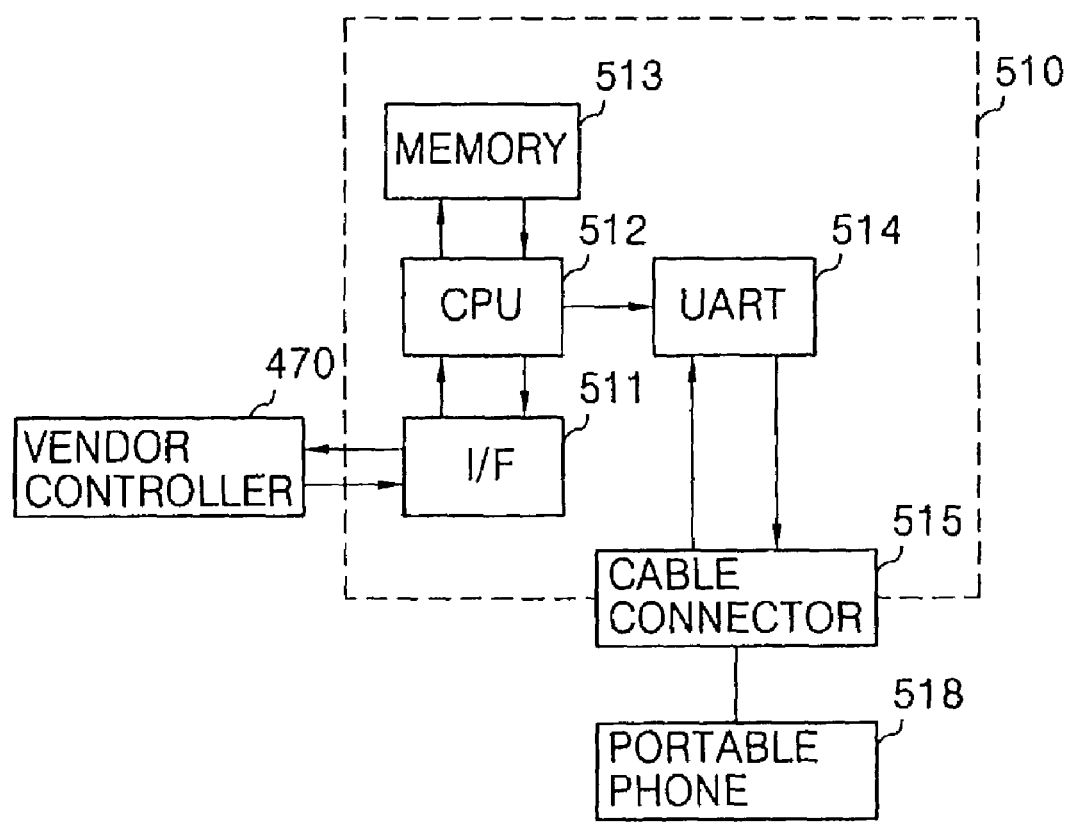
FIG. 53A is a block diagram showing an automatic vending system adopting a portable phone connection device.
Figure 53B:
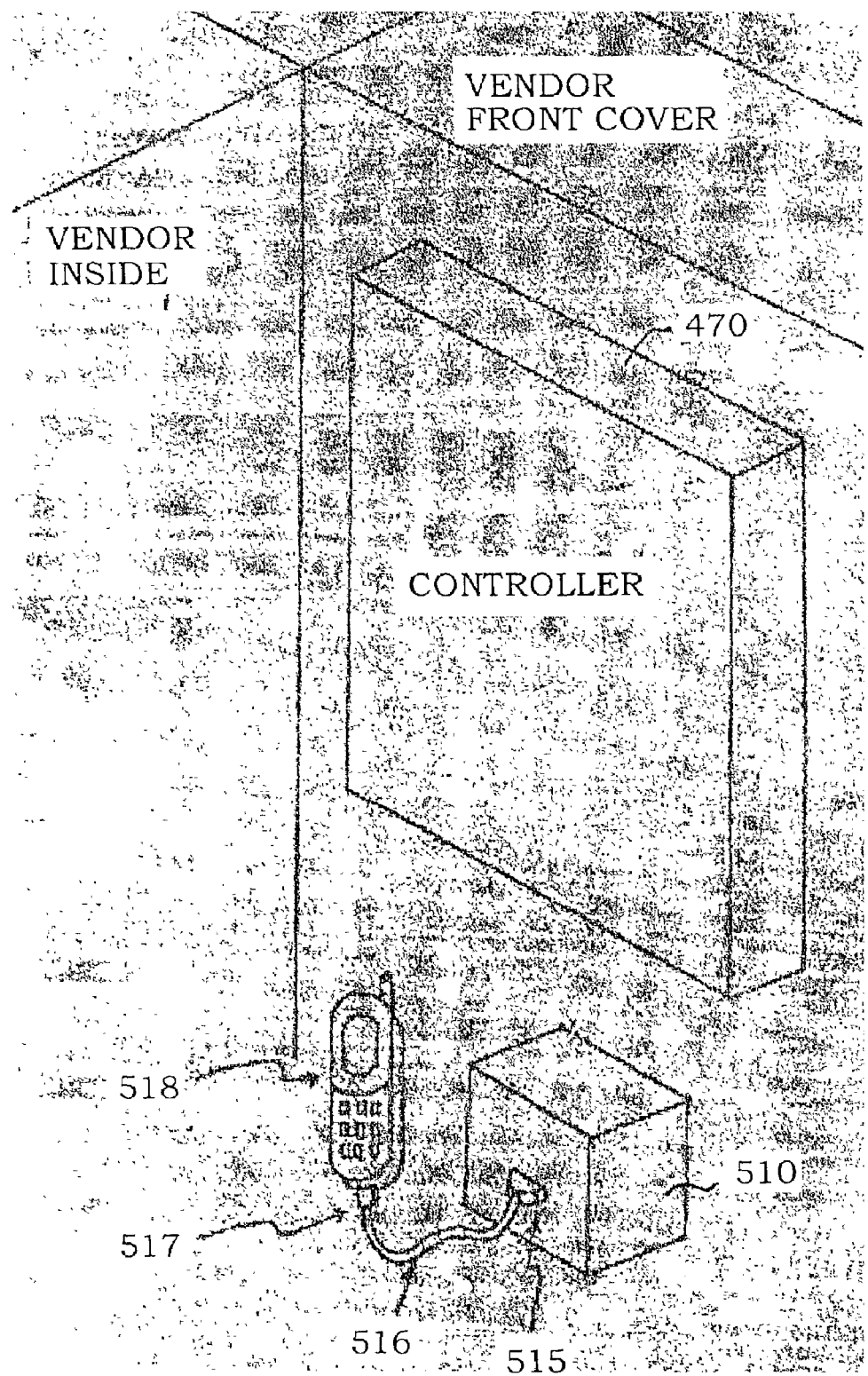
FIG. 53B shows an example of connection of the portable phone to the vending system.

FIG. 53A is a block diagram showing an automatic vending system adopting a portable phone connection device. FIG. 53B shows an example of connection of the portable phone to the vending system.

As shown in FIG. 53B, a vending machine controller 470 is attached in the inside of the front cover in the vending machine and a portable phone connection device 510 is attached below the vending machine controller 470. A cable connector 515 is provided in the portable phone connection device 510, to be connected to the external connection port 517 of a portable phone 518 via a cable 516. When the portable phone 517 is connected to the cable connection device 515 in the portable phone connection device 510, the portable phone connection is notified to a CPU 512 via a UART 514. The CPU 512 monitors a vending machine controller 470 via an I/F portion 511. If a transaction item is detected, the CPU 512 receives the transaction details ad stores the same in a memory 513. If a portable phone connection is notified to the CPU 512 via the UART 514, the CPU 512 makes a phone call through the portable phone 518 by a preset connection number and transmits the transaction details data stored in the memory 513. If the transaction details data is successfully transmitted to the called party, the CPU 512 deletes the recorded contents stored in the memory 513. Here, the set phone number is a number which can be connected to a central server in a corresponding settlement authority such as a card company or bank.

By the way, in the case that a portable phone is used as described above, the present invention cannot be applied to an automatic vending machine which is installed in a place out of service. Thus, the present invention provides an Internet connection device which can transmit transaction details via the Internet having no regional limitation.

Figure 54A:
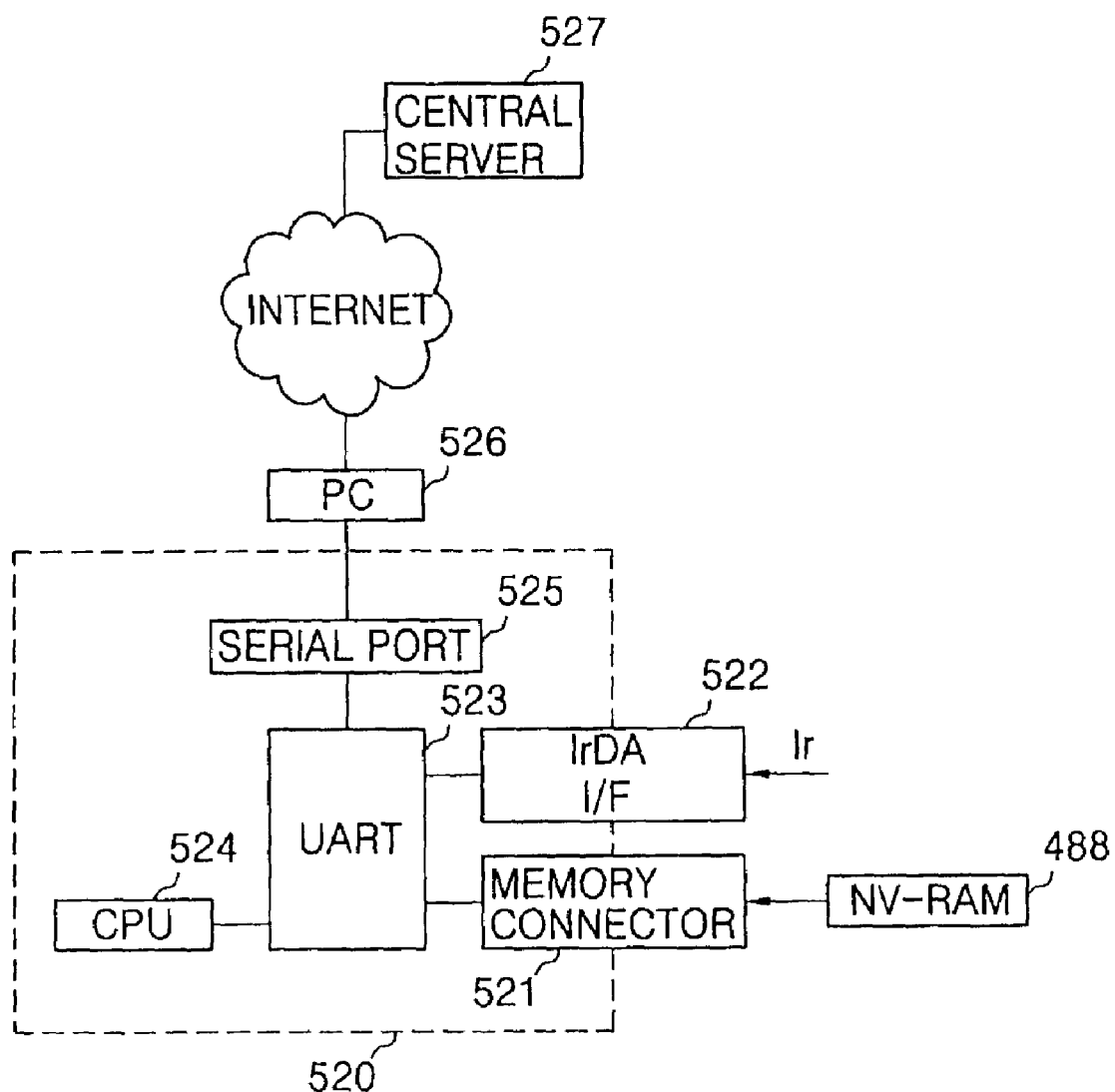
FIG. 54A is a block diagram showing an Internet accessible device.
Figure 54B:
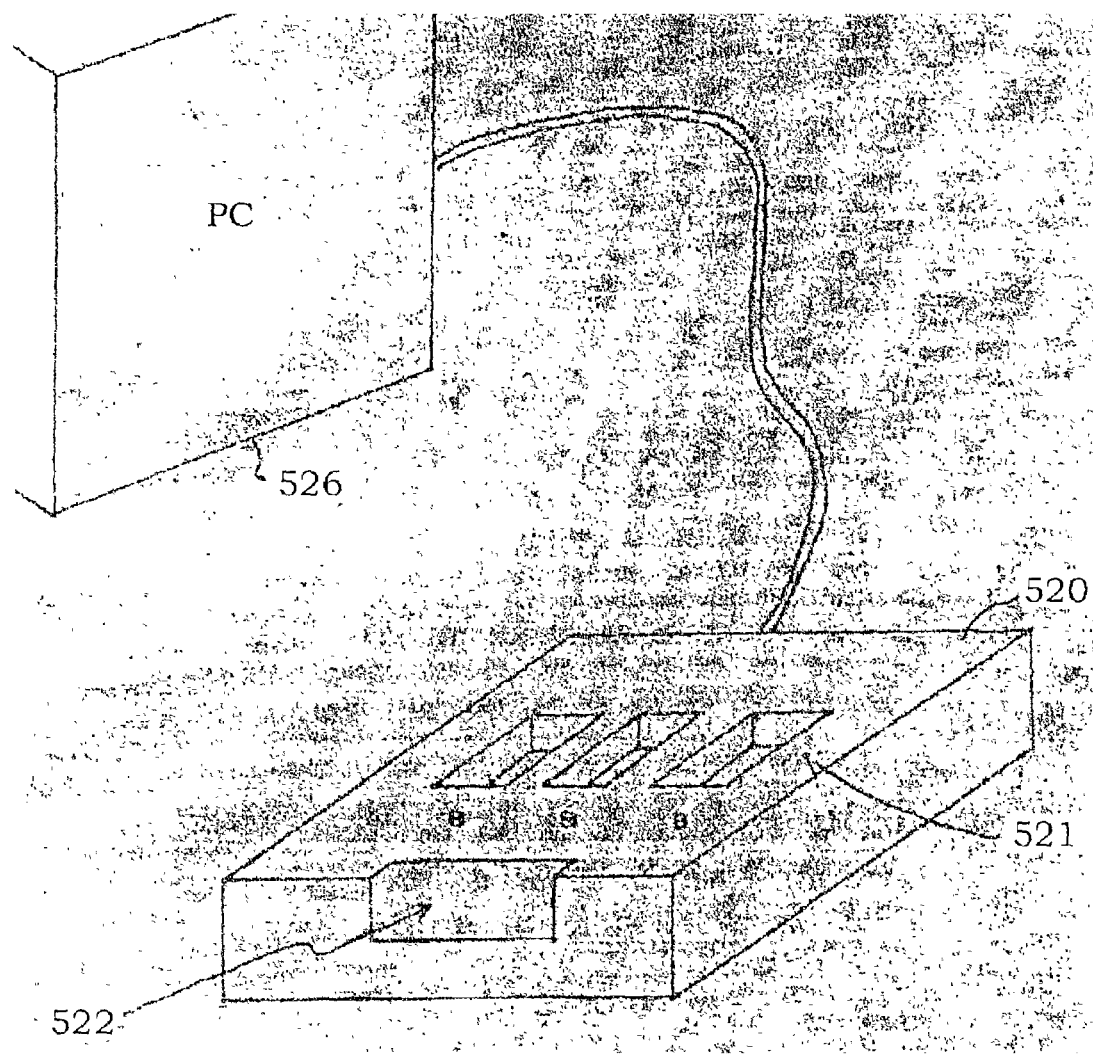
FIG. 54B shows an external connection state with respect to a PC.

FIG. 54A is a block diagram showing an Internet accessible device. FIG. 54B shows an external connection state with respect to a PC. Referring to FIG. 54B, an Internet connection device 520 is connected to an Internet accessible PC 526 by cable. The Internet connection device 520 includes a memory connector 521 which can be connected to a PDA 480 or a memory pack 488, which is a mobile collection device, and an infrared I/F portion 522 which receives the collected transaction details data by infrared communications.

An administrator connects a PC 26 to a connection device 520 by cable. The mobile collection device shown in FIGS. 49A, 49B, 50A and 50B with a memory connector 521. The memory connector 521 recognizes the transaction details data collected in the memory 488 installed in the mobile collection device, and transmits the recognized transaction details data to a CPU 524 via the UART 523. The connection device 520 can receive the transaction details data via infrared communications without having no connection with the mobile collection device. That is, an infrared I/F portion 522 in the connection device 520 recognizes the transaction details data in the infrared ray form and transmits the recognized result to the CPU 524 via the UART 523. The CPU 524 transmits the received data to the PC 526 connected to a serial port 525 via the UART 523. The PC 526 transmits the transaction details data transmitted from the connection device 520 to a central server 527, at the state where the PC 526 accesses the central server 527 in a corresponding settlement authority via the Internet. After transferring the transaction details data, the CPU 524 transmits a command to delete the recording contents from a memory 488 in the connected mobile collection device if data is successfully transmitted. Since the memory recording contents are cleared whenever the collected transaction details data is transmitted to the central server 527 normally, a memory capacity is not much occupied.

In the case of a place where the Internet is not supplied, a dial-up VAN connection device is provided so that transaction details data can be transmitted via a phone line.

Figure 55A:
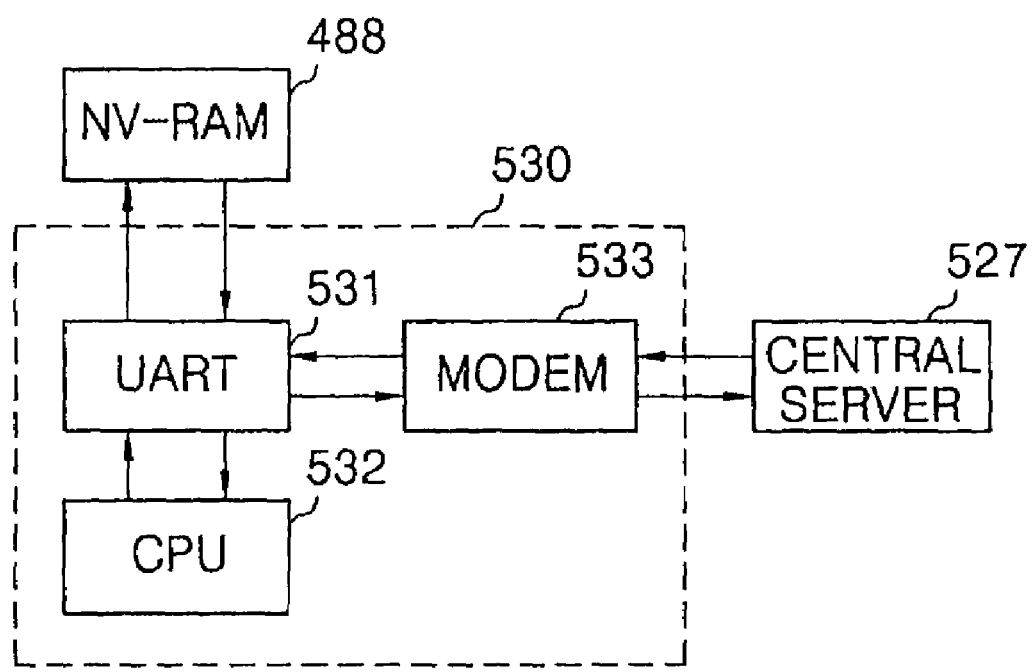
FIG. 55A is a block diagram showing a dial-up VAN accessible device.
Figure 55B:
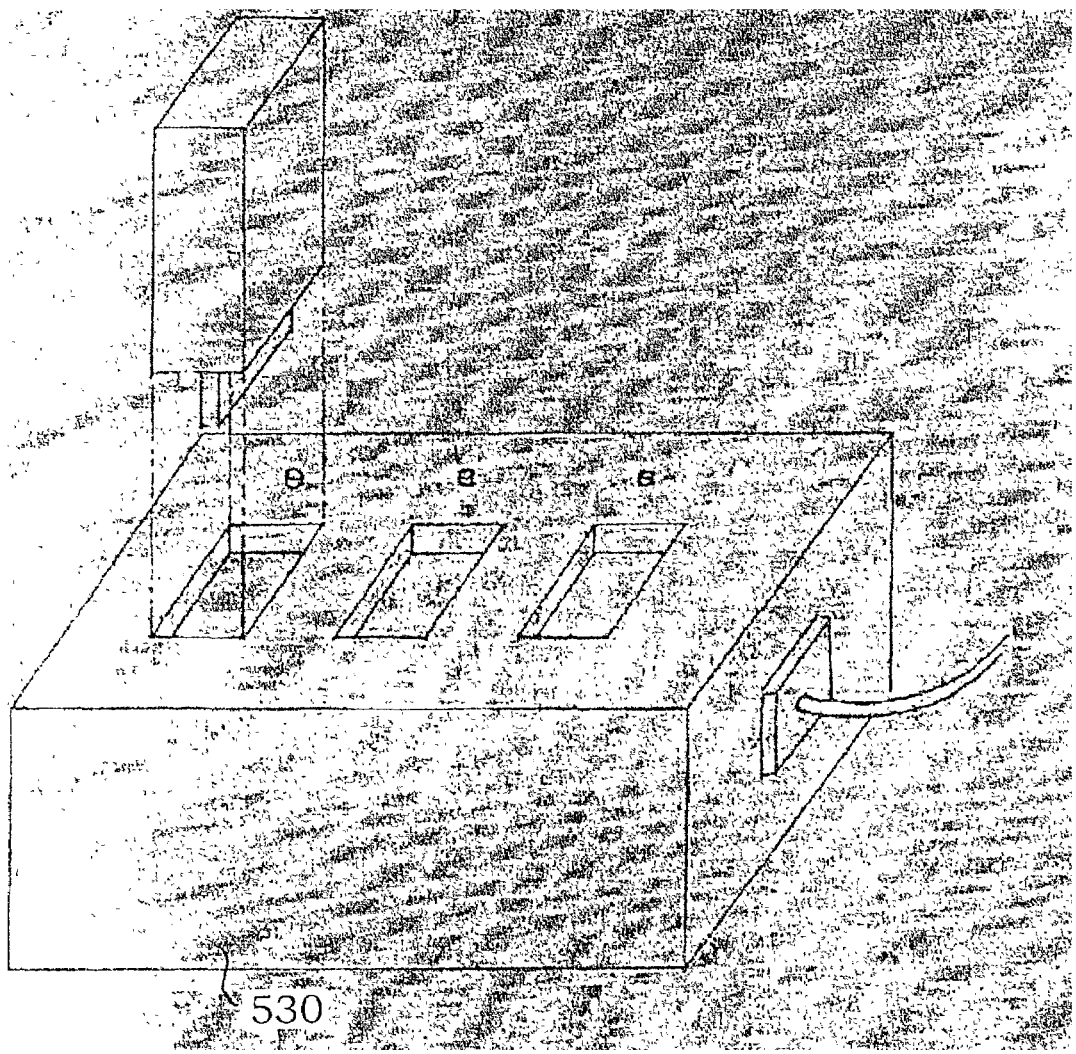
FIG. 55B shows an external connection state of the FIG. 55A dial-up VAN accessible device.

FIG. 55A is a block diagram showing a dial-up VAN accessible device. FIG. 55B shows an external connection state of the FIG. 55A dial-up VAN accessible device. Referring to FIG. 55B, a phone line is connected to one side of a connection device 530 fabricated in the form of a box, and a plurality of coupling holes are provided on the other side of the connection device 530, so as connect with a plurality of memory packs each being a mobile collection device. Also, a LED is provided in correspondence to each coupling hole, so that a current processing state can be checked by each memory pack.

An administrator connects the memory packs 488 in the mobile collection device to be processed with each coupling hole in the connection device 530 connected to the phone line. Transaction details data collected from a vending machine installed in a respectively different place is recorded in each memory pack 488. The CPU 532 transmits the data to a modem 533 via a UART 531 and loads it in the phone line to then be transmitted to a central server 527. After transferring the transaction details data, the CPU 532 deletes the recording contents of the processed memory pack 488 if data is successfully transmitted.

When the above-described transfer terminal is used, the optical payment settlement method according to the present invention can be applied to a bus or taxi fare automatic collection system.

Figure 56:
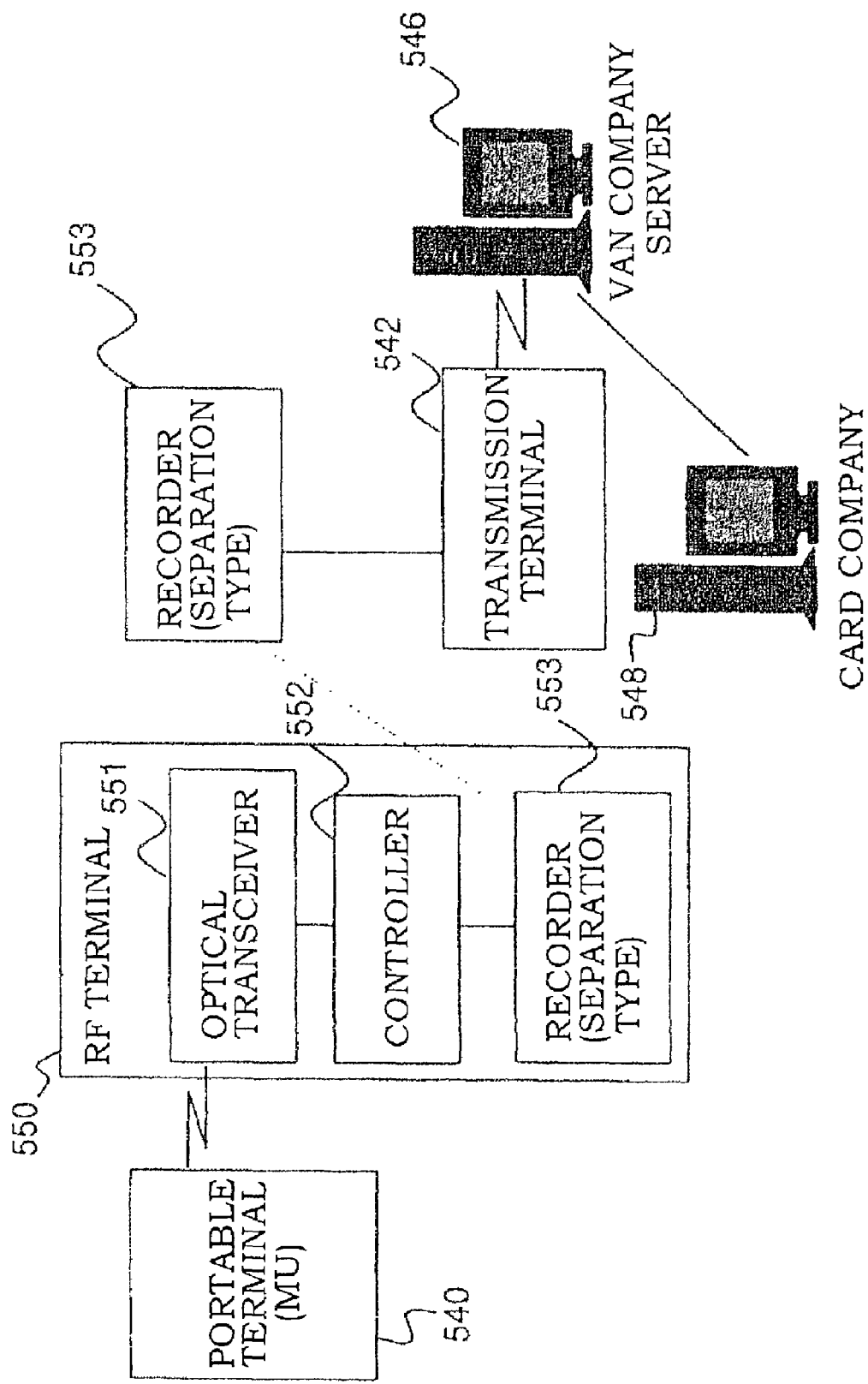
FIG. 56 is a configuration view showing a bus/taxi fare automatic collection system adopting an optical payment settlement system according to the present invention.
Figure 57:
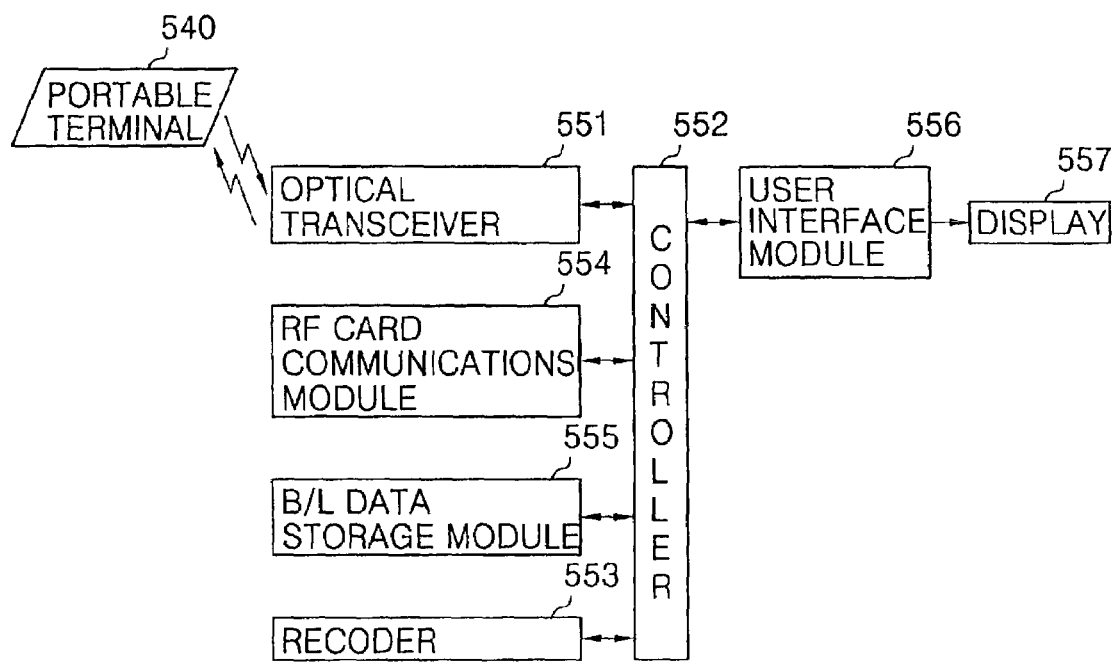
FIG. 57 is a detailed block diagram showing a RF terminal for collecting bus fares.

FIG. 56 is a configuration view showing a bus/taxi fare automatic collection system adopting an optical payment settlement system according to the present invention. A system shown in FIG. 56 includes a portable terminal (MU) 540 which is an optical payment unit and a RF terminal 550 for collecting a fare. The RF terminal 550 includes an optical transceiver 551 for receiving and transmitting optical payment information, a controller for controlling the operation of levying a fare, and a recorder 553 for recording levying details. The recorder 533 is fabricated separately in the form of a pack. The detailed structure of the RF terminal 550 is shown in FIG. 57. The FIG. 56 system includes a transfer terminal 542 connected to the recorder 553, for transferring the levying details to a card company server 548 via a VAN company server 546. Here, the transfer terminal 542 uses an Internet connection device or the dial-up VAN connection device shown in FIG. 54 or 55.

A customer riding a bus or taxi pays for a fare. In the case of an optical payment, the customer uses the portable terminal 540 which is an optical payment unit and transmits optical payment information toward the optical transceiver 551 in the RF terminal 550. The optical transceiver 551 receives the optical payment information transmitted from the customer's portable terminal 540 having ridden the bus or taxi and transmits the received optical payment information to the controller 552. In the case of a payment of an existing plastic card or an IC card such as a traffic card which does not adopt an optical payment method, a customer contacts a corresponding card to a RF card communications module 554 to transfer card information in the form of radio frequency. The RF card communications module 554 receives the transmitted RF card information and transmits the received card information to the controller 552. The controller 552 checks whether the received card information is valid. If card information is RF card information, the controller 552 checks a black list (B/L) stored in a B/L data storage module 555, and checks whether the card information is valid. If card information is valid, the controller 552 displays the levying fare and the remainder of the card on a display 557 via a user interface module 556. Meanwhile, in the case of an optical payment, the controller 552 need not check a black list separately. In the optical payment settlement system, the portable terminal which is a corresponding optical payment unit checks a black list. In the optical payment settlement system, the controller 552 displays the levying fare and the cumulative amount on the display 557 via the user interface module 556. In addition, the controller records the levying details such as the corresponding card information and amount in the recorder 553.

In order to read the above-described recorded information, an administrator visits a place where the transfer terminal 542 is installed and separates the recorder 553 from the RF terminal 550, to thereby connect the separated recorder with the transfer terminal 542. The transfer terminal 542 reads the levying details from the connected recorder 553 and transmits the read result to the VAN company server 546. The VAN company server 546 transmits the received levying details to the corresponding card company server 548.

Meanwhile, in the case of a subway, toll gate or kiosk, there is provided a system central server, which plays a role of a collection device or transfer terminal without adopting an additional collection device or transfer terminal. Here, a case using the central server will be described below.

Figure 58:
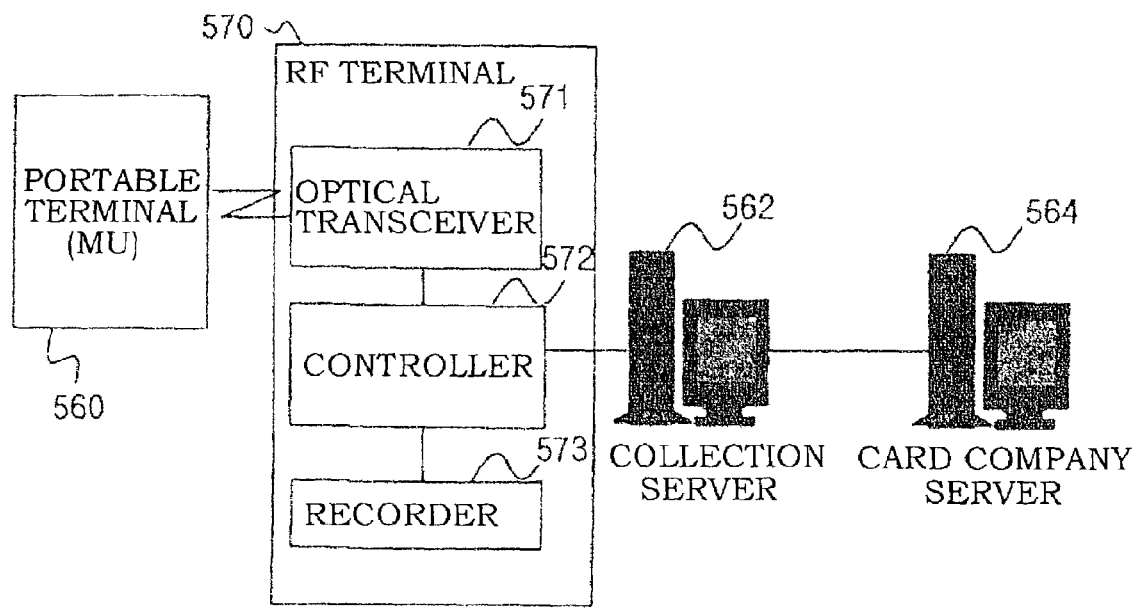
FIG. 58 is a configuration view showing a subway fare automatic collection system adopting an optical payment settlement system according to the present invention.
Figure 59:
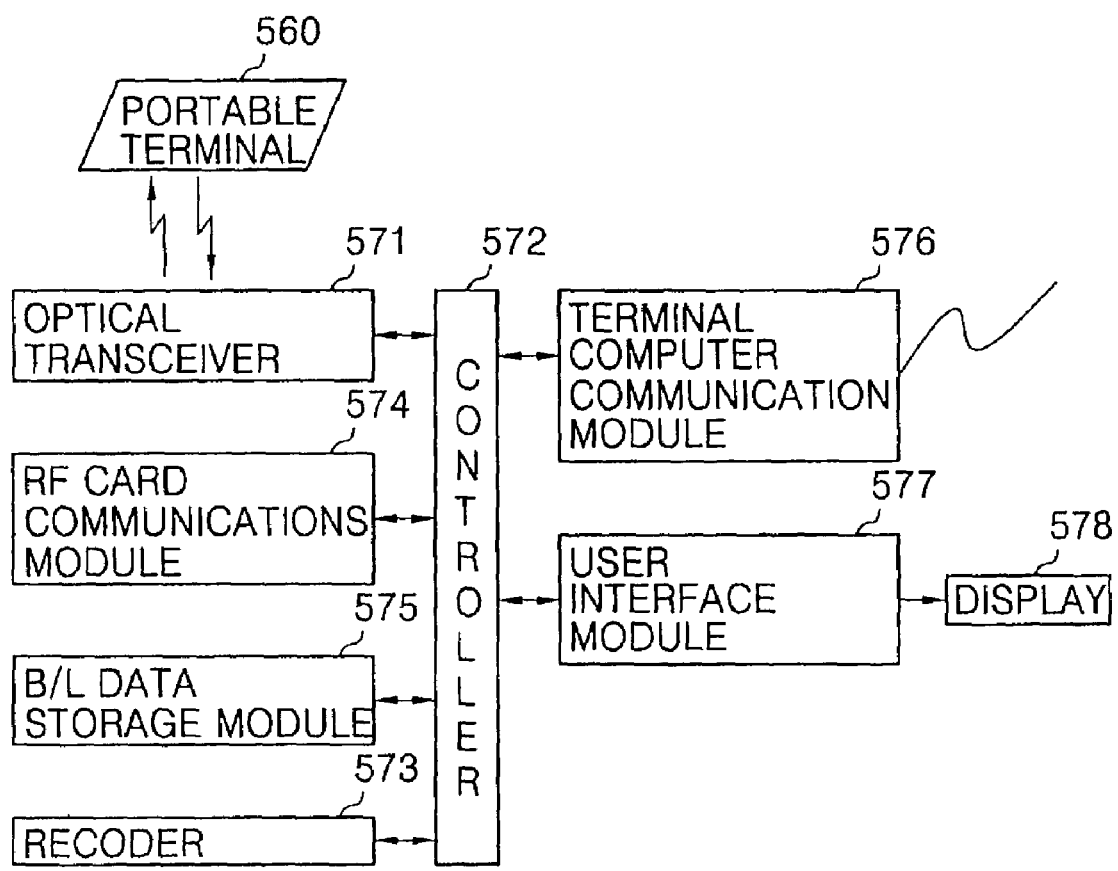
FIG. 59 is a detailed block diagram showing a RF terminal for collecting subway fares.

FIG. 58 is a configuration view showing a subway fare automatic collection system adopting an optical payment settlement system according to the present invention. A system shown in FIG. 58 includes a portable terminal (MU) 560 which is an optical payment unit and a RF terminal 570 installed in a subway gate. The RF terminal 570 includes an optical transceiver 571 for transmitting and receiving optical payment information, a controller 572 for controlling operation of levying a subway fare, and a recorder 573 for recording levying details. The detailed structure of the RF terminal 570 is shown in FIG. 59. The FIG. 58 system also includes a collection server 562 for collecting levying details of the recorder 573 disposed in each subway station and transferring the same to a card company server 564 in a lump. Here, the collection server 562 is a central server for linking each subway station and centrally controlling the same. Also, since a fare differs for each subway section, information with respect to a boarding subway station is input into the portable terminal 560 using a bidirectional optical transceiver 571, so that an accurate fare can be levied at a get-off subway station.

The RF terminals 570 provided in the subway station entrance and exit are connected to a subway station central server via a terminal computer communications module 576. In order to ride on a subway train, a passenger transmits optical card information to the optical transceiver 571 in the RF terminal 570, using the card information incorporated portable terminal 560. Then, the optical transceiver 571 transmits the received card information to the controller 572. The controller 572 confirms whether the received card information is valid data of a predetermined protocol. If it is valid data, the controller 572 transmits the departure station information and time information to the portable terminal 560 via the optical transceiver 571. The portable terminal 560 receives the departure station information transmitted from the optical transceiver 571 and temporarily stores the same therein. The controller 572 controls the entrance and exit opening system to allow the passenger to pass through the entrance and exit opening system and to ride on the subway train. When the passenger rides on the subway train and arrives at a desired destination, he or she uses the portable terminal 560 in which the departure station information has been stored, and proceeds the get-off procedure. Here, the departure station information together with the card information is transmitted to the optical transceiver 571 in the RF terminal 570 provided in the entrance and exit opening system of the arrival station. The optical transceiver 571 receives the departure station information together with the card information transmitted from the portable terminal 560 and transmits the same to the controller 572. The controller 572 checks whether the received card information is valid data of a predetermined protocol. If it is valid data, the controller 572 calculates a fare from the departure station to the arrival station and displays a calculated amount and/or a used cumulative amount on a display 578 via a user interface module 577. Also, the controller 572 records the levying details such as the card information, transaction date, fare, and cumulative amount on the recorder 573.

The central server 562 being the collection server collects the transaction details recorded in the recorder 573 in the RF terminal 570 installed in each subway station, at every interval of period. The central server 562 checks if the collected transaction details matches the transaction details recorded in the recorder 573. Then, if both match, the central server 562 transmits the transaction details to a card company 564 and requests for an approval of settlement of the used amount and then clears the recorded contents from the recorder 573.

Of course, the passenger can use a subway ticket which is another payment ticket or uses a traffic card such as a plastic card or an IC card to have it contact the RF card communications module 574 to settle the payment.

Hereinbelow, a case that a phone number is used as an ID for a batch processing settlement system in a vending machine, a bus or a subway will be described.

Figure 60:
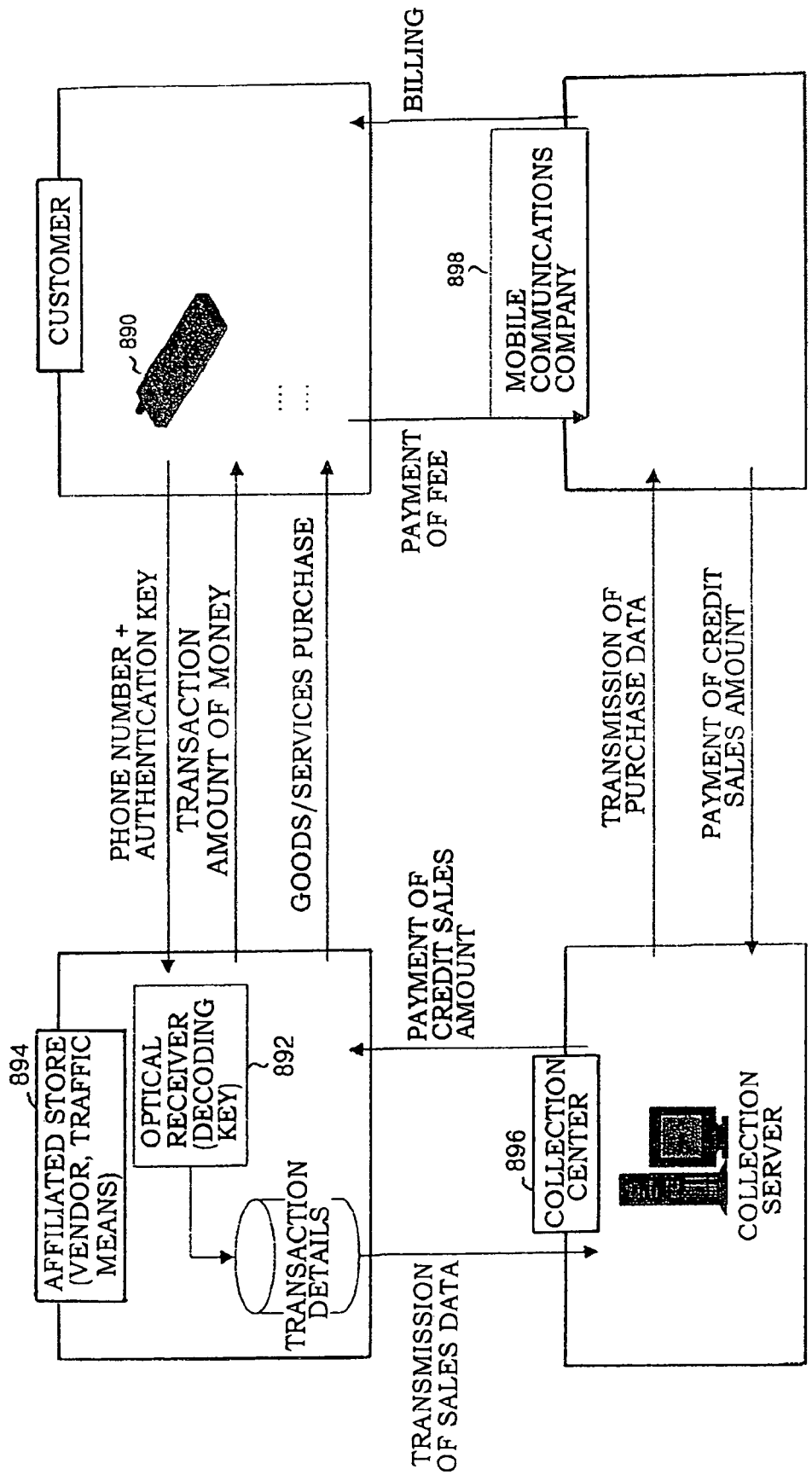
FIG. 60 is a conceptual view showing an optical payment batch processing settlement system using a phone number as an ID.

FIG. 60 is a conceptual view showing an optical payment batch processing settlement system using a phone number as an ID.

A user possessing a portable terminal 890 incorporated with an optical payment function selects a corresponding mobile communications company as a credit transaction authority for taking a transaction action requiring a batch processing settlement. The user selects the mobile communications company 898 as a credit transaction authority in an optical menu of the portable terminal 890, and then transmits a phone number and an authentication key registered in the portable terminal 890 in the form of an infrared ray by means of manipulation of buttons. An optical receiver 892 installed in a vending machine, a bus, or a subway station receives a phone number and an authentication key from the portable terminal 890. The optical receiver 892 confirms the received authentication key by using a decoding key and confirms whether the received phone number is an inherent number input at the time of participating in the communications network using the confirmed authentication key. If it is confirmed that the phone number is an inherent number, the optical receiver 892 approves the transaction action and then keeps the transaction details in custody with a self-authentication program. The optical receiver 892 transmits the transaction amount to the portable terminal 890 in the form of an infrared ray. The portable terminal 890 cumulates the transmitted transaction amount and keeps the cumulated result in a memory which can be controlled by the mobile communications company 898. The portable terminal 890 can continue to take a credit transaction action within a limit determined by the mobile communications company 898. Meanwhile, an operator transmits the stored transaction details to a collection center 896. The collection center 896 totalizes the collected sales data and converts the totalized sales data into purchase data for the mobile communications company 898, to then transfer the converted result to the mobile communications company 898. The mobile communications company 898 settles the purchase data and pays for the credit sales debts to the collection center 896 according to a payment interval of period. If the debts are paid for from the mobile communications company 898, the collection center 896 pays for the credit sales debts to each affiliated shop to be settled. The mobile communications company 898 charges for the credit sales debts collected for a predetermined period in addition to a communications fee and sends a bill to the user at a date which is determined to be settled by the user. Since the user pays for the billed fees, such an optical payment settlement credit purchase is completed by using a phone number as an ID.

Meanwhile, since the number of persons who use the Internet increases sharply, a commercial use of the Internet, that is, an electronic commerce becomes quickly and widely spread. The electronic commerce uses a settlement system requiring a user to input card information such as a user name, card number, secret number, and a valid date on a browser provided by a cyber shopping mall. The present invention is applied to the electronic commerce so that a settlement processing can be performed without inputting card information each time.

Figure 61:
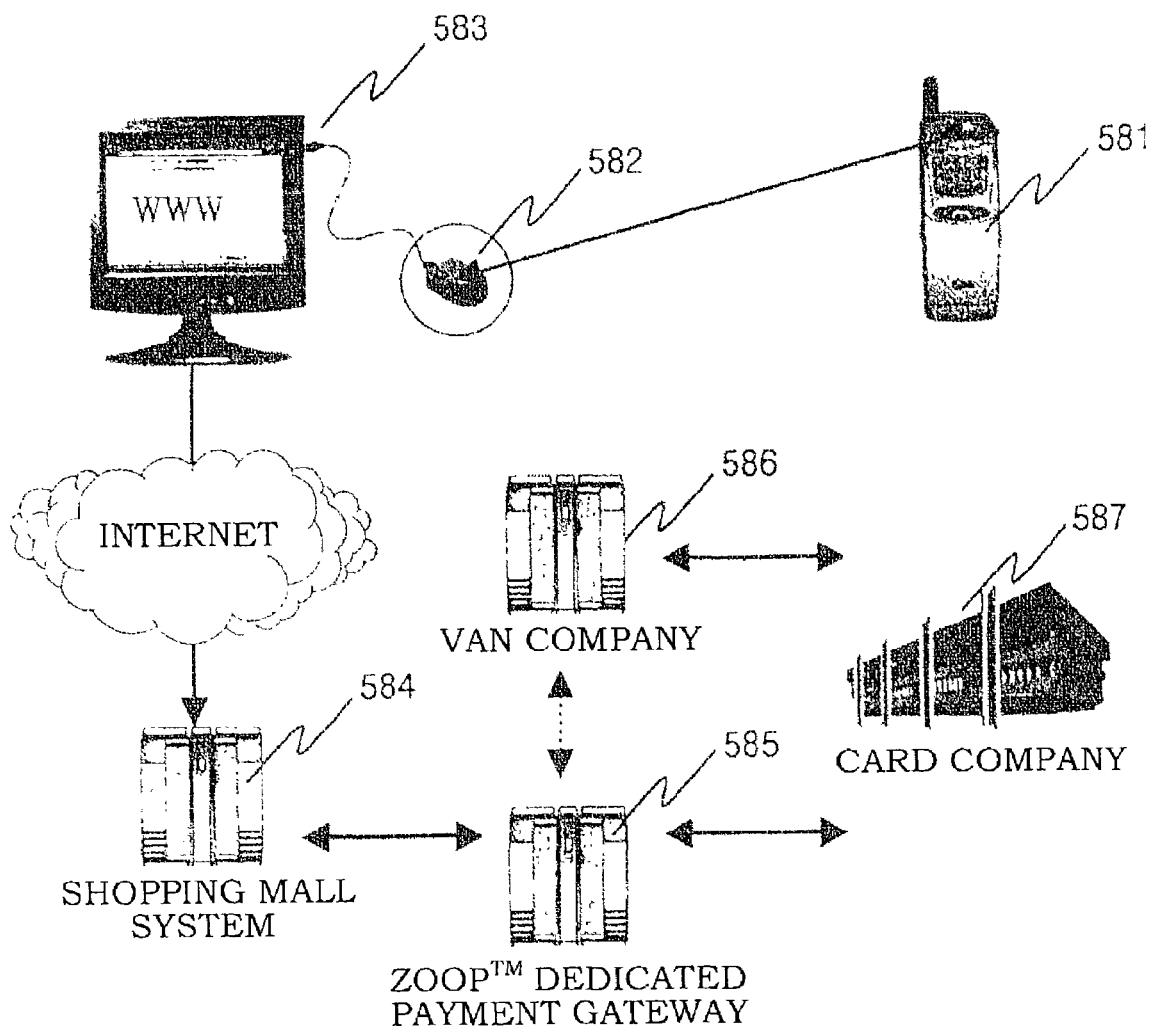
FIG. 61 is a configuration view showing an embodiment of an electronic commerce system adopting an optical payment settlement system according to the present invention.
Figure 62:
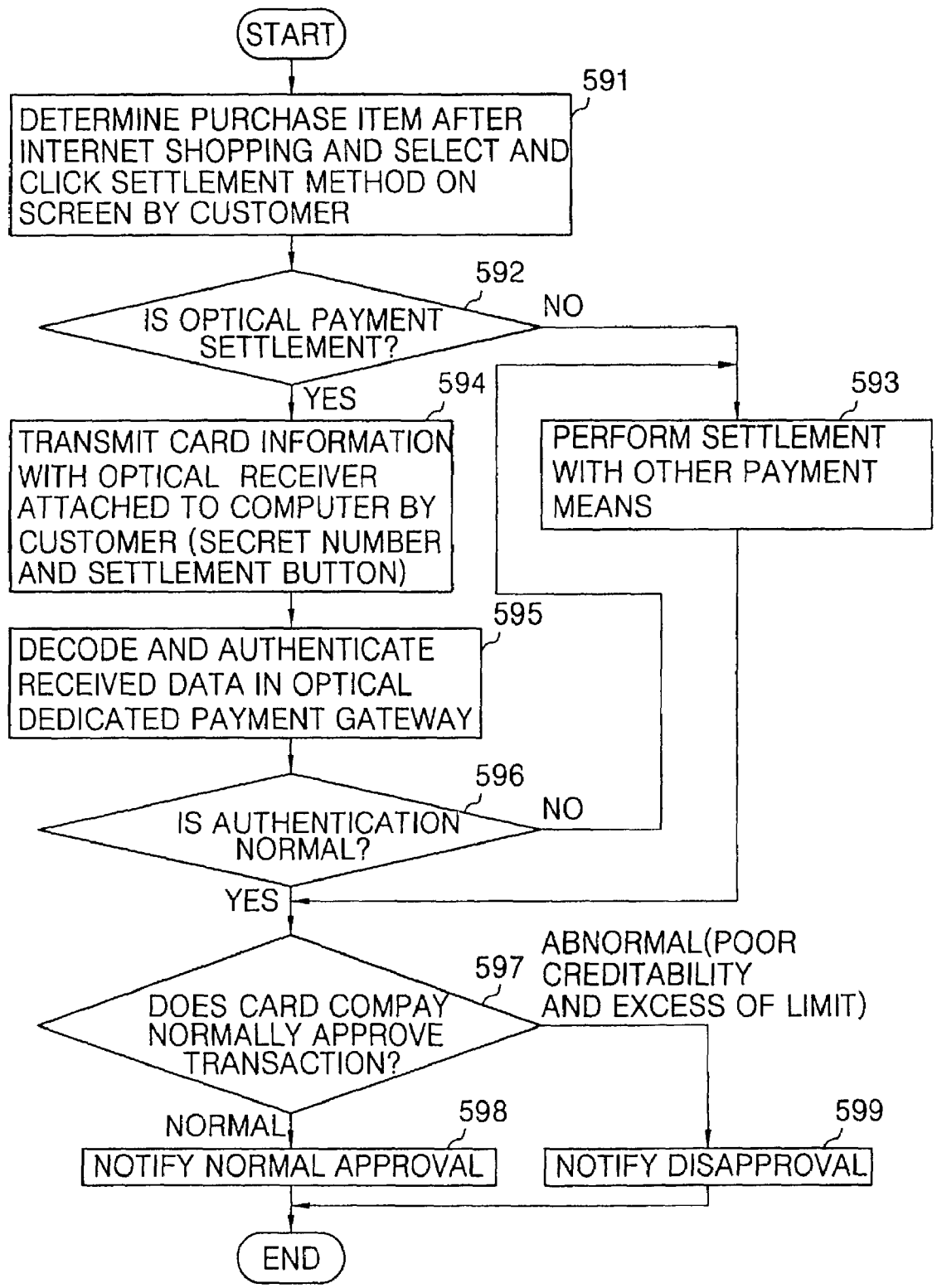
FIG. 62 is a flowchart view for explaining a settlement operation in the FIG. 61 electronic commerce system.

FIG. 61 is a configuration view showing an electronic commerce system adopting an optical payment settlement system according to the present invention. A system shown in FIG. 61 includes a mobile unit 581 used as an optical payment unit having an optical transmitter for optically transferring preset personal credit information, an optical receiver 582 connected to an Internet connection terminal computer (PC) 583 for performing an electronic commerce transaction, for receiving optically transmitted personal credit information and inputting the received credit information to the PC 583, and a payment gateway 585 connected to a shopping mall 584, for performing a settlement processing. The optical receiver 582 receives only payment information transmitted in the form of an infrared ray (Ir) and transmits the received payment information to an electronic commerce settlement program. Of course, Ir-transmitted payment information and magnetic card information of a swapping method can be selectively received, by using an optical receiver including a card reader. Also, if an optical relay base unit is connected to the PC 583 and an optical relay in which an optical receiver is attached is used, Ir-transmitted payment information and magnetic card information of a swapping method which is transmitted via a mobile optical relay can be selectively received. Here, the payment gateway 585 is an optical payment (Zoop™) dedicated gateway, and can be operated by the shopping mall 584 or a separate service company. A VAN company 586 and a card company 587 are connected to the optical payment dedicated gateway 585. In the FIG. 61 system having the above-described structure, an optical payment operation in the electronic commerce will be described specifically via FIG. 62.

A customer gains access to the shopping mall 584 by the computer 583 connected to the Internet and searches products. Then, the customer determines purchase items and makes up an order sheet. Then, the customer selects a settlement method for settlement of a debt on a screen and clicks the selected settlement method (step 591). The shopping mall system 584 checks if the customer's selected settlement method is an optical payment settlement method (step 592). If the customer determines the payment by one of other settlement method other than the optical payment, a settlement procedure using the determined settlement method (step 593). There are an electronic money, an MS card and so on as the settlement methods other than the optical payment. If a payment is an optical payment settlement, a customer uses a portable unit 581 which is an optical payment unit and transmits the card information to the optical transmitter 582 connected to the computer 583 (step 594). Since the optical payment unit has been described above, the detailed description thereof will be omitted. The customer inputs a secret number which is known only by him or her and presses a settlement button, and then transmits card information necessary for settlement to the optical receiver 582 attached to the Internet connection computer 583, by using an optical communications method, in particular, an infrared communications method. The optical receiver 582 received the transmitted card information and converts it into the form which can be processed in the computer 583 so as to be input to the computer 583. The computer 583 transmits the input card information to the shopping mall system 584. The shopping mall system 584 transmits the received card information to the optical payment dedicated gateway 585. The optical payment dedicated gateway 585 having received the card information performs decoding and authenticating of the received card information (step 595). The optical payment dedicated gateway 585 checks whether the optical payment settlement is authenticated from an authentication server (step 596). If it has been authenticated, the optical payment dedicated gateway 585 requests for an approval to the VAN company 586 or directly to the card company 587. If it has not been authenticated, a settlement processing is performed by other payment methods (step 593). The optical payment dedicated gateway 585 checks an authentication result (step 597) and transmits the check result to the transaction generated shopping mall 584. When the shopping mall 584 is notified from the optical payment dedicated gateway 585 that the transaction is normally approved, it notifies to a customer's browser that the transaction is normally approved (step 598). Then, products purchased by the corresponding customer are delivered within a determined delivery date. If the shopping mall 584 is notified from the optical payment dedicated gateway 585 that the transaction is not approved due to poor creditability, an excess of limitation, or an illegal use, it notifies to the customer's browser that the transaction is not approved (step 599).

As described above, the optical settlement system according to the present invention can be applied to an electronic payment on the wireless Internet as well as that on the wired Internet.

Figure 63:
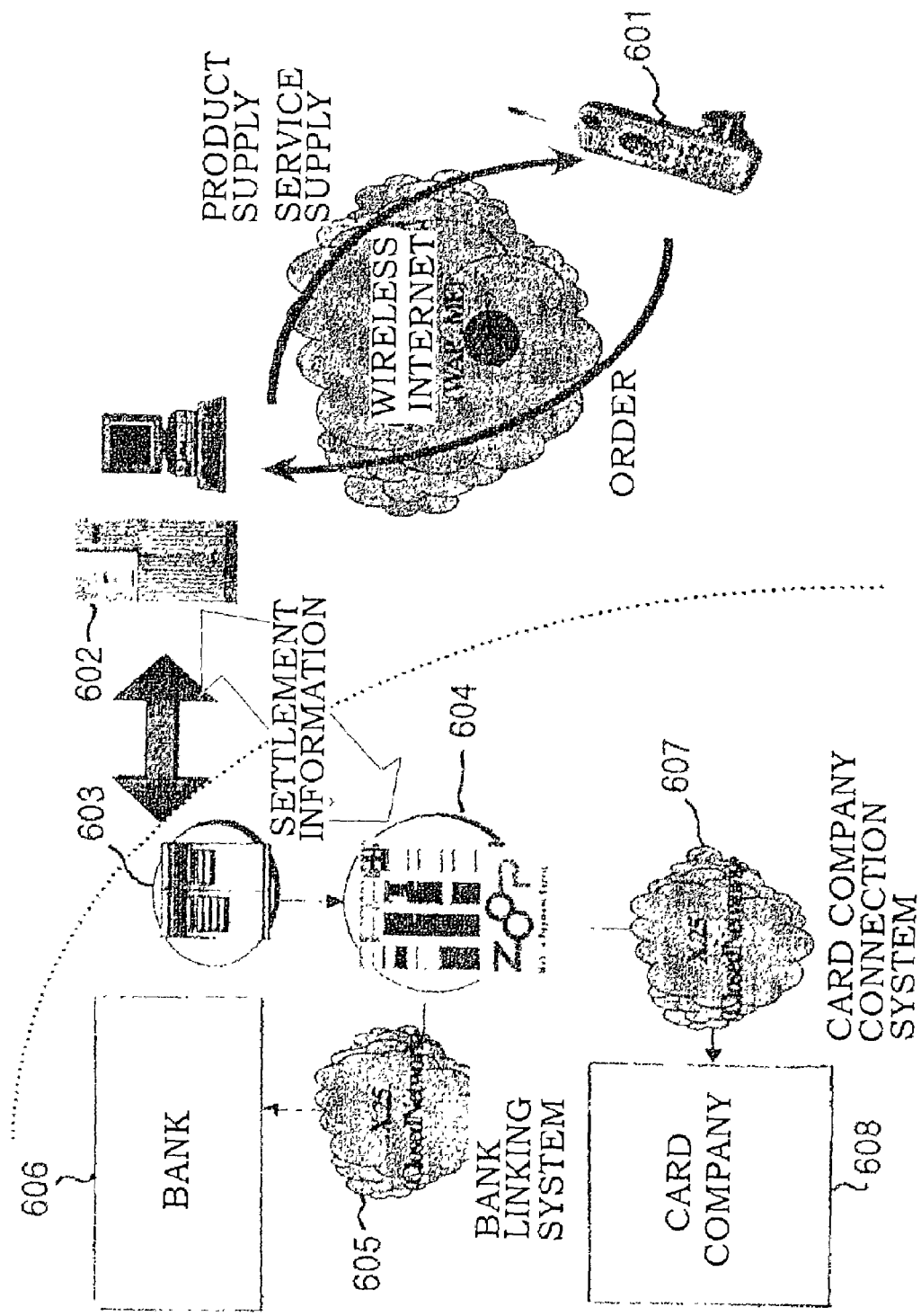
FIG. 63 is a configuration view showing another embodiment of an electronic commerce system adopting an optical payment settlement system according to the present invention.
Figure 64:
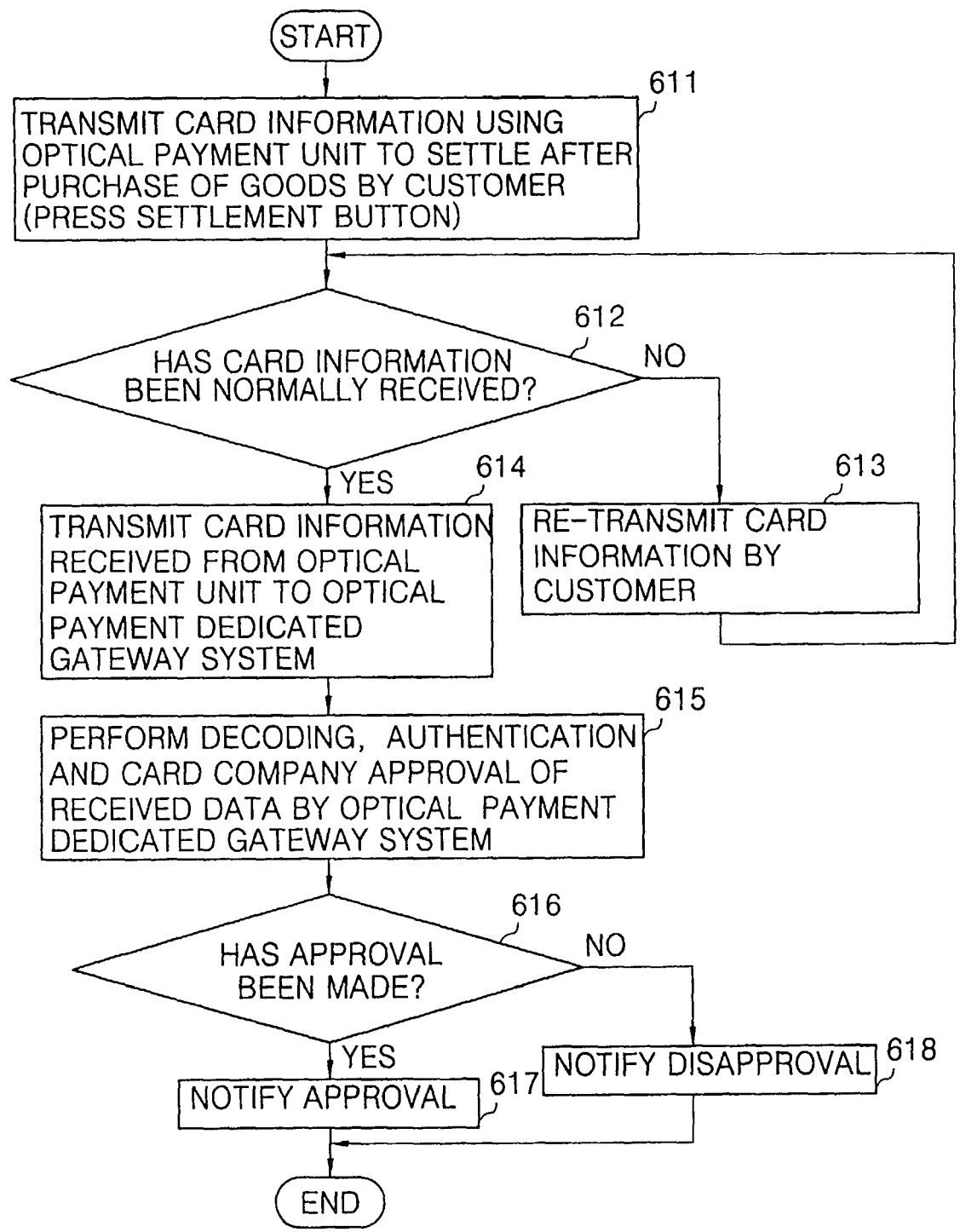
FIG. 64 is a flowchart view for explaining a settlement operation in the FIG. 63 electronic commerce system.

FIG. 63 is a configuration view showing a wireless Internet-based electronic commerce system adopting an optical payment settlement system according to the present invention. A system shown in FIG. 63 is configured in the same structure as that of the FIG. 61 system. However, the FIG. 63 system is configured so that a settlement is performed between an optical payment portable unit 601 and a shopping mall system 602 via a wireless Internet protocol. An optical payment operation in the wireless Internet-based electronic commerce of the FIG. 63 system having the above configuration will be described with reference to FIG. 64.

In the wireless Internet-based electronic commerce, the customer uses a terminal such as an Internet connectable portable phone or PDA as an optical payment unit. The optical payment unit uses a micro-browser mounted portable phone terminal in which the micro-browser is a commercially available software program such as WAP/UP, ME, etc. The customer gains access to the shopping mall 602 on the wireless Internet via the wireless Internet connectable terminal 601 which is used as an optical payment unit. The customer selects goods or services to be purchased according to a menu provided from the shopping mall 602, and then selects an optical payment settlement as a settlement method. The customer uses an optical transmitter in the terminal 601 which is an optical payment unit and optically transmits card information incorporated in the terminal (step 611). Here, the customer inputs a secret number into the terminal 601. If the secret number is correct, the customer can access the card information. If not, the customer cannot use the incorporated card information. When the customer inputs the secret number into the terminal 601 and then presses a transmit button on a menu, the card information incorporated in the terminal 601 is encoded and then transmitted to the shopping mall server 602 which is currently connected on the wireless Internet. The shopping mall server 602 confirms the transmitted card information. If the transmitted card information is normally received, the shopping mall server 602 sends a reception message to the customer's terminal, while if not, the former sends a re-transmission requesting message to the customer's terminal 601 and displays the re-transmission requesting message on the customer's terminal screen to thereby make the customer check if the card information has been normally transmitted (step 612). If the card information has not been transmitted, the customer manipulates the terminal 601 again and re-transmits the card information (step 613). If it is checked that the card information has been normally received in step 611, the shopping mall server 602 transmits the encoded card information to the optical payment dedicated gateway 604 (step 614). Here, the optical payment dedicated gateway 604 is a separately existing payment gateway server in order to decode only data which has been stored in the terminal and then encoded and transmitted, in addition to payment information processed in a general key-in method. The reason why the optical payment dedicated gateway 604 is provided in comparison with the general payment gateway 603 is because the optically transmitted data is encoded and thus cannot be decoded in the general payment gateway server 603. The optical payment dedicated gateway 604 receives the settlement information transmitted via the shopping mall system 602 and decodes it into an original prior-to-being-encoded state. Then, the optical payment dedicated gateway 604 requests for an approval to a bank 606 or a card company 608 which is a settlement authority through an authentication procedure (step 615). Here, a dedicated network 605 or 607 of X.25 is connected between the optical payment dedicated gateway 604 and the corresponding settlement authority 606 or 608. The optical payment dedicated gateway server 604 checks if an approval has been done from the corresponding settlement authority such as the bank 606 or card company 608 (step 616). If an approval has been done, the optical payment dedicated gateway server 604 notifies the shopping mall 602 that the payment has been completed and the customer that the settlement has been completed (step 617). If an approval has not been done in the result of checking of step 616, the optical payment dedicated gateway server 604 notifies the customer via the shopping mall 602 that the settlement has been rejected, to thereby allow the customer to use other settlement methods (step 618).

Figure 65:
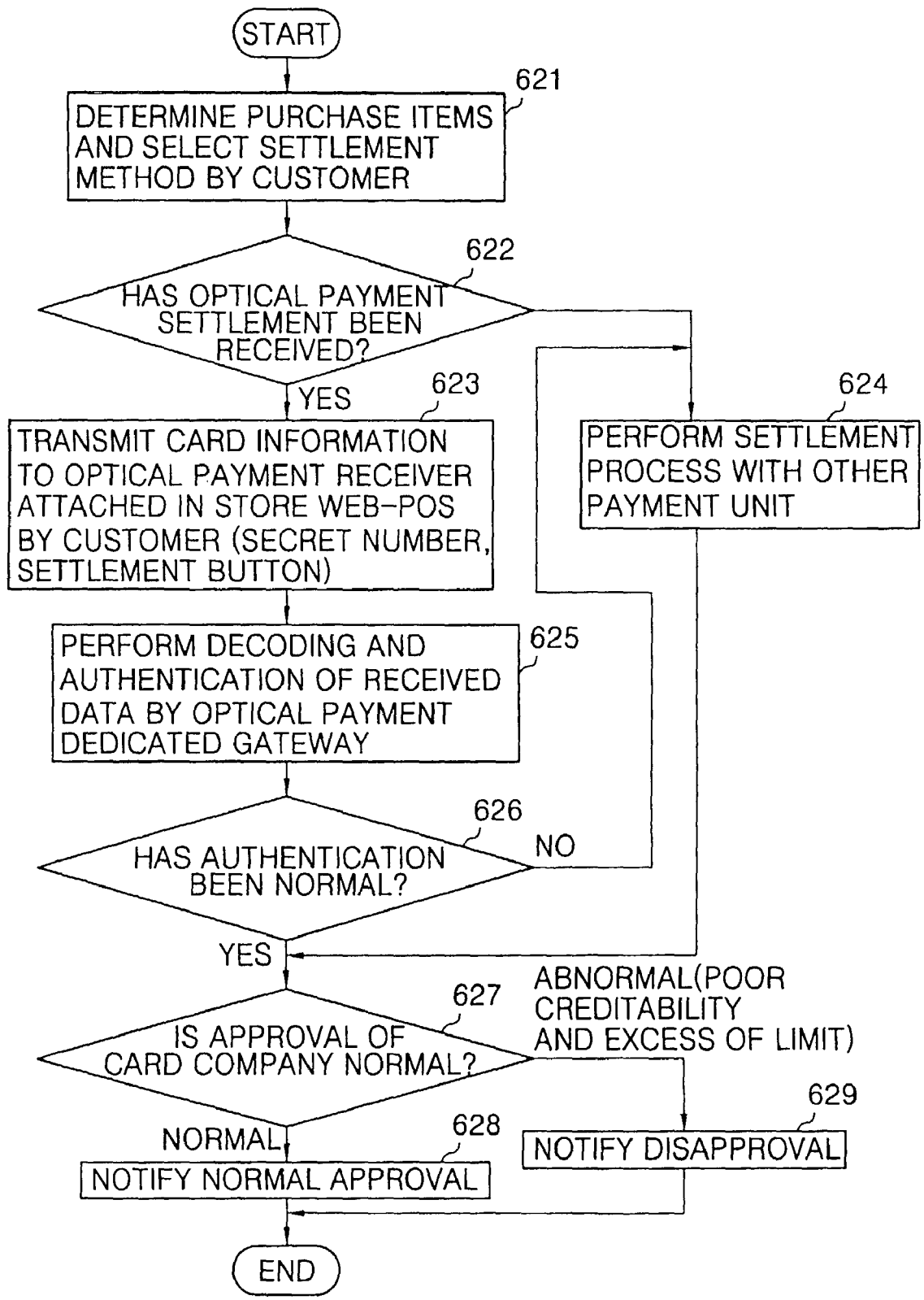
FIG. 65 is a flowchart view in the case that the FIG. 61 electronic commerce system is applied in a general store.

FIG. 65 is an operational flowchart view in the case that the FIG. 61 electronic commerce system is applied in a general store. A system adopting the FIG. 65 method transmits optical payment information in real-time via an electronic commerce optical receiver 582 connected to a PC 583 in a general store connected to the Internet, for processing various settlement approval items.

A customer determines a purchase item and selects a settlement method in a store counter (step 621). The system checks if the customer's selected settlement method is an optical payment settlement (step 622). If the customer's settlement method is an optical payment settlement, the customer uses a portable terminal 581 which is an optical payment unit, and transmits card information to the electronic commerce optical receiver 582 attached to a PC 583 in the store (step 623). The card information includes a secret number and a settlement command. If the customer's settlement method is not an optical payment settlement, the customer performs a settlement processing in cash or with other payment methods such as a magnetic card (step 624). The PC 583 plays a role of a Web-POS and encodes the received card information and transmits it to the optical payment dedicated gateway 585 in order to request for an approval. The optical payment dedicated gateway 585 decodes the card information received via the Internet into an original prior-to-being-encoded state, and proceeds to an authentication procedure (step 625). The optical payment dedicated gateway 585 checks if an optical payment settlement is authenticated from an authentication server (step 626). If the optical payment settlement is authenticated, the optical payment dedicated gateway 585 requests for an approval to a VAN company 586 or directly to a card company 587. If not, a settlement processing is performed with other payment methods (step 624). The optical payment dedicated gateway 585 checks if an approval has been done (step 627). If an approval has been normally done, the optical payment dedicated gateway 585 notifies the browser of the Web-POS 583 connected via the Internet that an approval has been normally done (step 628). If a normal approval has been notified, the shopping mall hands over to the customer the products purchased by the customer. If an approval has not been done due to poor creditability, an excess of limitation and an illegal use, the optical payment dedicated gateway 585 notifies the browser of the Web-POS 583 that the transaction has not been approved (step 629).

Figure 66:
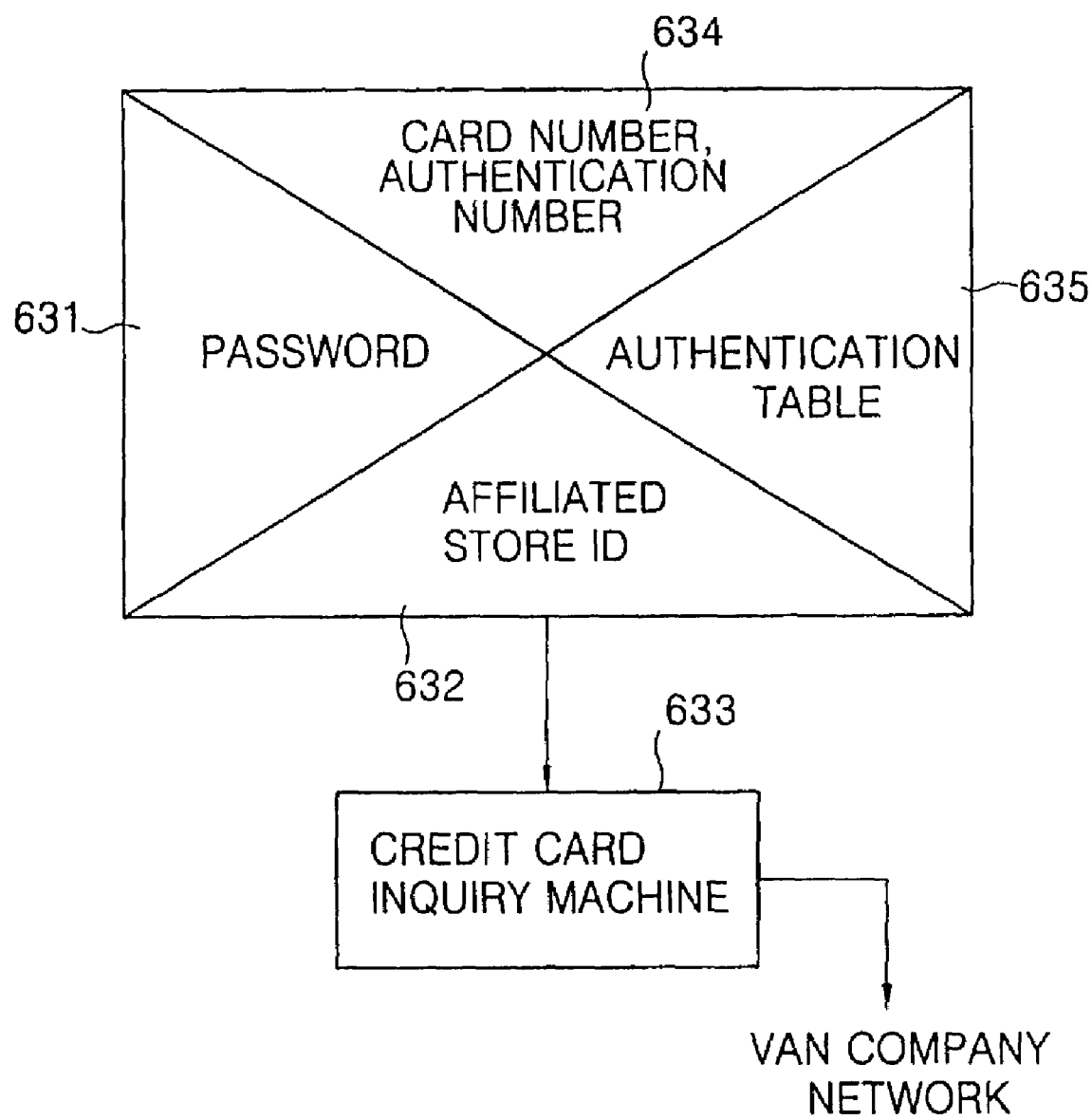
FIG. 66 is a diagram for explaining an authentication system according to the present invention.

An authentication unit is needed in order to prevent an illegal use of payment information in an optical payment commerce. As shown in FIG. 66, an optical payment unit, an affiliated store and a card company in the present invention includes an authentication unit, respectively. Also, when all these authentication units are combined with one another, the card information can be used as significant payment information. A user 631 purchases services or goods in an affiliated store and inputs his or her own controlled password into an optical payment unit in order to pay for the purchased services or goods, which can prevent others from accessing. An optical payment receiver installed in an affiliated store 632 analyzes the received signal and ascertains a contracted index table and communicates with each other to thereby control an access to services. The affiliated store 632 adds an affiliated store ID assigned to a credit card inquiry machine 633 installed in the affiliated store to credit information to then transmit the affiliated store ID added credit information to a card company 634, and has an approval request right assigned to the affiliated store 632. The card company 634 compares the card number transmitted via the credit card inquiry machine 633 and the VAN network and the authentication number transmitted together with the card number to thereby judge if the card is a card issued by a card company 634 and thus have an approval right. An optical payment dedicated gateway 635 existing between the card company 634 and the affiliated store 632 includes a self-authentication table to have an authentication right with respect to an optical payment settlement.

The secret number for authentication of a user in a portable terminal which is an optical payment unit can be exposed to others. Thus, the secret number is combined with user's bio-identification information such as the iris, face, footprint, voice, etc. In this embodiment, a user authentication using a secret number and face recognition data will be described below.

Figure 67A:
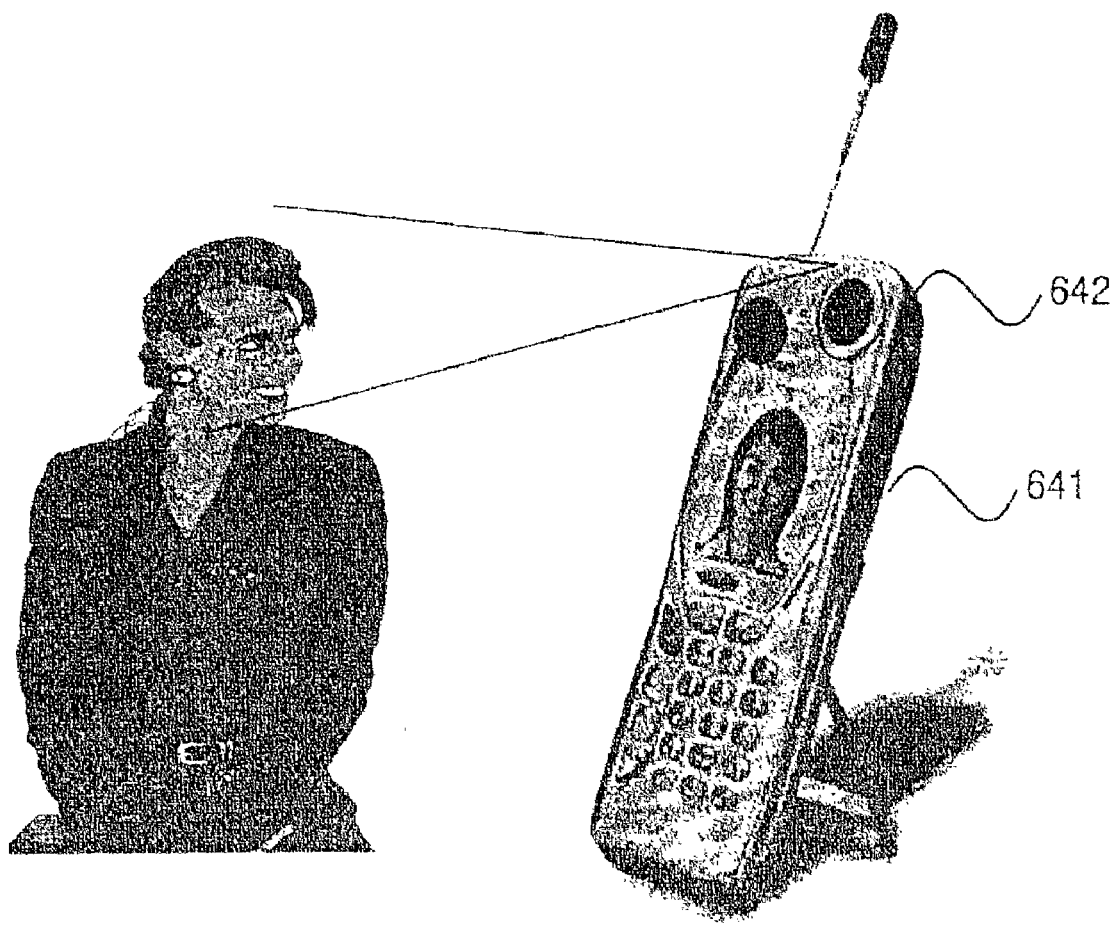
FIGS. 67A and 67B are views for explaining a process of registering user facial data in a portable terminal initially, respectively.
Figure 67B:
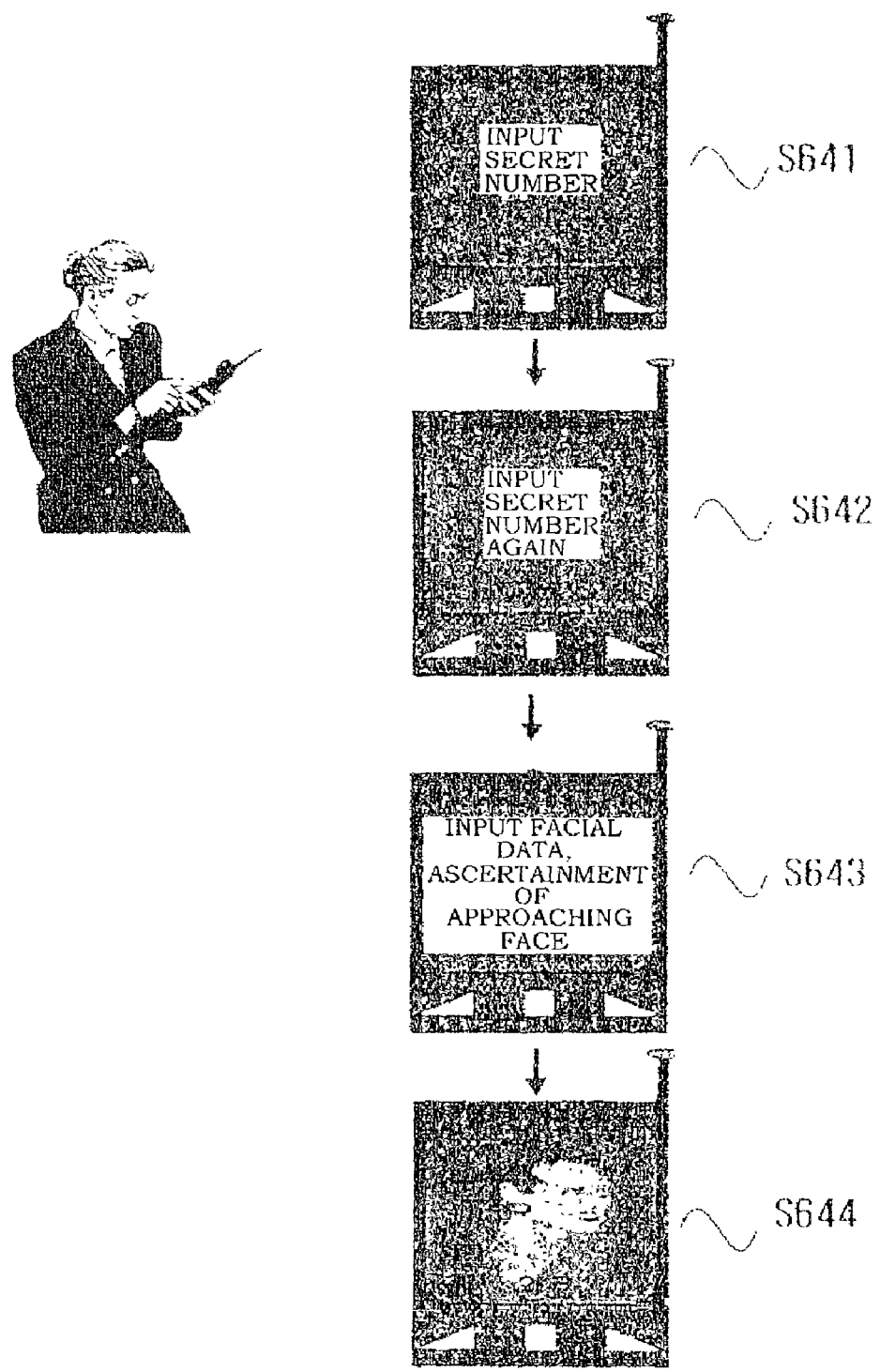

FIGS. 67A and 67B are views for explaining a process of registering user facial data in a portable terminal initially, respectively. A portable terminal 641 shown in FIG. 67A is attached with a camera 642 for photographing a user. The portable terminal 641 contains a program for extracting facial data from a user image photographed and obtained in the camera 642 and storing the extracted facial data, and then comparing the stored facial data with facial data of a person who uses the portable terminal.

In FIG. 67B, a user manipulates a menu on a portable terminal 641 such as a portable phone and a PDA and sets the portable terminal 641 into a secret number input mode. In the secret number input mode, the user inputs a secret number for accessing his or her own payment information into the portable terminal 641 (step 641). After inputting a secret number, the user re-inputs the secret number into the portable terminal 641 (step 641). If the twice sequentially input secret numbers match each other, the portable terminal 641 proceeds to a facial data input mode automatically. In the facial data input mode, the user approaches his or her own face to the camera 642 attached to the portable terminal 641 and selects a confirmation button (step 643). If the confirmation button is selected, the portable terminal 641 takes a picture of the user's face via the camera 642 and then displays the photographed face on the screen together with a completion indication (step 644). If the photograph is not satisfied, the user presses a cancel button and performs the facial data input accessing his or her own payment information into the portable terminal 641 (step 641). After inputting a secret number, the user re-inputs the secret number into the portable terminal 641 (step 641). If the twice sequentially input secret numbers match each other, the portable terminal 641 proceeds to a facial data input mode automatically. In the facial data input mode, the user approaches his or her own face to the camera 642 attached to the portable terminal 641 and selects a confirmation button (step 643). If the confirmation button is selected, the portable terminal 641 takes a picture of the user's face via the camera 642 and then displays the photographed face on the screen together with a completion indication (step 644). If the photograph is not satisfied, the user presses a cancel button and performs the facial data input procedure again.

A user authentication will be described in the case of the portable terminal 641 in which facial data has been input through the above procedure.

Figure 68A:
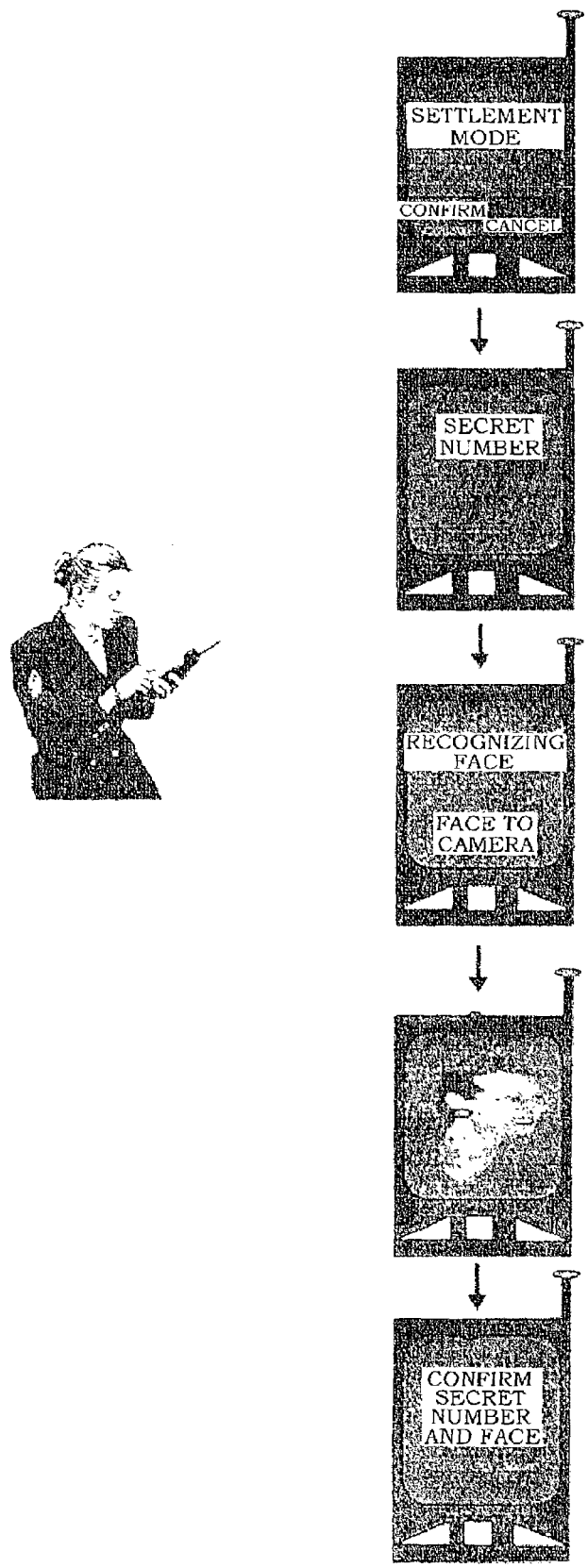
FIG. 68A is a view for explaining a user authentication process in the facial data contained portable terminal.
Figure 68B:
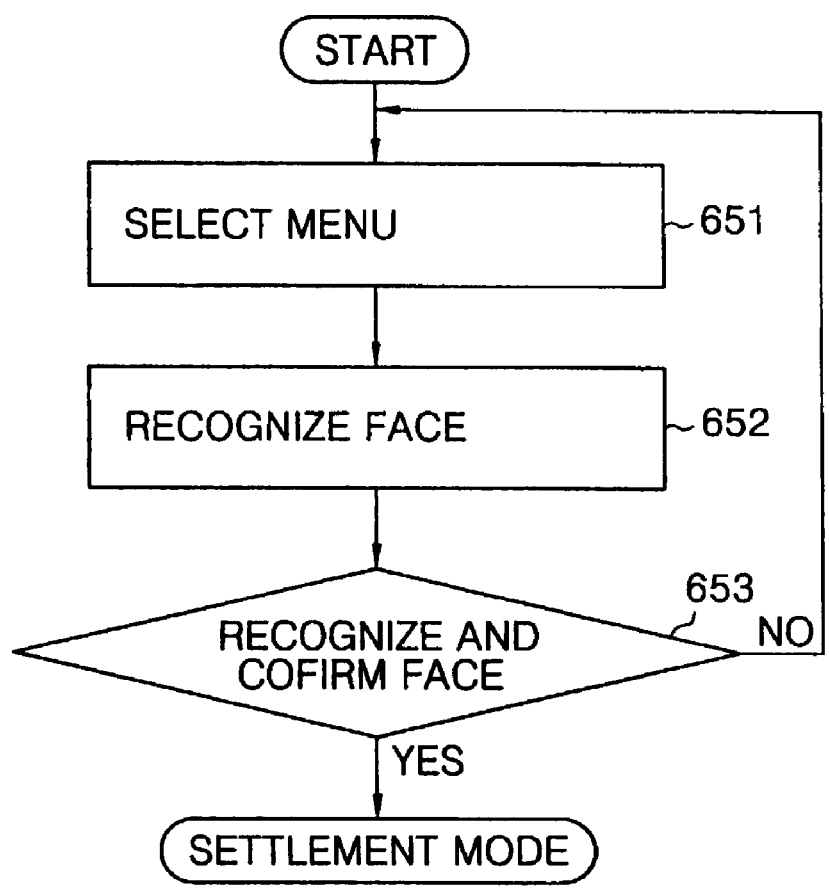
FIG. 68B is a flowchart view for explaining a user authentication process in the facial data contained portable terminal.

FIG. 68A is a view for explaining a user authentication process in the facial data contained portable terminal 641. FIG. 68B is a flowchart view for explaining a user authentication process in the facial data contained portable terminal.

A user selects a settlement mode in the portable terminal 641 and then presses a confirmation button in order to access his or her own payment information (step 651). If the portable terminal 641 is selected at a settlement mode, it displays a message for requesting the user to input a secret number on a screen as shown in FIG. 68A. Here, the user inputs a secret number. Then, the portable terminal 641 displays a message for requesting the user to approach his or her face to the camera 642 on the screen for facial recognition. Then, the user approaches his or her face to the camera 642 and then presses a confirmation button. If the confirmation button is pressed, the portable terminal 641 drives the camera 642 and the driving program, to photograph the user's face (step 652). When the user's face is completely photographed, the photographed facial data is analyzed and compared with the initially registered user's facial data (step 653). Here, if a probability error in comparison is accurate within the range of about 30%, the photographed facial data is processed in the same as the previously registered facial data. The reason is because data extracted from the facial shape has some errors according to the age or condition of the user. Thus, a case that a user is not recognized as the person in question according to the condition at that time although he or she is the person in question is avoided. If an in-person authentication is completed through the above procedure, an access to the payment information incorporated in the portable terminal 641 is accomplished. In the case that an error is above 30%, the program is performed again from the initial menu selection step. Then, in the case that the facial data does not match more than three times, the payment information is automatically stopped and a report of the loss of the corresponding portable terminal is submitted.

Next, additional services such as change in card information, termination/stoppage/loss of the card, and transaction suspension for the optical payment settlement system according to the present invention will be described.

Figure 69:
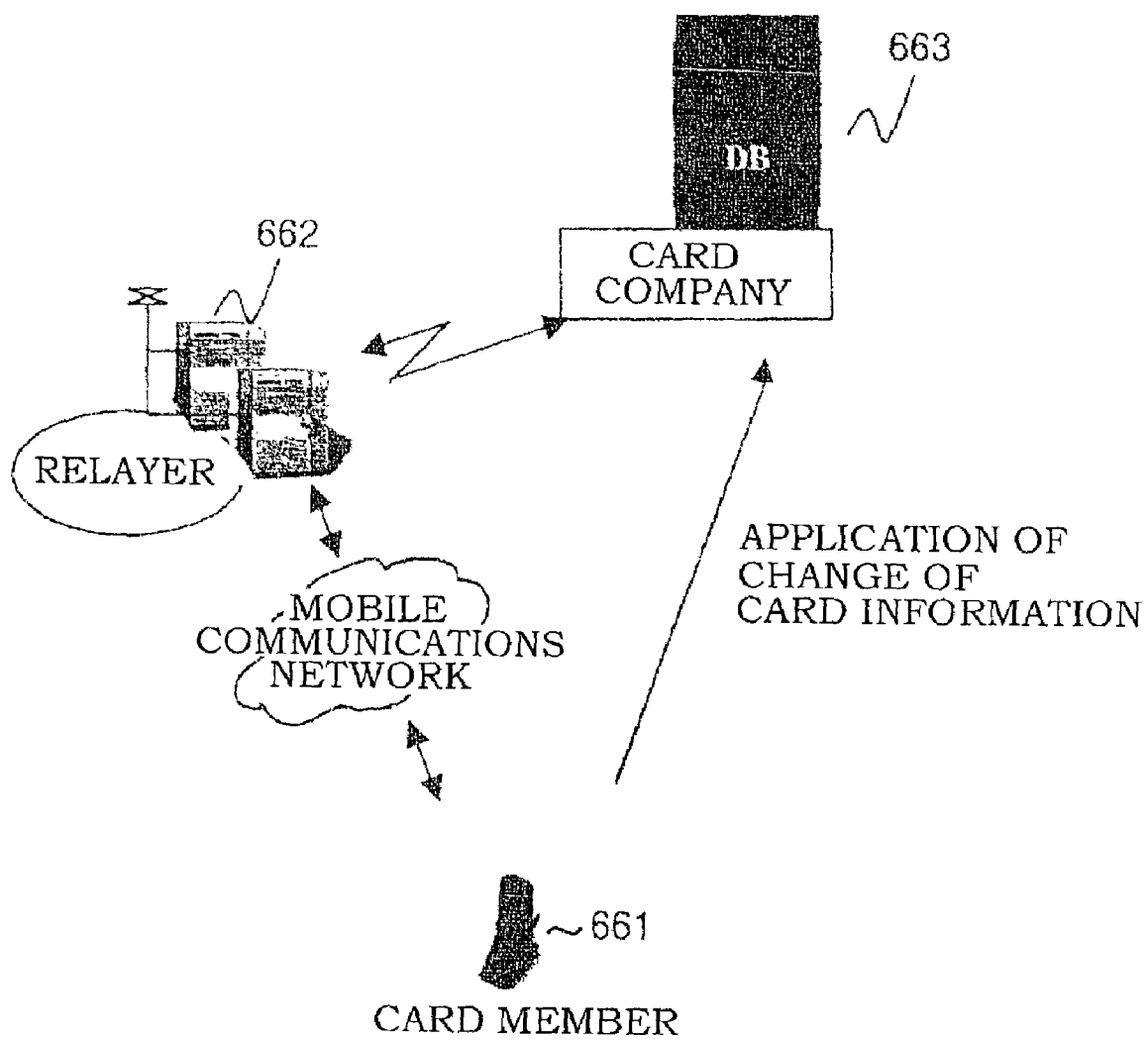
FIG. 69 shows a card information change service system provided in an optical payment settlement system according to the present invention.
Figure 70:
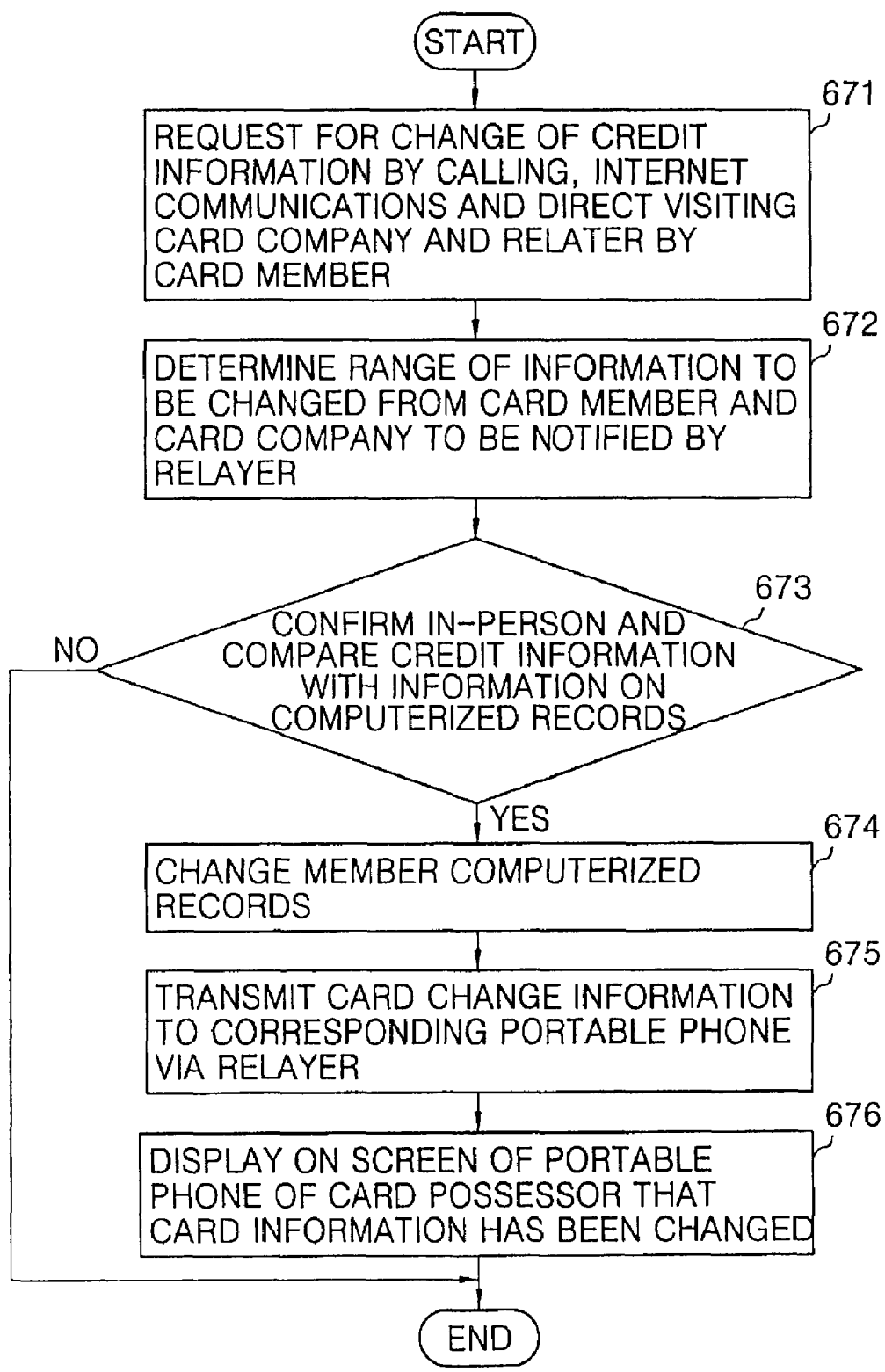
FIG. 70 is a flowchart view in the FIG. 69 card information change service system provided in an optical payment settlement system according to the present invention.

FIG. 69 shows a card information change service system provided in an optical payment settlement system according to the present invention. FIG. 70 is a flowchart view in the FIG. 69 card information change service system provided in an optical payment settlement system according to the present invention.

If an alteration cause of card information such as an address, a secret number, a contact address, and a bill recipient place occurs, a card member 661 requests for an alteration of the card information by phone, via wired or wireless Internet, or by paying a direct visit of a corresponding card company 663 or a relayer 662 (step 671). The relayer 662 having received the card information alteration application, demands on data for ascertaining the applicant is the card member 661 in person, and ascertains the contents of the card information to be changed and the card company of the card to be changed. The relayer 662 applies for an alteration of the card information by proxy of the card member 661 via the dedicated line with respect to the card company 663 in question (step 672). Here, the relayer 662 transmits authentication data necessary for identifying the person in question such as part of a secret number, a residence number and final sales approval details, to the card company 663, together with the card information alteration application. The card company 663 verifies whether the received application is an application applied by the person in question, with the in-person authentication data transmitted from the relayer 662. In the case that the card member 661 applies for an application of alteration of the card information to a corresponding card company, the card company 663 receives the in-person authentication data from the card member 661. If it has been checked that the applicant is a person in charge, the card company 663 compares the card information in a member computerized sheet registered in the card company server 663 with the card information to be changed (step 673). In the result of comparison of step 673, if both of the card information coincide with each other, the card company 663 notifies the relayer 662 that there is no change matter in the card information. The relayer 662 transmits the notified contents of the card company 663 to the card member 661 in the form of a wireless data format. In the result of comparison of step 673, if both of the card information do not coincide with each other, the card company 663 changes the card information contents on the member computer recording sheet upon request of the member (step 674). When the card information change is completed, the card company 663 notifies the relayer 662 that the card information has been completely changed. The relayer 662 transmits a message of "card information change completion" to a card substitute portable phone of a corresponding card member according to the notification of the card company (step 675). The card substitute portable phone carried by the card member displays the card information change completion message on its screen and informs the user that the card information has been changed (step 676). Thus, when the other person tries to change the card information illegally, the card holder can ascertain the illegal card information change.

Meanwhile, in the case that the card holder is registered as a person of poor credit due to theft or loss of the card, or the card use money in arrears, the card transaction needs to be suspended. In this case, there are two existing methods for checking the card transaction suspension. One method is to manage black list (B/L) information with respect to cards which need to be suspended for their transactions from the card company server in the case that the cards need to be suspended for their transactions and check whether the card is suspended if a card transaction approval request is received from an affiliated store. The other method is to download black list (B/L) information in package from a card company server by wire and store the downloaded B/L information in a card reader installed in a subway ticket gate or a bus ticket gate during use of subway or bus, and compare the input card information with the stored B/L information. In the case of these methods, it takes long time to check a B/L and burdens the subway or bus card reader to store B/L data. Thus, in the case of a card which needs to suspend transactions, the card company transmits transaction suspension information to a portable phone which is used as an optical payment unit in the form of a wireless data format using a mobile communications method and registers the transaction suspension information in the portable phone, to thereby prevent the portable phone from being used as the optical payment unit. This process is shown in FIG. 71.

Figure 71:
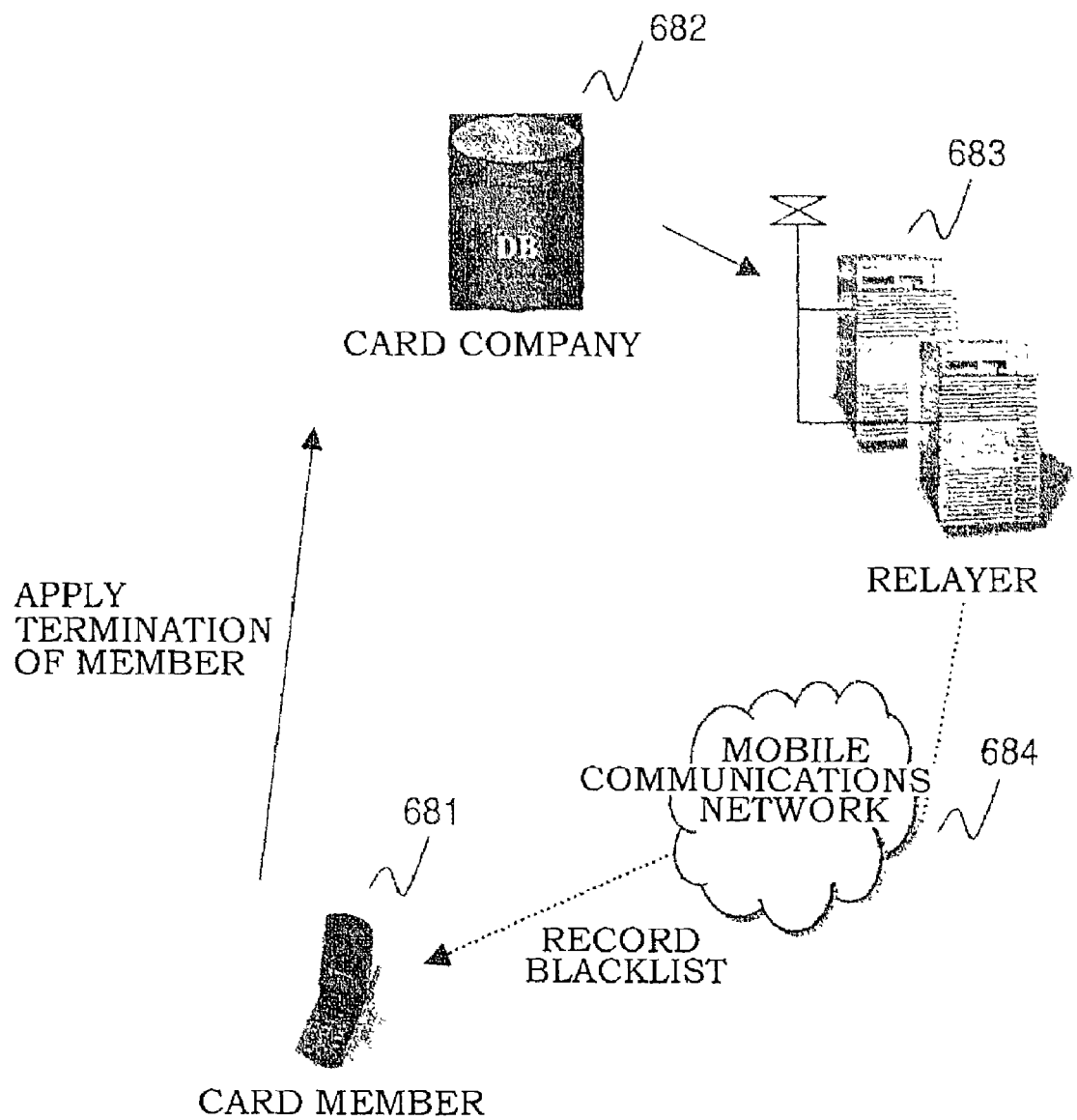
FIG. 71 shows a card dealing suspension system according to the present invention.

FIG. 71 shows a card dealing suspension system according to the present invention. The system shown in FIG. 71 includes a card member 681, a card company 682, a relayer 683 and a mobile communications network 684. The card member 681 purchases a portable wireless communications terminal such as a portable phone and a PDA for financial settlement and participates as a card member in a card company. The card company 682 includes companies each issuing a direct payment card, a advance payment card, a credit card and an electronic money. The relayer 683 is a company which provides card information and other financial information to the card member 681 upon agreement of the card member 681 in which the relayer 683 contracts with the card company 682 and other financial authorities. The mobile communications network 684 is a network for transmitting data to particular wired or wireless communications terminals designated by the relayer 683 via a dedicated line from the relayer 683 by the contract between the mobile communications company and the relayer 683. In this system, operations of registering B/L data for registering transaction suspension of cards having a transaction suspension causes in a terminal carried by the card member and suspending the transactions will be described in detail with reference to FIGS. 72 and 73.

Figure 72:
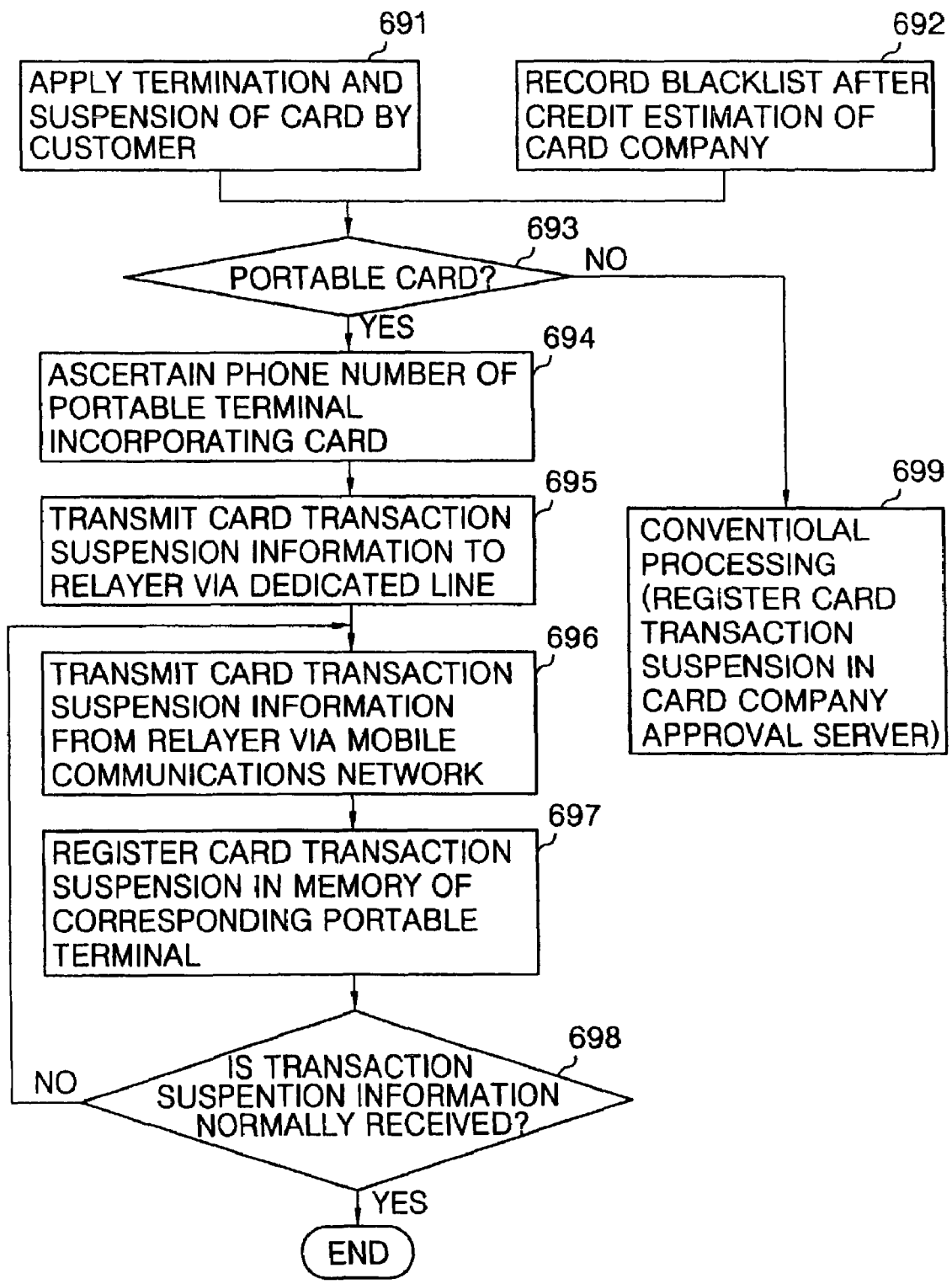
FIG. 72 is a flowchart view for explaining a card B/L registration method in the FIG. 71 system.
Figure 73:
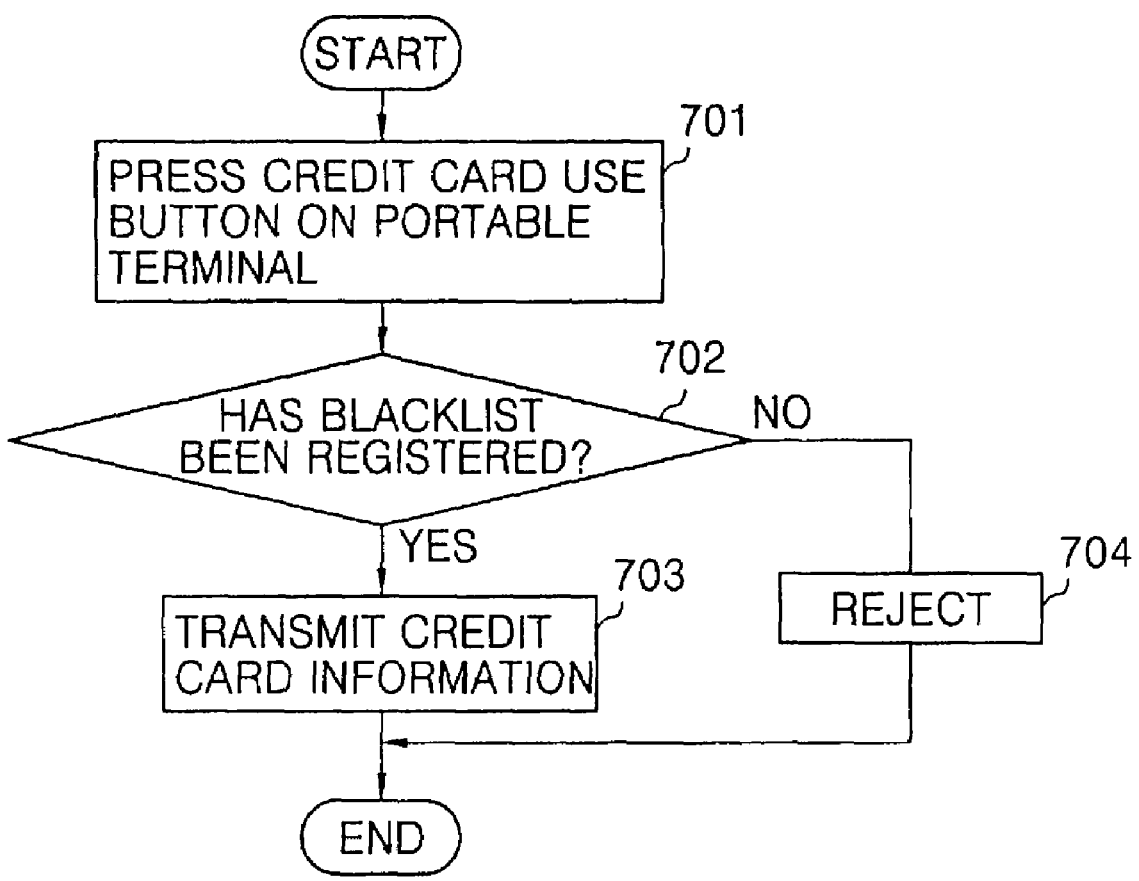
FIG. 73 is a flowchart view for explaining a card dealing suspension method in the FIG. 71 system.
Figure 74:
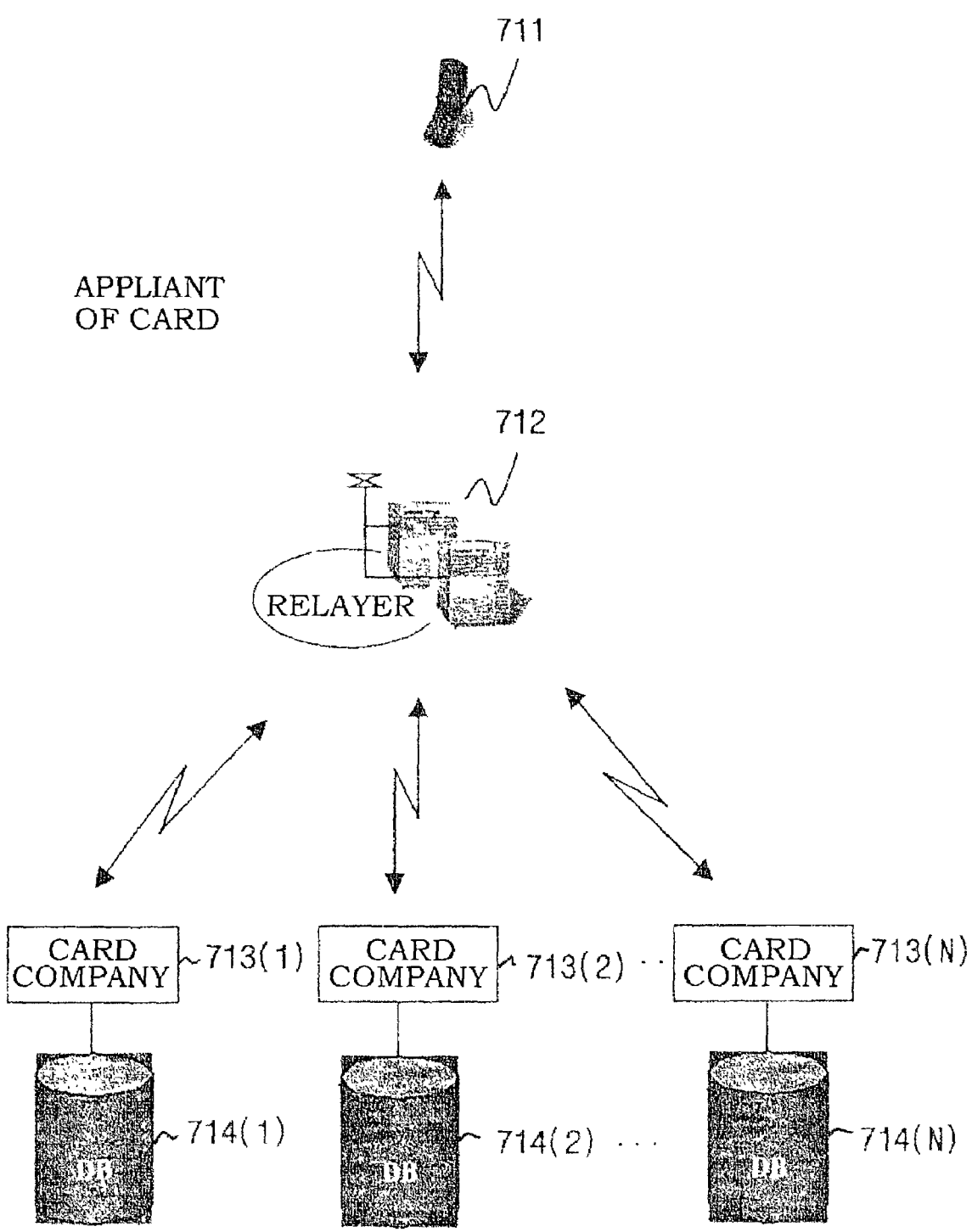
FIG. 74 is a configuration view showing a card loss service system provided in an optical payment settlement system according to the present invention.
Figure 75:
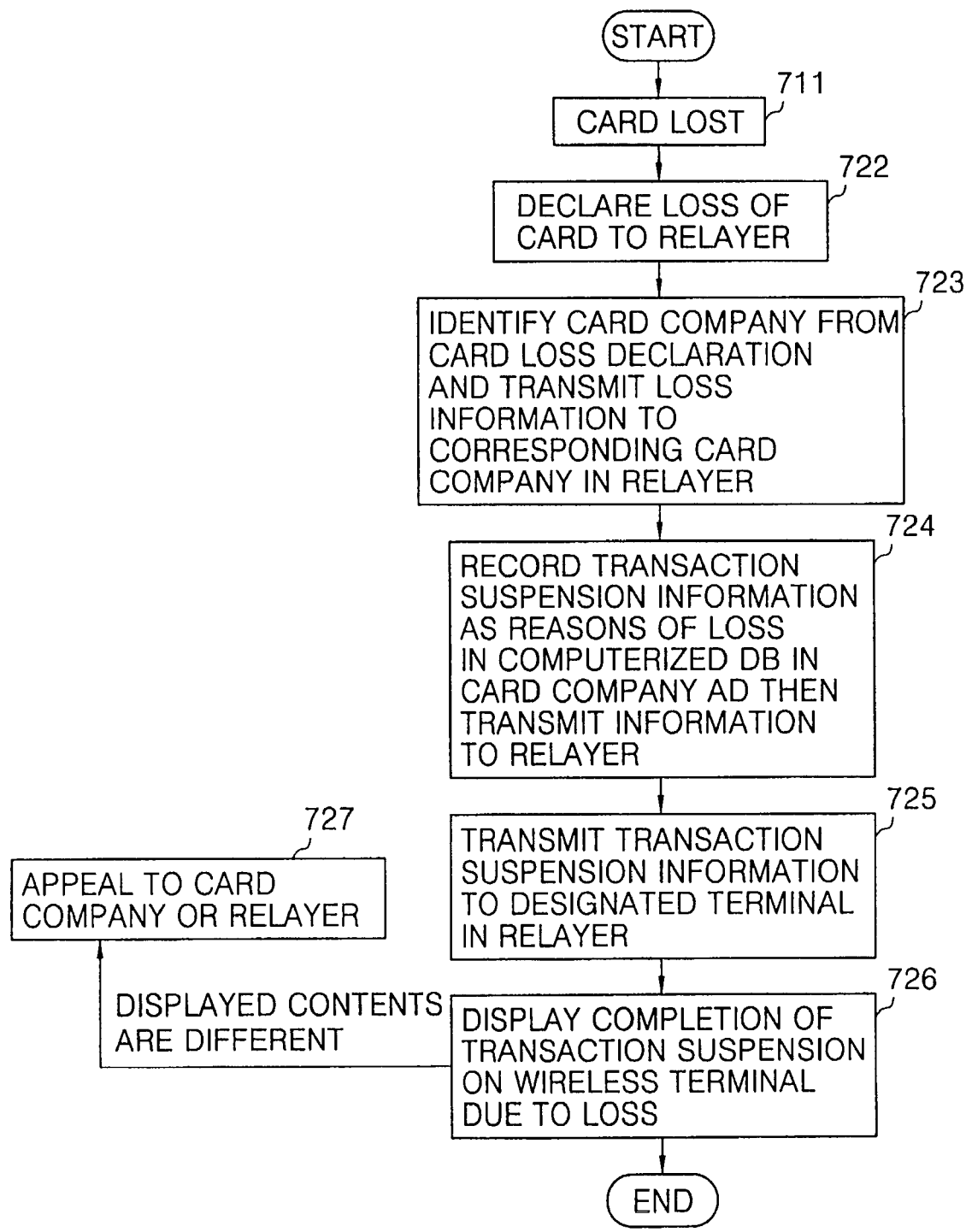
FIG. 75 is a flowchart view for explaining an operation in the FIG. 74 card loss service system.

FIG. 72 is a flowchart view for explaining a card B/L registration method in the FIG. 71 system. FIG. 73 is a flowchart view for explaining a card dealing suspension method in the FIG. 71 system.

If a customer applies withdrawal or stoppage of a card (step 691) or is registered as a person of poor credit called a B/L person in the result of a credit estimation in the card company 682 (step 692), it is judged whether the card is a card incorporated in the portable phone or PDA (step 693). If the card is a card incorporated in the portable terminal in the result of judgement of step 693, the card company 682 ascertains a phone number of the portable terminal having an incorporated card (step 694), the card suspension information is transmitted to the relayer 683 via the dedicated line (step 695). The relayer 683 calls a corresponding portable terminal 681 by the ascertained phone number via the mobile communications network 684 and transmits the transaction suspension information (step 696). Here, the transaction suspension information is transmitted in the form of a wireless data format. The corresponding portable terminal 681 receives the transaction suspension information and registers the B/L data in a memory incorporated therein or card information stored in the detachable IC card (step 697). The portable terminal 681 having received the transaction suspension information sends a response signal to the card company 682 and enables the card company 682 to judge whether the transaction suspension information is normally input. The card company 682 judges whether the transaction suspension information is input in the portable terminal 681 normally (step 698), and if the transaction suspension information is not input normally, the card company 682 repeatedly performs the steps starting from step 696 so that the card transaction suspension information is re-transmitted. Meanwhile, if the card is not a portable card in the result of judgement of step 693, the card company 682 processes in the same manner as the existing card (step 698). That is, the card transaction suspension information is registered in the card company approval server.

The method for suspending the transactions during a card substitute use of the portable terminal 681 registered as the B/L data will be described in detail with reference to FIG. 73.

When the card substitute portable terminal 681 holder presses a credit card use button of the portable terminal 681 and transmits the credit information in order to pay for cost of the service (step 701), a controller in the portable terminal 681 ascertains whether the card is registered as B/L card (step 702). If the card is registered as the B/L data, the controller in the portable terminal 681 rejects the transaction by display of an error message on a display screen in the portable terminal 681 (step 704) and completes the program. If the card is not registered as B/L data in the result of ascertainment of step 702, the portable terminal 681 transmits the incorporated credit information to the card information reception portion (step 703) and completes the program.

With the above transaction suspension method, in a petty cash transaction performed without approval of transaction, that is, traffic transactions in facilities such as paid roads, buses, subways, and parking rots, vending machines, and a small-money electronic commerce, a B/L check is performed in the card substitute portable terminal during use of the credit card with the portable terminal. Accordingly, the processing speed of the card substitute portable terminal is faster than that of comparing the B/L data downloaded from the card company server in package by wire in a card reader one by one, and the system running cost of the former is cheaper than that of the latter. information representing that the card has been lost, to the card company 713 except for the cards which are not lost by the card member among the extracted card numbers, together with the in-person authentication information via the dedicated line (step 723). The card company 713 ascertains the in-person authentication information among the received information to thereby ascertain that the card holder is a true card possessor. In this case, the card company 713 records the transaction suspension due to the loss of the card in a computer DB 714, and transmits the transmits the recorded information to the relayer 712 (step 724). The relayer 712 transmits the transaction suspension information received from the card company 713 to a wireless terminal 711 designated by the card member in the form of a wireless data format (step 725). The wireless terminal 711 displays the transaction suspension completion due to loss on a display screen and makes the card member see that the loss of card is declared and processes (step 726). If the displayed contents are not correct, the card member appeals the card company 713 or the relayer 712 (step 727).

As such, if the card transaction suspension is performed due to the card loss, the payment information transmission of the lost portable terminal is stopped. Also, the communications function of the portable terminal can be stopped through the mobile communications company, to thereby make the portable terminal disabled.

By the way, the illegal use of the card having occurred before declaring the card loss or theft is not easily accepted by the card company although an appeal is filed by the card member, which causes a dispute. In order to prevent such a dispute in advance, a method for transferring transaction details by use of various payment information incorporated in the portable terminal to a user portable terminal is proposed in the present invention.

Figure 76:
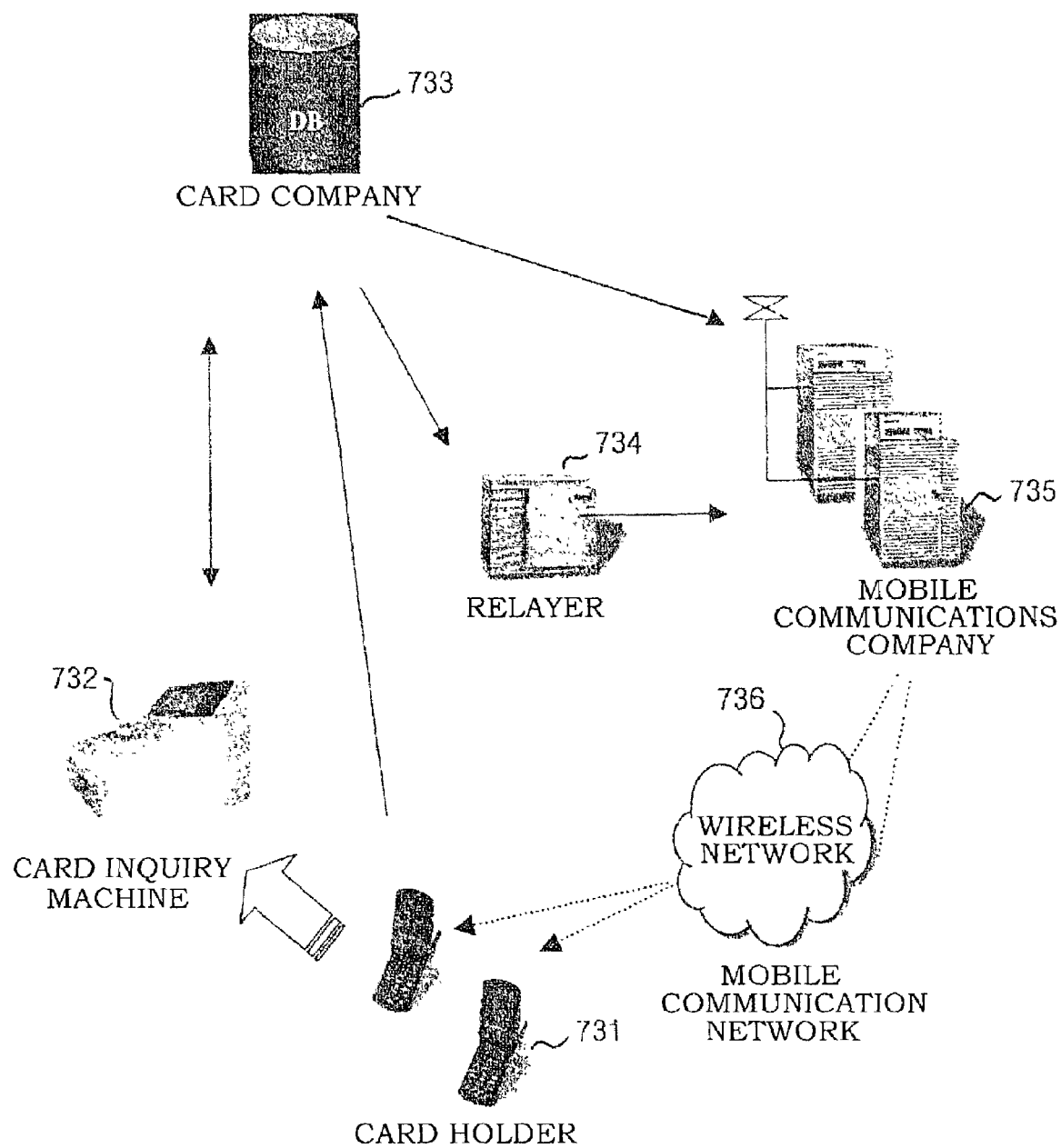
FIG. 76 is a configuration view showing a use details wireless transfer system provided in an optical payment settlement system according to the present invention.
Figure 77:
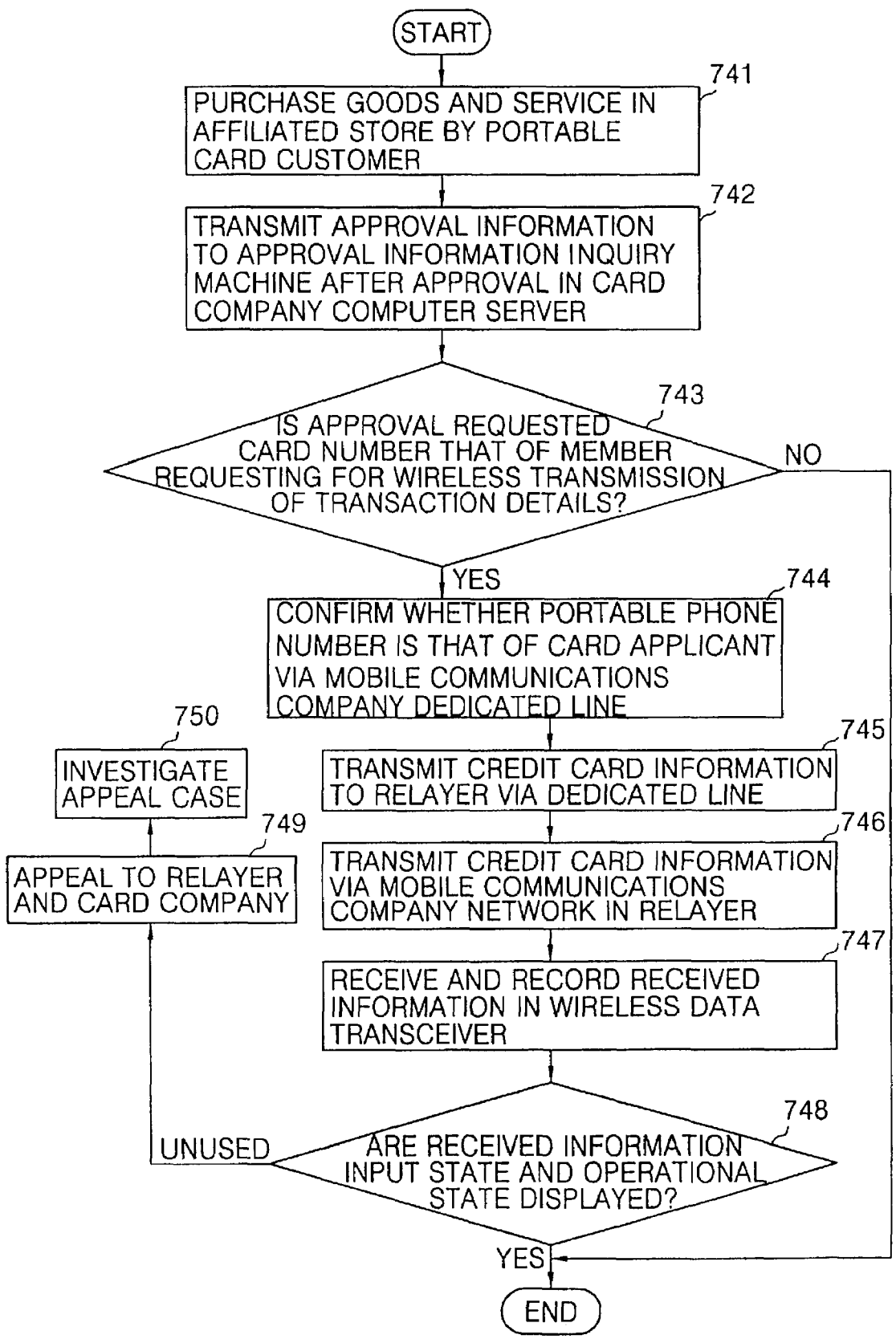
FIG. 77 is a flowchart view for explaining an operation in the FIG. 76 use details wireless transfer system.

FIG. 76 is a configuration view showing a use details wireless transfer system provided in an optical payment settlement system according to the present invention. FIG. 77 is a flowchart view for explaining an operation in the FIG. 76 use details wireless transfer system.

A customer purchases goods or services in an affiliated store (step 741), and payment information for optical settlement is transmitted. Then, a card inquiry machine 732 sends an approval request to a card company 733. The card company 733 checks remainder limitation and transaction suspension of the approval requested card. If there is no abnormality, the approval signal is transmitted to the card inquiry machine 732 (step 742). Also, the card company 733 ascertains whether a member of an approval requested card number is a member who applies for receiving approval details wirelessly (step 743). If it is ascertained that the member of the card number is a member who does not apply for receiving the approval details, the program is completed. If it is ascertained that the member of the card number is a member who applies for receiving the approval details, and the approval is a firstly generated approval after application of the approval, it is ascertained whether the card member is a possessor of a wireless data transceiver 731 such as a portable phone, a PDA, and a beeper through which the card member wishes to receive the approval details via the dedicated line connected to a mobile communications company 755 (step 744). If it is ascertained that the card member is a possessor of the mobile data transceiver 731, the card company 733 transmits the approved details such as a sales generated time, sales amount, affiliated store name, and part of the card number to a relayer 734 via the dedicated line (step 745). The relayer 734 uses a communications network 736 of the mobile communications company 735 and transmits the approved details transmitted from the card company 733 by e-mail or by a wireless transmission method (step 746). The wireless data transceiver 731 designated to receive the approved details by the card member receives and records the approved details by e-mail, wireless data transmission method, or WAP (step 747), displays the approved details on a screen to receive a confirmation from the card member (step 748). If approved details are transmitted to his or her wireless data transceiver 731, although he or she does not use the card, the card member appeals that such sales are illegal sales to the relayer 734 or the card company 733 and requests for taking a proper action (step 749). If such an appeal is raised, the relayer 734 transmits the appeal information to the card company 733, immediately. The card company 733 starts to investigate the received appeal (step 750).

In addition, the present invention presents a system for leasing an optical payment unit and settling all purchase-related amount. This is more effective if the rental service of the optical payment unit is applied to a business place for an attendance as in a theme park.

Figure 78:
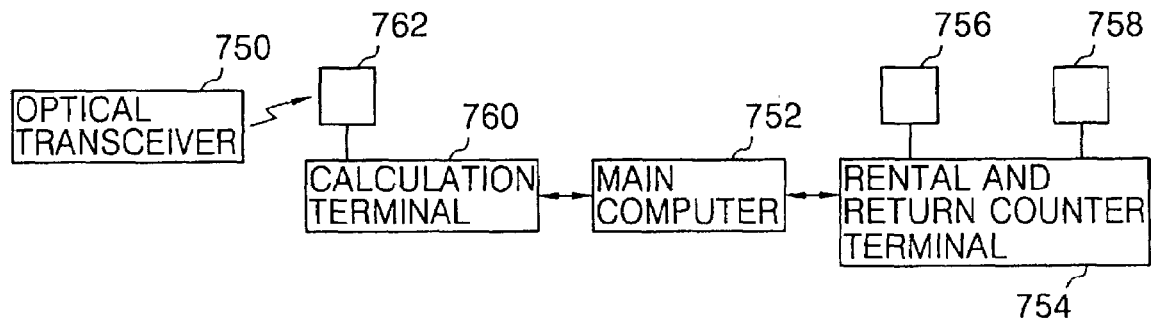
FIG. 78 is a block diagram showing a settlement system using a rental type optical payment unit according to the present invention.
Figure 79:
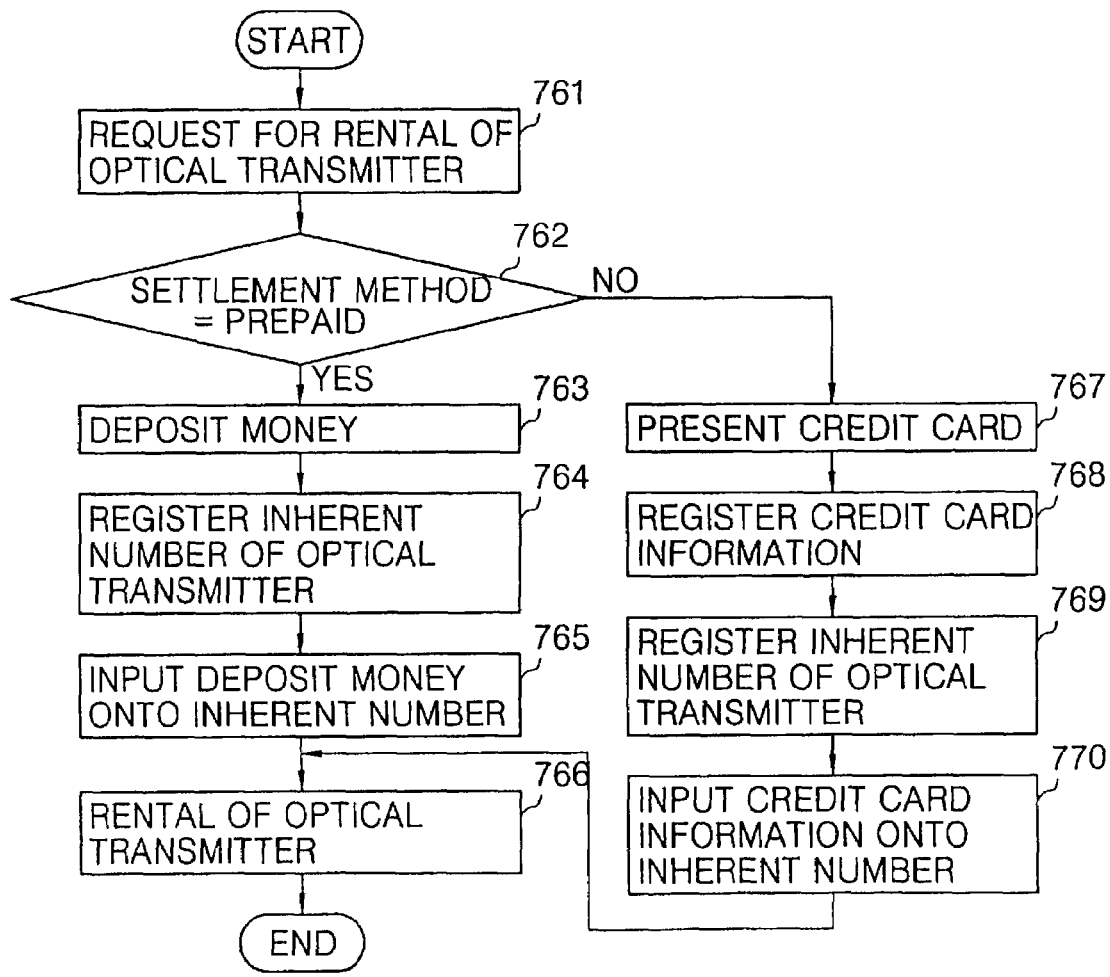
FIG. 79 is a flowchart view for explaining a rental process of an optical transmitter.

FIG. 78 is a block diagram showing a settlement system using a rental type optical payment unit according to the present invention. A system shown in FIG. 78 includes an optical transmitter 750, a counter terminal 754 for registering rental and return of the optical transmitter 750, a calculation terminal 760 for inputting a transaction amount in which an optical receiver 762 is attached, and a main computer 752 for ascertaining an inherent number input from the calculation terminal 760 and the transaction amount and performing settlement of the transaction amount. Here, the optical transmitter 750 employs an IC chip in which an inherent number is registered therein, and converts the inherent number registered in the IC chip into an optical signal to then transmit the optical signal. Also, the optical transmitter 750 is fabricated into a portable size so that a user carries it conveniently. The calculation terminal 760 is located in a calculation stand in a restaurant or stall which sells food or goods, and is attached with the optical receiver 762. The counter terminal 754 is installed in an entrance and exit gate in a game resort, etc., or in a predetermined place in the game resort, and is attached with an optical receiver 756 and a card reader 758 for ascertaining credit card information. An operation of the settlement system using a rental type optical payment unit of FIG. 77 having the above configuration will be described in detail with reference to FIGS. 79 to 82.

If a user wishes to use an optical settlement system of the present invention when the user enters a game resort such as a theme park or in a zoo, or after entrance there, the user goes to a rental counter located in the entrance and exit gate or park, for leasing the optical transmitter 750, and requests for rental of the optical transmitter 750 (step 761). The user can select his or her desired settlement method (step 762), in which there are a prepaid type for depositing a predetermined amount of money and a credit card type using a credit card as a settlement method. If a user selects a prepaid settlement method, the user deposits an amount of money to be consumed and a guarantee money of the optical transmitter 750 (step 763). A clerk in the counter selects one among various optical transmitters 750 which are kept in custody and then transmits an inherent number registered in the IC chip incorporated in the optical transmitter 750 toward the optical receiver 756 attached to the counter terminal 754. The optical receiver 756 receives the inherent number transmitted from the optical transmitter 750 and outputs the same to the counter terminal 754 (step 764). The clerk key-inputs an amount of the user deposited and consumable money into the inherent number of the optical transmitter 750 which is input into the counter terminal 764 (step 765). Then, the corresponding optical transmitter 750 becomes an enabling state which can be used by the user and the key input value is input to the main computer 752. The clerk ascertains the usable state via the counter terminal 754 and then rents the optical transmitter 750 to the user (step 766).

If a user selects a credit card settlement method in step 762, the carried credit card is presented to a clerk in the counter (step 767). The clerk puts the credit card into a card reader 758 attached to the counter terminal 754 and registers the credit card information of the user into the counter terminal 754 (step 768). Then, an inherent number of an optical transmitter 750 to be rent to the user is input into the counter terminal 754 in the same manner as that of the prepaid settlement method (step 769), and matches the inherent number with the credit card information (step 770). Then, the corresponding optical transmitter 750 becomes a usable state and the state value is input to the main computer 752. Then, the clerk ascertains the input results and rents the optical transmitter 750 to the user (step 766).

Figure 80:
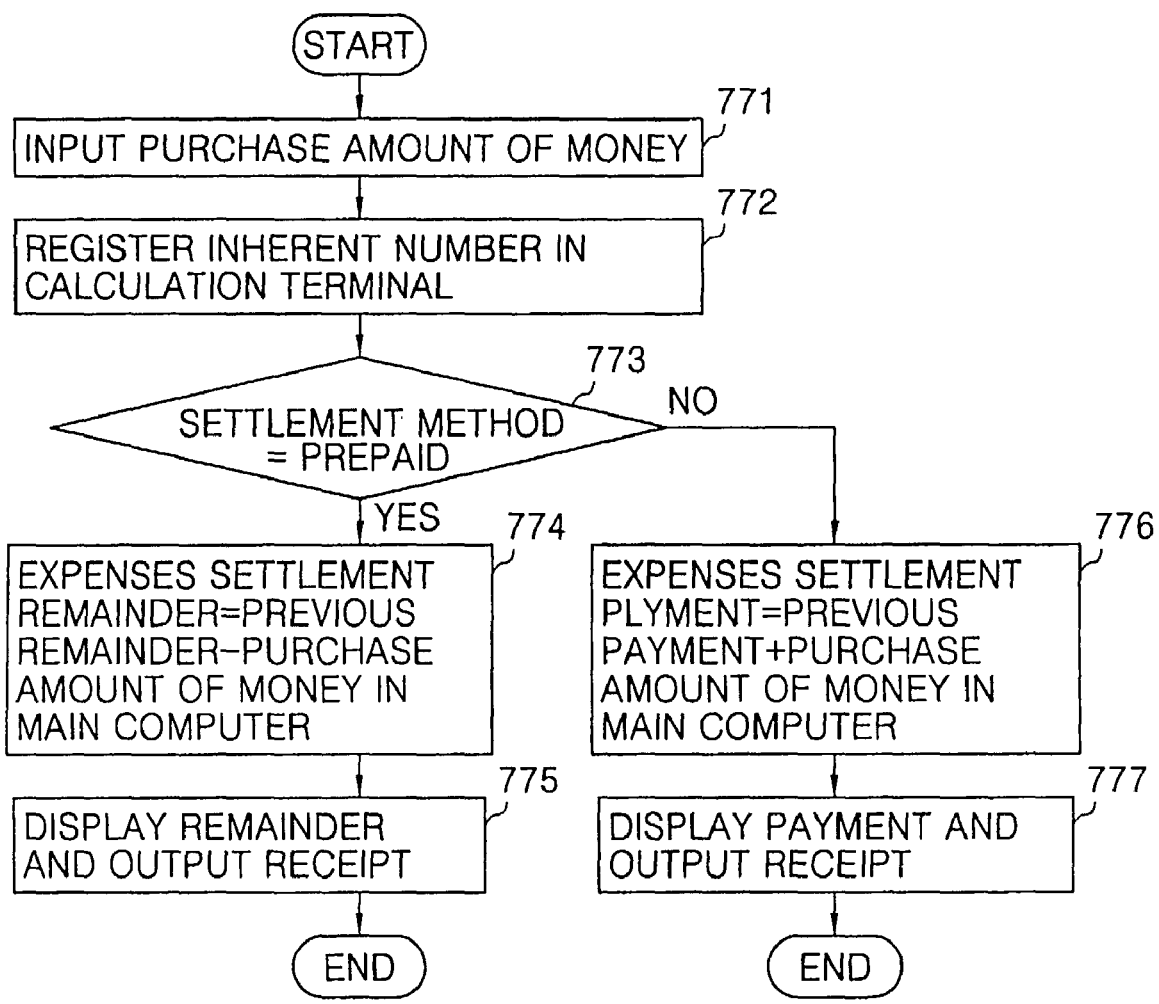
FIG. 80 is a flowchart view for explaining a settlement process in the FIG. 78 system.

FIG. 80 is a flowchart view for explaining a settlement process in the FIG. 78 system.

When a user rents an optical transmitter 750 and then wishes to go to a restaurant or purchases goods, a clerk in the restaurant or store key-inputs a transaction amount into the calculation terminal 760 (step 771). Then, the user transmits the inherent number of the carried optical transmitter 750 toward the optical receiver 762 attached to the calculation terminal 760, so that the inherent number is input into the calculation terminal 760 (step 772). the main computer 752 receives the transaction amount of money and the inherent number of the optical transmitter 750 from the calculation terminal 760 and checks a settlement method (step 773). If the settlement method is a prepaid type, the main computer 752 subtracts the transaction amount of money from the usable amount of money and settles the transaction amount of money (step 774). The main computer 752 outputs a usable remainder amount of money to the calculation terminal 760 and the calculation terminal 760 displays the usable remainder amount of money and simultaneously outputs a receipt (step 775). If the settlement method is a credit card type, the main computer 752 accumulates the transaction amount of money and settles the accumulated amount of money (step 776). The main computer 752 outputs a current total of transaction amount of money to the calculation terminal 760, and the calculation terminal displays the total transaction amount of money and simultaneously outputs a receipt (step 777).

Figure 81:
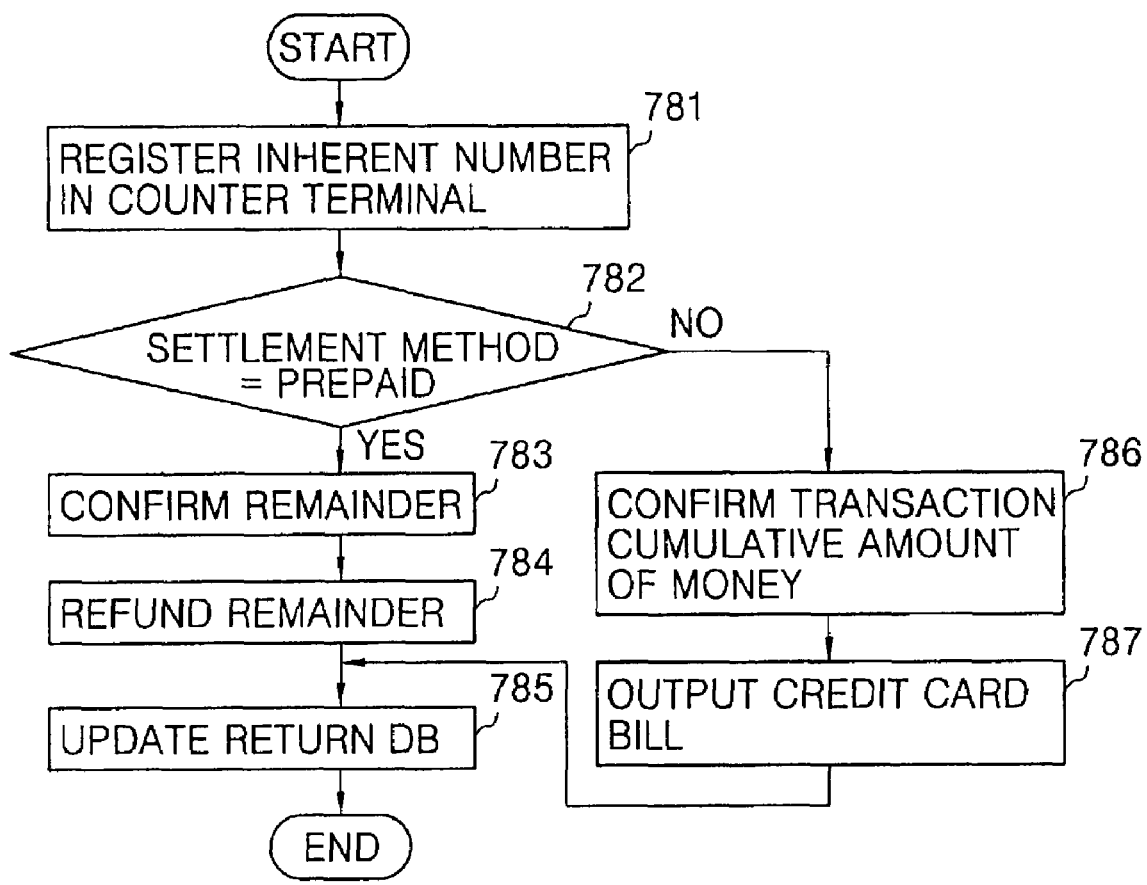
FIG. 81 is a flowchart view for explaining a return process of an optical transmitter.

FIG. 81 is a flowchart view for explaining a return process of an optical transmitter 750. When a user who rents an optical transmitter 750 leaves a theme park, the rent optical transmitter 750 is returned. a clerk in the rental and return counter receives the optical transmitter 750 from the user and then transmits the inherent number of the optical transmitter 750 to the optical receiver 756 attached to the counter terminal 754 to input a return state (step 781). Then, the settlement method is selected (step 782). In the case of a prepaid settlement method, the main computer 752 ascertains an amount of money remaining in the corresponding inherent number in response to the input return signal and then outputs the ascertained result to the counter terminal 754 (step 783). The clerk refunds the ascertained amount of remainder money and the guarantee money of the optical transmitter 750 to the user and the transmits a return completion signal to the main computer 752 (step 784). The main computer 752 aligns the return database in response to the return completion signal (step 785). Meanwhile, in the case of the credit card type, the return process is much simpler than that of the prepaid type. The main computer 752 outputs a total amount of transaction money of the corresponding inherent number to the counter terminal 754 in response to the input return signal (step 786), and the counter terminal 754 automatically outputs a card bill with respect to the total amount of transaction money (step 787). The return state of the optical transmitter 750 is indicated on the card bill. Here, the main computer 752 aligns the return database immediately (step 785).

Figure 82:
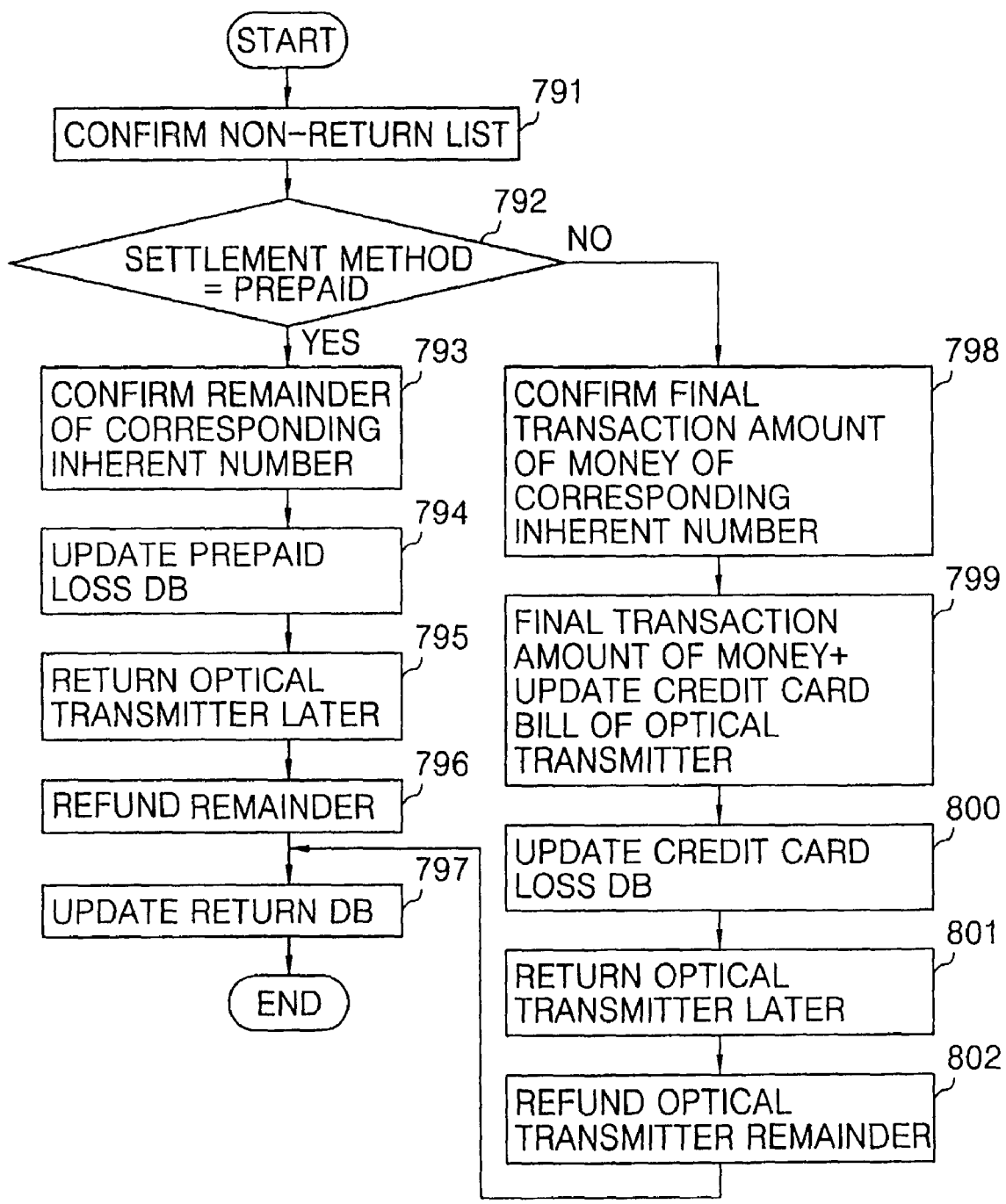
FIG. 82 is a flowchart view for explaining a non-return process of an optical transmitter.

FIG. 82 is a flowchart view for explaining a non-return process of an optical transmitter 750. When all attendance leave and a predetermined time elapses, the main computer 752 compares the rental database with the return database with respect to the rental optical transmitters 750 and ascertains a list of the non-return optical transmitters 750 (step 791). Then, a settlement method is checked (step 792). In the case of a prepaid type, the main computer 752 ascertains an amount of remainder money of the inherent number of the non-return optical transmitter 750 (step 793), and registers the corresponding inherent number in a prepaid type loss database (step 794). Then, when the non-return optical transmitter 750 is returned (step 795), the amount of remainder money registered in the prepaid loss database is returned (step 796), and the return database is aligned (step 797). In the case of the credit card type, the main computer 752 ascertains the final amount of the transaction money of the non-return inherent number (step 798), and adds the amount of money of the optical transmitter 750 to the ascertained amount of transaction money and aligns the credit card bill (step 799). Then, the main computer 752 registers the corresponding inherent number in the credit card type loss database (step 800). If the lost optical transmitter 750 is returned (step 801), only the amount of charged money of the optical transmitter 750 is refund (step 802), and the return database is aligned (step 797). In order to reduce the non-return of the optical transmitter 750, a method can be used that a predetermined amount of penalty money should be paid in the case of the non-return according to a contract with the rental users.

The above-described rental concept can be extended to an overseas use as well as a domestic use. Although such a system for embodying an optical payment settlement method is not described specifically, it can be understood by one skilled in the art based on the present invention.

Meanwhile, although the above-described embodiments have been described only with respect to a financial transaction system, the present invention can be applied to a system requiring an entrance and exit security management such as in a company or governmental office. A conventional entrance and exit security system chiefly uses a non-contact type RF-ID card. The conventional non-contact RF-ID card relies on imported components, and the size of the maximum data which can be stored is limited to 96 bits. The conventional non-contact RF-ID card requires a separate device for issuing cards. Also, in order to enter and exit various offices controlling entrance and exit of persons, the persons should additionally carry the cards as many as the number of the offices to enter and exit. Thus, the present invention inputs personal identification information including a name, an employee number, a in-service department into a personal portable terminal such as a portable phone and a PDA containing an optical transceiver. The personal identification information contained portable terminal is used as a personal identification unit, which substitutes a card for an entrance and exit security system.

Figure 83:
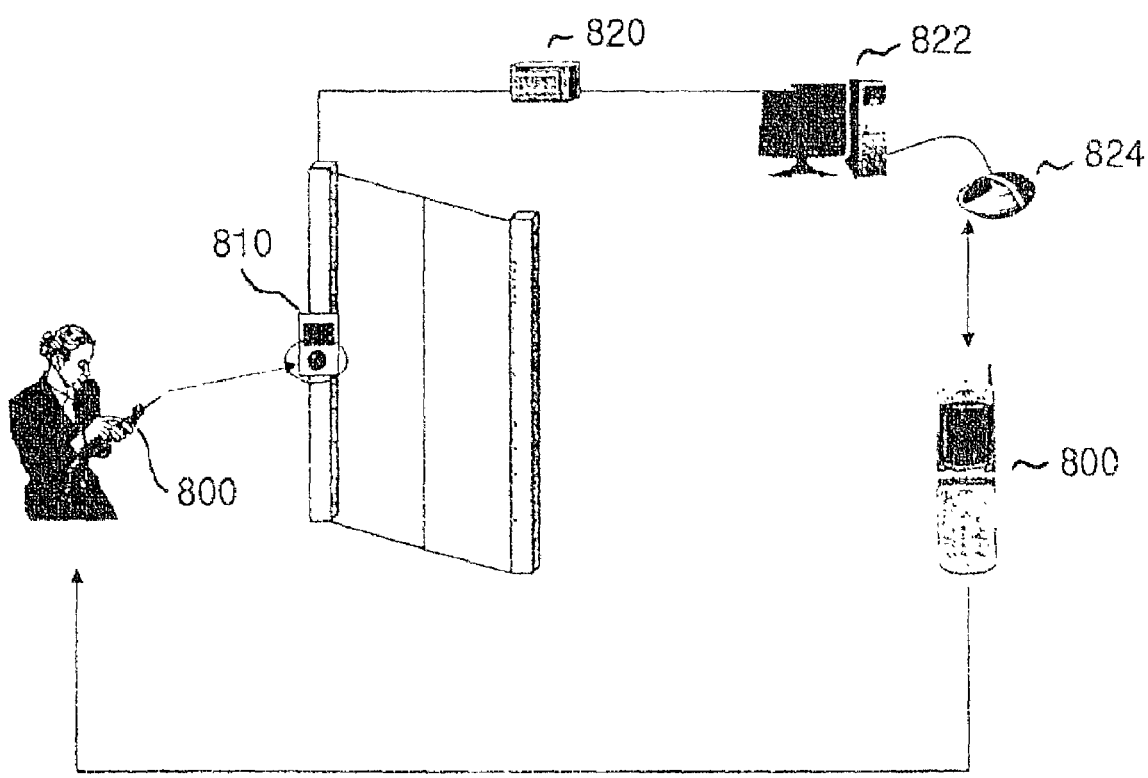
FIG. 83 is a configuration view showing an entrance/exit security system using an optical transceiver according to the present invention.
Figure 84:
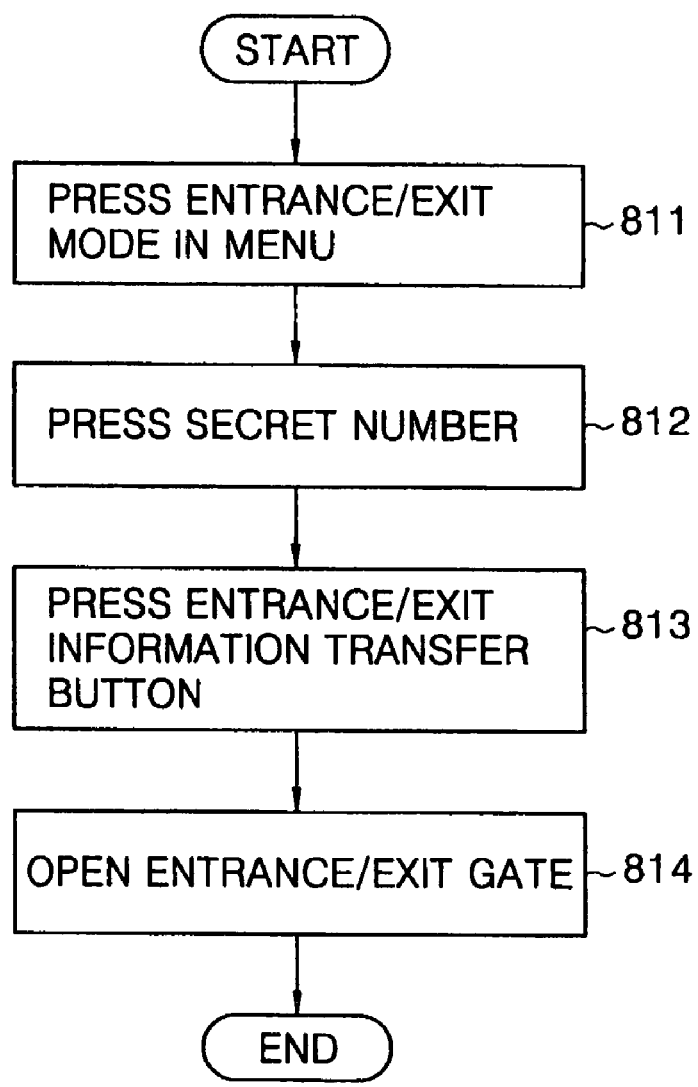
FIGS. 84 and 85 are flowchart views for explaining an entrance/exit control process in the FIG. 83 system, respectively.
Figure 85:
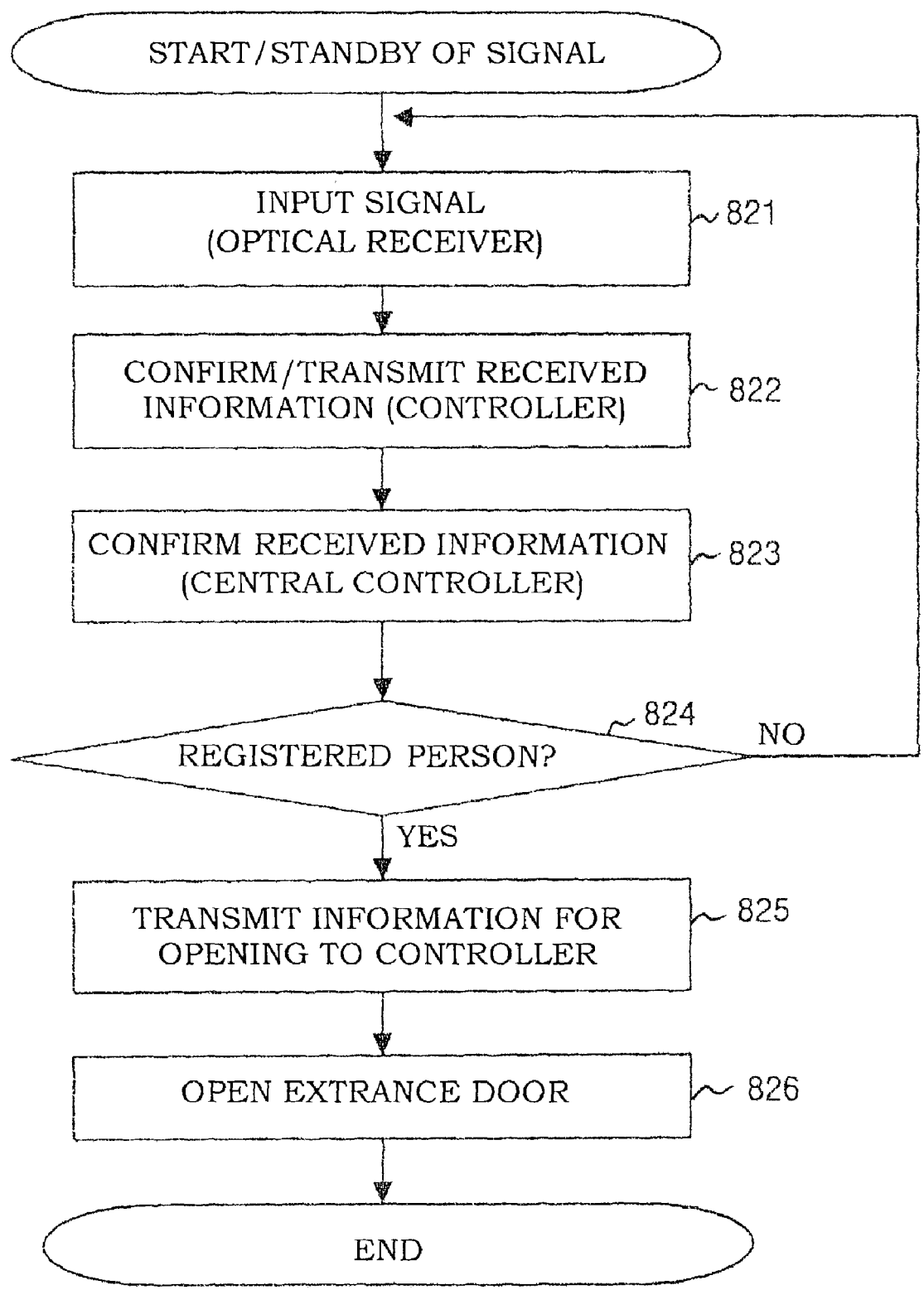

FIG. 83 is a configuration view showing an entrance/exit security system using an optical transceiver according to the present invention. A system shown in FIG. 83 includes an optical transceiver 800 which is a personal identification unit and an entrance/exit optical receiver 810 attached to the entrance/exit gate, for receiving an inherent ID optically transmitted from the optical transceiver 800. The inherent ID is personal identification information. A controller 820 is connected to the optical receiver 810 and adds necessary information of the entrance/exit gate identification information to the received inherent ID to thereby transmit the added result to a central controller 822. The central controller 822 includes a controlling DB where inherent IDs with respect to the admitted visitors are registered. An operation of controlling the entrance/exit in the FIG. 83 system having the above configuration, will be described through FIGS. 84 and 85.

A user's entrance/exit information should be input to the central controller 822, in order to enter and exit an entrance/exit gate. In this process, the optical transceiver 800 is directed toward the optical receiver 824 connected to the central controller 822 and then inherent ID input in the optical transceiver 800 is optically transmitted. The optical receiver 824 receives the inherent ID transmitted from the optical transceiver 800 and transmits the same to the central controller 822. The central controller 822 registers the transmitted inherent ID in a DB.

At the state where the inherent ID has been registered, a visitor manipulates a menu on the portable terminal 800 which is a personal identification unit and selects an entrance/exit mode (step 811). After selecting the entrance/exit mode, the visitor manipulates a keypad on the portable terminal 800 and inputs a secret number in response to a request for an input of the secret number (step 812). The portable terminal 800 checks if the input secret number is correct (step 813). If the secret number is correct, the portable terminal 800 is converted into an entrance/exit information transfer mode. If the visitor presses a transfer button at the entrance/exit information transfer mode, the entrance/exit information is optically transmitted via the optical transceiver of the portable terminal 800. If the optically transmitted entrance/exit information is information registered in the DB of the central controller 822, the entrance/exit gate is open and admitted for entrance (step 814). If the secret number is not correct or the entrance/exit information does not coincide with the pre-menu on the portable terminal 800 which is a personal identification unit and selects an entrance/exit mode (step 811). After selecting the entrance/exit mode, the visitor manipulates a keypad on the portable terminal 800 and inputs a secret number in response to a request for an input of the secret number (step 812). If the secret number is input, the portable terminal 800 is converted into an entrance/exit information transfer mode. If the visitor presses a transfer button at the entrance/exit information transfer mode (step 813), the entrance/exit information is optically transmitted via the optical transceiver of the portable terminal 800. If the optically transmitted entrance/exit information is information registered in the DB of the central controller 822, the entrance/exit gate is open and admitted for entrance (step 814). If the secret number is not correct or the entrance/exit information does not coincide with the pre-registered information, the steps starting from step 811 will be resumed.

Meanwhile, if the entrance/exit information is received (step 821), the optical receiver 810 attached to the entrance/exit gate decodes the received information and then transmits the decoded result to the controller 820 (step 822). The controller 820 adds necessary information including entrance/exit identification information to the received information so that it can be identified whether the received information is information transmitted from which entrance/exit gate, and transmits the added result to the central controller 822 (step 823). The central controller 822 searches the DB and judges whether the received information is an entrance/exit admitted personal information registered in the DB (step 824). If the user is an unregistered person, the central controller 822 takes no action in response to the input information and thus the entrance/exit gate is not open. If the user is a registered person who is admitted for entrance/exit, the central controller 822 transmits an entrance/exit gate opening signal to the controller 820 corresponding to the entrance/exit gate to which the entrance/exit information is transmitted (step 825). The controller 820 having received the entrance/exit gate opening signal opens the entrance/exit gate by an operation (step 826).

A function of storing or transmitting an actual monetary value is added in a portable terminal incorporated with an optical transceiver, to thereby allow the portable terminal to give and take the monetary value with a cash input and output machine (ATM) or a portable terminal of the other person in real-time, Also, when a user pays for transaction money in a general store, it is preferable that a monetary value can be transmitted from the in-person portable terminal to a portable terminal of a seller or a card reader attached with an optical receiver, in real-time.

Figure 86:
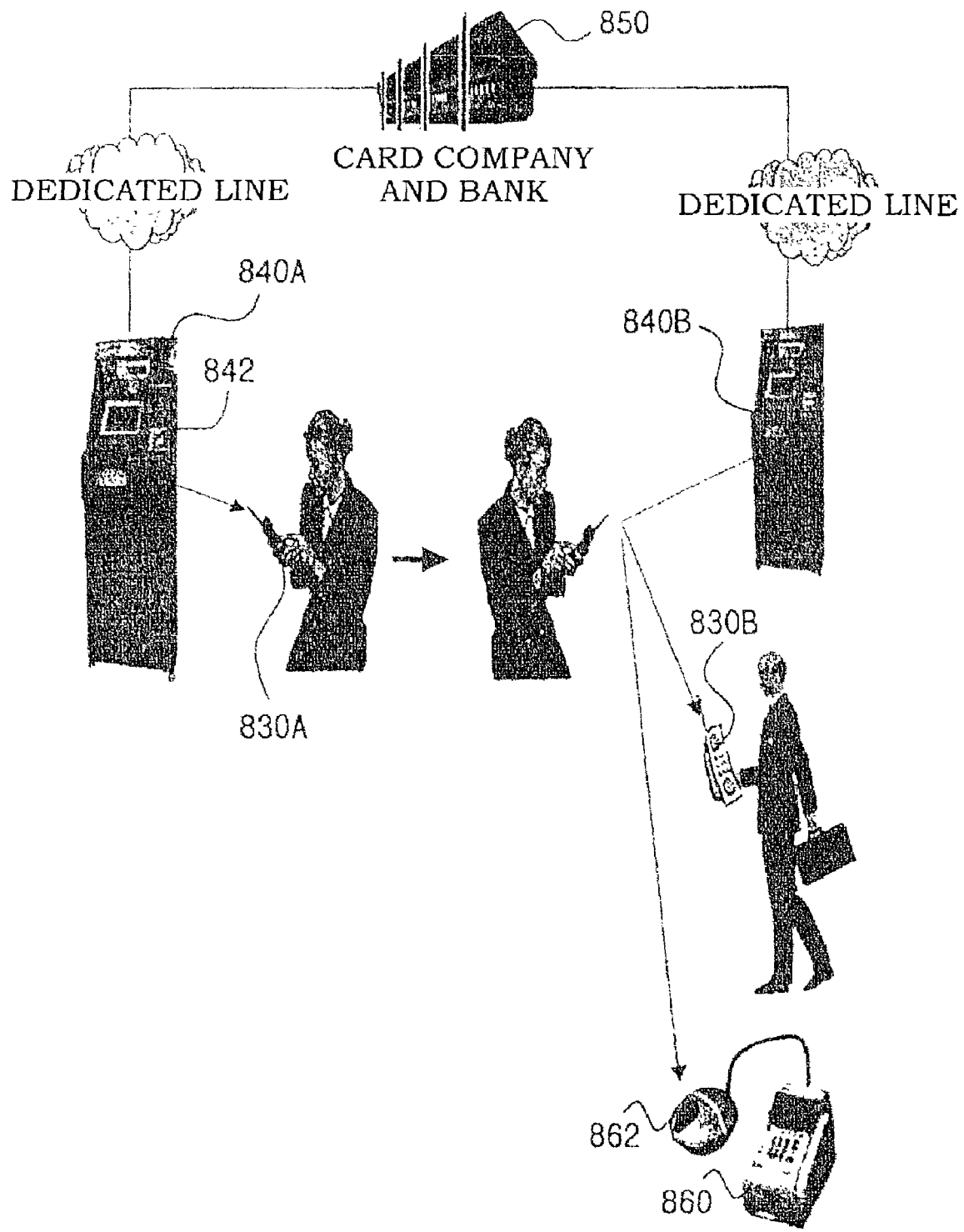
FIG. 86 is a configuration view showing a real-time value transferable electronic money system according to the present invention.

FIG. 86 is a configuration view showing a real-time value transferable electronic money system according to the present invention. a user of a portable terminal 830A attached with an optical transceiver receives a predetermined amount of money from a cashier machine 840A attached with an optical receiver 842 in the form of an electronic money. The user transmits the electronic money received in the portable terminal 830A to the other cashier machine 840B or a portable terminal 830B of the other person or a card reader 860 connected with an optical receiver 862 in a general store.

First of all, a case that the electronic money is withdrawn from the cashier machine 840A will be described.

Figure 87:
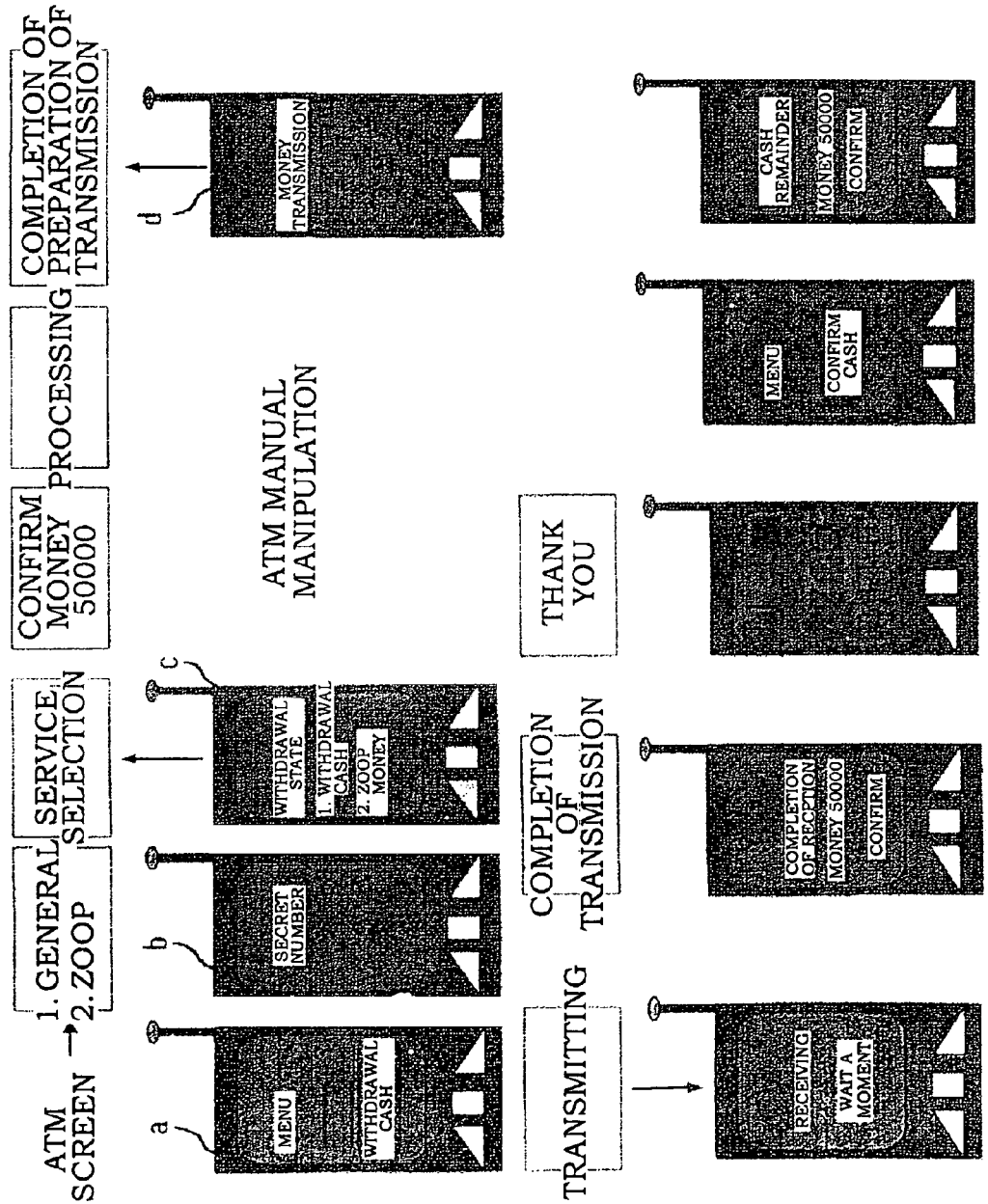
FIG. 87 shows configuration of display screens when an electronic money is withdrawn in an ATM.
Figure 88:
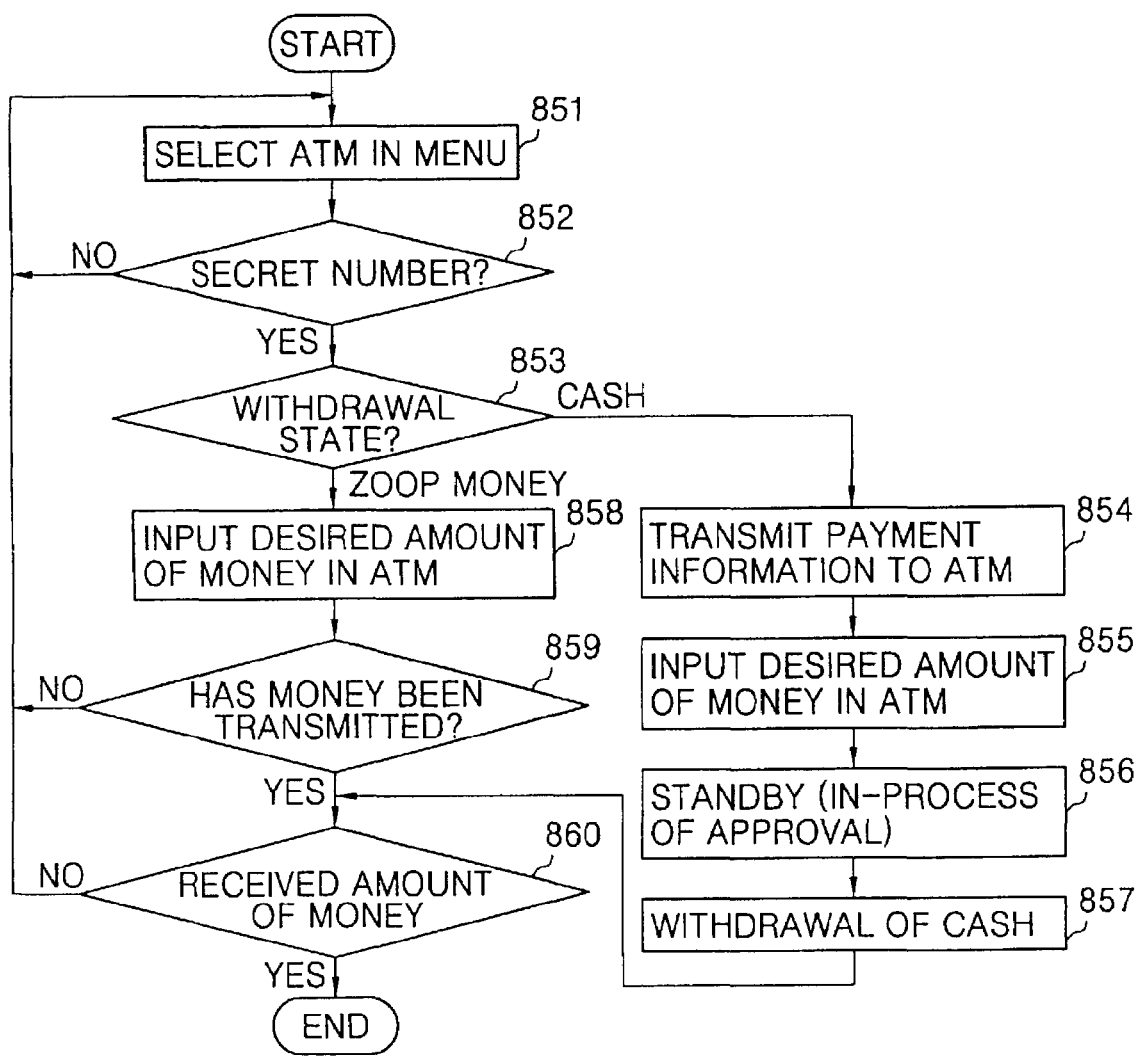
FIG. 88 is a flowchart view for explaining an operation when an electronic money is withdrawn in an ATM.

FIG. 87 shows configuration of display screens when an electronic money is withdrawn from a cash withdrawal machine 840A such as an ATM. FIG. 88 is a flowchart view for explaining an operation when an electronic money is withdrawn from a cash withdrawal machine 840A such as an ATM.

A user selects a cashier machine 840A on a menu screen (a) of FIG. 87 of the in-person portable terminal (step 851). Then, on the screen of the portable terminal 830A is displayed a message for asking a secret number as shown in the screen (b) of FIG. 87. If the user inputs the secret number, the portable terminal 830A checks if the input secret number is a correct secret number (step 852). If the input secret number is correct, the portable terminal 830A displays a message for selecting the and displays the in-process operation. The ATM 840A pays for a corresponding amount of money in cash after an approval processing, and makes the user withdraw the cash (step 857). If the user selects the electronic money in step 853, the ATM 840A asks the user of how much money the user wishes to receive. The user inputs a desired amount of money in the ATM 840A manually (step 858), and stands by. The ATM 840A displays a in-process message on the screen and then displays a transmission preparation completion message on the screen. Then, the user presses an "execution" button among selection options of the money reception displayed on the menu of the portable terminal 830A shown in the screen (d) of FIG. 87. The portable terminal 830A checks if the money transfer execution button is pressed (step 859). When the "execution" button is pressed, the money as much as the input amount of money input from the ATM 840a is transmitted to the portable terminal 830A. Here, on the screen of the portable terminal 830A is displayed an in-reception, a reception completion and a transmitted m\amount of money in turn. At the same time, on the screen of the ATM 840A id displayed a transmission completion message. The user ascertains the received amount of money after the monetary value is transmitted from the ATM 840A (step 860). Here, if the received money is correct, the transfer of the monetary value is completed. If the received money is not correct, the transfer thereof is resumed from the initial step.

In the following, an electronic money exchange between portable terminals will be described.

Figure 89:
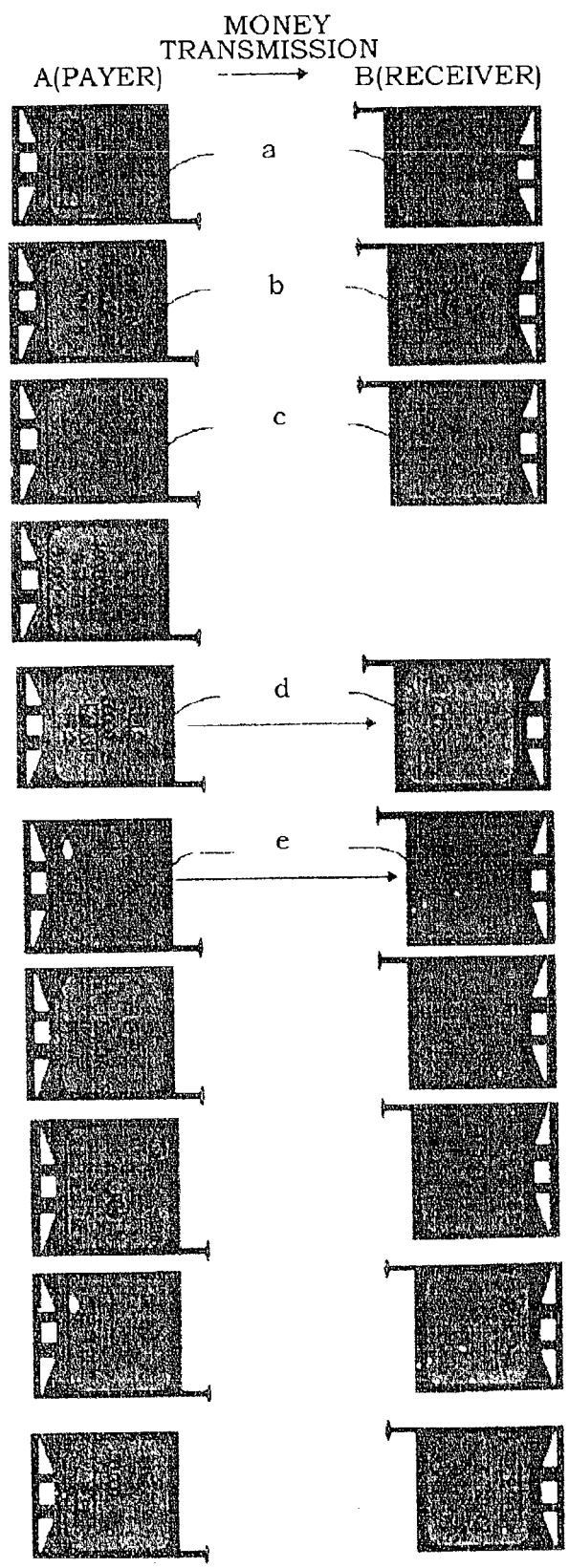
FIG. 89 shows configuration of display screens when an electronic money is exchanged between portable terminals.
Figure 90:
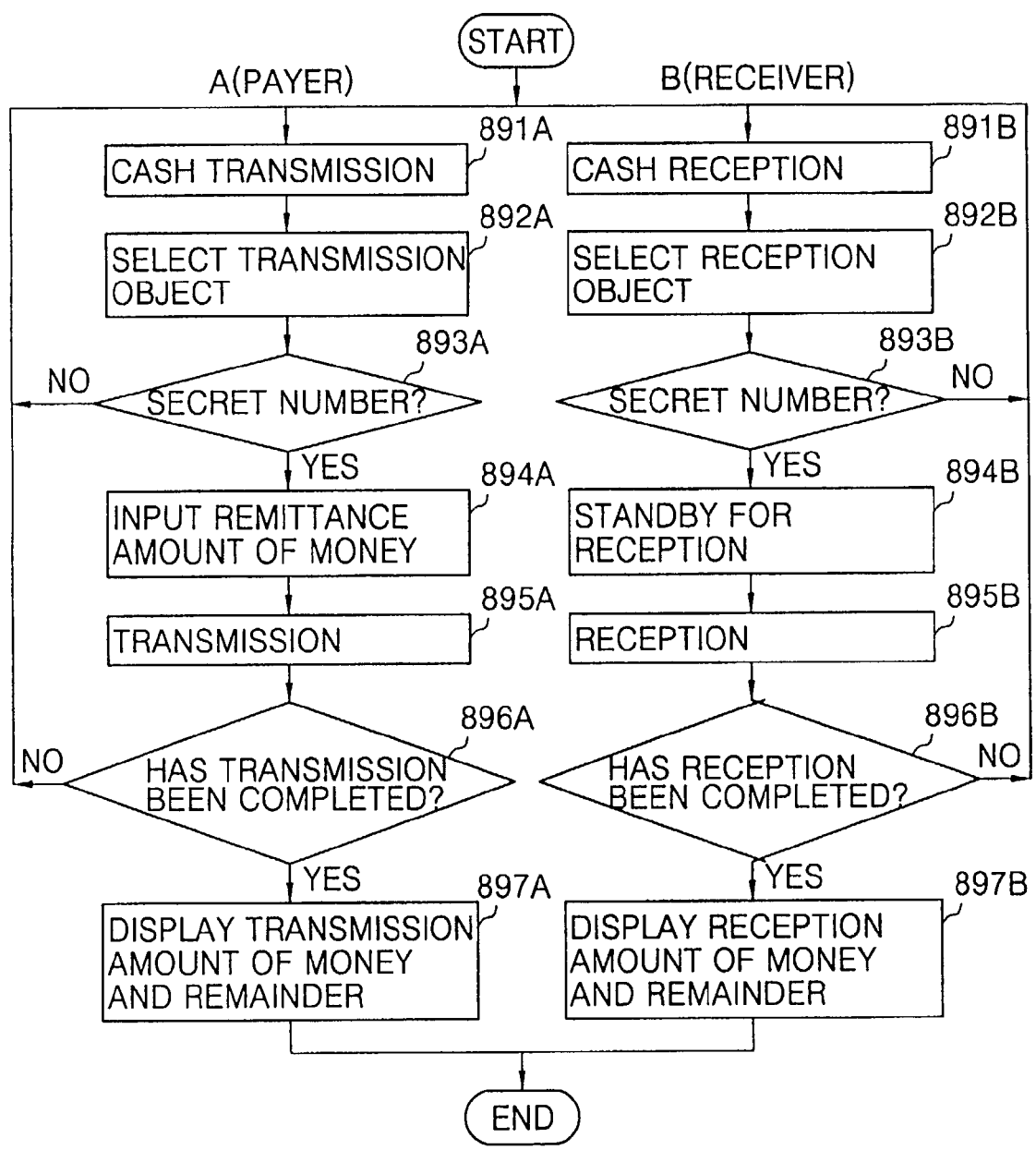
FIG. 90 is a flowchart view for explaining an operation when an electronic money is exchanged between portable terminals.

FIG. 89 shows configuration of display screens when an electronic money is exchanged between portable terminals. FIG. 90 is a flowchart view for explaining an operation when an electronic money is exchanged between portable terminals.

A provider and a receiver respectively select a cash transfer and a cash reception at a menu screen on the portable terminal 830A or 830B, as shown in the screen (a) in FIG. 89 (step 891A or 891B). Then, the portable terminal 830A or 830B displays the screen so that one transferable object can be selected among the portable terminal of a zoop phone and the ATM machine as shown in the screen (b) of FIG. 89. Both the provider and the receiver select the transferable object using the portable terminal (step 892A or 892B). If the transferable object is selected, the corresponding portable terminal 830A or 830B displays the screen for asking the secret number as shown in the screen (c) of FIG. 89. If both the provider and the receiver input the respective secret numbers, the portable terminal 830A or 830B checks if the input secret number is correct (step 893A or 893B). If the input secret number is correct, the provider inputs an amount of money to be transmitted (step 894A). Here, the receiver stands by to receive the money (step 894B), and the portable terminal 830A displays the reception stand-by on the screen as shown in the screen (d) of FIG. 89. If the remittance amount of money is input, the provider portable terminal 830A displays the screen so that the money transfer execution is selected. If the money transfer execution is selected, the provider portable terminal 830A transmits the electronic money to the receiver portable terminal 830B which stands by for reception at the same time (step 895A). Here, the receiver portable terminal 830B receives the transmitted electronic money (step 895B). Each of the provider and receiver portable terminals 830A and 830B display the screen indicating the transmission and reception states as shown in the screen (e) of FIG. 89 during transmission and reception. The provider and receiver portable terminals 830A and 830B check the transmission and reception completion (steps 896A and 896B), respectively. If the transmission and reception is completed, the transmitted and received money is displayed and ascertains the amount of money (steps 897A and 897B). In this case, the remainder money is displayed together. At this state, a confirmation button is pressed to terminate an electronic money exchange.

In the following, an electronic money payment using a portable terminal in a general commerce will be described.

Figure 91:
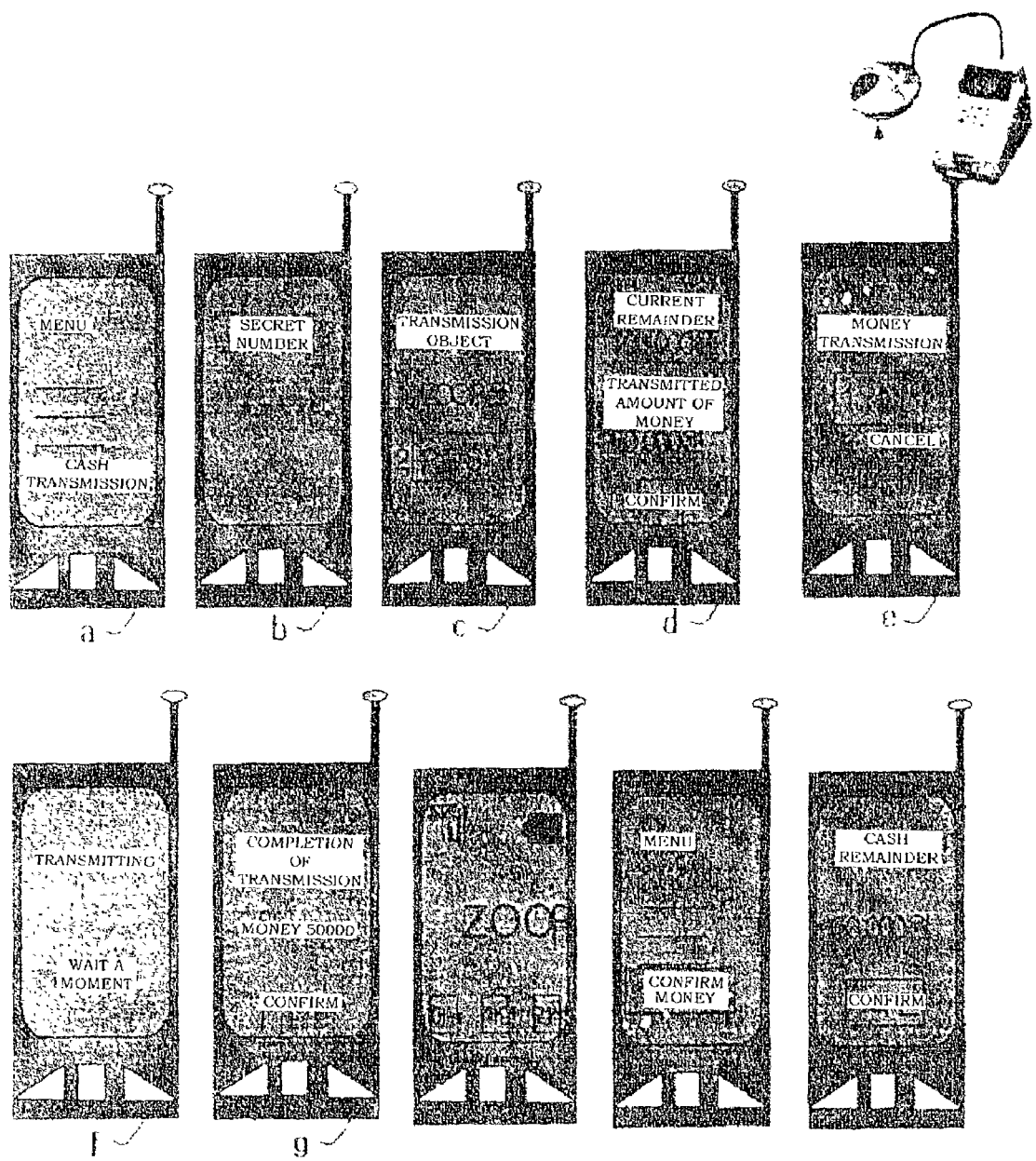
FIG. 91 shows configuration of display screens in the case of payment of an electronic money using a portable terminal.
Figure 92:
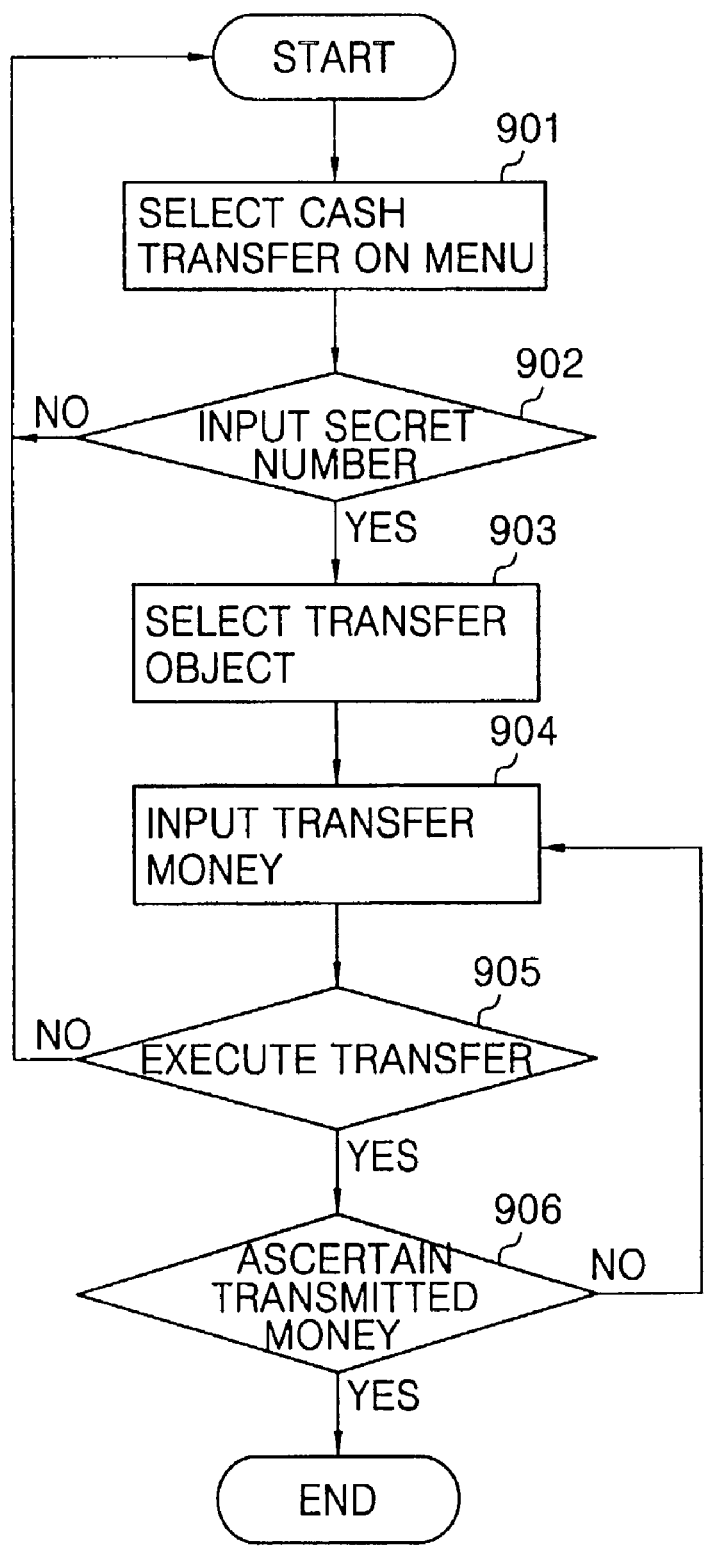
FIG. 92 is a flowchart view for explaining an operation in the case of payment of an electronic money using a portable terminal.

FIG. 91 shows configuration of display screens in the case of payment of an electronic money using a portable terminal. FIG. 92 is a flowchart view for explaining an operation in the case of payment of an electronic money using a portable terminal.

When a user who possesses a portable terminal 830A incorporated an electronic money purchases goods or services in a general store, and then intends to pay for the transaction money with the electronic money, the user selects a cash transfer on a menu as shown in the screen (a) of FIG. 91 (step 901). If the cash transfer is selected, the portable terminal 830A displays the screen asking a secret number as shown in the screen (b) of FIG. 91. When the user inputs a secret number, the portable terminal 830A checks if the secret number is correct (step 902). If the secret number is correct, the portable terminal 830A displays the screen asking a transfer object as shown in the screen (c) of FIG. 91 and checks the selected transfer object (step 903). Here, the user selects a POS as the transfer object. If the transfer object is a POS, the portable terminal 830A displays asking a transfer money together with an amount of current money as shown in the screen (d) of FIG. 91. The user inputs the transfer money in the portable terminal 830A (step 904). If the transfer money is input, the portable terminal 830A displays the screen asking whether a money transfer is executed as shown in the screen (e) of FIG. 91 and checks if the money transfer is executed (step 905). If the user presses an execution button, the portable terminal 830A transmits an amount of electronic money toward an optical receiver 862 connected to a credit card inquiry machine 860 in a corresponding business place and displays the in-transfer on the screen as sown in the screen (f) of FIG. 91. If the transmission is completed, the portable terminal 830A displays the transmitted money as sown in the screen (f) of FIG. 91 and ascertains the transmitted money (step 906). If the user selects the cash confirmation, in order to ascertain the transmitted money, an amount of remaining money after payment is displayed on the screen.

INDUSTRIAL APPLICABILITY

As described above, an optical payment transceiver and an optical settlement system using the same according to the present invention incorporates credit information in a portable terminal attached with an optical transceiver and transmits the credit information in the form of an infrared ray. Accordingly, a simple and safe transaction system can be embodied. In the case of a large amount of credit transaction requiring a secret number, a receiver receives a secret number and uses the same. Accordingly, there is no risk of leaking personal payment information. Also, since an optical receiver is attached to a credit information inquiry machine and credit information transmitted in the form of an infrared ray is transmitted to the inquiry machine, the credit card need not be presented to a clerk when the credit card transaction can be done. Accordingly, the illegal use of the credit card information can be prevented fundamentally. Also, a settlement can be done at a location distant from a credit card inquiry machine via a movable relayer and a device. In the case of a vending machine which cannot settle by a credit card in real-time, payment information is stored and collected at a predetermined point in time so as to be processed in package. Accordingly, it is possible to construct a credit transaction environment even in a field where a card has not been used. Thus, the present invention minimizes inconveniences where users carry cards or cash, and can prevent risks due to loss, theft and damage of the cards. Further, the present invention is applied to most fields where financial transactions are performed as in a general commerce, a drive-thru ordering system, a restaurant, a gas station, a department store, an electronic commerce, a vending machine, a subway or bus fare levying system, a toll gate fee collection system, a fee payment of kiosks, and an electronic money, and provides conveniences to users to thereby expedite active transactions. Also, the present invention can be applied to an entrance/exit security system requiring personal identification as well as the financial transaction. In addition, a secret number and bio-identification data are combined when an in-person is identified in order to access payment information incorporated in a portable terminal. Thus, an access with respect to personal payment information by an unauthorized person is prevented fundamentally, to thereby reinforce a security. Further, in a card transaction suspension field, a card reader downloads a blacklist from a card company in package and compares input credit information with the stored blacklist. If the input card information is blacklisted, an optical payment operation is not performed in a portable terminal. Accordingly, the present invention is faster in view of a blacklist processing speed, and cheaper in view of a system running cost. Moreover, a cost for issuing plastic cards continuously can be reduced.

The present invention is not limited in the above-described embodiments. It is apparent to one who is skilled in the art that there are many variations and modifications without departing off the spirit of the present invention and the scope of the appended claims.

The invention claimed is:

1. A card issuance method comprising the steps of:
   receiving from a customer an application for a card;
   selecting by the customer of a designated portable terminal from a plurality of portable terminals owned by the customer, to which upon approval of the application of the charge number is to be sent;
   determining that the applicant is the owner of the designated portable terminal;
   producing card information including charge number and encrypting the produced card information;
   transferring the encrypted card information to the designated portable terminal; and
   storing the information in the portable terminal.

2. The card issuance method of claim 1, wherein said step of producing card information comprises the steps of:
   forming a set by producing a card number and assigning an authentication number to the produced card number;
   compressing the set according to a predetermined compression algorithm; and
   assigning a card identification (ID) for discriminating the kind of a card with the corresponding card information to the compressed set.

3. The card issuance method of claim 1, wherein said step of storing the card information includes storing the card information in a memory device of the designated portable terminal.

4. The card issuance method of claim 1, wherein said step of transferring card information is in a wireless WAP or SMS data communications format.

5. The card issuance method of claim 1, wherein said step of transferring card information to the portable terminal is by cable interface.

6. The card issuance method of claim 1, further comprising the step of transferring a blacklist information into a corresponding portable terminal if a transaction suspension of an issued card occurs, registering the blacklist, and suspending use of the charge number which is stored in the portable terminal.

7. The card issuance method of claim 1 further comprises the step of displaying suspension of transaction on a designated data receiver if the transaction is disapproved and informing a card owner that a suspension or loss has been processed.

8. The card issuance method of claim 1, further including notifying card issuance to the designated portable terminal using wireless Internet Protocol communications or telephony communications.

9. The card issuance method of claim 1, wherein transmitting a message requesting identification data of an authorized person is performed using wireless Internet Protocol communications or telephony communications.

10. A card issuance method, comprising:
    receiving at a card issuer a card issuance application filled in by a customer;
    selecting by the customer of a designated handheld phone number to which upon approval of the application a charge number is sent;
    receiving at the card issuer the designated phone number;
    determining that the applicant is the owner of the designated phone number;
    producing the charge number by the card issuer;
    transmitting the charge number to the customer handheld phone having the designated phone number; and
    storing the charge number in the handheld phone having the designated phone number.

11. The method according to claim 10, wherein a financial transaction includes wirelessly transmitting the charge number from the handheld phone to a card receiving device.

12. The method according to claim 10, wherein said transmitting the charge number to the handheld phone is via a telephony communications network.

13. The method according to claim 10, wherein the step of determining whether the customer is the owner of the designated phone number is by communication with the customer's telephone service provider.

* * * * *